(12) United States Patent
Good

(10) Patent No.: US 6,951,304 B2
(45) Date of Patent: Oct. 4, 2005

(54) POLYGON-BASED BIOPTICAL POS SCANNING SYSTEM EMPLOYING DUAL INDEPENDENT OPTICS PLATFORMS DISPOSED BENEATH HORIZONTAL AND VERTICAL SCANNING WINDOWS

(75) Inventor: Timothy Good, Clementon, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 10/227,545

(22) Filed: Aug. 23, 2002

(65) Prior Publication Data

US 2003/0102377 A1 Jun. 5, 2003

Related U.S. Application Data

(63) Continuation of application No. 10/045,577, filed on Jan. 11, 2002, which is a continuation-in-part of application No. 09/551,887, filed on Apr. 18, 2000.

(51) Int. Cl.⁷ .................................................. G06K 7/10
(52) U.S. Cl. ............................ 235/462.32; 235/472.01; 235/462.25
(58) Field of Search ................................ 235/462 ALL, 235/472 ALL, 454, 455, 494, 462.01–462.05, 472.01–472.03

(56) References Cited

U.S. PATENT DOCUMENTS

| | | | |
|---|---|---|---|
| 3,902,048 A | * | 8/1975 | Fleischer et al. ...... 235/462.39 |
| 3,947,816 A | | 3/1976 | Rabedeau |
| 4,093,865 A | | 6/1978 | Nickl |
| 4,333,006 A | | 6/1982 | Gorin et al. |
| 4,647,143 A | | 3/1987 | Yamazaki et al. |
| 4,652,732 A | | 3/1987 | Nickl |
| 4,794,237 A | | 12/1988 | Ferrante |
| 4,795,224 A | | 1/1989 | Goto |
| 4,861,973 A | | 8/1989 | Hellekson et al. |
| 4,960,985 A | | 10/1990 | Knowles |
| 5,000,529 A | | 3/1991 | Katoh et al. |
| 5,026,975 A | | 6/1991 | Guber et al. |
| 5,039,184 A | | 8/1991 | Murakawa et al. |
| 5,073,702 A | | 12/1991 | Schuhmacher |
| 5,132,524 A | | 7/1992 | Singh et al. |
| 5,206,491 A | | 4/1993 | Katoh et al. |
| 5,229,588 A | | 7/1993 | Detwiler et al. |

(Continued)

FOREIGN PATENT DOCUMENTS

| EP | 0 663 643 A2 | 7/1995 |
|---|---|---|
| US | 2001/0017320 | 8/2001 |
| WO | WO99/01839 | 1/1999 |

OTHER PUBLICATIONS

Product Brochure for the Magellan SL 360–Degree Scanner/Scale by PSC Inc., Webster, NY, Feb. 2000, pp. 1–2.

Primary Examiner—Thien M. Le
(74) Attorney, Agent, or Firm—Thomas J. Perkowski, Esq., P.C.

(57) ABSTRACT

A bioptical laser scanning system employing a plurality of laser scanning stations about a two independently controlled rotating polygonal mirrors. The system has an ultra-compact construction, ideally suited for space-constrained retail scanning environments, and generates a 3-D omnidirectional laser scanning pattern between the bottom and side-scanning windows during system operation. The laser scanning pattern of the present invention comprises a complex of quasi-orthogonal laser scanning planes, including a plurality of substantially-vertical laser scanning planes for reading bar code symbols having bar code elements (i.e. ladder type bar code symbols) that are oriented substantially horizontal with respect to the bottom-scanning window, and a plurality of substantially-horizontal laser scanning planes for reading bar code symbols having bar code elements (i.e. picket-fence type bar code symbols) that are oriented substantially vertical with respect to the bottom-scanning window.

9 Claims, 91 Drawing Sheets

U.S. PATENT DOCUMENTS

| | | | |
|---|---|---|---|
| 5,286,961 A | | 2/1994 | Saegusa |
| 5,361,158 A | | 11/1994 | Tang |
| 5,459,308 A | | 10/1995 | Detwiler et al. |
| 5,475,207 A | * | 12/1995 | Bobba et al. ............ 235/462.4 |
| 5,491,328 A | | 2/1996 | Rando |
| 5,495,097 A | | 2/1996 | Katz et al. |
| 5,557,093 A | | 9/1996 | Knowles et al. |
| 5,684,289 A | | 11/1997 | Detwiler et al. |
| 5,689,102 A | | 11/1997 | Schonenberg et al. |
| 5,693,930 A | | 12/1997 | Katoh et al. |
| 5,705,802 A | | 1/1998 | Bobba et al. |
| 5,723,852 A | | 3/1998 | Rando et al. |
| 5,801,370 A | * | 9/1998 | Katoh et al. ........... 235/462.01 |
| 5,834,708 A | * | 11/1998 | Svetal et al. ................ 177/180 |
| 5,837,988 A | | 11/1998 | Bobba et al. |
| 5,869,827 A | | 2/1999 | Rando |
| 5,886,336 A | | 3/1999 | Tang et al. |
| 6,069,700 A | * | 5/2000 | Rudnick et al. ............ 356/511 |
| 6,098,885 A | | 8/2000 | Knowles et al. |
| 6,117,080 A | * | 9/2000 | Schwartz .................... 600/443 |
| 6,189,795 B1 | * | 2/2001 | Ohkawa et al. ........ 235/462.39 |
| 6,213,397 B1 | | 4/2001 | Rando |
| 6,223,986 B1 | | 5/2001 | Bobba et al. |
| 6,237,852 B1 | * | 5/2001 | Svetal et al. ........... 235/462.43 |
| 6,330,973 B1 | | 12/2001 | Bridgelall et al. |
| 6,435,413 B1 | * | 8/2002 | Kumagai et al. ...... 235/462.45 |
| 6,462,880 B1 | * | 10/2002 | Ohkawa et al. ............. 359/629 |
| 2003/0052172 A1 | * | 3/2003 | Lucera et al. .......... 235/462.25 |
| 2003/0052173 A1 | * | 3/2003 | Good .................... 235/462.32 |
| 2003/0102377 A1 | * | 6/2003 | Good .................... 235/462.32 |
| 2003/0136843 A1 | * | 7/2003 | Ralph et al. ........... 235/462.33 |
| 2003/0141367 A1 | * | 7/2003 | Lucera et al. ............ 235/462.4 |
| 2003/0201326 A1 | * | 10/2003 | Bobba et al. .......... 235/462.14 |
| 2004/0016813 A1 | * | 1/2004 | Good .................... 235/462.39 |
| 2004/0056099 A1 | * | 3/2004 | Barkan .................. 235/462.39 |

* cited by examiner

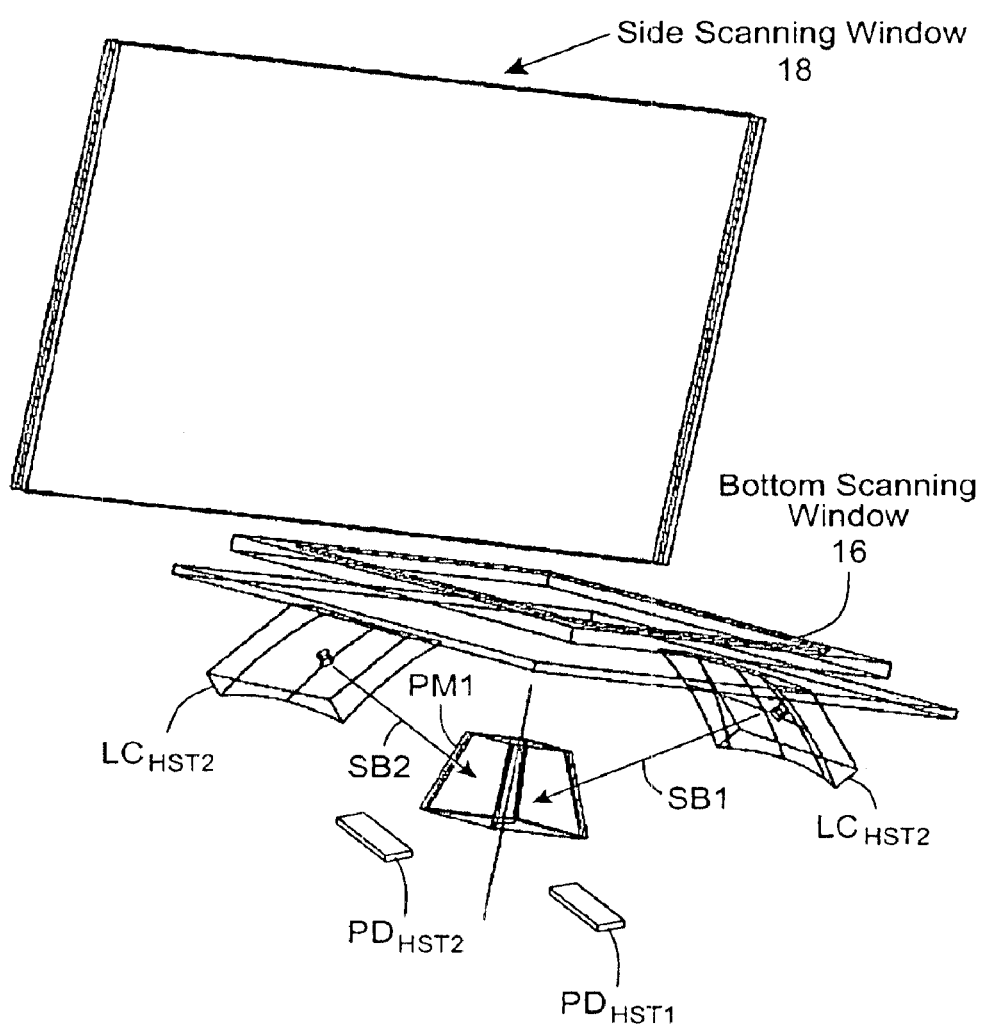
FIG. 2C1

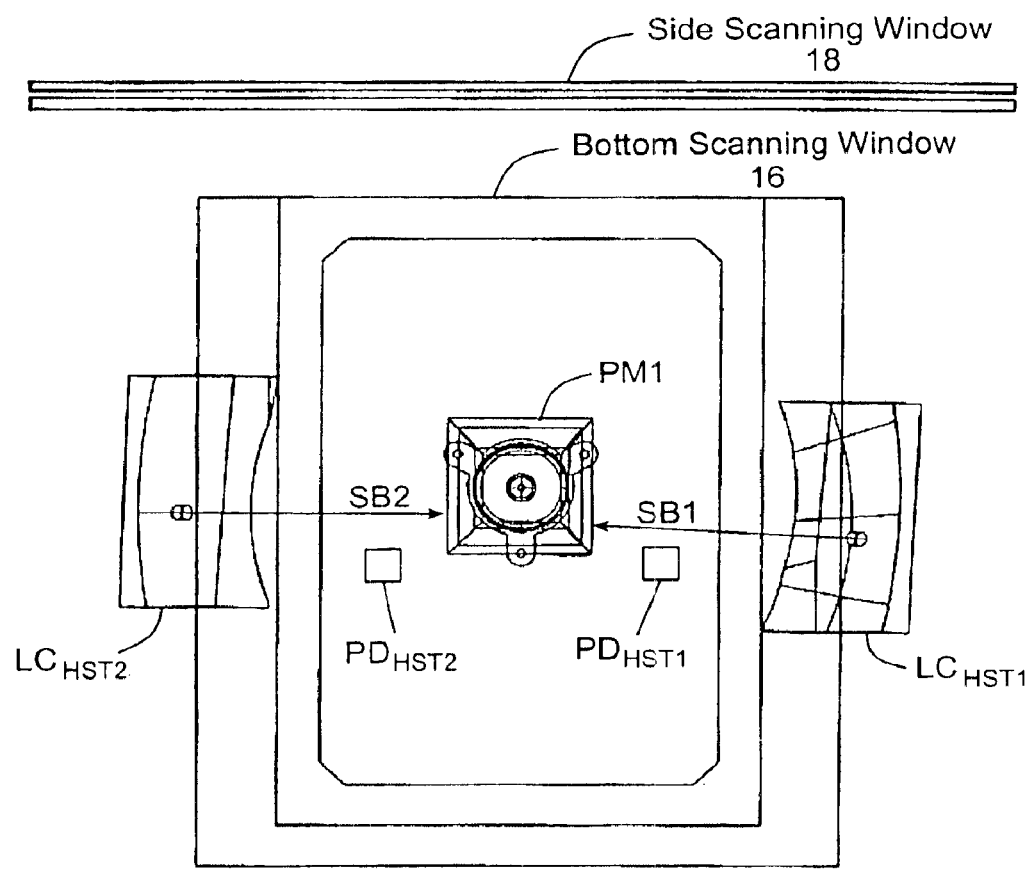
FIG. 2C2

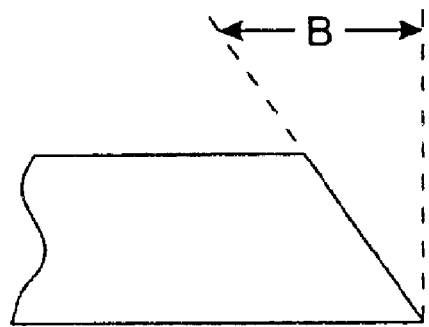
| First Polygon PM1 | Second Polygon PM2 |
|---|---|
| $B_1 = 11.6°$ | $B_1 = 10°$ |
| $B_2 = 13.3°$ | $B_2 = 12°$ |
| $B_3 = 14.9°$ | $B_3 = -10°$ |
| $B_4 = 16.6°$ | $B_4 = -12°$ |
FIG. 2G1

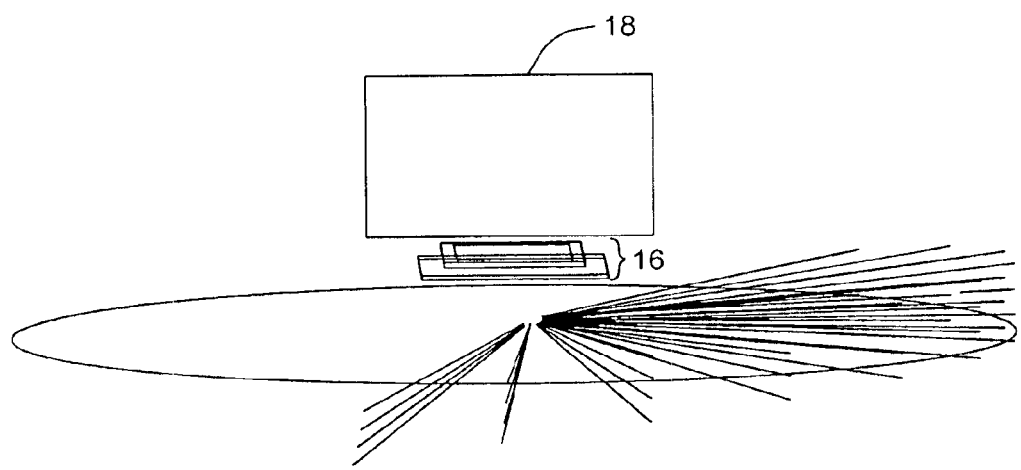
FIG. 2G2

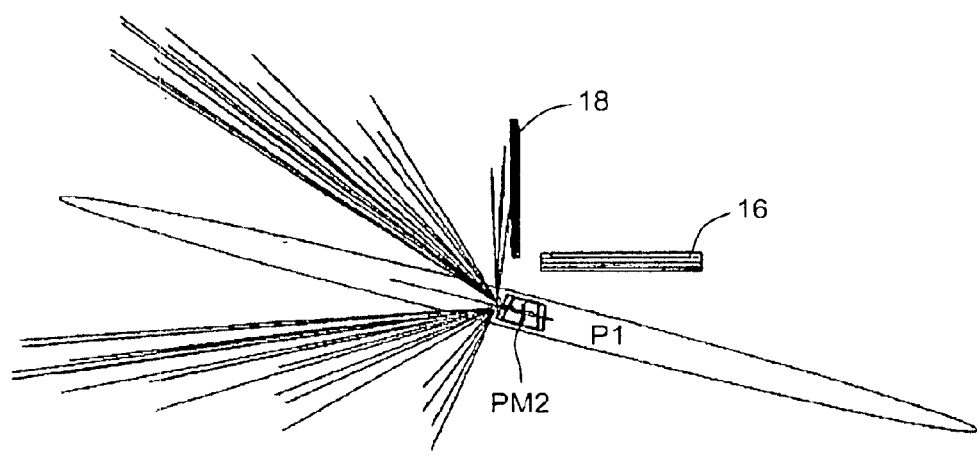
FIG. 2G3

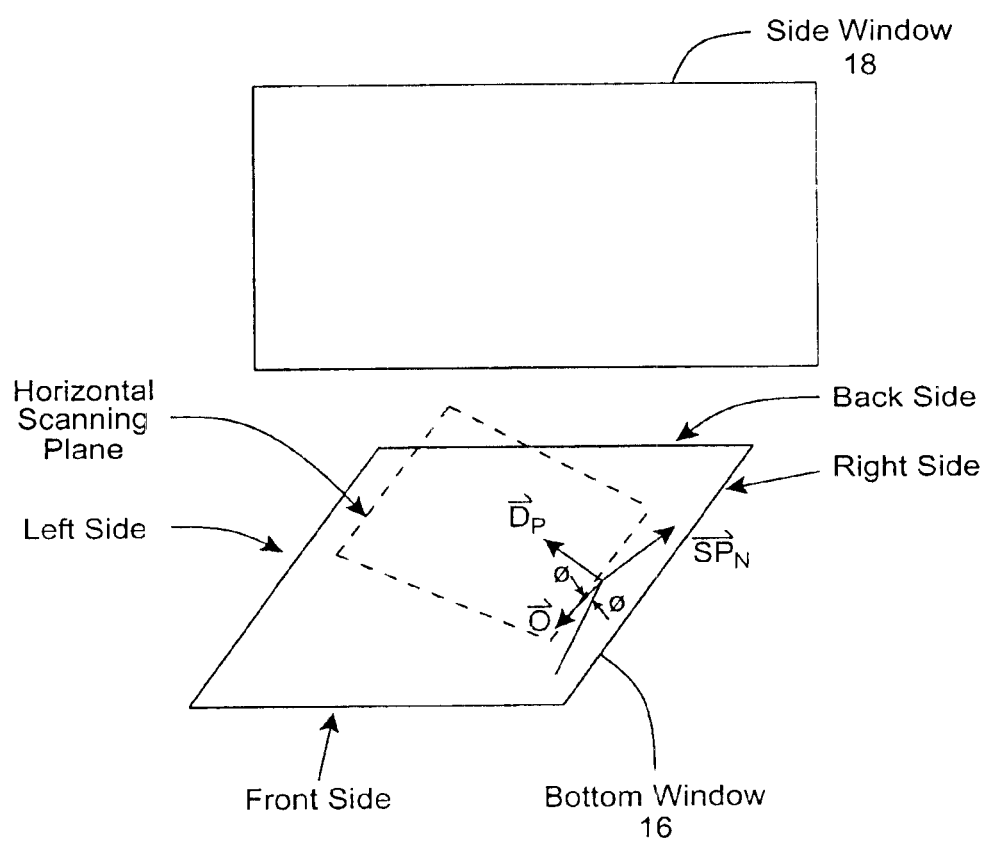
FIG. 3B1

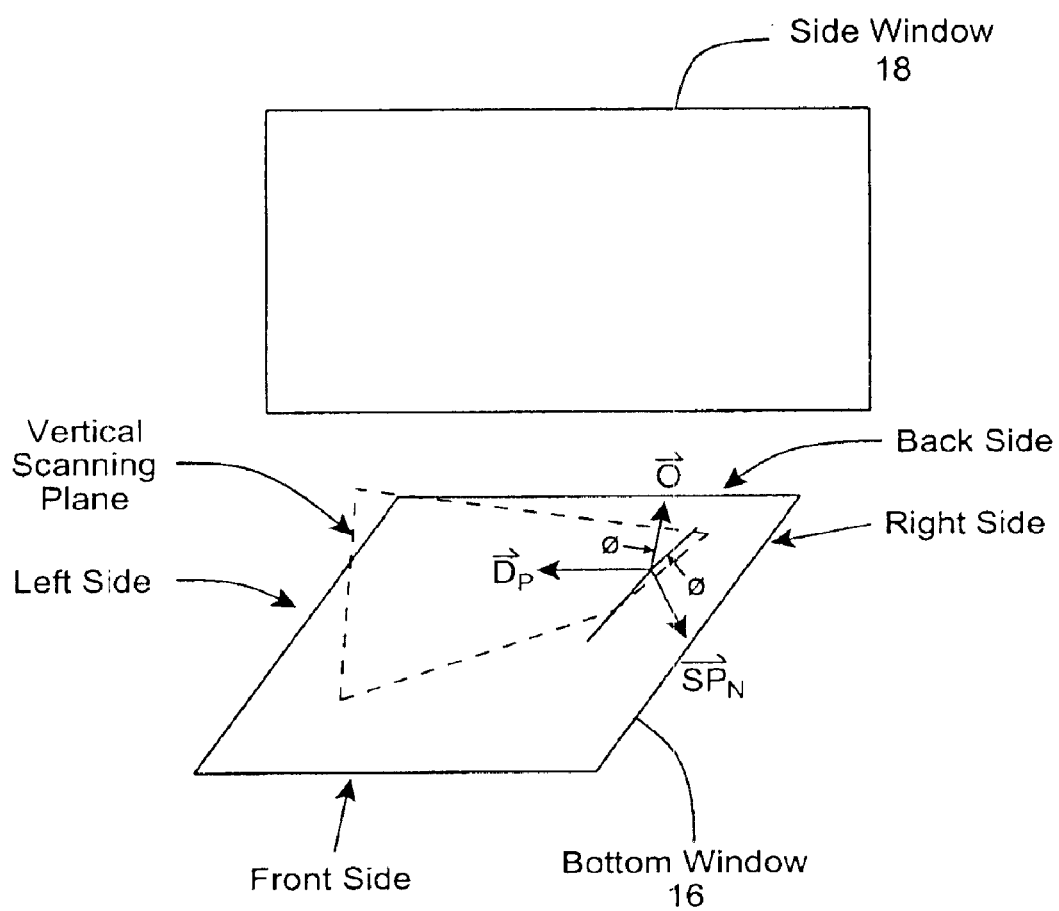
FIG. 3B2

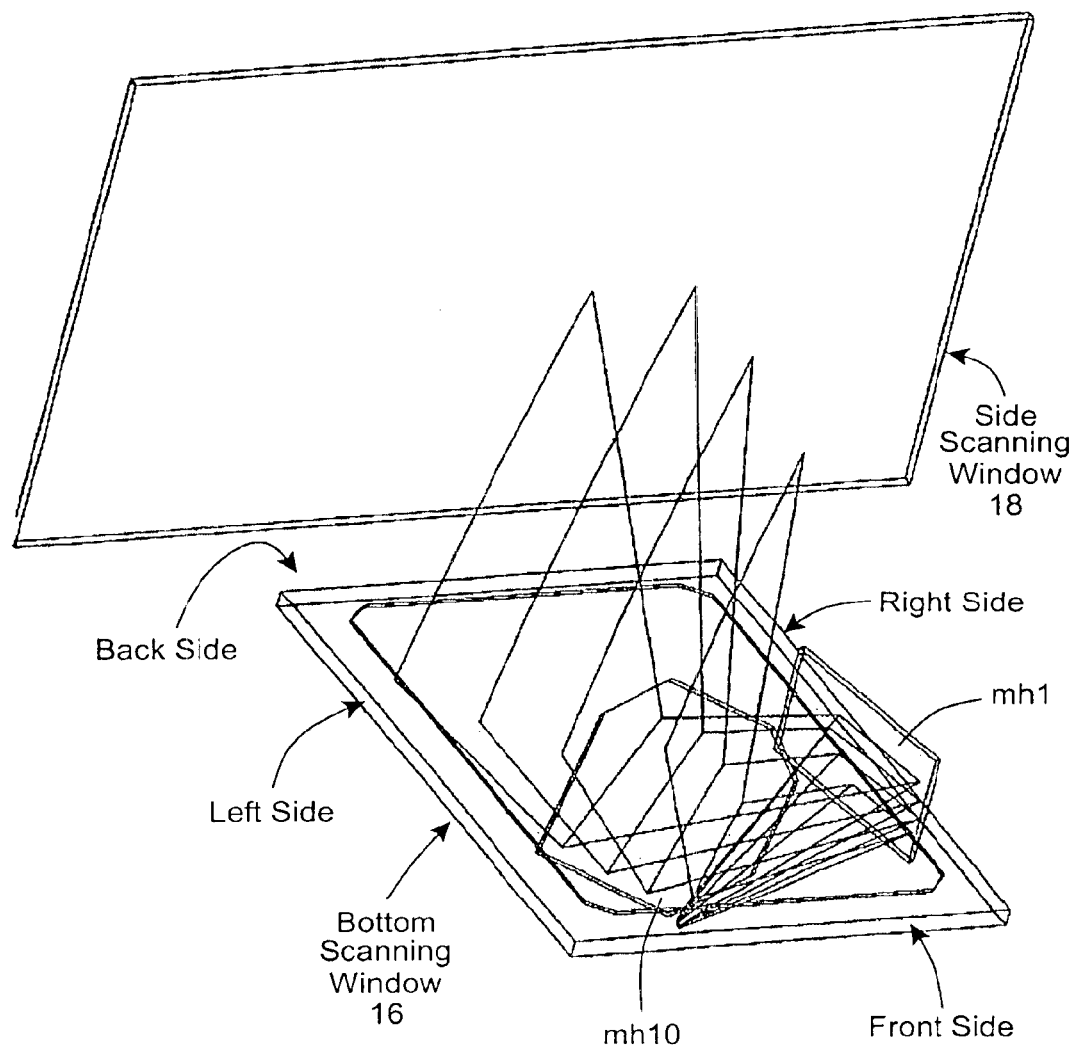
FIG. 3C1

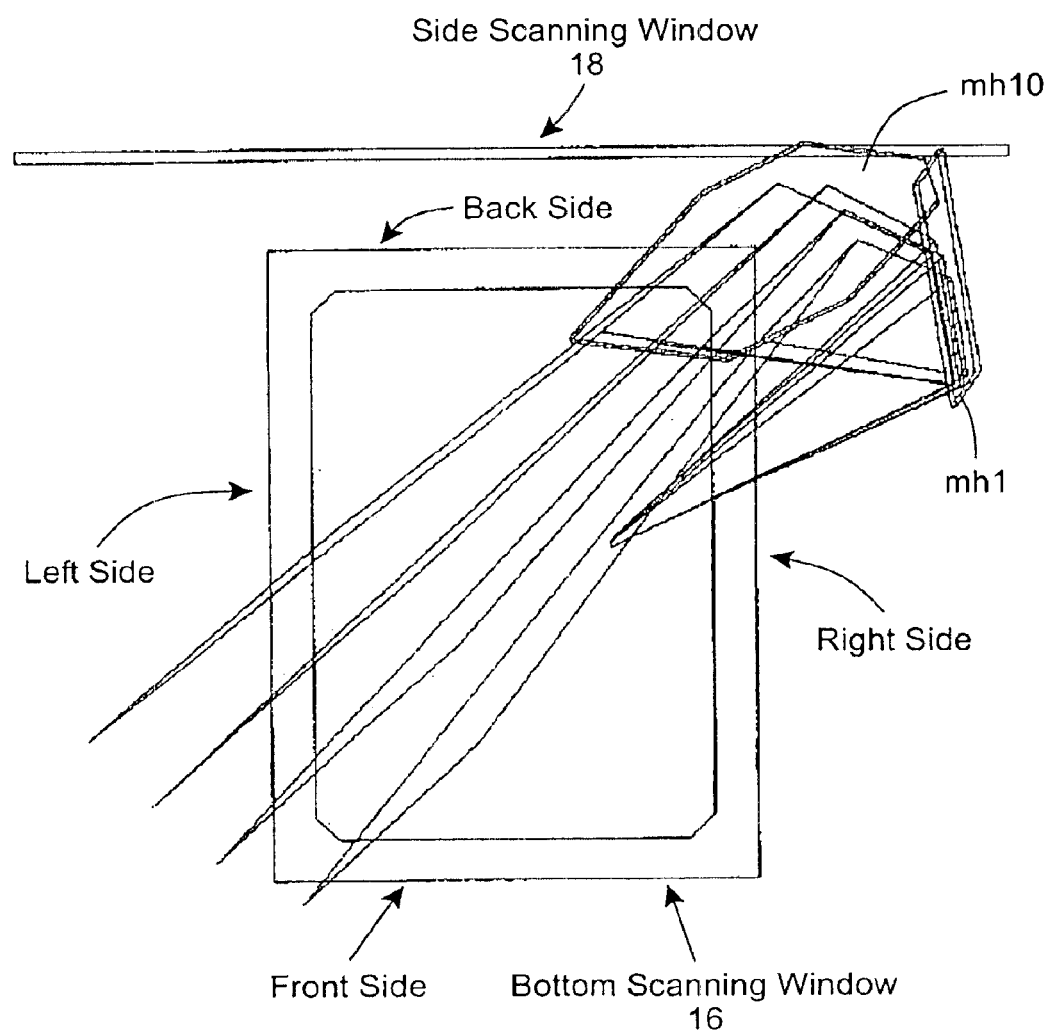
FIG. 3C2

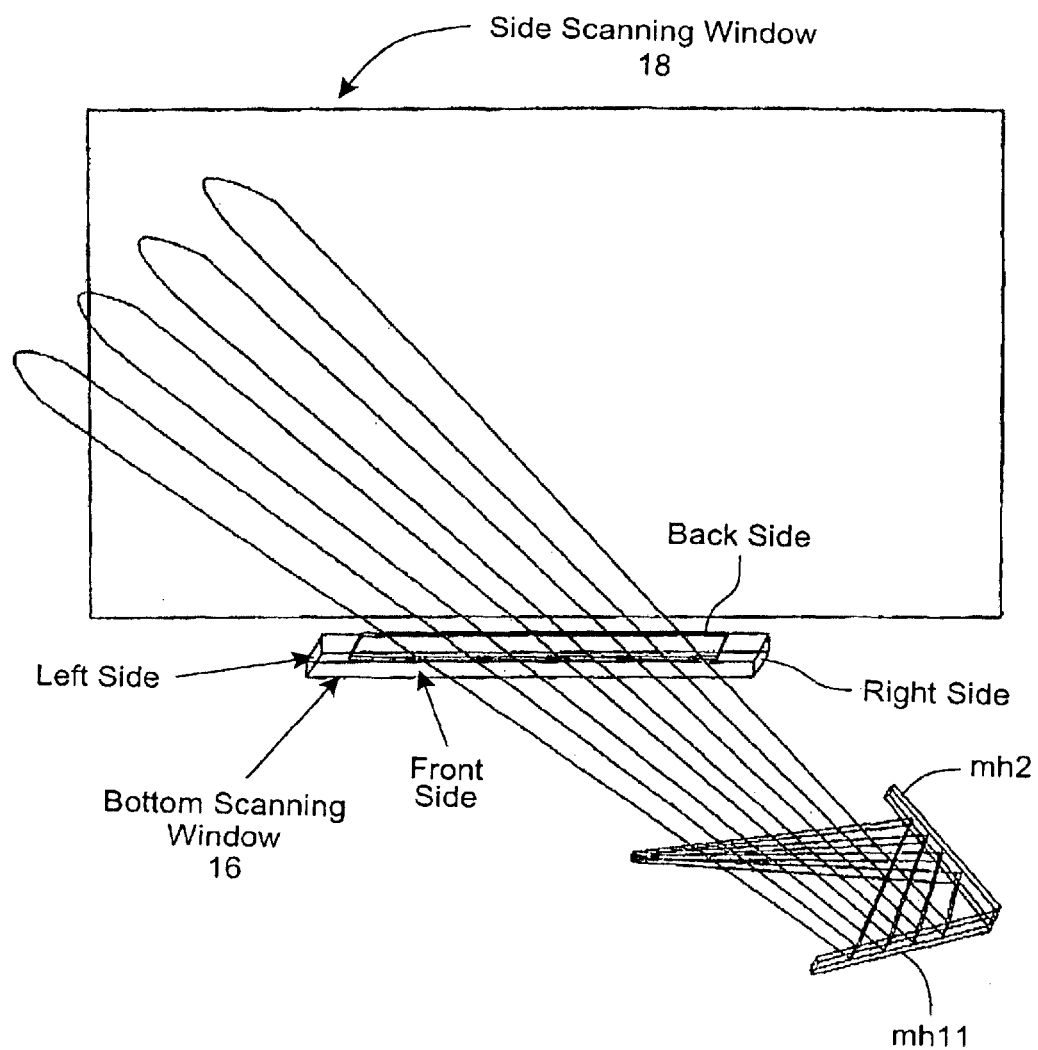
FIG. 3D1

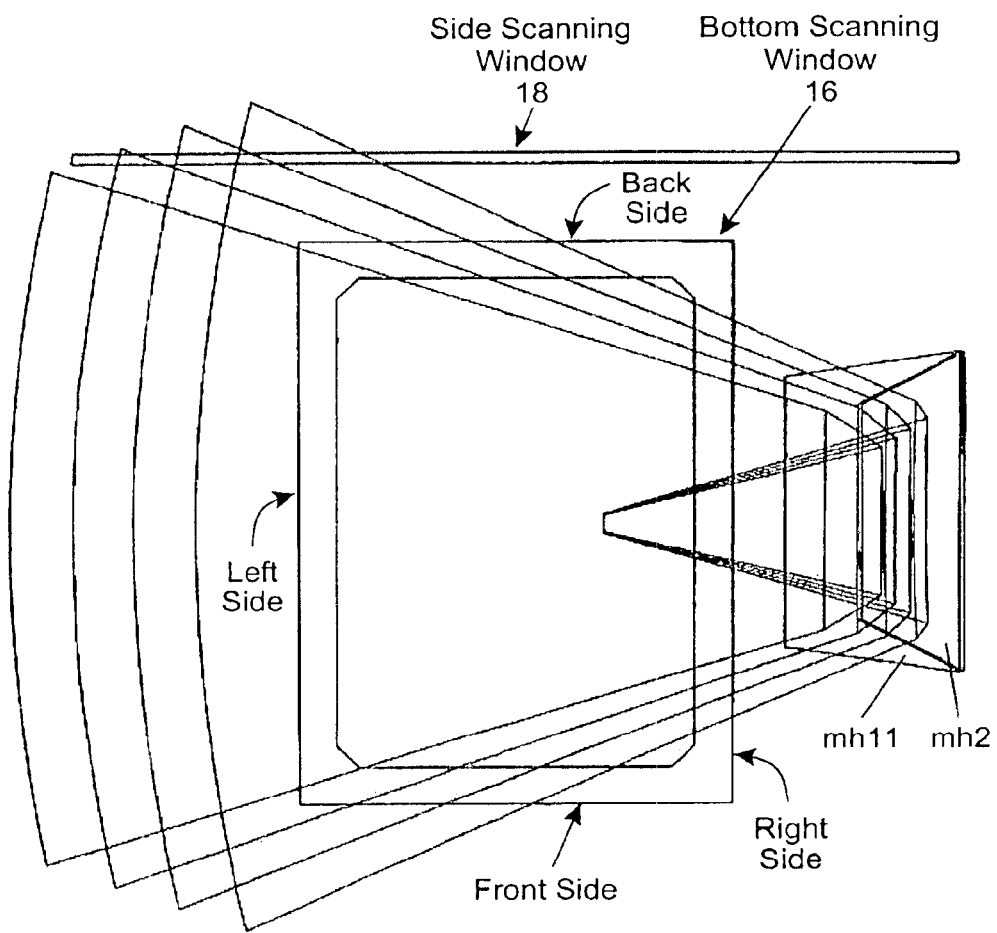
FIG. 3D2

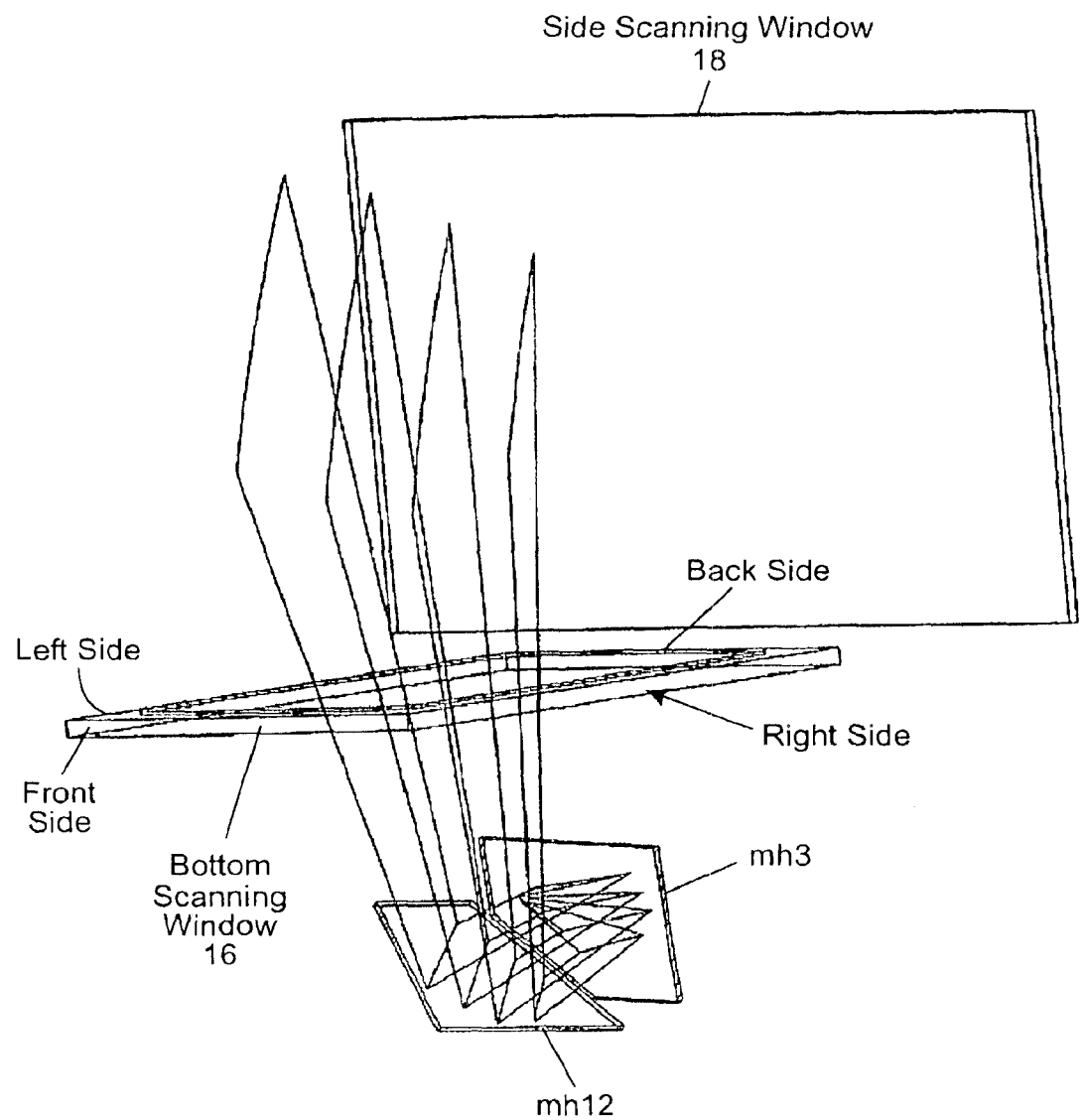
FIG. 3E1

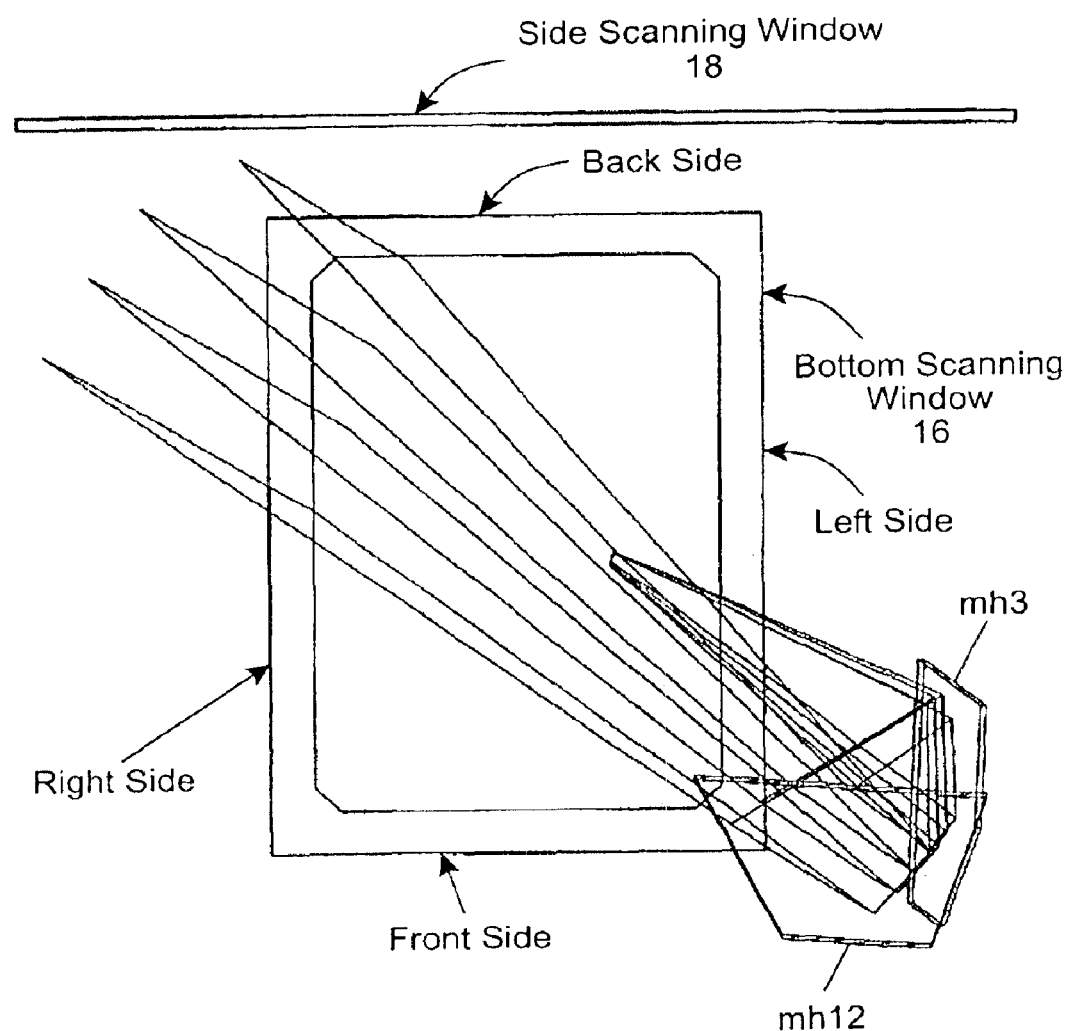
FIG. 3E2

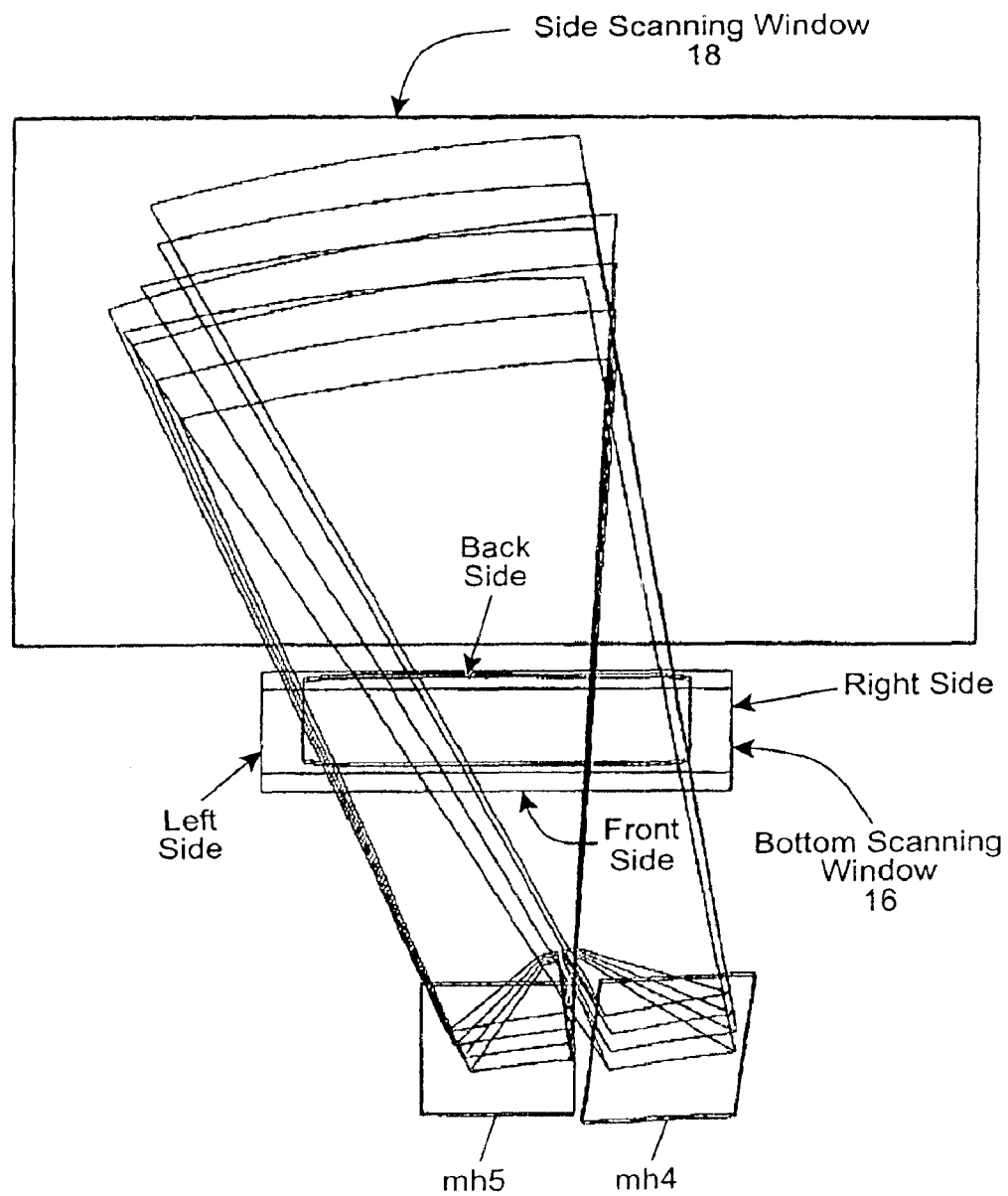
FIG. 3F1

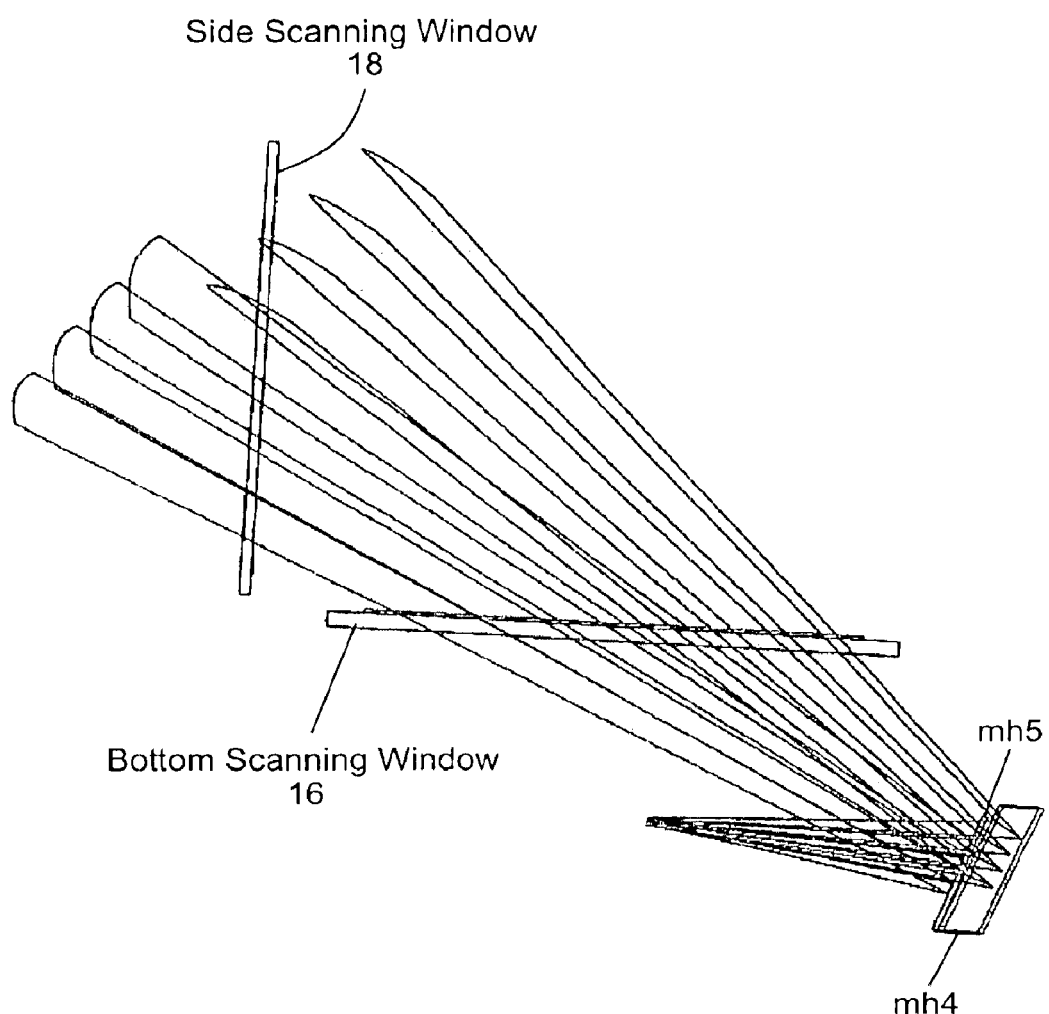
FIG. 3F2

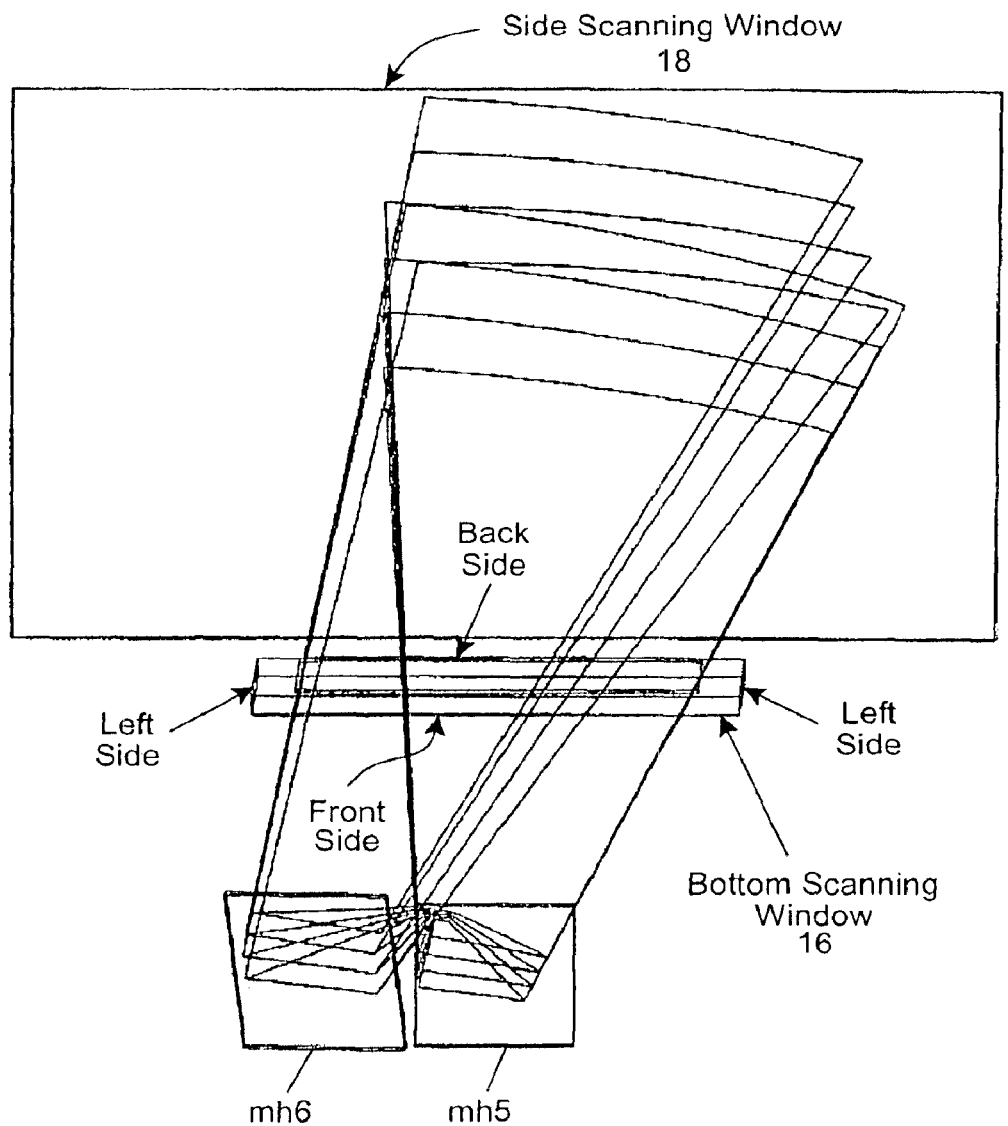
FIG. 4B1

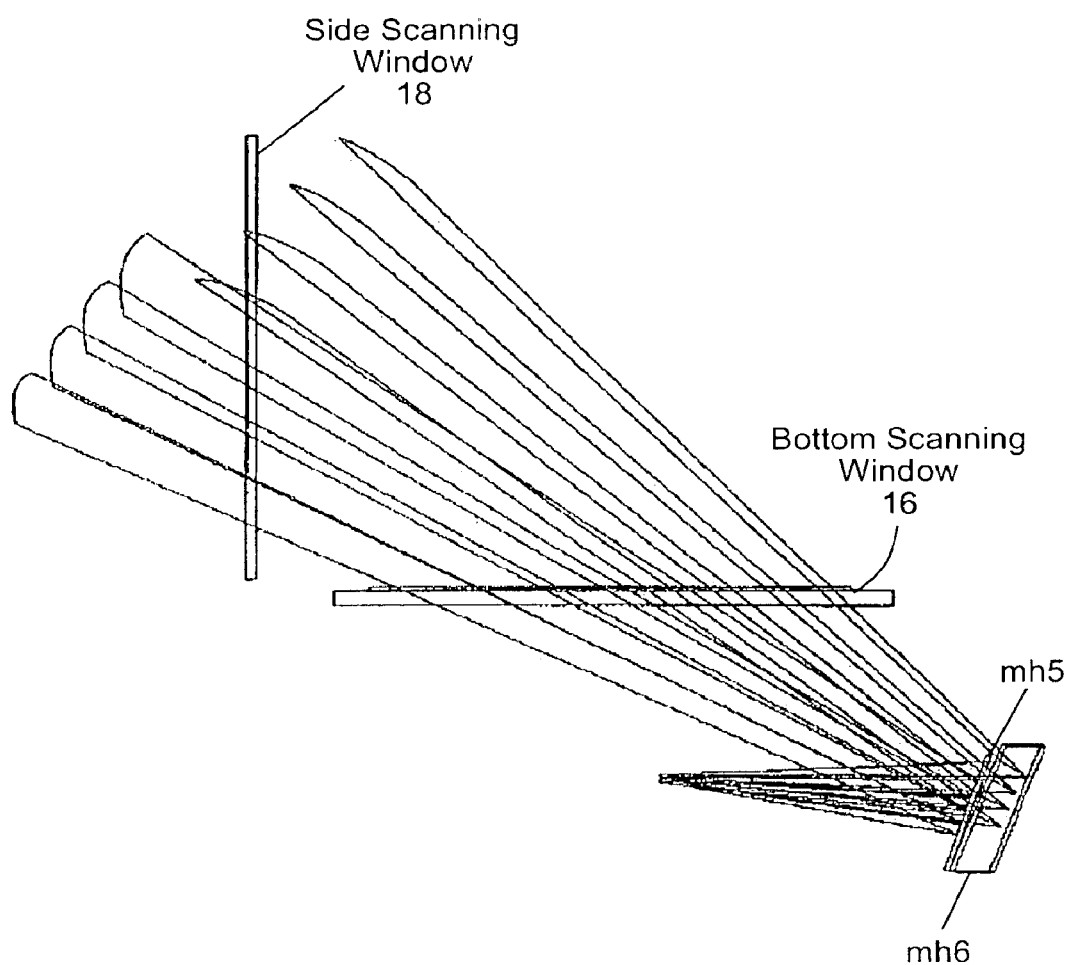
FIG. 4B2

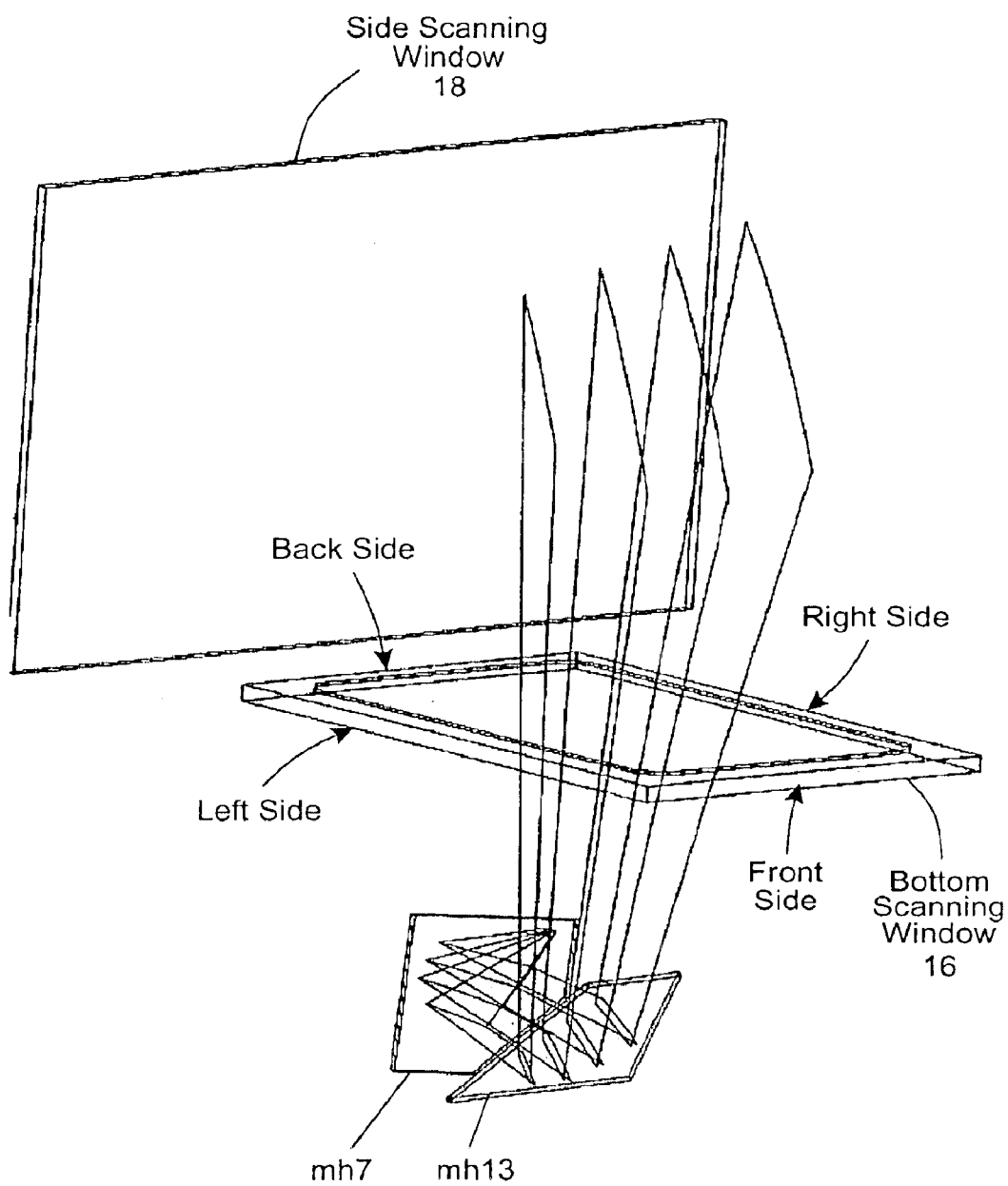
FIG. 4C1

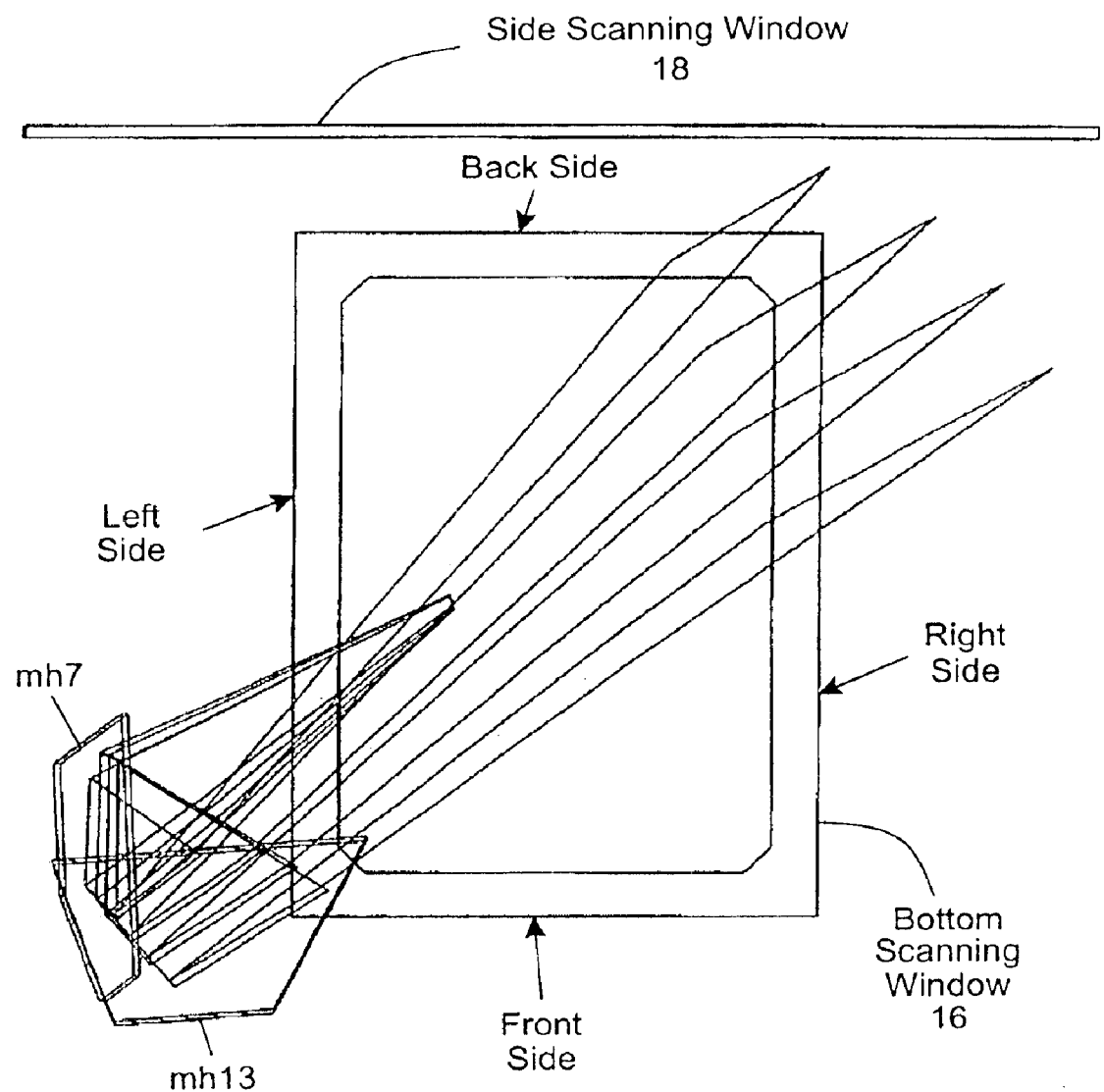
FIG. 4C2

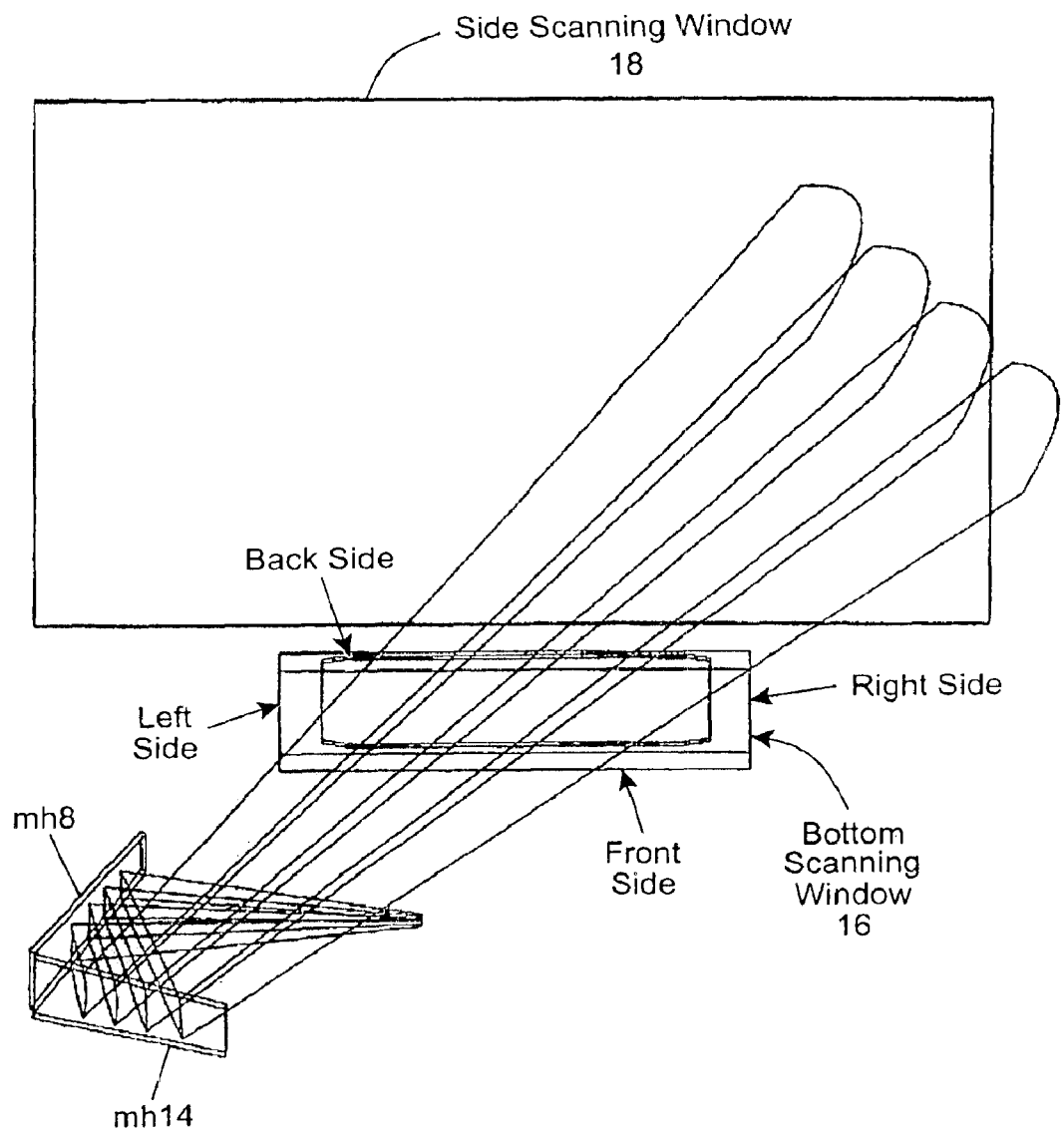
FIG. 4D1

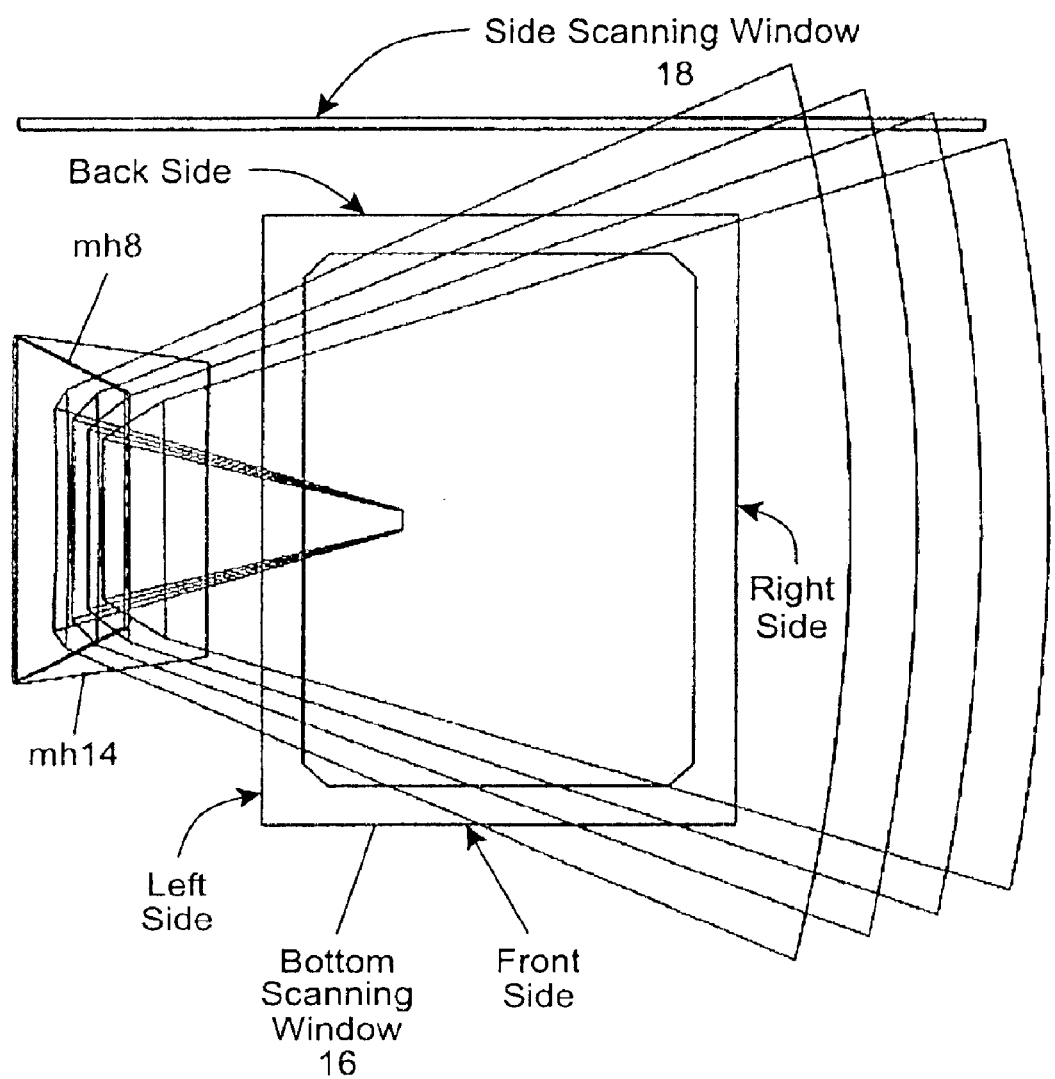
FIG. 4D2

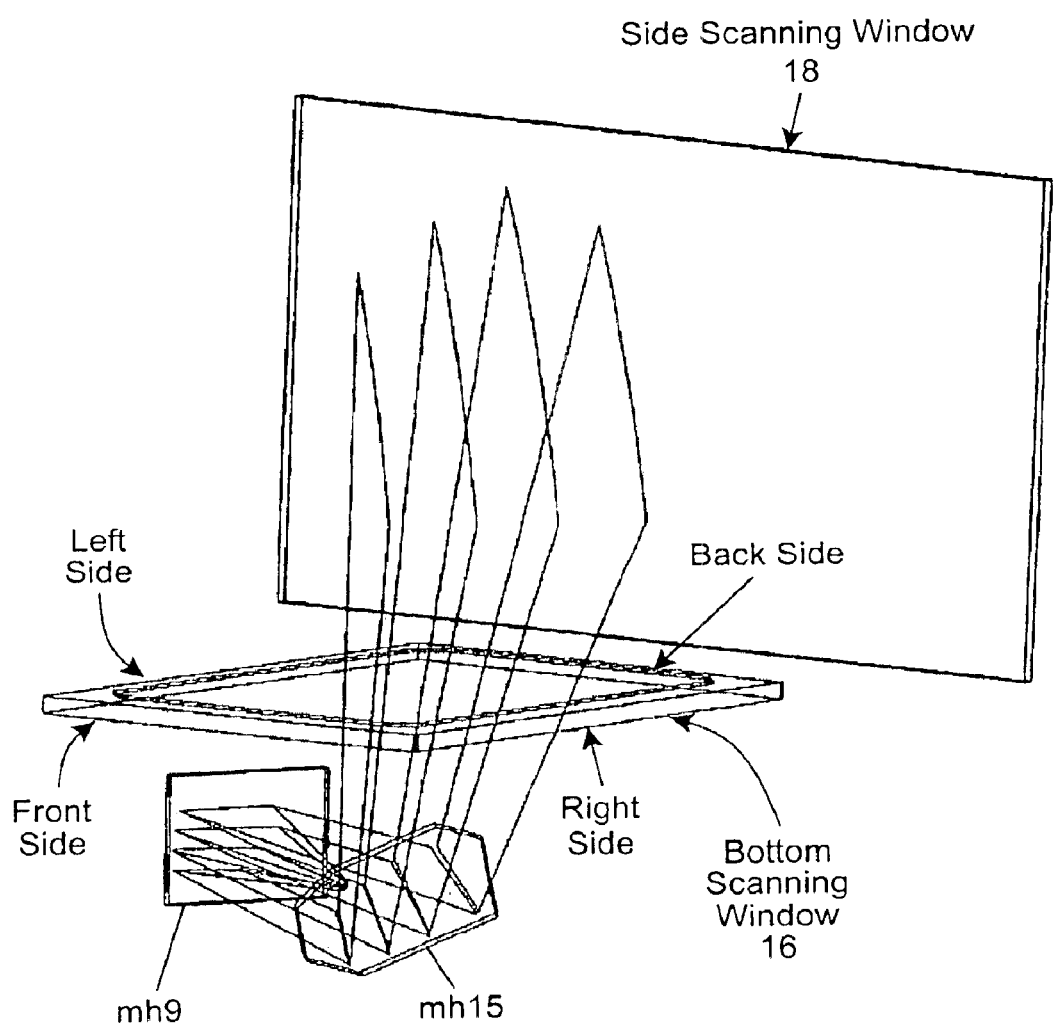
FIG. 4E1

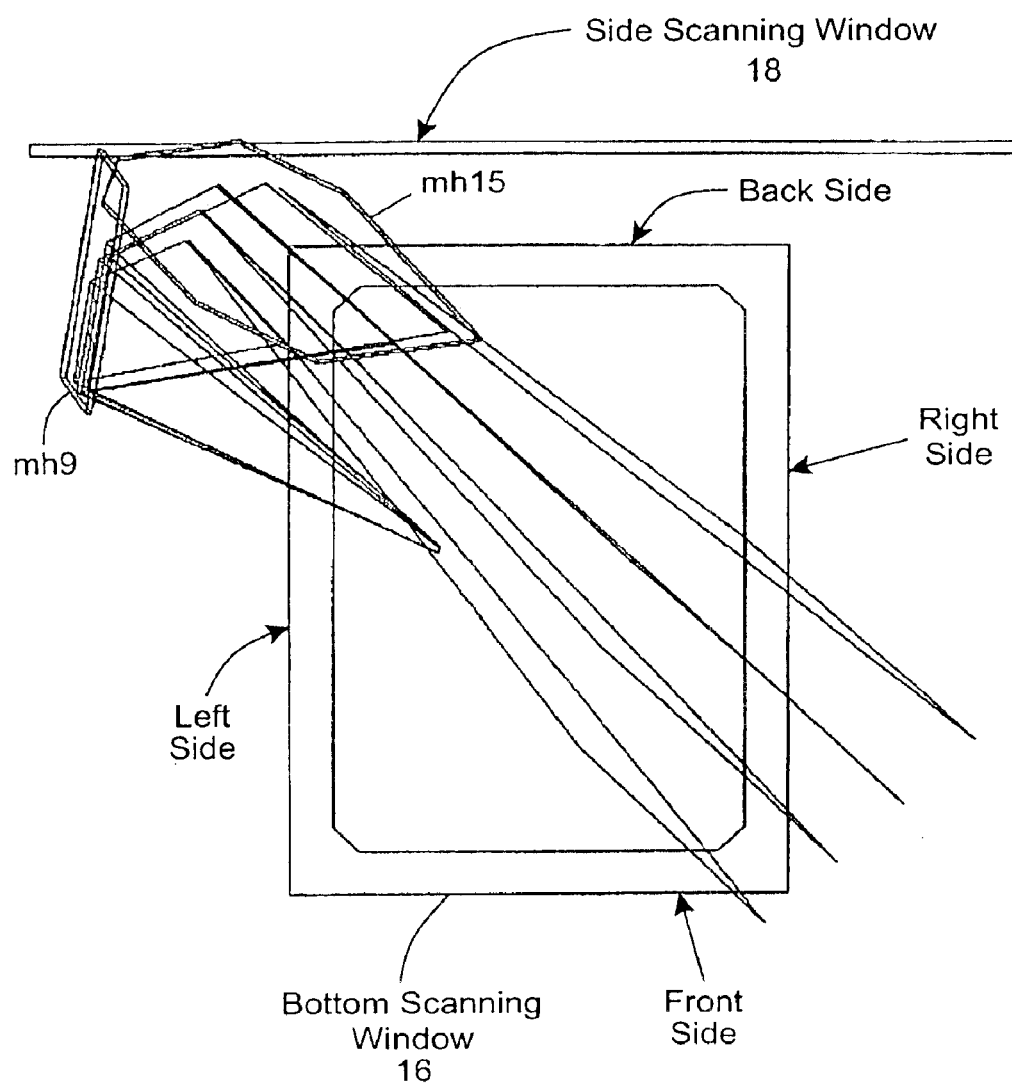
FIG. 4E2

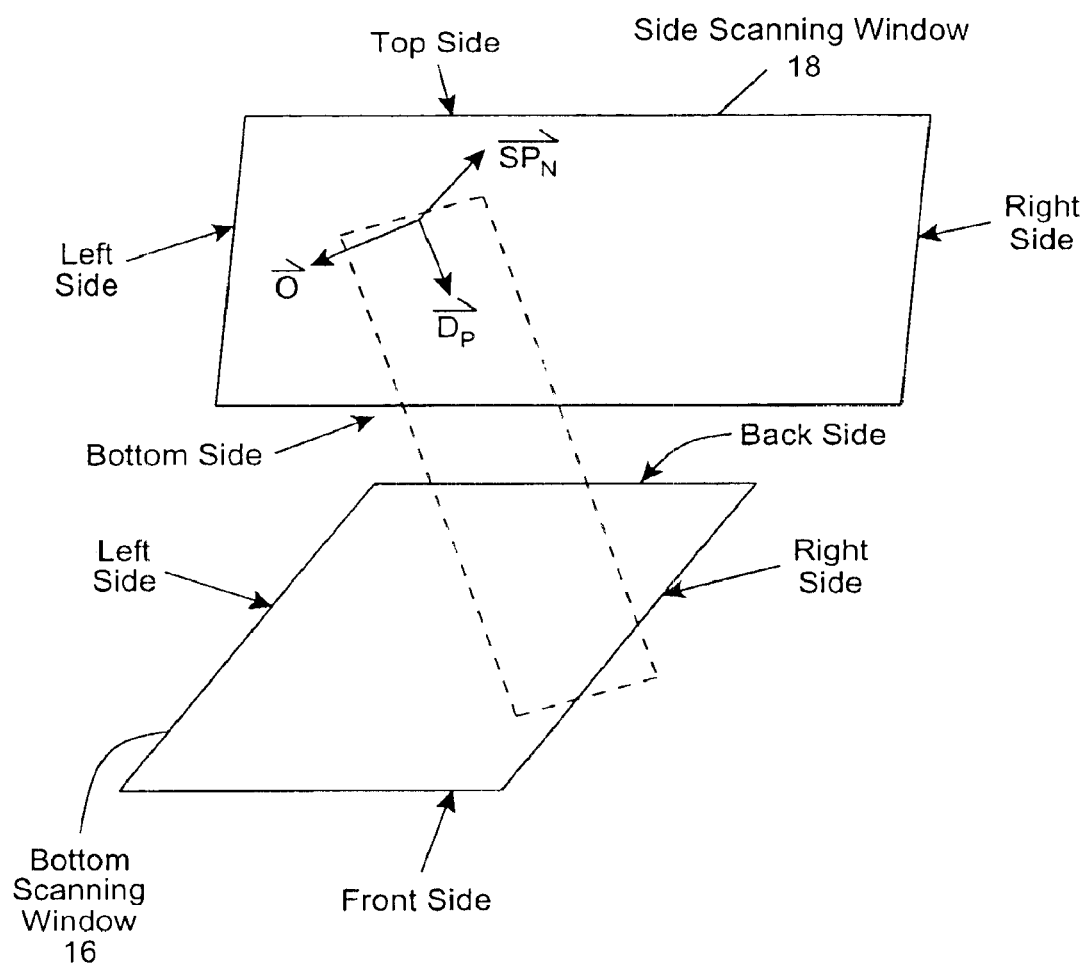
FIG. 5B1

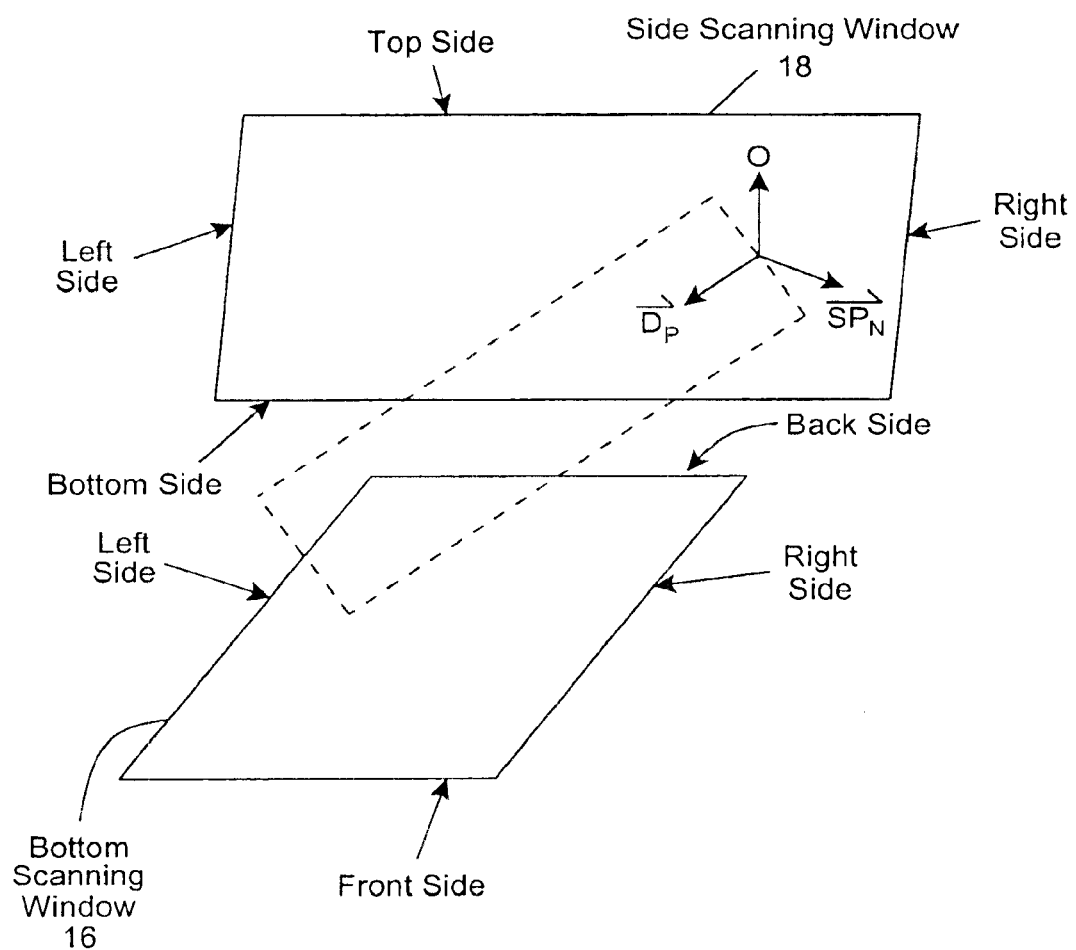
FIG. 5B2

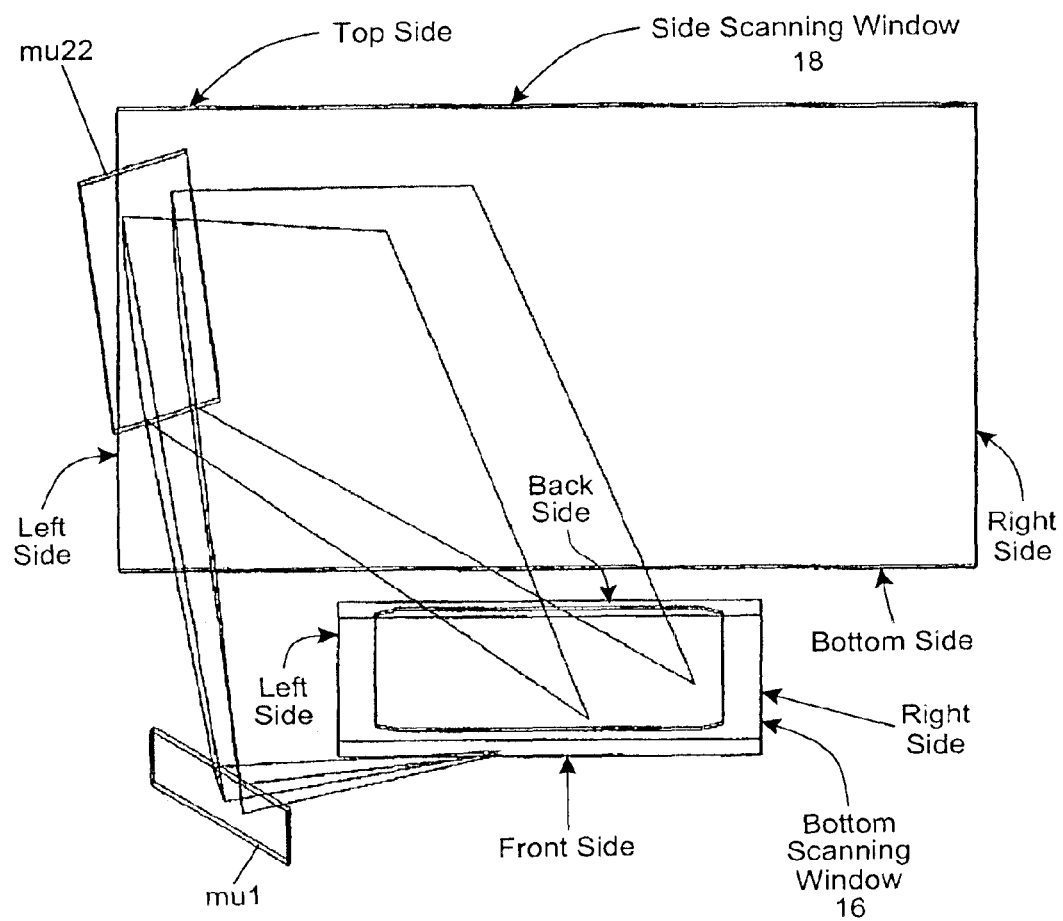
FIG. 5C1

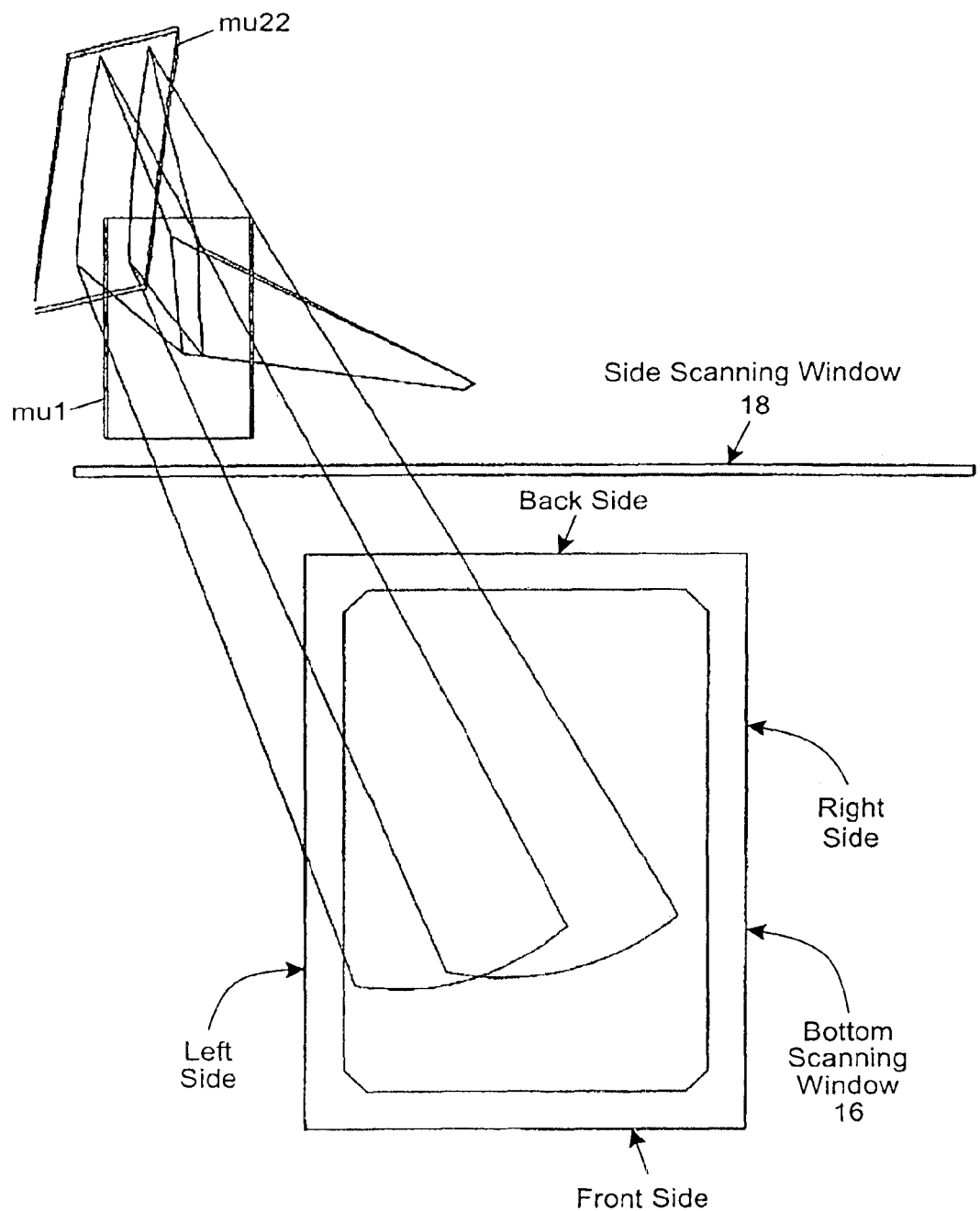
FIG. 5C2

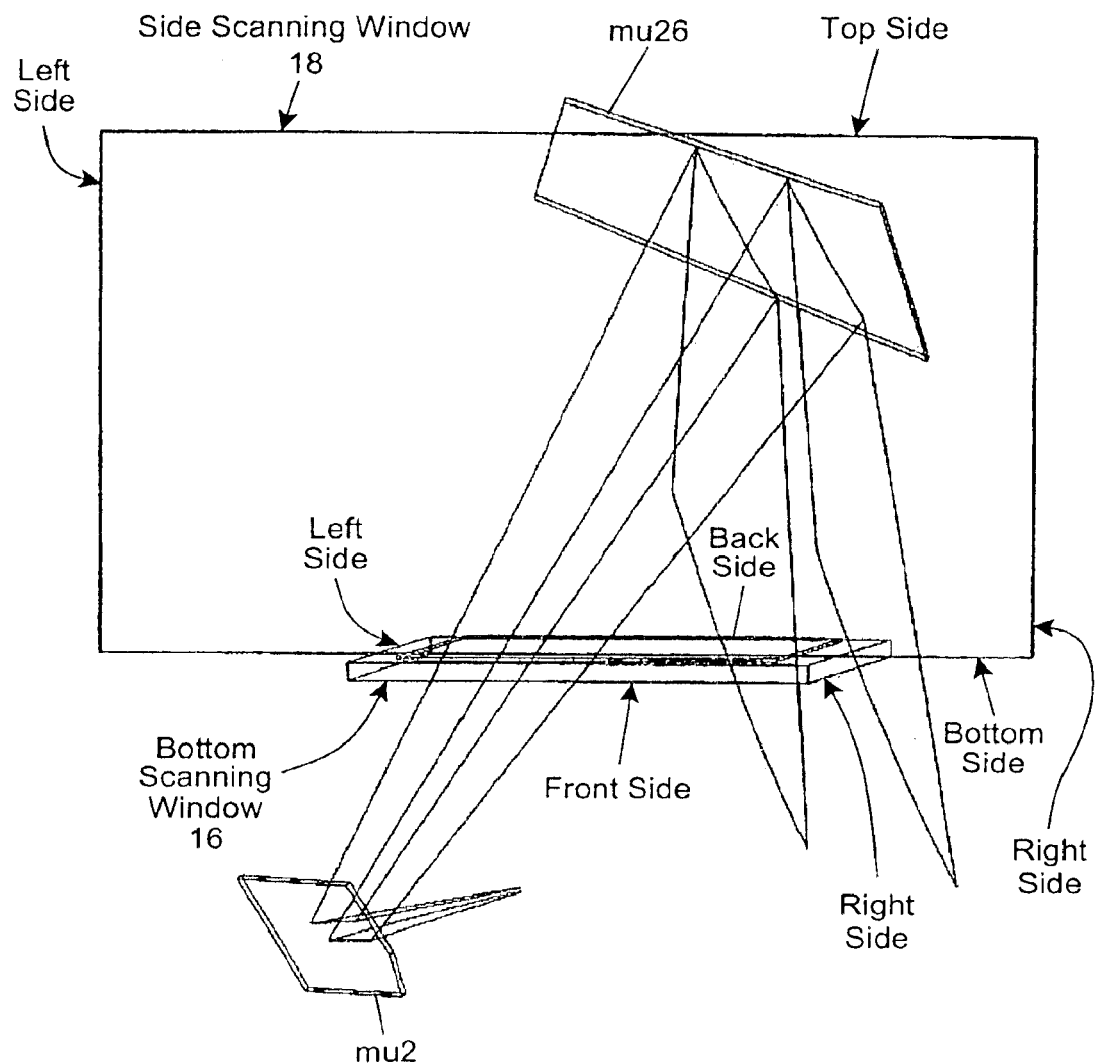
FIG. 5D1

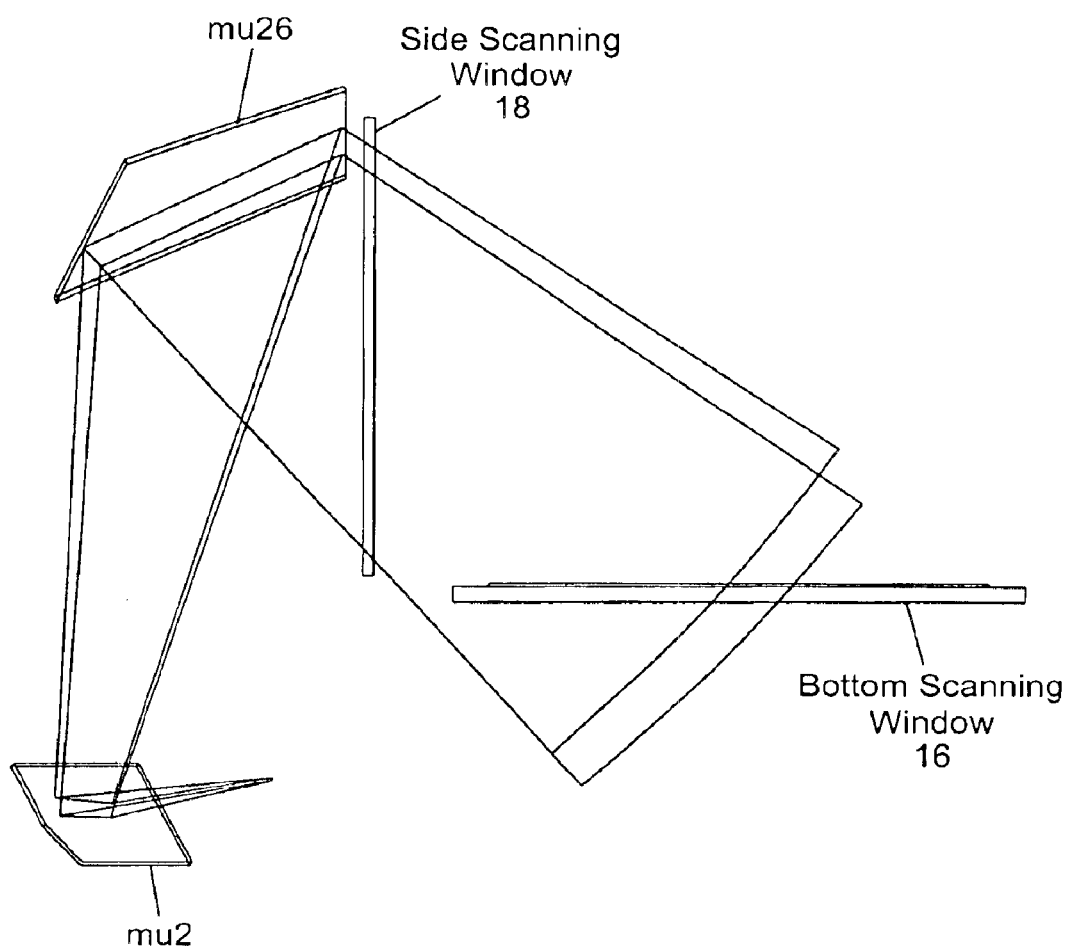
FIG. 5D2

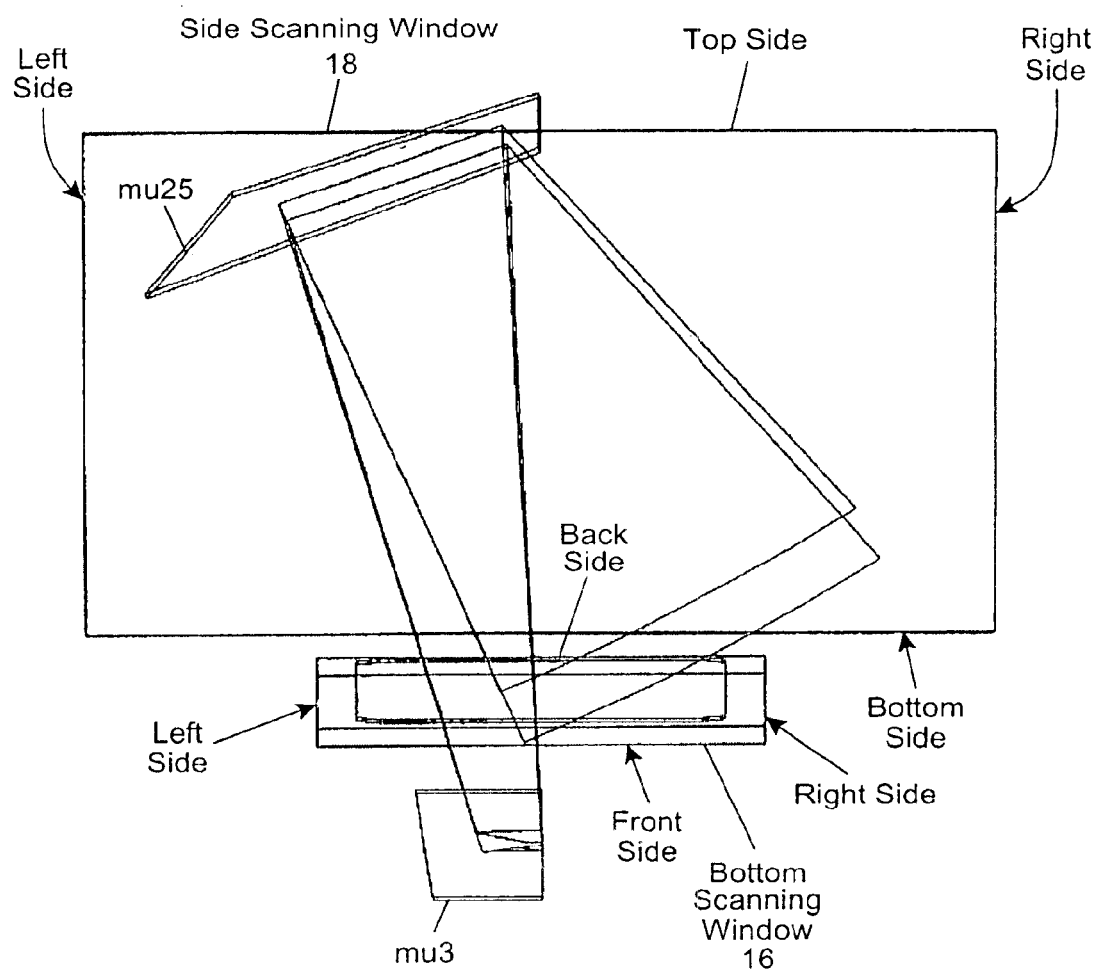
FIG. 5E1

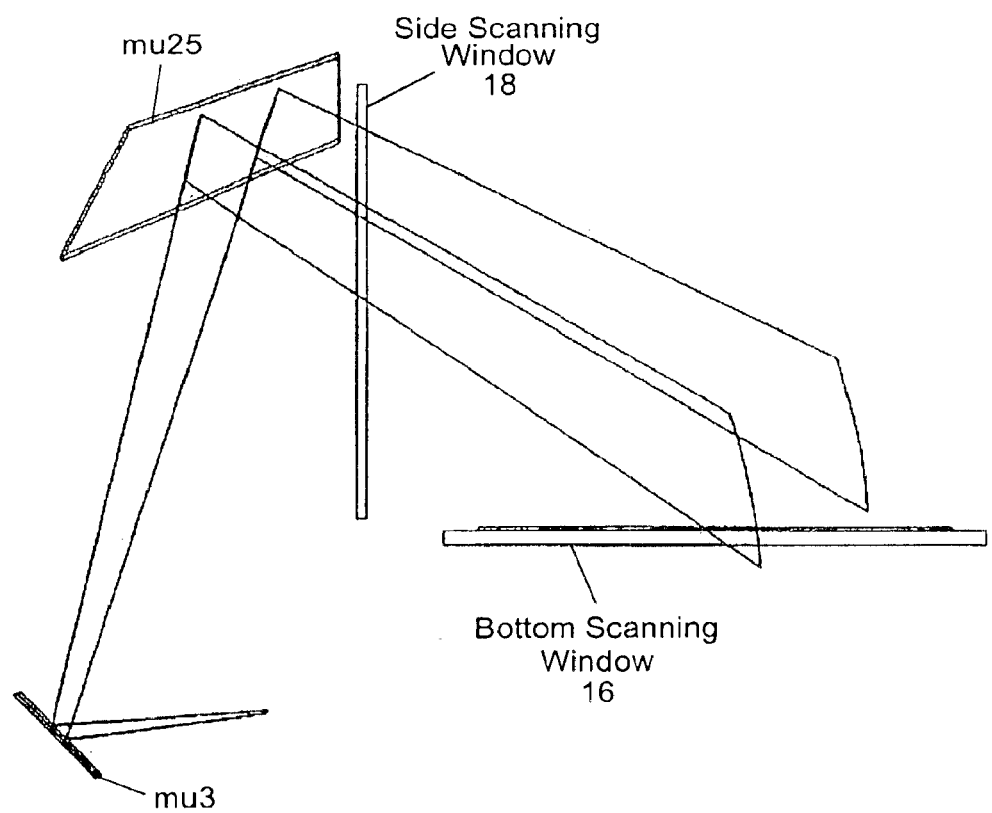
FIG. 5E2

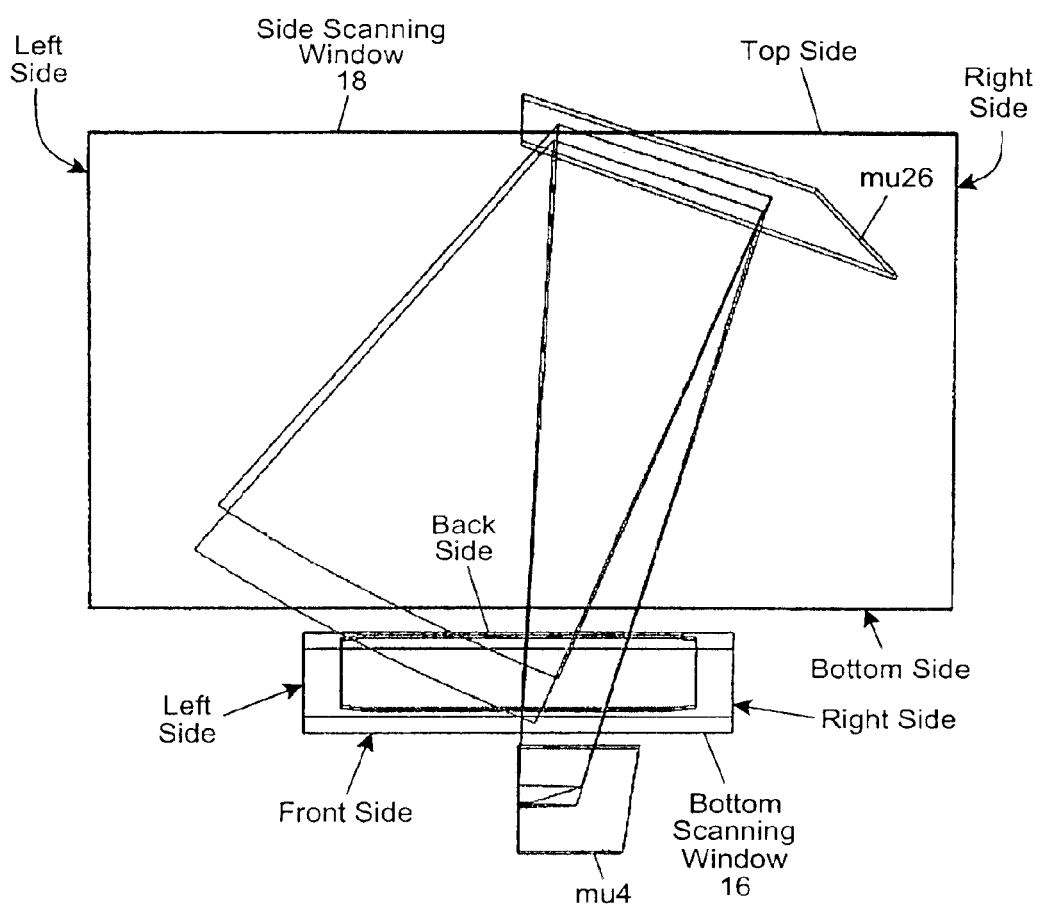
FIG. 5F1

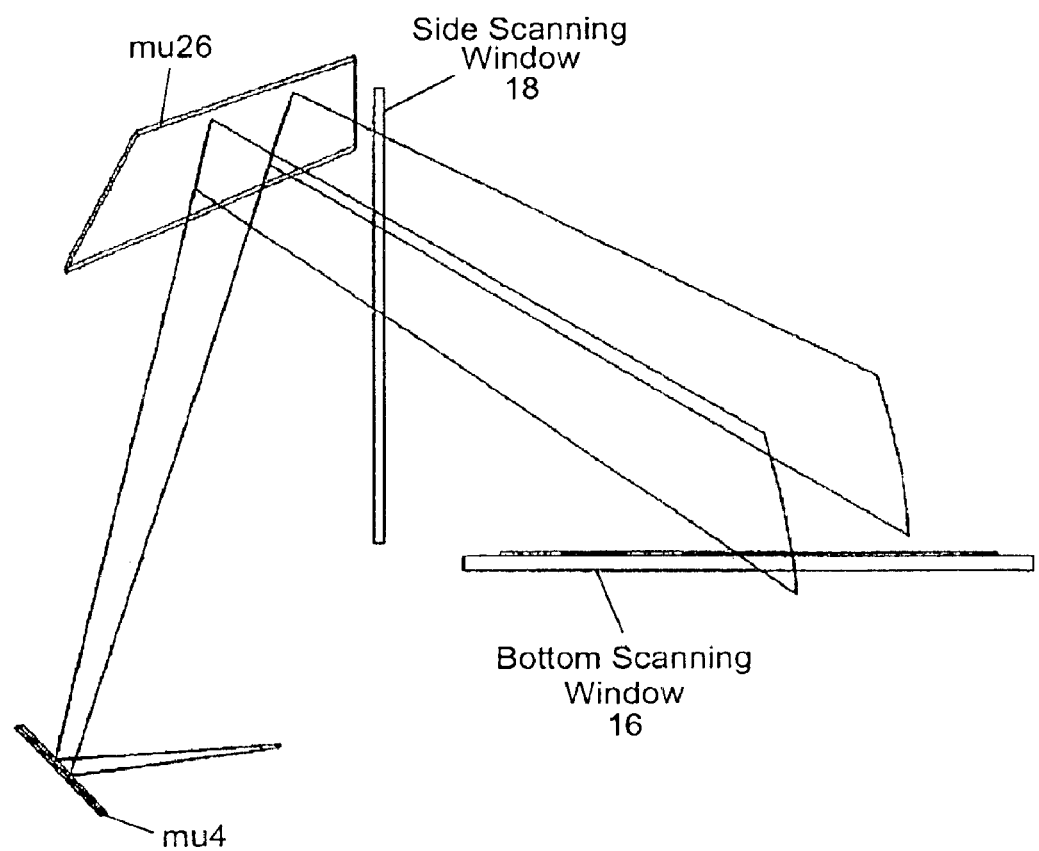
FIG. 5F2

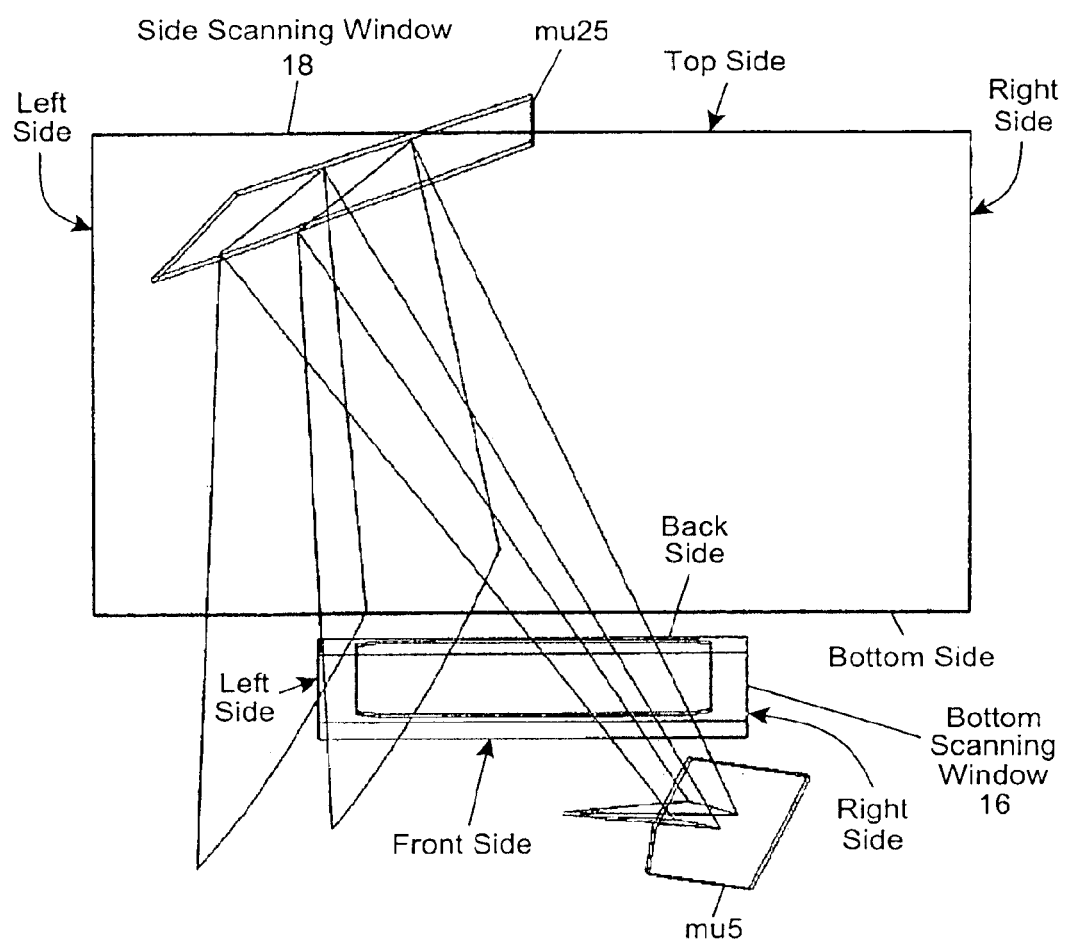
FIG. 5G1

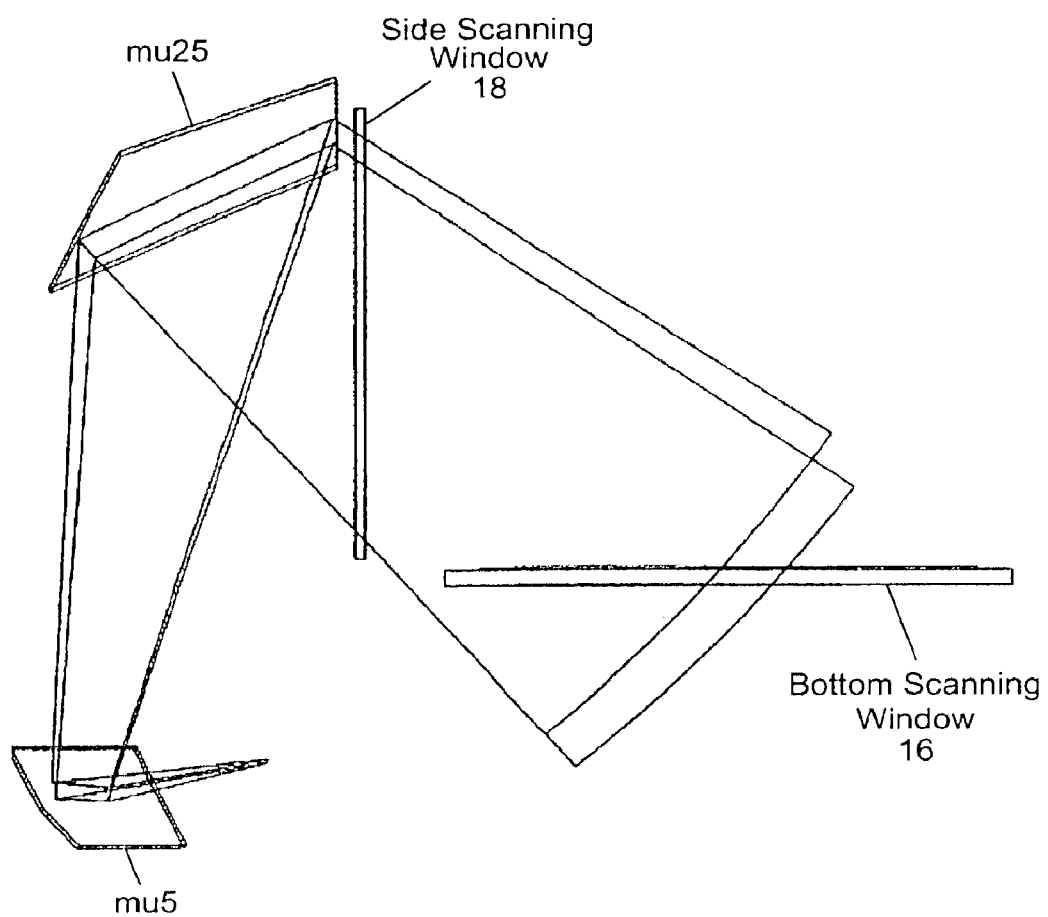
FIG. 5G2

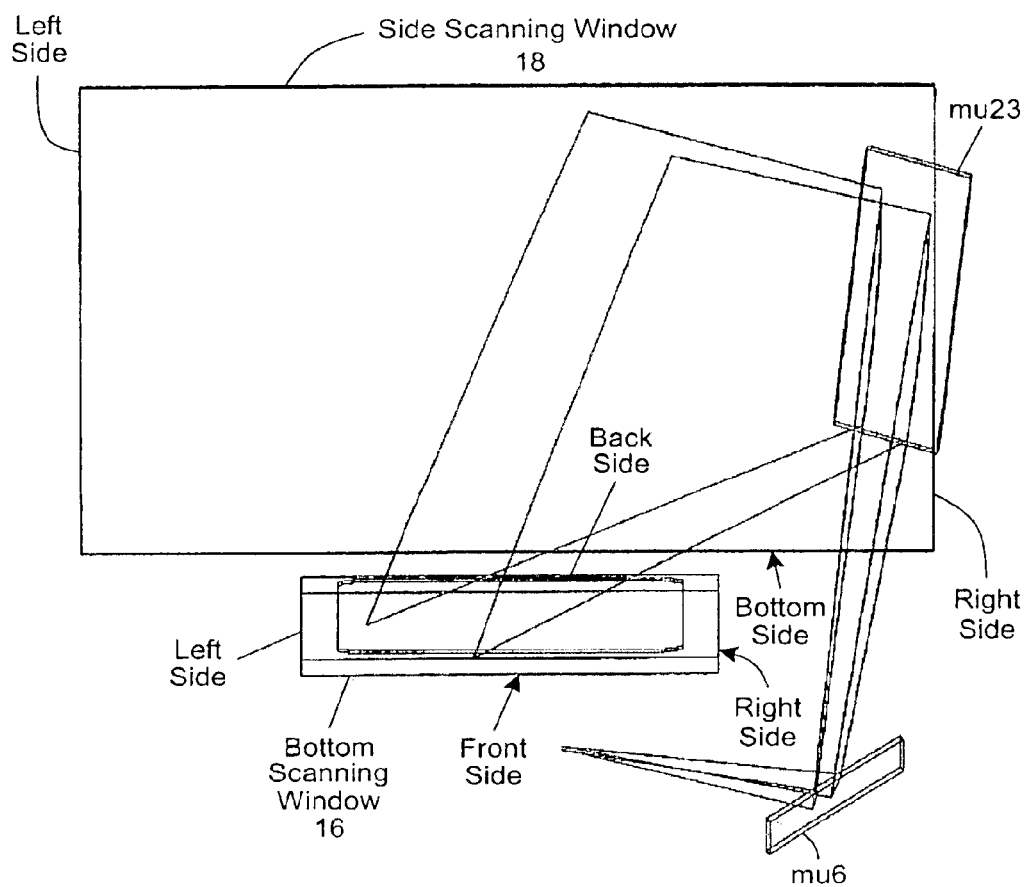
FIG. 5H1

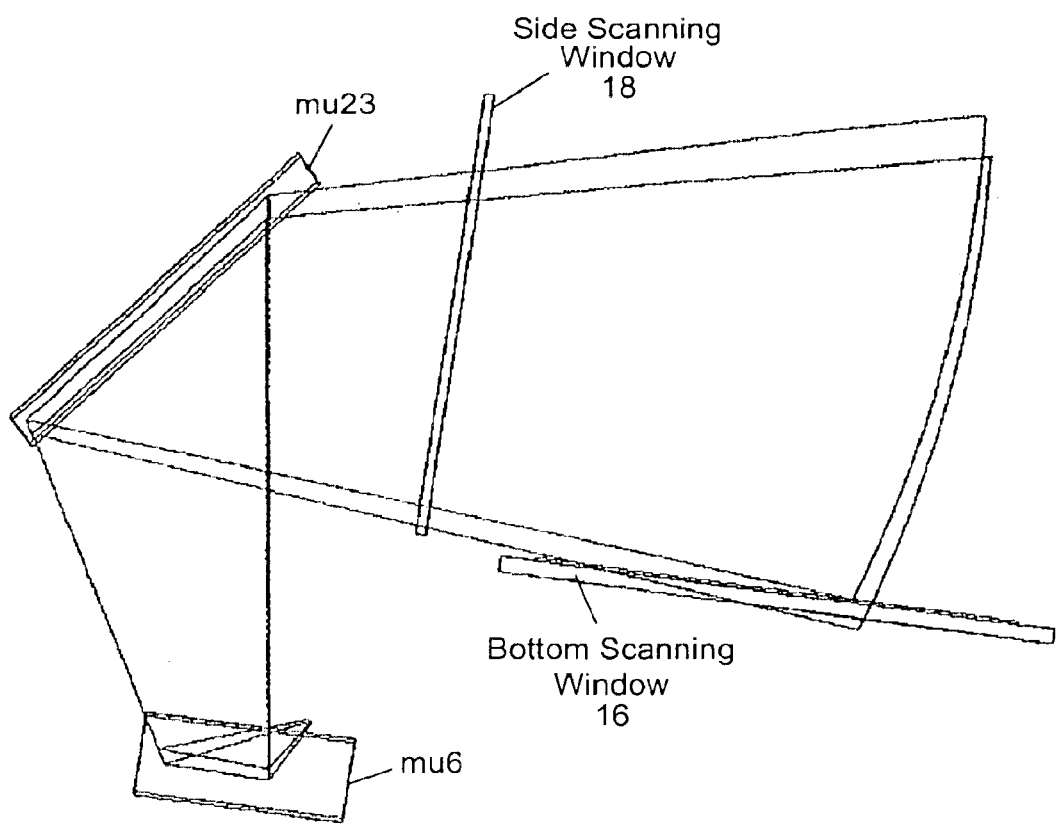
FIG. 5H2

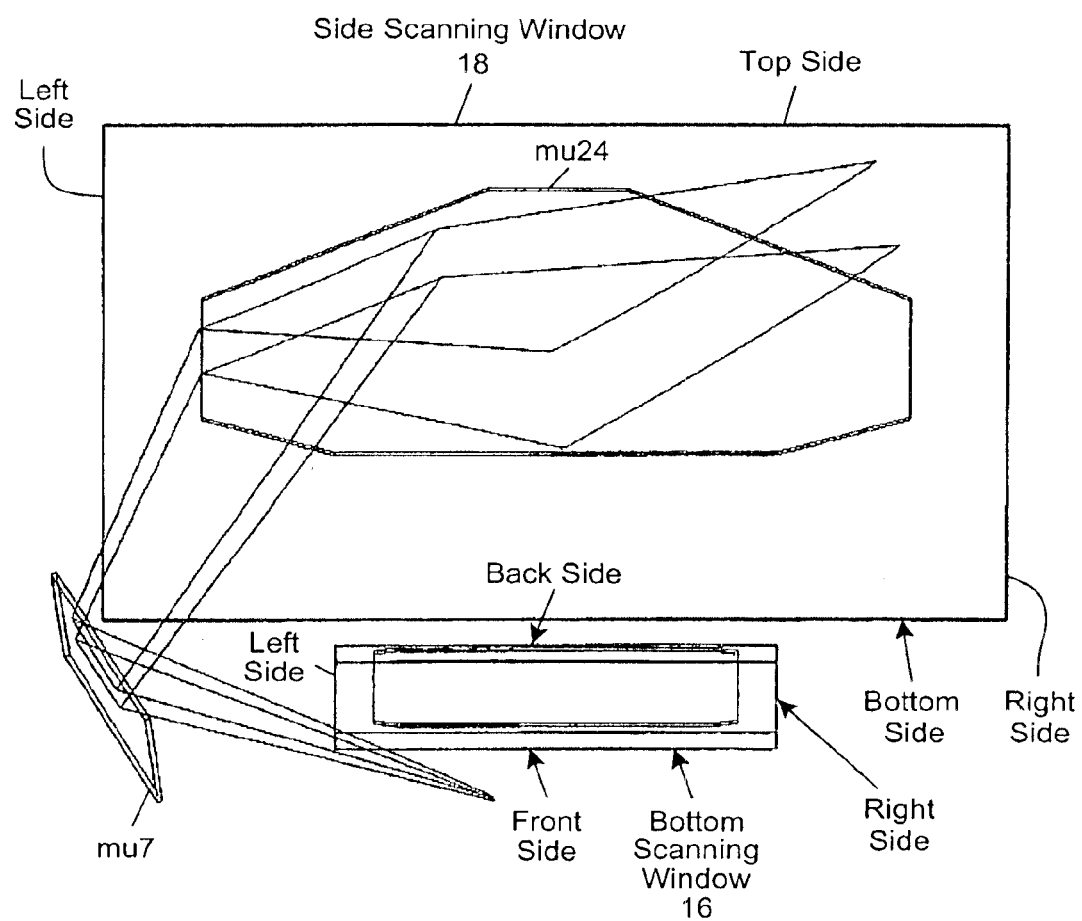
FIG. 5I1

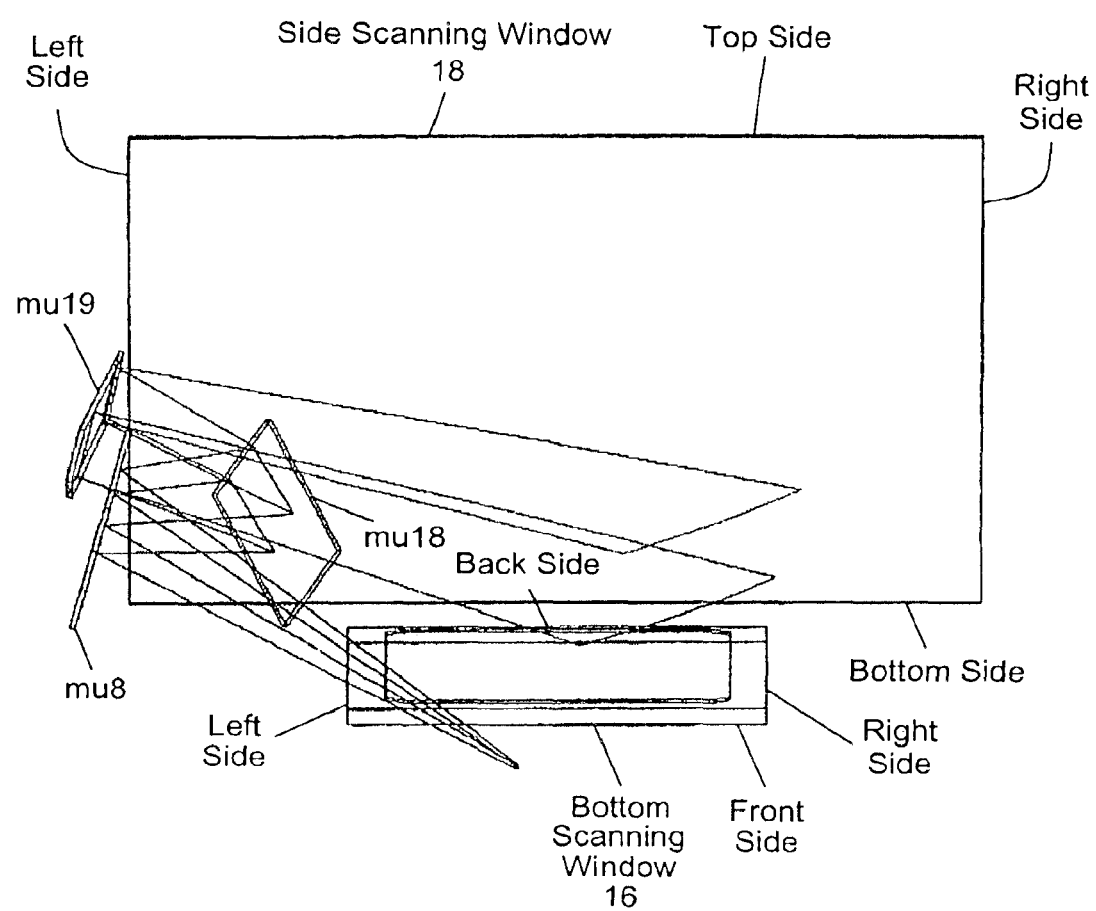
FIG. 5J1

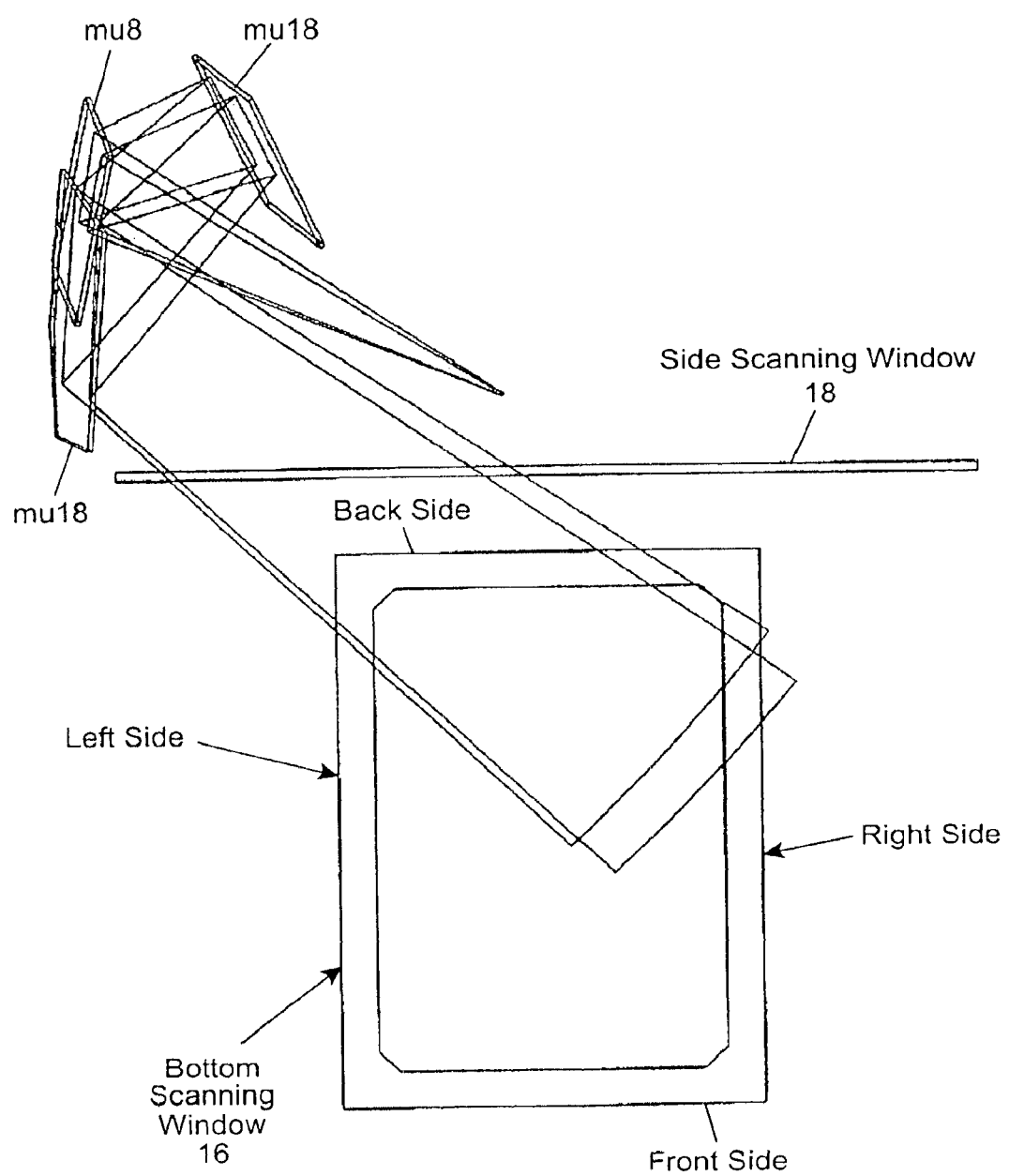
FIG. 5J2

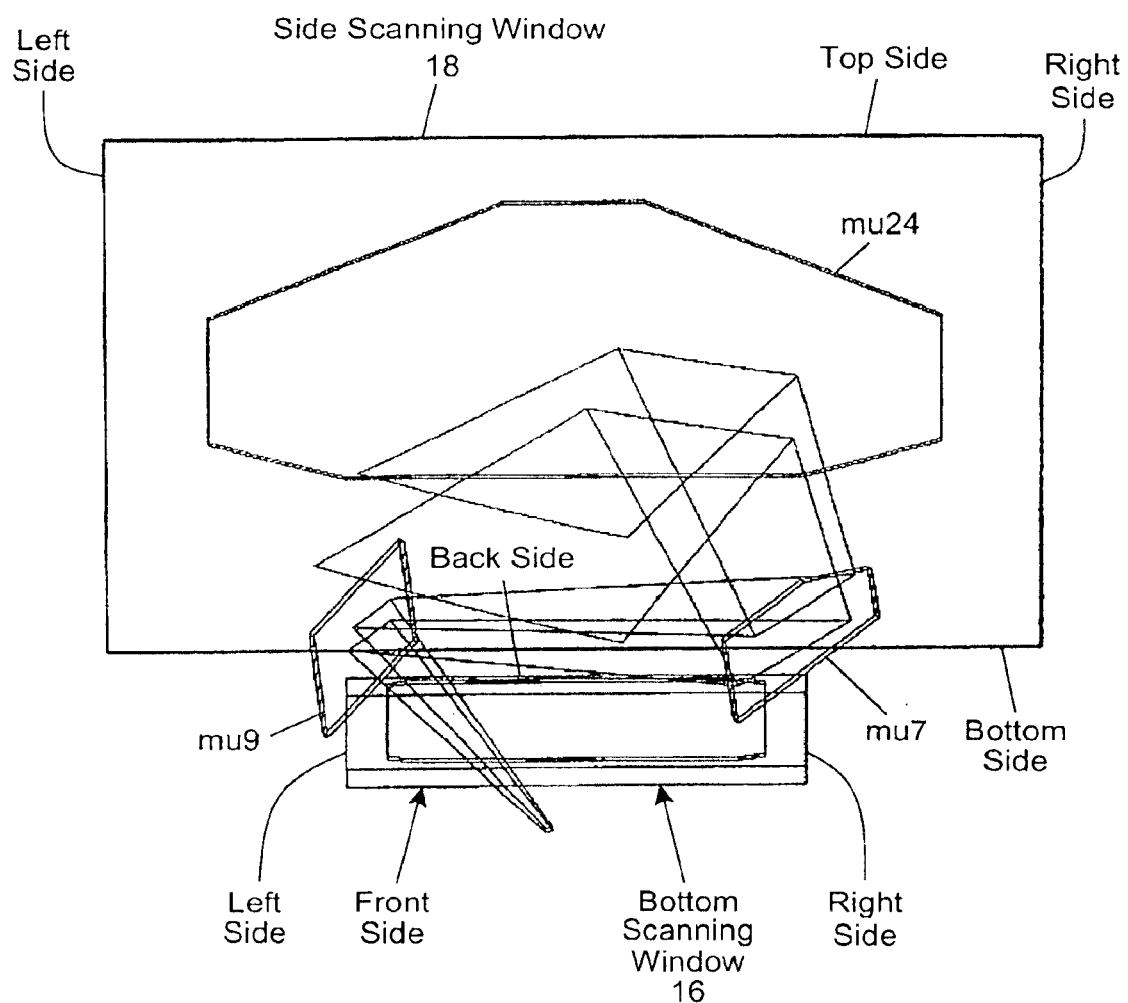
FIG. 5K1

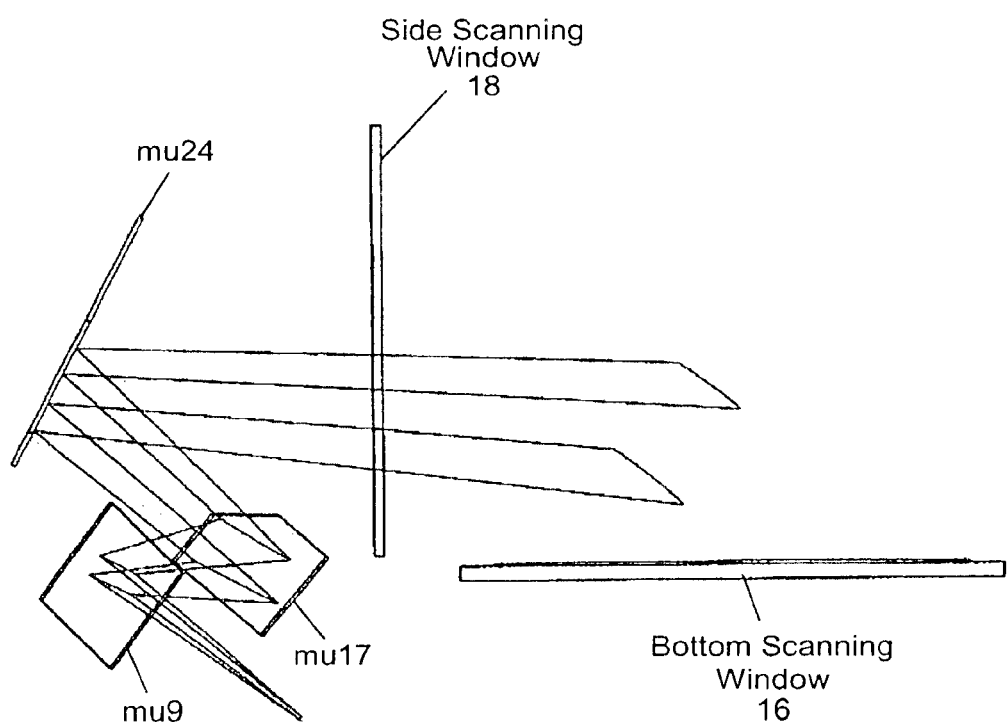
FIG. 5K2

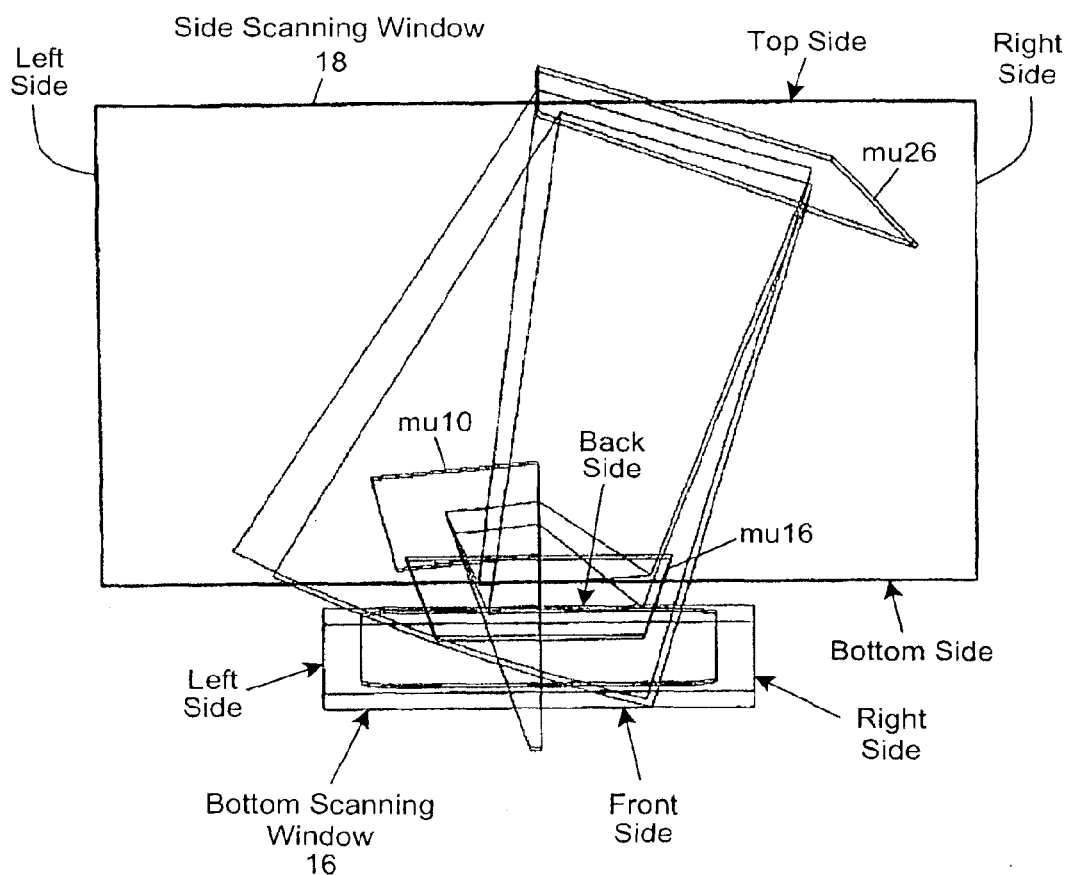
FIG. 5L1

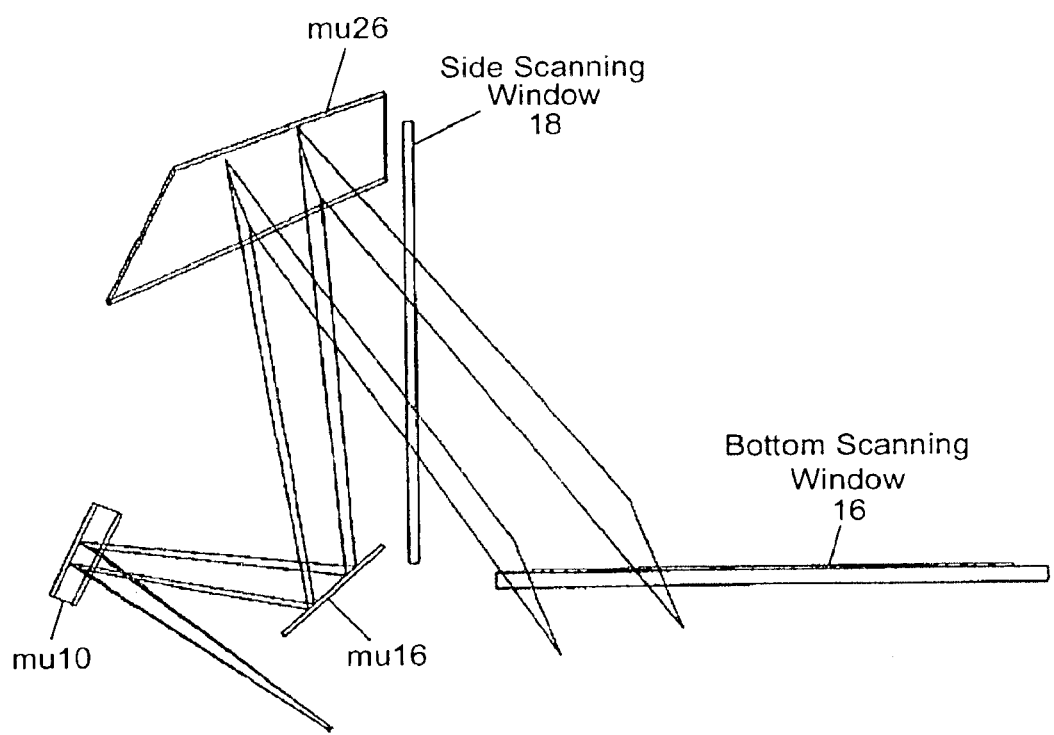
FIG. 5L2

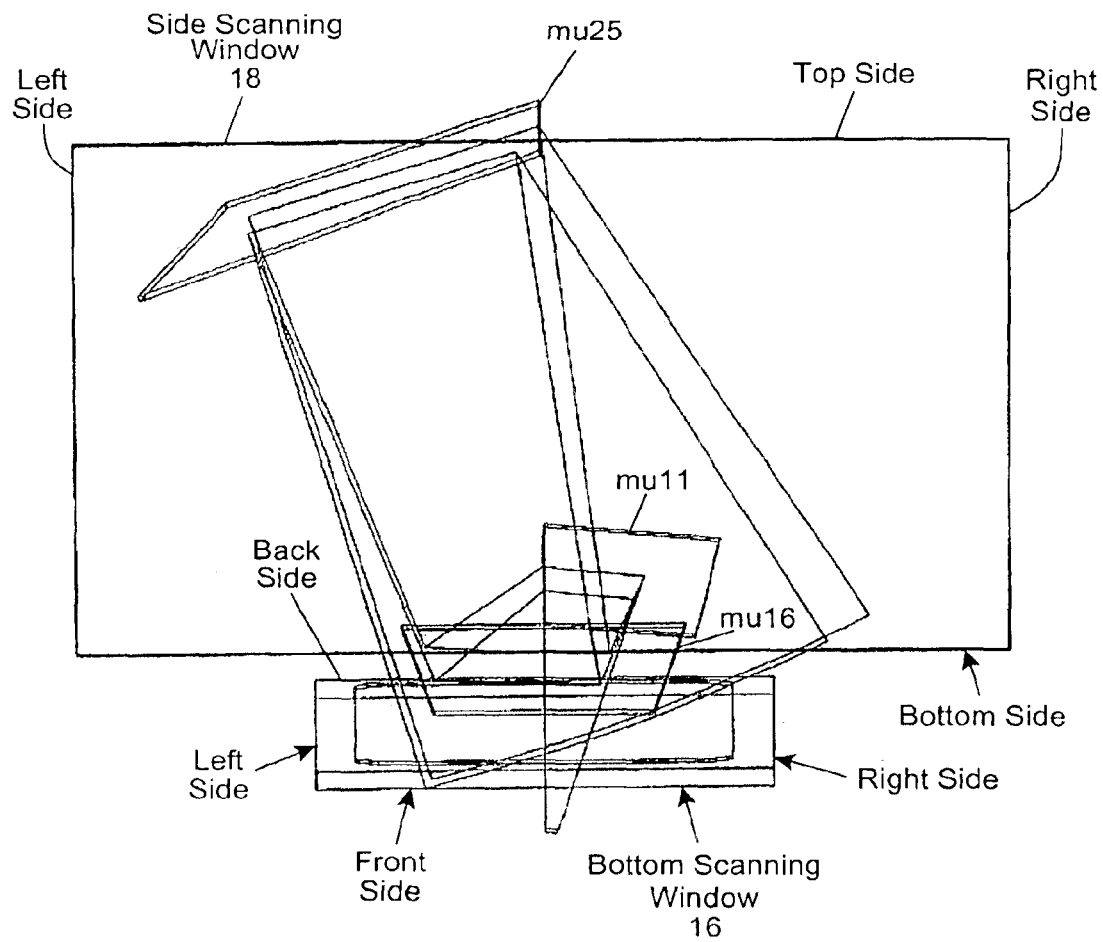
FIG. 5M1

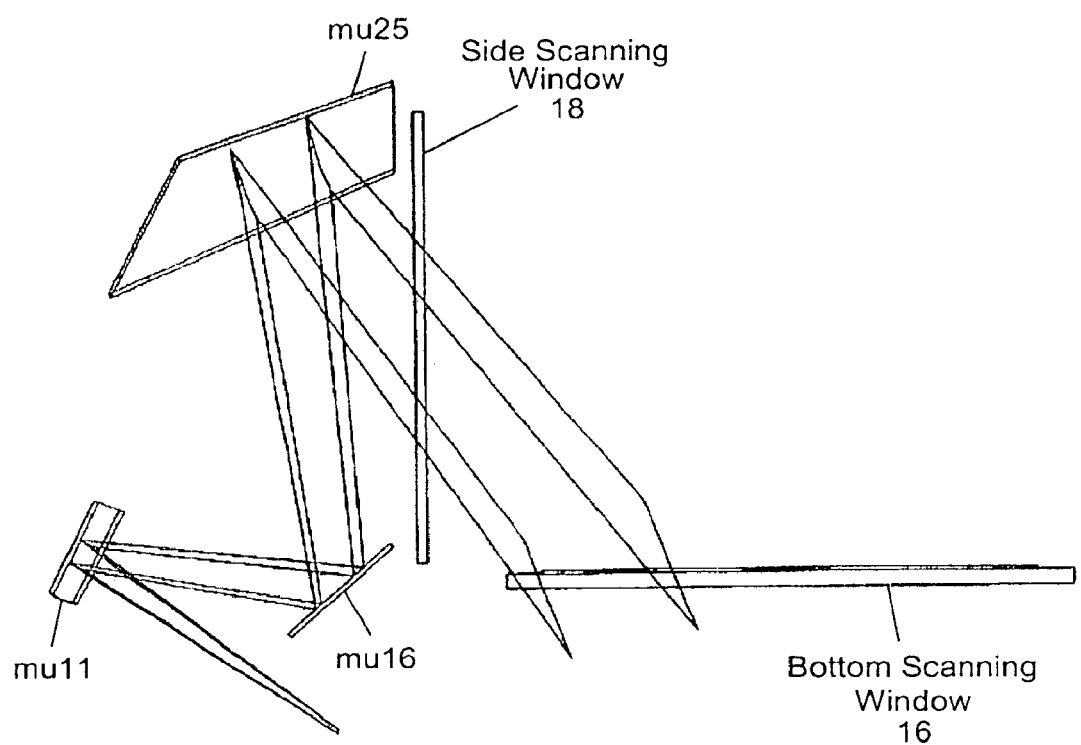
FIG. 5M2

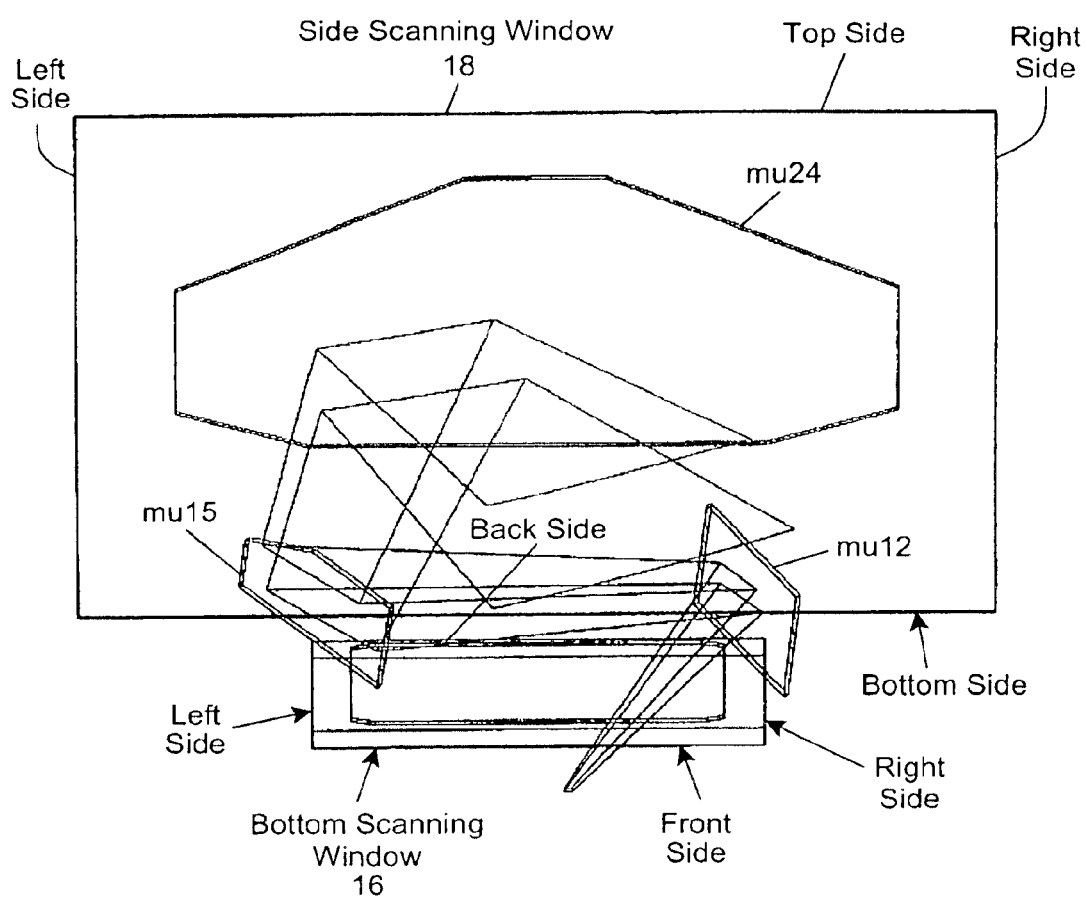
FIG. 5N1

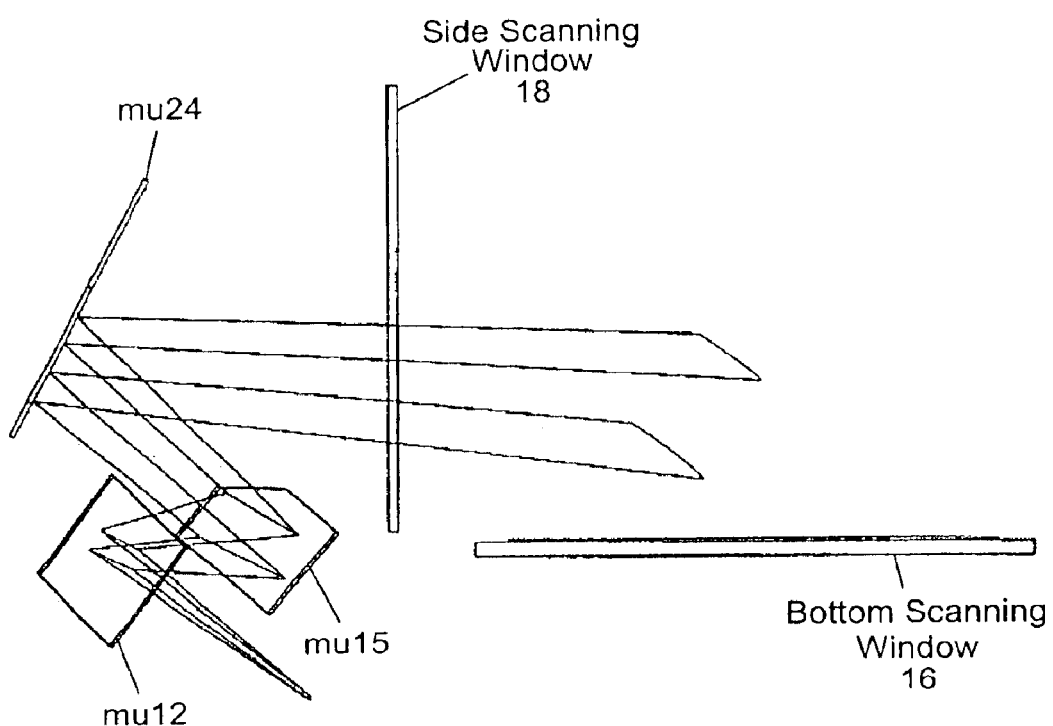
FIG. 5N2

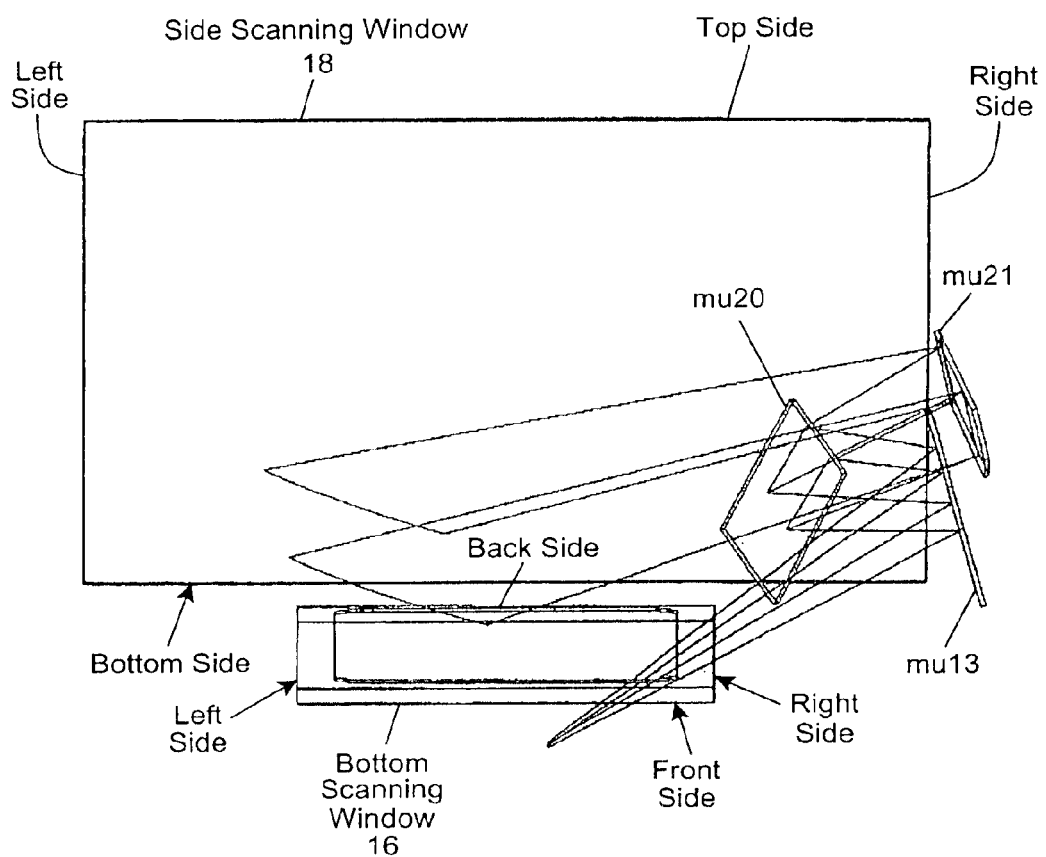
FIG. 5O1

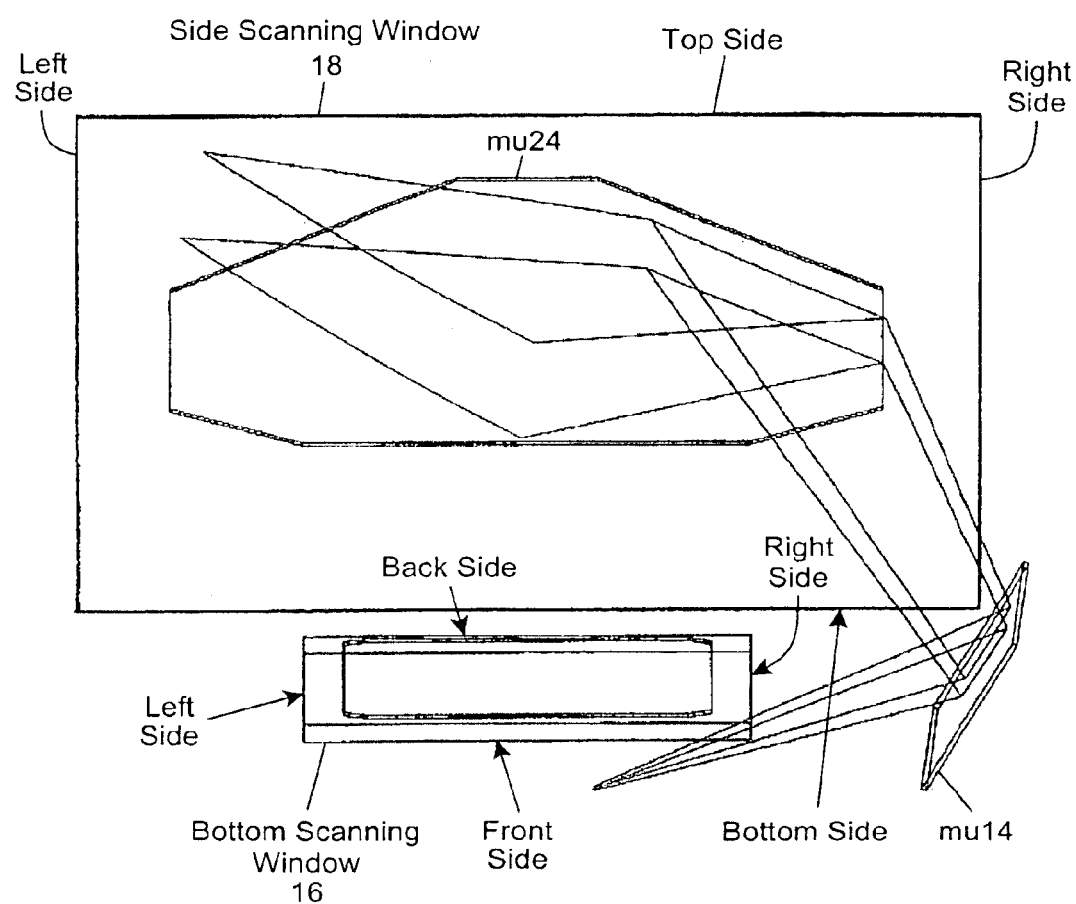
FIG. 5P1

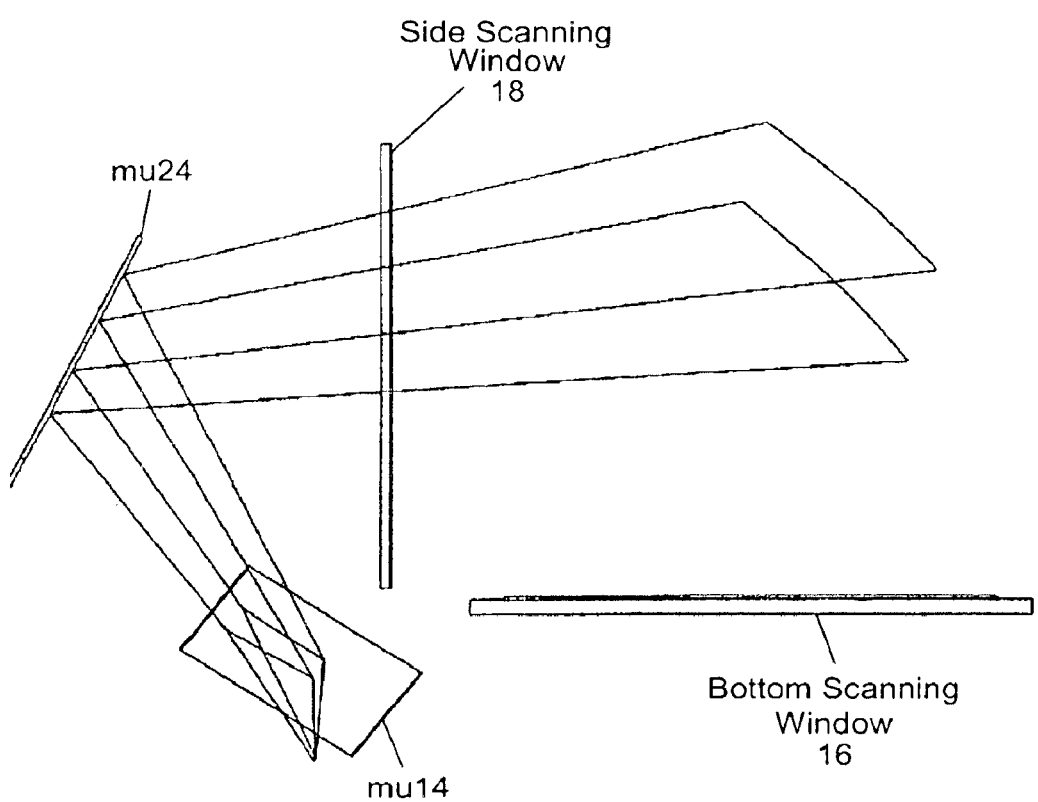
FIG. 5P2

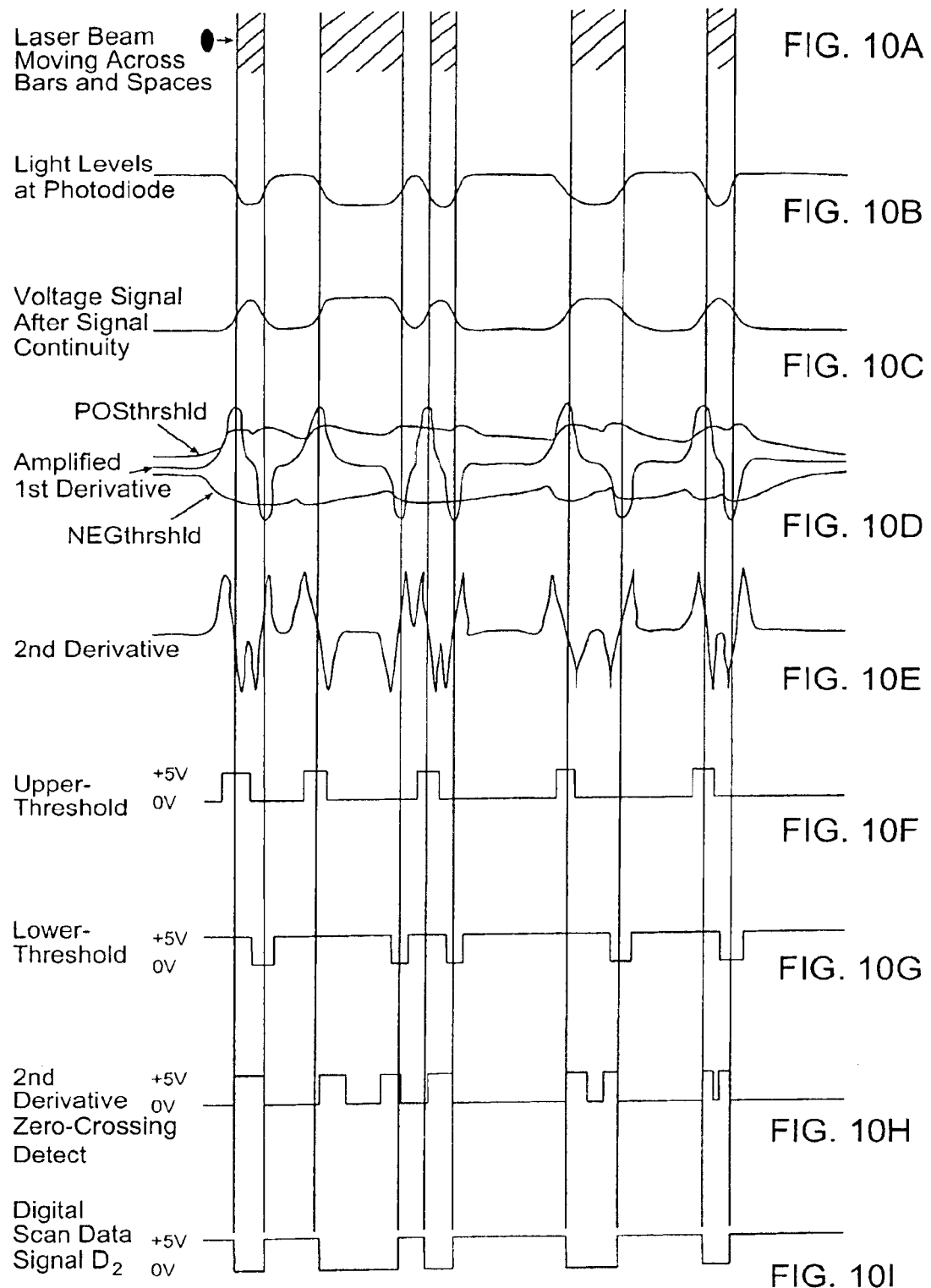

POLYGON-BASED BIOPTICAL POS SCANNING SYSTEM EMPLOYING DUAL INDEPENDENT OPTICS PLATFORMS DISPOSED BENEATH HORIZONTAL AND VERTICAL SCANNING WINDOWS

CROSS-REFERENCE TO RELATED U.S. APPLICATIONS

This is a continuation of Ser. No. 10/045,577 filed Jan. 11, 2002 which is a Continuation-in-Part of copending application Ser. No. 09/551,887 entitled "Bioptical Holographic Laser Scanning System" filed Apr. 18, 2000, said application being owned by Assignee, Metrologic Instruments, Inc., of Blackwood, N.J., and incorporated herein by reference as if fully set forth herein.

BACKGROUND OF THE INVENTION

1. Field of Invention

The present invention relates generally to laser scanners of ultra-compact design capable of reading bar code symbols in point-of-sale (POS) and other demanding scanning environments.

2. Brief Description of the Prior Art

The use of bar code symbols for product and article identification is well known in the art. Presently, various types of bar code symbol scanners have been developed. In general, these bar code symbol readers can be classified into two distinct classes.

The first class of bar code symbol reader simultaneously illuminates all of the bars and spaces of a bar code symbol with light of a specific wavelength(s) in order to capture an image thereof for recognition and decoding purposes. Such scanners are commonly known as CCD scanners because they use CCD image detectors to detect images of the bar code symbols being read.

The second class of bar code symbol reader uses a focused light beam, typically a focused laser beam, to sequentially scan the bars and spaces of a bar code symbol to be read. This type of bar code symbol scanner is commonly called a "flying spot" scanner as the focused laser beam appears as "a spot of light that flies" across the bar code symbol being read. In general, laser bar code symbol scanners are sub-classified further by the type of mechanism used to focus and scan the laser beam across bar code symbols.

The majority of laser scanners in use today, particular in retail environments, employ lenses and moving (i.e. rotating or oscillating) mirrors and/or other optical elements in order to focus and scan laser beams across bar code symbols during code symbol reading operations. In demanding retail scanning environments, it is common for such systems to have both bottom and side-scanning windows to enable highly aggressive scanner performance, whereby the cashier need only drag a bar coded product past these scanning windows for the bar code thereon to be automatically read with minimal assistance of the cashier or checkout personal. Such dual scanning window systems are typically referred to as "bioptical" laser scanning systems as such systems employ two sets of optics disposed behind the bottom and side-scanning windows thereof. Examples of polygon-based bioptical laser scanning systems are disclosed in U.S. Pat. No. 4,229,588 and U.S. Pat. No. 4,652,732, assigned to NCR, Inc., each incorporated herein by reference in its entirety.

In general, prior art bioptical laser scanning systems are generally more aggressive that conventional single scanning window systems. For this reason, bioptical scanning systems are often deployed in demanding retail environments, such as supermarkets and high-volume department stores, where high check-out throughput is critical to achieving store profitability and customer satisfaction.

While prior art bioptical scanning systems represent a technological advance over most single scanning window system, prior art bioptical scanning systems in general suffered from various shortcomings and drawbacks.

In particular, the laser scanning patterns of such prior art bioptical laser scanning systems are not optimized in terms of scanning coverage and performance, and are generally expensive to manufacture by virtue of the large number of optical components presently required to constructed such laser scanning systems.

Thus, there is a great need in the art for an improved bioptical-type laser scanning bar code symbol reading system, while avoiding the shortcomings and drawbacks of prior art laser scanning systems and methodologies.

Moreover, the performance of such aggressive laser scanning systems (in scanning a bar code symbol and accurately produce digital scan data signals representative of a scanned bar code symbol) is susceptible to noise, including ambient noise, thermal noise and paper noise. More specifically, during operation of such machines, a focused light beam is produced from a light source such as a visible laser diode (VLD), and repeatedly scanned across the elements of the code symbol attached, printed or otherwise fixed to the object to be identified. In the case of bar code scanning applications, the elements of the code symbol consists of a series of bar and space elements of varying width. For discrimination purposes, the bars and spaces have different light reflectivity (e.g. the spaces are highly light-reflective while the bars are highly light-absorptive). As the laser beam is scanned across the bar code elements, the bar elements absorb a substantial portion of the laser beam power, whereas the space elements reflective a substantial portion thereof. As a result of this scanning process, the intensity of the laser beam is modulated to in accordance with the information structure encoded within the scanned bar code symbol. As the laser beam is scanned across the bar code symbol, a portion of the reflected light beam is collected by optics within the scanner. The collected light signal is subsequently focused upon a photodetector within the scanner which generates an analog electrical output signal which can be decomposed into a number of signal components, namely a digital scan data signal having first and second signal levels, corresponding to the bars and spaces within the scanned code symbol; ambient-light noise produced as a result of ambient light collected by the light collection optics of the system; thermal noise produced as a result of thermal activity within the signal detecting and processing circuitry; and "paper" or substrate noise produced as a result of the microstructure of the substrate in relation to the cross-sectional dimensions of the focused laser scanning beam. The analog scan data signal has positive-going transitions and negative-going transitions which signify transitions between bars and spaces in the scanned bar code symbol. However, as a result of such noise components, the transitions from the first signal level to the second signal level and vice versa are not perfectly sharp, or instantaneous. Consequently, it is difficult to determine the exact instant that each binary signal level transition occurs in detected analog scan data signal.

It is well known that the ability of a scanner to accurately scan a bar code symbol and accurately produce digital scan data signals representative of a scanned bar code symbol in noisy environments depends on the depth of modulation of the laser scanning beam. The depth of modulation of the laser scanning beam, in turn, depends on several important factors, namely: the ratio of the laser beam cross-sectional dimensions at the scanning plane to the width of the minimal bar code element in the bar code symbol being scanned, and (ii) the signal to noise ratio (SNR) in the scan data signal processing stage where binary level (1-bit) analog to digital (A/D) signal conversion occurs.

As a practical matter, it is not possible in most instances to produce analog scan data signals with precisely-defined signal level transitions. Therefore, the analog scan data signal must be further processed to precisely determine the point at which the signal level transitions occur.

Hitherto, various circuits have been developed for carrying out such scan data signal processing operations. Typically, signal processing circuits capable of performing such operations include filters for removing unwanted noise components, and signal thresholding devices for rejecting signal components which do not exceed a predetermined signal level.

One very popular approach for converting analog scan data signals into digital scan data signals is disclosed in U.S. Pat. No. 4,000,397, incorporated herein by reference in its entirety. In this US Letters Patent, a method and apparatus are disclosed for precisely detecting the time of transitions between the binary levels of encoded analog scan data signals produced from various types of scanning devices. According to this prior art method, the first signal processing step involves double-differentiating the analog scan data input signal $S_{analog}$ to produce a second derivative signal $S''_{analog}$. Then the zero-crossings of the second derivative signal are detected, during selected gating periods, to signify the precise time at which each transition between binary signal levels occurs. As taught in this US Patent, the selected gating periods are determined using a first derivative signal $S'_{analog}$ formed by differentiating the input scan data signal $S_{analog}$. Whenever the first derivative signal $S'_{analog}$ exceeds a threshold level using peak-detection, the gating period is present and the second derivative signal $S''_{analog}$ is detected for zero-crossings. At each time instant when a second-derivative zero-crossing is detected, a binary signal level is produced at the output of the signal processor. The binary output signal level is a logical "1" when the detected signal level falls below the threshold at the gating interval, and a logical "0" when the detected signal level falls above the threshold at the gating interval. The output digital signal $S_{digital}$ produced by this signal processing technique corresponds to the digital scan data signal component contributing to the underlying structure of the analog scan data input signal $S_{analog}$.

While the above-described signal processing technique generates a simple way of generating a digital scan data signal from a corresponding analog scan data signal, this method has a number of shortcomings and drawbacks.

In particular, thermal as well as "paper" or substrate noise imparted to the analog scan data input signal $S_{analog}$ tends to generate zero-crossings in the second-derivative signal $S''_{analog}$ in much the same manner as does binary signal level transitions encoded in the input analog scan data signal $S_{analog}$. Consequently, the gating signal mechanism disclosed in U.S. Pat. No. 4,000,397 allows "false" second-derivative zero-crossing signals to be passed onto the second-derivative zero-crossing detector thereof, thereby producing erroneous binary signal levels at the output stage of this prior art signal processor. In turn, error-ridden digital data scan data signals are transmitted to the digital scan data signal processor of the bar code scanner for conversion into digital words representative of the length of the binary signal levels in the digital scan data signal. This can result in significant errors during bar code symbol decoding operations, causing objects to be incorrectly identified and/or erroneous data to be entered into a host system.

Also, when scanning bar code symbols within a large scanning field with multiple scanning planes that cover varying focal zones of the scanning field, as taught in co-applicant's PCT International Patent Publication No. WO 97/22945 published on Jun. 26, 1997, Applicants' have observed that the effects of paper/substrate noise are greatly amplified when scanning bar code symbols in the near focal zone(s), thereby causing a significant decrease in overall system performance. In the far out focal zones of the scanning system, Applicants have observed that laser beam spot speed is greatest and the analog scan data signals produced therefrom are time-compressed relative to analog scan data signals produced from bar code symbols scanned in focal zones closer to the scanning system. Thus, in such prior art laser scanning systems, Applicants' have provided, between the first and second differentiator stages of the scan data signal processor thereof, a low-pass filter (LHF) having cutoff frequency which passes (to the second differentiator stage) the spectral components of analog scan data signals produced when scanning bar code elements at the focal zone furthest out from the scanning system. While this technique has allowed prior art scanning systems to scan bar codes in the far focal zones of the system, it has in no way addressed or provided a solution to the problem of increased paper/substrate noise encountered when scanning bar code symbols in the near focal zones of such laser scanning systems.

Moreover, although filters and signal thresholding devices are useful for rejecting noise components in the analog scan signal, such devices also limit the scan resolution of the system, potentially rendering the system incapable of reading low contrast and high resolution bar code symbols on surfaces placed in the scanning field.

Thus, there is a great need in the art for improved laser scanning system wherein the analog scan data signals generated therewithin are processed so that the effects of thermal and paper noise encountered within the system are significantly mitigated while not compromising the scan resolution of the system.

OBJECTS AND SUMMARY OF THE PRESENT INVENTION

Accordingly, a primary object of the present invention is to provide a novel bioptical laser scanning system which is free of the shortcomings and drawbacks of prior art bioptical laser scanning systems and methodologies.

Another object of the present invention is to provide a bioptical laser scanning system, wherein a plurality of pairs of quasi-orthogonal laser scanning planes are projected within predetermined regions of space contained within a 3-D scanning volume defined between the bottom and side-scanning windows of the system.

Another object of the present invention is to provide such a bioptical laser scanning system, wherein the plurality of pairs of quasi-orthogonal laser scanning planes are produced using at least one rotating polygonal mirror having scanning facets that have high and low elevation angle characteristics.

Another object of the present invention is to provide such a bioptical laser scanning system, wherein the plurality of pairs of quasi-orthogonal laser scanning planes are produced using at least two rotating polygonal mirrors, wherein a first rotating polygonal mirror produces laser scanning planes that project from the bottom-scanning window, and wherein a second rotating polygonal mirror produces laser scanning planes that project from the side-scanning window.

Another object of the present invention is to provide such a bioptical laser scanning system, wherein each pair of quasi-orthogonal laser scanning planes comprises a plurality of substantially-vertical laser scanning planes for reading bar code symbols having bar code elements (i.e., ladder type bar code symbols) that are oriented substantially horizontal with respect to the bottom-scanning window, and a plurality of substantially-horizontal laser scanning planes for reading bar code symbols having bar code elements (i.e., picket-fence type bar code symbols) that are oriented substantially vertical with respect to the bottom-scanning window.

Another object of the present invention is to provide a bioptical laser scanning system comprising a plurality of laser scanning stations, each of which produces a plurality of groups of quasi-orthogonal laser scanning planes that are projected within predetermined regions of space contained within a 3-D scanning volume defined between the bottom and side-scanning windows of the system.

Another object of the present invention is to provide a bioptical laser scanning system, wherein two visible laser diodes (VLDs) disposed on opposite sides of a rotating polygonal mirror are used to create a plurality of groups of quasi-orthogonal laser scanning planes that project through the bottom-scanning window.

Another object of the present invention is to provide a bioptical laser scanning system, wherein a single VLD is used to create the scan pattern projected through the side-scanning window.

Another object of the present invention is to provide a bioptical laser scanning system which generates a plurality of quasi-orthogonal laser scanning planes that project through the bottom-scanning window and side-scanning window to provide 360 degrees of scan coverage at a POS station.

Another object of the present invention is to provide a bioptical laser scanning system which generates a plurality of vertical laser scanning planes that project through the bottom-scanning window to provide 360 degrees of scan coverage.

Another object of the present invention is to provide a bioptical laser scanning system which generates a plurality of horizontal and vertical laser scanning planes that project from the top of the side-scanning window downward, which are useful for reading ladder type and picket-fence type bar code symbols on top-facing surfaces.

A further object of the present invention is to provide such a bioptical laser scanning system, in which an independent signal processing channel is provided for each laser diode and light collection/detection subsystem in order to improve the signal processing speed of the system.

A further object of the present invention is to provide such a bioptical laser scanning system, in which a plurality of signal processors are used for simultaneously processing the scan data signals produced from each of the photodetectors within the laser scanner.

A further object of the present invention is to provide a bioptical laser scanning system that provides improved scan coverage over the volume disposed between the two scanning windows of the system.

Another object of the present invention is to provide a bioptical laser scanning system that produces horizontal scanning planes capable of reading picket-fence type bar code symbols on back-facing surfaces whose normals are substantially offset from the normal of the side-scanning window.

Another object of the present invention is to provide a bioptical laser scanning system that produces horizontal scanning planes that project from exterior portions (for example, left side and right side) of the side-scanning window at a characteristic propagation direction whose non-vertical component is greater than thirty-five degrees from normal of the side-scanning window.

Another object of the present invention is to provide a bioptical laser scanning system that produces vertical scanning planes capable of reading ladder type bar code symbols on back-facing surfaces whose normals are substantially offset from the normal of the side-scanning window.

Another object of the present invention is to provide a bioptical laser scanning system that produces a plurality a vertical scanning planes that project from portions (e.g., back-left and back-right corners) of the bottom-scanning window proximate to the back of the bottom-scanning window and the bottom side of the side-scanning window.

Another object of the present invention is to provide a bioptical laser scanning system that produces vertical scanning planes capable of 360 degree reading of ladder type bar code symbols (e.g., on bottom-, front-, left-, back- and/or right-facing surfaces of an article).

Another object of the present invention is to provide a bioptical laser scanning system that produces a plurality a vertical scanning planes that project from each one of the four corners of the bottom-scanning window.

Another object of the present invention is to provide a bioptical laser scanning system that produces at least eight different vertical scanning planes that project from the side-scanning window.

Another object of the present invention is to provide a bioptical laser scanning system that produces at least 13 different horizontal scanning planes that project from the side-scanning window.

Another object of the present invention is to provide a bioptical laser scanning system that produces at least 20 different horizontal scanning planes that project from the side-scanning window.

Another object of the present invention is to provide a bioptical laser scanning system that produces at least 21 different scanning planes that project from the side-scanning window.

Another object of the present invention is to provide a bioptical laser scanning system that produces at least 28 different scanning planes that project from the side-scanning window.

Another object of the present invention is to provide a bioptical laser scanning system that produces at least seven different vertical scanning planes that project from the bottom-scanning window.

Another object of the present invention is to provide a bioptical laser scanning system that produces at least 21 different horizontal scanning planes that project from the bottom-scanning window.

Another object of the present invention is to provide a bioptical laser scanning system that produces at least 25 different scanning planes that project from the bottom-scanning window.

Another object of the present invention is to provide a bioptical laser scanning system with at least one laser beam production module that cooperates with a rotating polygonal mirror and a plurality of laser beam folding mirrors to produce a plurality of scanning planes that project through the window, wherein the incidence angle of the laser beam produced by the laser beam production module is offset with respect to the axis of rotation of the rotating polygonal mirror.

A further object of the present invention is to provide such a bioptical laser scanning system wherein the offset of the incidence angle of the laser and the axis of rotation of the rotating polygonal mirror produces overlapping scanning ray patterns that are incident on at least one common mirror to provide a dense scanning pattern projecting therefrom.

In another aspect of the present invention, it is a primary objective to provide an improved laser scanning system, wherein scan data signals produced therewithin are processed so that the effects of thermal and paper noise encountered within the system are significantly mitigated.

Another object of the present invention is to provide an improved laser scanning system having a scan data signal processor with improved dynamic range.

Another object of the present invention is to provide an improved laser scanning system having a multi-path scan data signal processor that employs different operational characteristics (such as different filter cutoff frequencies, peak thresholds, etc) in distinct signal processing paths.

Another object of the present invention is to provide an improved laser scanning system having a multi-path scan data signal processor that concurrently performs distinct signal processing operations that employ different operational characteristics (such as different filter cutoff frequencies, peak thresholds, etc).

Another object of the present invention is to provide an improved laser scanning system employing a scan data signal processor having a plurality of processing paths each processing the same data signal derived from the output of a photodetector to detect bar code symbols therein and generate data representing said bar code symbols, wherein the plurality of processing paths have different operational characteristics (such as different filter cutoff frequencies, peak thresholds, etc).

A further object of the present invention is to provide such an improved laser scanning system wherein each signal processing path includes a peak detector that identifies time periods during which a first derivative signal exceeds at least one threshold level, and wherein the at least one threshold level for one of the respective paths is different than the at least one threshold level for another of the respective paths.

A further object of the present invention is to provide such an improved laser scanning system wherein each signal processing path performs low pass filtering, wherein the cut-off frequency of such low pass filtering for one of the respective paths is different than the cut-off frequency of such low pass filtering for another of the respective paths.

A further object of the present invention is to provide such an improved laser scanning system wherein each signal processing path performs voltage amplification, wherein the gain of such voltage amplification for one of the respective paths is different than the gain of such voltage amplification for another of the respective paths.

Another object of the present invention is to provide an improved laser scanning system employing a scan data signal processor with dynamic peak threshold levels.

Another object of the present invention is to provide an improved laser scanning system employing a scan data signal processor with multiple signal processing paths that perform analog signal processing functions with analog circuitry.

Another object of the present invention is to provide an improved laser scanning system employing a scan data signal processor with multiple signal processing paths that perform digital signal processing functions with digital signal processing circuitry.

A further object of the present invention is to provide such a laser scanning system, wherein each processing path is performed sequentially based on real-time status of a working buffer that stores data values for digital signal processing.

These and other objects of the present invention will become apparent hereinafter and in the Claims to Invention.

BRIEF DESCRIPTION OF THE DRAWINGS

In order to more fully understand the Objects of the Present Invention, the following Detailed Description of the Illustrative Embodiments should be read in conjunction with the accompanying Figure Drawings in which:

FIG. 1I is a perspective view of the bioptical laser scanning system of the present invention shown installed above a work surface (e.g. a conveyor belt structure) employed, for example, in manual sortation operations or the like.

FIG. 2C1 is a perspective view of a wire frame model of portions of the horizontal section of the bioptical laser scanning system of the illustrative embodiment of the present invention, including the bottom-scanning window (e.g., horizontal window), first rotating polygonal mirror PM1, and the first and second scanning stations HST1 and HST2 disposed thereabout, wherein each laser scanning station includes a light collecting/focusing optical element (labeled $LC_{HST1}$ and $LC_{HST2}$) that collects light from a scan region that encompasses the outgoing scanning planes and focuses such collected light onto a photodetector (labeled $PD_{HST1}$ and $PD_{HST2}$), which produces an electrical signal whose amplitude is proportional to the intensity of light focused thereon. The electrical signal produced by the photodetector is supplied to analog/digital signal processing circuitry, associated with the first and second laser scanning station HST1 and HST2, that process analog and digital scan data signals derived therefrom to perform bar code symbol reading operations. Preferably, the first and second laser scanning stations HST1 and HST2 each include a laser beam production module (not shown) that generates a laser scanning beam (labeled SB1 and SB2) that is directed through an aperture in the corresponding light collecting/focusing element as shown to a point of incidence on the first rotating polygonal mirror PM1.

FIG. 2C2 is a top view of the wire frame model of FIG. 2C1.

FIG. 2G1 depicts the angle of each facet of the rotating polygonal mirrors PM1 and PM2 with respect to the rotational axis of the respective rotating polygonal mirrors in the illustrative embodiment of the present invention.

FIG. 2G2 is a pictorial illustration of the scanning ray pattern produced by the four facets of the first polygonal mirror PM1 in conjunction with the laser beam source provided by the first laser scanning station HST1 in the illustrative embodiment of the present invention is shown in FIG. 2G2. A similar scanning ray pattern is produced by the four facets of the first polygonal mirror PM1 in conjunction with the laser beam source provided by the second laser scanning station HST2.

FIG. 2G3 is a pictorial illustration of the scanning ray pattern produced by the four facets of the second polygonal mirror PM2 in conjunction with the laser beam source provided by the third laser scanning station VST1 in the illustrative embodiment of the present invention; the facets of the second polygonal mirror PM2 can be partitioned into two classes: a first class of facets (corresponding to angles $\beta_1$ and $\beta_2$) have High Elevation (HE) angle characteristics, and a second class of facets (corresponding to angles $\beta_3$ and $\beta_4$) have Low Elevation (LE) angle characteristics; high and low elevation angle characteristics are referenced by the plane P1 that contains the incoming laser beam and is normal to the rotational axis of the second polygonal mirror PM2; each facet in the first class of facets (having high beam elevation angle characteristics) produces an outgoing laser beam that is directed above the plane P1 as the facet sweeps across the point of incidence of the third laser scanning station VST1; whereas each facet in the second class of facets (having low beam elevation angle characteristics) produces an outgoing laser beam that is directed below the plane P1 as the facet sweeps across the point of incidence of the third laser scanning station VST1.

FIGS. 3B1 and 3B2 graphically depict a vector-based nomenclature that may be used to define horizontal and vertical scanning planes, respectively, that project through the bottom-scanning window 16.

FIGS. 3C1 and 3C2 is a perspective view and top view, respectively, of a wire frame model that illustrates the first group GH1 of laser beam folding mirrors of the first laser scanning station (HST1), which cooperate with the four scanning facets of the first rotating polygonal mirror PM1 so as to generate four different vertical laser scanning planes that project from the right back corner of the bottom-scanning window 16 diagonally outward and upward above the front left side (and front left corner) of the bottom-scanning window 16 as shown.

FIGS. 3D1 and 3D2 is a front view and top view, respectively, of a wire frame model that illustrates the second group GH2 of laser beam folding mirrors of the first laser scanning station (HST1), which cooperate with the four scanning facets of the first rotating polygonal mirror PM1 so as to generate four different horizontal laser scanning planes that project from the right side of the bottom-scanning window 16 diagonally outward and upward above the left side of the bottom-scanning window 16 as shown.

FIG. 3E1 and 3E2 is a perspective view and top view, respectively of a wire frame model that illustrates the third group GH3 of laser beam folding mirrors of the first laser scanning station (HST1), which cooperate with the four scanning facets of the first rotating polygonal mirror PM1 so as to generate four different vertical laser scanning planes that project from the right front corner of the bottom-scanning window 16 diagonally outward and upward above the back left side and back left corner of the bottom-scanning window 16 as shown.

FIGS. 3F1 and 3F2 is a front view and side view, respectively, of a wire frame model that illustrates the fourth group GH4 of laser beam folding mirrors of the first laser scanning station (HST1), which cooperate with the four scanning facets of the first rotating polygonal mirror PM1 so as to generate eight different horizontal laser scanning planes that project from the front side of the bottom-scanning window 16 diagonally outward and upward above the back side of the bottom-scanning window 16 as shown; note that the first laser scanning station HST1 utilizes mirrors MH4 and MH5 (and not MH6) of group GH4 to produce eight different scan planes therefrom.

FIGS. 4B1 and 4B2 is a front view and side view, respectively, of a wire frame model that illustrates the first group (GH4) of laser beam folding mirrors of the second laser scanning station (HST2), which cooperate with the four scanning facets of the first rotating polygonal mirror PM1 so as to generate eight different horizontal laser scanning planes that project from the front side of the bottom-scanning window 16 diagonally outward and upward above the back side of the bottom-scanning window 16 as shown; note that the second laser scanning station HST2 utilizes mirrors MH5 and MH6 (and not MH4) of group GH4 to produce eight different scan planes therefrom.

FIGS. 4C1 and 4C2 is a perspective view and top view, respectively, of a wire frame model that illustrates the second group (GH5) of laser beam folding mirrors of the second laser scanning station (HST2), which cooperate with the four scanning facets of the first rotating polygonal mirror PM1 so as to generate four different vertical laser scanning planes that project from the left front corner of the bottom-scanning window 16 diagonally outward and upward above the back right side and back right corner of the bottom-scanning window 16 as shown.

FIGS. 4D1 and 4D2 is a front view and top view, respectively, of a wire frame model that illustrates the third group (GH6) of laser beam folding mirrors of the second laser scanning station (HST2), which cooperate with the four scanning facets of the first rotating polygonal mirror PM1 so as to generate four different horizontal laser scanning planes that project from the left side of the bottom-scanning window 16 diagonally outward and upward above the right side of the bottom-scanning window 16 as shown.

FIGS. 4E1 and 4E2 is a perspective view and top-view, respectively, of a wire frame model that illustrates the fourth group (GH7) of laser beam folding mirrors of the second laser scanning station (HST2), which cooperate with the four scanning facets of the first rotating polygonal mirror PM1 so as to generate four different vertical laser scanning planes that project from the left back corner of the bottom-scanning window 16 diagonally outward and upward above the front right side and front right corner of the bottom-scanning window 16 as shown.

FIGS. 5B1 and 5B2 graphically depict a vector-based nomenclature that may be used to define horizontal and vertical scanning planes, respectively, that project through the side-scanning window 18.

FIGS. 5C1 and 5C2 is a front view and top view, respectively, of a wire frame model that illustrates the first group (GV1) of laser beam folding mirrors of the third laser scanning station (VST1), which cooperate with the two low-elevation (LE) scanning facets of the second rotating polygonal mirror PM2 (corresponding to angles $\beta_3$ and $\beta_4$ of the second polygonal mirror PM2 in FIG. 2G1) so as to generate two different vertical laser scanning planes that project from the left side of the side-scanning window 18 diagonally down and out across the bottom-scanning window 16 above the front right corner of the bottom-scanning window 16 as shown.

FIGS. 5D1 and 5D2 is a perspective view and side view, respectively, of a wire frame model that illustrates the second group (GV2) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2G1) so as to generate two different vertical laser scanning planes that project from the top left corner of the side-scanning window 18 downward toward the bottom-scanning window 16 substantially along the left side of the bottom-scanning window 16 as shown.

FIGS. 5E1 and 5E2 is a front view and side view, respectively, of a wire frame model that illustrates the third group (GV3) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2G1) so as to generate two different horizontal laser scanning planes that project from the top left quadrant of the side-scanning window 18 diagonally down across the bottom-scanning window 16 as shown.

FIGS. 5F1 and 5F2 is a front view and side view, respectively, of a wire frame model that illustrates the fourth group (GV4) of laser beam folding mirrors of the third laser scanning station (VST1), which cooperate with the two low elevation scanning facets of the second rotating polygonal mirror PM2 (corresponding to angles $\beta_3$ and $\beta_4$ of the second polygonal mirror PM2 in FIG. 2G1) so as to generate two different horizontal laser scanning planes that project from the top right quadrant of the side-scanning window 18 diagonally down across the bottom-scanning window 16 as shown.

FIGS. 5G1 and 5G2 is a front view and side view, respectively, of a wire frame model that illustrates the fifth group (GV5) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2G1) so as to generate two different vertical laser scanning planes that project from the top right corner of the side-scanning window 18 downward toward the bottom-scanning window 16 substantially along the right side of the bottom-scanning window 16 as shown.

FIGS. 5H1 and 5H2 is a front view and side view, respectively, of a wire frame model that illustrates the sixth group (GV6) of laser beam folding mirrors of the third laser scanning station (VST1), which cooperate with the two low elevation scanning facets of the second rotating polygonal mirror PM2 (corresponding to angles $\beta_3$ and $\beta_4$ of the second polygonal mirror PM2 in FIG. 2G1) so as to generate two different vertical laser scanning planes that project from the right side of the side-scanning window 18 diagonally out across the bottom-scanning window 16 above the front left corner of the bottom-scanning window 16 as shown.

FIGS. 5I1 and 5I2 is a front view and side view, respectively, of a wire frame model that illustrates the seventh group (GV7) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the top left quadrant of the side-scanning window 18 outwardly across the bottom-scanning window 16 (substantially parallel to the bottom-scanning window 16) as shown.

FIGS. 5J1 and 5J2 is a front view and top view, respectively, of a wire frame model that illustrates the eighth group (GV8) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the left side of the side-scanning window 18 outwardly across the bottom-scanning window 16 (substantially parallel to the bottom-scanning window 16) as shown; in the illustrative embodiment, the characteristic direction of propagation of such scanning planes has a non-vertical component whose orientation relative to the normal of the side-scanning window 18 is greater than 35 degrees.

FIGS. 5K1 and 5K2 is a front view and side view, respectively, of a wire frame model that illustrates the ninth group (GV9) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the central portion of the side-scanning window 18 outwardly and downward across the bottom-scanning window 16 as shown.

FIGS. 5L1 and 5L2 is a front view and side view, respectively, of a wire frame model, that illustrates the tenth group (GV10) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the central portion of the side-scanning window 18 outwardly and sharply downward across the bottom-scanning window 16 as shown.

FIGS. 5M1 and 5M2 is a front view and side view, respectively, of a wire frame model that illustrates the eleventh group (GV11) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the central portion of the side-scanning window 18 outwardly and sharply downward across the bottom-scanning window 16 as shown.

FIGS. 5N1 and 5N2 is a front view and side view, respectively, of a wire frame model that illustrates the twelfth group (GV12) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the central portion of the side-scanning window 18 outwardly across the bottom-scanning window 16 (substantially parallel to the bottom-scanning window 16) as shown.

FIG. 5O1 and 5O2 is a front view and top view, respectively, of a wire frame model that illustrates the thirteenth group (GV13) of laser beam folding mirrors of the third laser scanning station (VST1), which cooperate with the two high elevation scanning facets of the second rotating polygonal mirror (corresponding to angles $\beta_1$ and $\beta_2$ of the second polygonal mirror PM2 in FIG. 2G1) so as to generate two different horizontal laser scanning planes that project from the right side of the side-scanning window 18 outwardly across the bottom-scanning window 16 (substantially parallel to the bottom-scanning window 16) as shown; in the illustrative embodiment, the characteristic direction of propagation of such scanning planes has a non-vertical component whose orientation relative to the normal of the side-scanning window 18 is greater than 35 degrees.

FIGS. 5P1 and 5P2 is a front view and side view, respectively, of a wire frame model that illustrates the fourteenth group (GV14) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the top right quadrant of the side-scanning window 18 outwardly across the bottom-scanning window 16 (substantially parallel to the bottom-scanning window 16) as shown.

FIGS. 10A through 10I are signal diagrams that illustrate the operation of the multi-path scan data signal processor 901 of the illustrative embodiment of FIG. 9. FIGS. 10A and 10B depict the signal produced at the output of the photodetector 902 as the laser scanning beam scans across a bar code symbol; FIG. 10C depicts the output signal produced by the signal conditioning circuitry 903; and FIGS. 10D through 10I depict the processing performed in one of the respective paths of the multi-path scan data signal processor 901; similar processing operations with different operations characteristics are performed in other paths of the multi-path scan data signal processor 901.

FIG. 17B illustrates exemplary digital signal processing operations that identify a data frame (e.g., a portion of the discrete scan data signal levels stored in memory 1709) that potentially represents a bar code symbol (block 1723) and stores the data frame in a working buffer (block 1725); FIG. 17C illustrates exemplary digital signal processing operations that carry out multi-path scan data signal processing according to the present invention; and FIG. 17D illustrates alternative digital signal processing operations that carry out multi-subpath scan data signal processing (with different first derivative threshold processing performed in each subpath) according to the present invention.

DETAILED DESCRIPTION OF THE ILLUSTRATIVE EMBODIMENTS OF THE PRESENT INVENTION

Figure 1A:
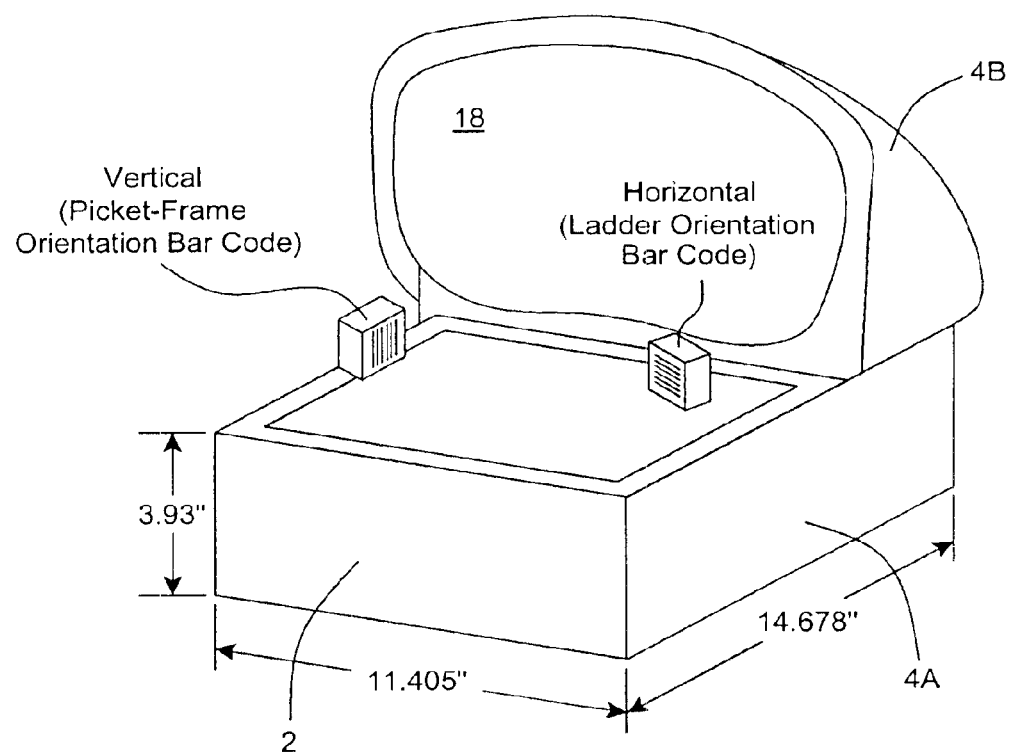
FIG. 1A is a perspective view of an illustrative embodiment of the bioptical laser scanning system of the present invention, showing its bottom-scanning and side-scanning windows formed with its compact scanner housing.
Figure 1B:
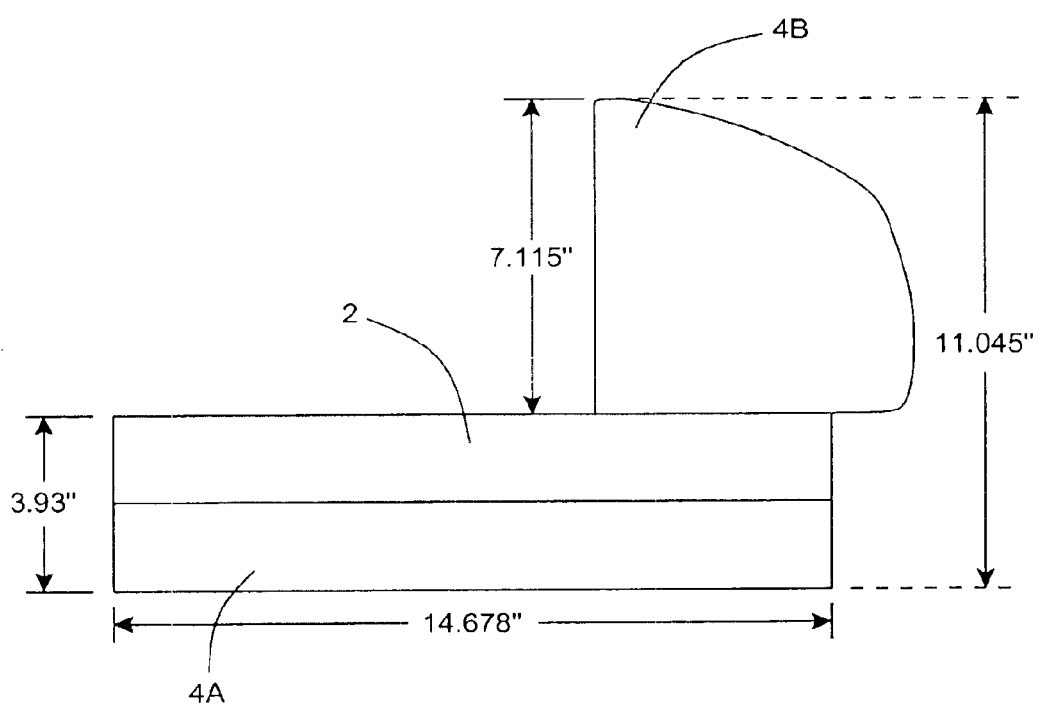
FIG. 1B is a side view of the bioptical laser scanning system of FIG. 1A.

Referring to the figures in the accompanying Drawings, the various illustrative embodiments of the bioptical laser scanner of the present invention will be described in great detail.

In the illustrative embodiments, the apparatus of the present invention is realized in the form of an automatic code symbol reading system having a high-speed bioptical laser scanning mechanism as well as a scan data processor for decode processing scan data signals produced thereby. However, for the sake of convenience of expression, the term "bioptical laser scanner" shall be used hereinafter to denote the bar code symbol reading system which employs the bioptical laser scanning mechanism of the present invention.

As shown in FIGS. 1A through 1G, the bioptical laser scanner 1 of the illustrative embodiment of the present invention has a compact housing 2 having a first housing portion 4A and a second housing portion 4B which projects from one end of the first housing portion 4A in a substantially orthogonal manner. When the laser scanner 1 is installed within a counter-top surface, as shown in FIG. 1H, the first housing portion 4A oriented horizontally, whereas the second housing portion 4B is oriented vertically with respect to the POS station. Thus throughout the Specification and Claims hereof, the terms first housing portion and horizontally-disposed housing portion may be used interchangeably but refer to the same structure; likewise, the terms the terms second housing portion and vertically-disposed housing portion may be used interchangeably but refer to the same structure.

In the illustrative embodiment, the first housing portion 4A (which includes the bottom-scanning window 16) has width, length and height dimensions of 11.405, 14.678 and 3.93 inches, respectively, whereas the second housing portion 4B (which includes the side-scanning window 18) has width and height dimensions of 12.558 inches and 7.115 inches, respectively. The total height of the scanner housing 2 is 11.044 inches. In addition, the bottom-scanning window 16 has width and length dimensions of approximately 3.94 inches (100 mm) and 5.9 inches (150 mm), respectively, to provide a window with a square area of approximately 15,000 square mm. And, the side-scanning window 18 has width and height dimensions of approximately 9.8 inches (248 mm) and 5.9 inches (150 mm), respectively, to provide a window with a square area of approximately 37,200 square mm. As will be described in greater detail below, the bioptical laser scanning mechanism housed within this ultra-compact housing produces an omni-directional laser scanning pattern within the three-dimensional volume above the bottom-scanning window 16 and in front of the side-scanning window 18.

Figure 1C:
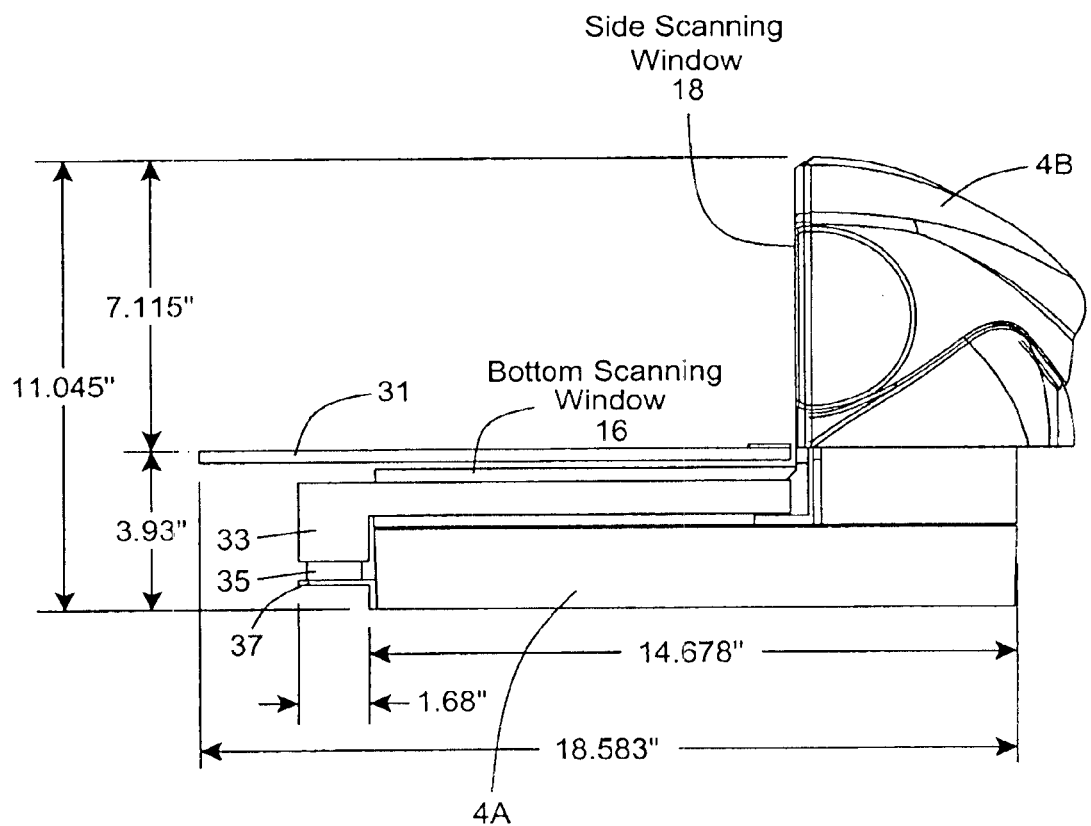
FIG. 1C is a side view of the bioptical laser scanning system of FIGS. 1A and 1B with an integrated weigh scale for use in a Point-Of-Sale (POS) retail environment as shown in FIG. 1H.
Figure 1D:
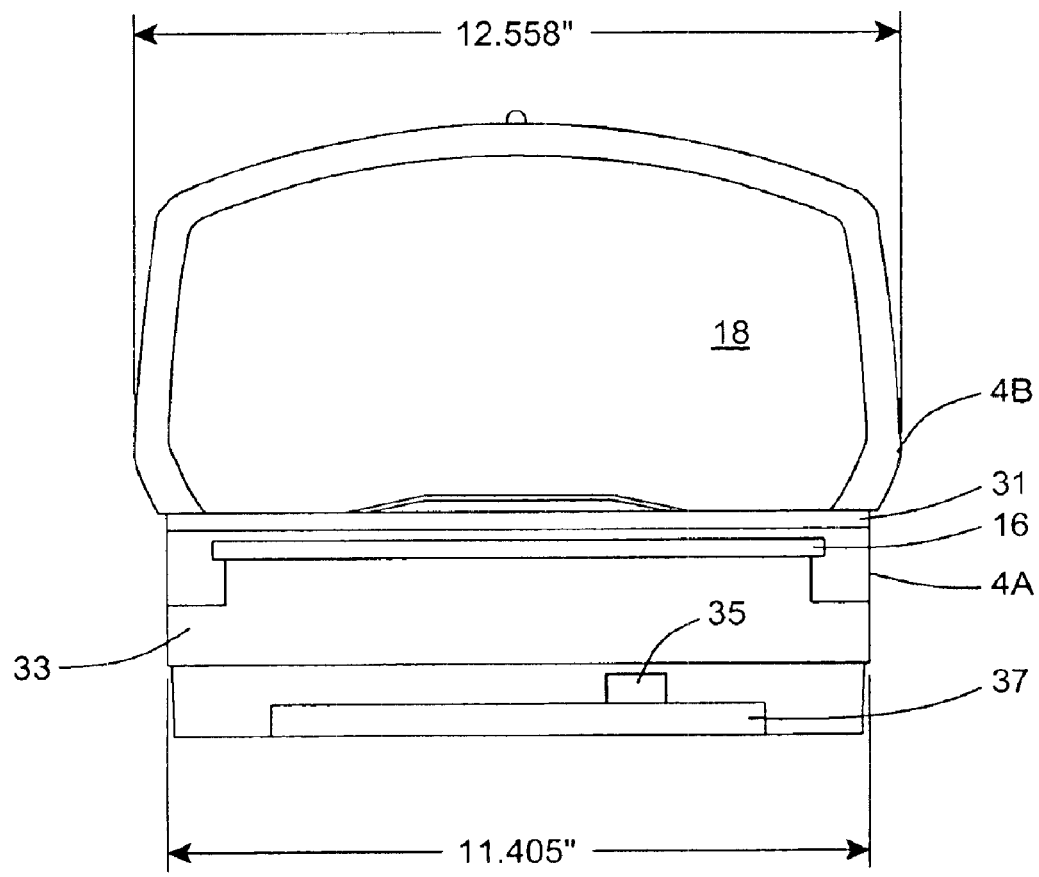
FIG. 1D is a front view of the bioptical laser scanning system with integrated weigh scale of FIG. 1C.
Figure 1E:
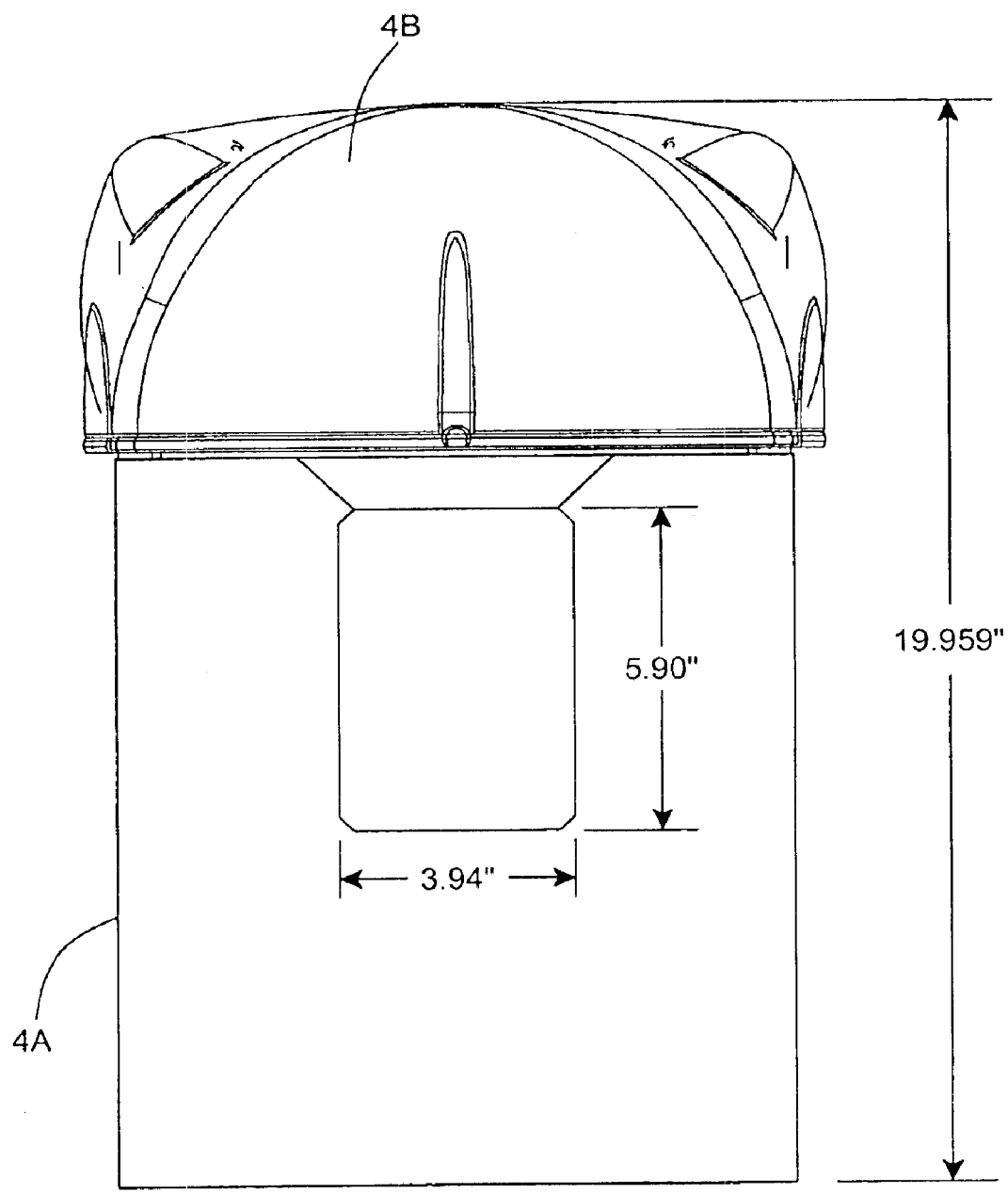
FIG. 1E is a top view of the bioptical laser scanning system with integrated weigh scale of FIG. 1C.
Figure 1F:
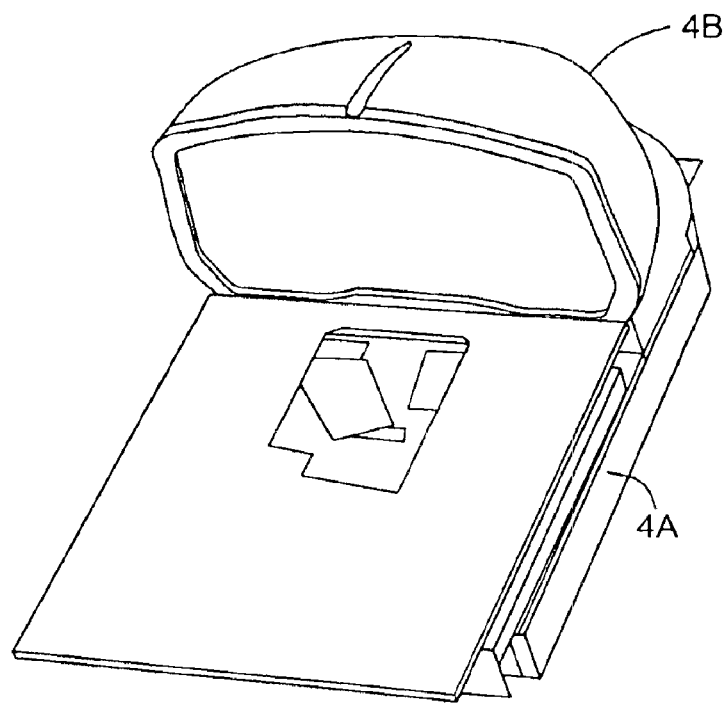
FIGS. 1F and 1G are perspective views of a model of the bioptical laser scanning system with integrated weigh scale of FIG. 1C.
Figure 1G:
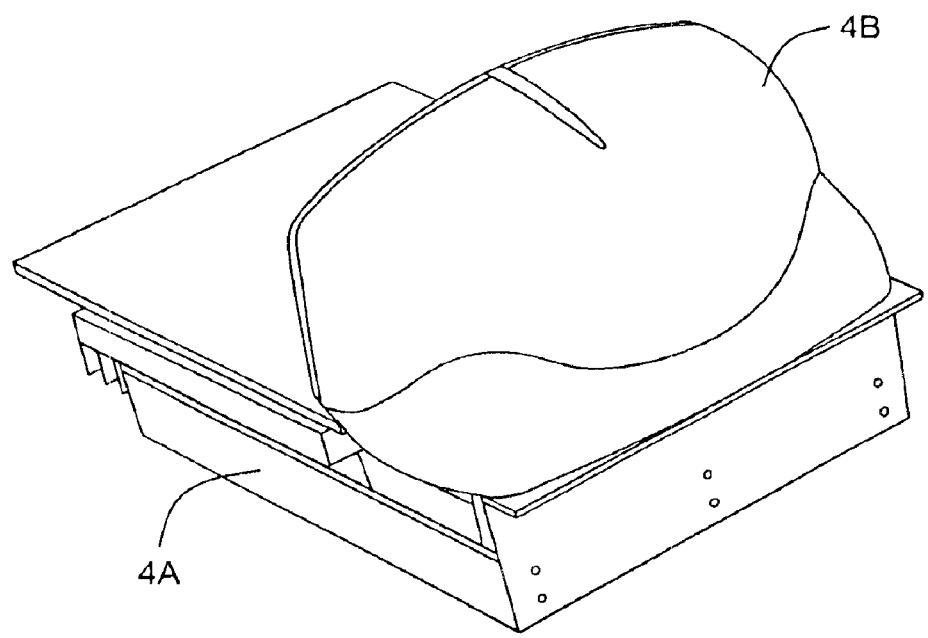
Figure 1H:
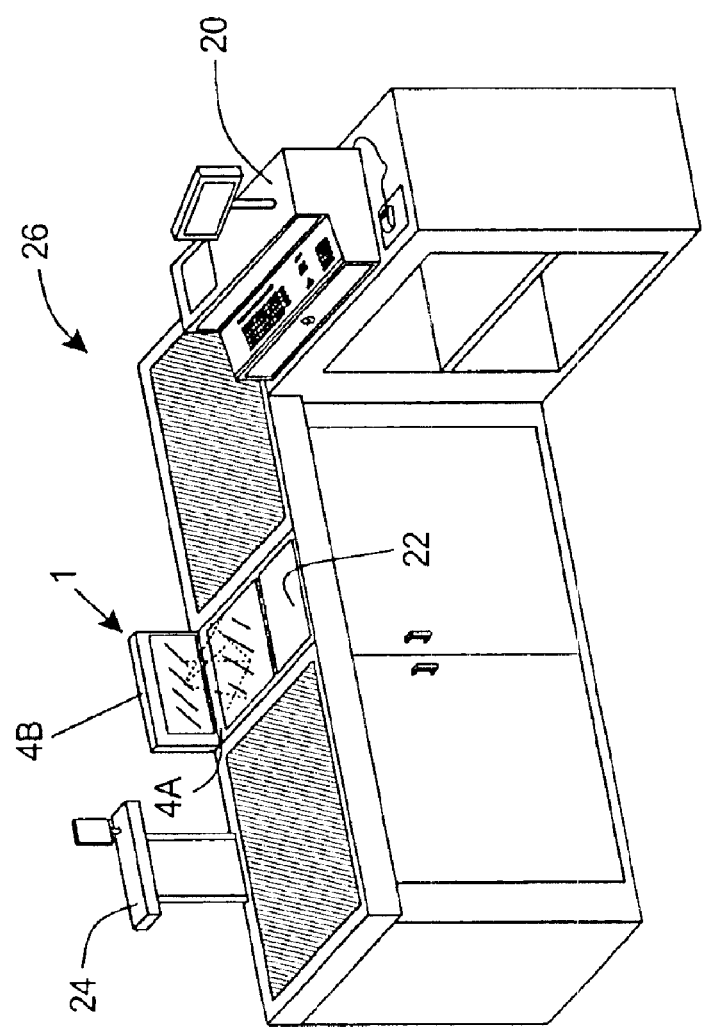
FIG. 1H is a perspective view of the bioptical laser scanning system of the present invention shown installed in a Point-Of-Sale (POS) retail environment.

The omni-directional scanning pattern is capable of reading picket-fence type bar code symbols on bottom-facing surfaces (i.e., a surface whose normal is directed toward the bottom-scanning window 16 of the scanner), top-facing surfaces (i.e., a surface whose "flip-normal" is directed toward the bottom-scanning window 16 of the scanner), back-facing surfaces (i.e., a surface whose normal is directed toward the side-scanning window 18 of the scanner), front-facing surfaces (i.e., a surface whose "flip-normal" is directed toward the side-scanning window 18 of the scanner), left-facing surfaces (i.e., a surface whose normal is directed toward or above the left side of the scanner), and right-facing surfaces (i.e., a surface whose normal is directed toward or above the right side of the scanner). A "flip-normal" as used above is a direction co-linear to the normal of a surface yet opposite in direction to this normal as shown in FIG. 1J. An example of such bottom-facing, top-facing, back-facing, front-facing surfaces, left-facing surfaces, and right-facing surfaces of a rectangular shaped article oriented in the scan volume of the bioptical laser scanning system disposed between bottom-scanning and side-scanning windows of the system is illustrated in FIG. 1K.

The bioptical laser scanning system of the present invention can be used in a diverse variety of bar code symbol scanning applications. For example, the bioptical laser scanner 1 can be installed within the countertop of a point-of-sale (POS) station as shown in FIG. 2H. In this application, it is advantageous to integrate a weight scale with the laser scanning mechanism. Such a device is shown in FIGS. 1C and 1D including a weight transducer 35 affixed to a flange 37 mounted to the front side of the first housing portion 4A. A weigh platter 31 (upon which goods or articles to be weighed are placed) is mechanically supported via posts (preferably disposed on its periphery) to a plastic insert 33. The posts (not shown) and plastic insert 33 transfer the weight forces exerted by the goods or articles placed on the weigh platter 31 to the weight transducer 35 for measurement. In addition, the plastic insert 33 supports the bottom-scanning window 16.

As shown in FIG. 1H, the bioptical laser scanner 1 can be installed within the countertop of a point-of-sale (POS) station 26, having a computer-based cash register 20, a weigh-scale 22 mounted within the counter adjacent the laser scanner, and an automated transaction terminal (ATM) supported upon a courtesy stand in a conventional manner.

Figure 1I:
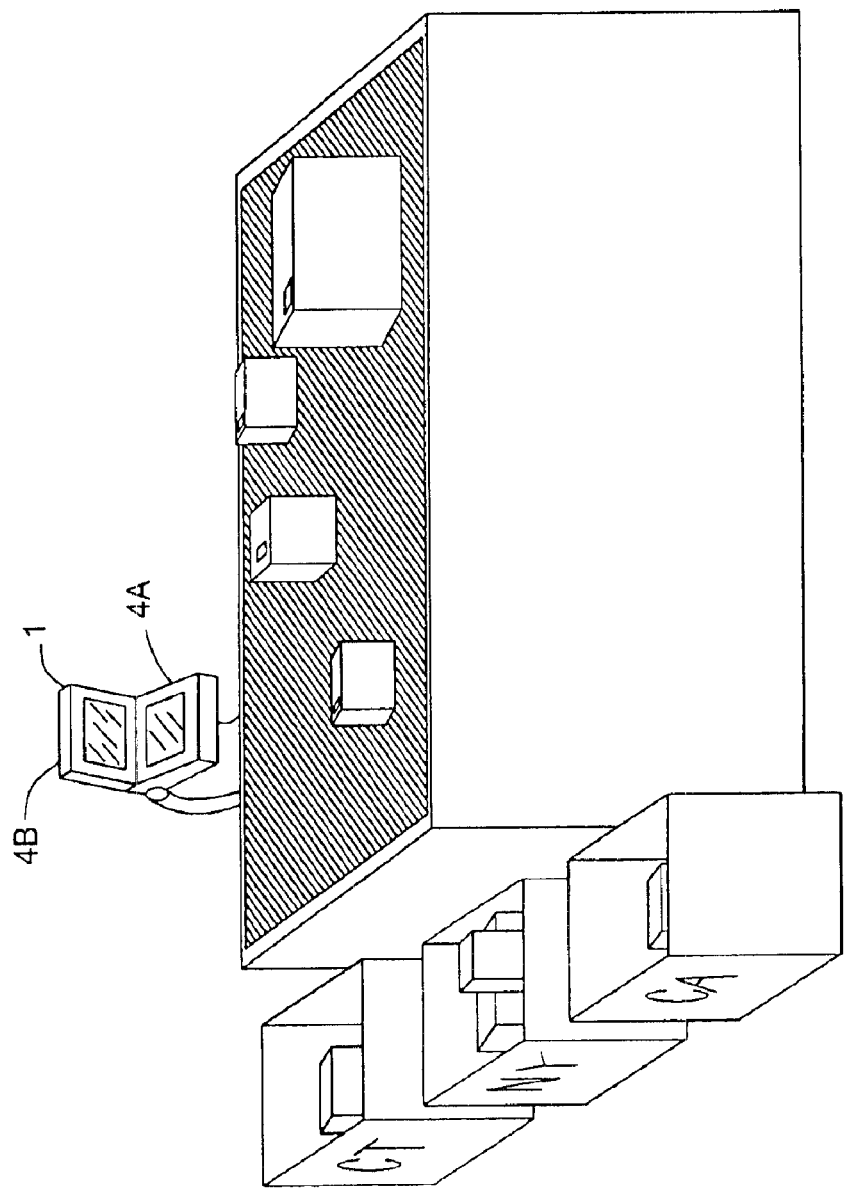
Figure 1J:
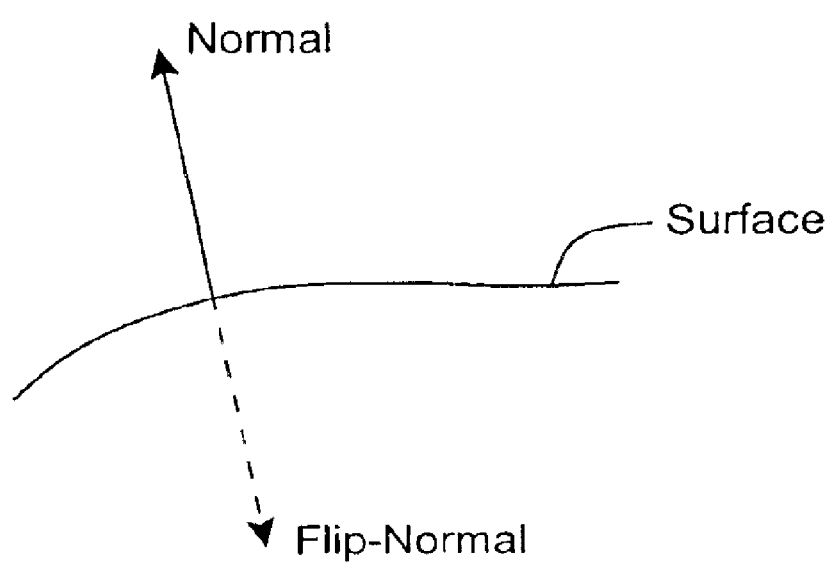
FIG. 1J is a pictorial illustration depicting a normal of a surface and the "flip-normal" of the surface as used herein.
Figure 1K:
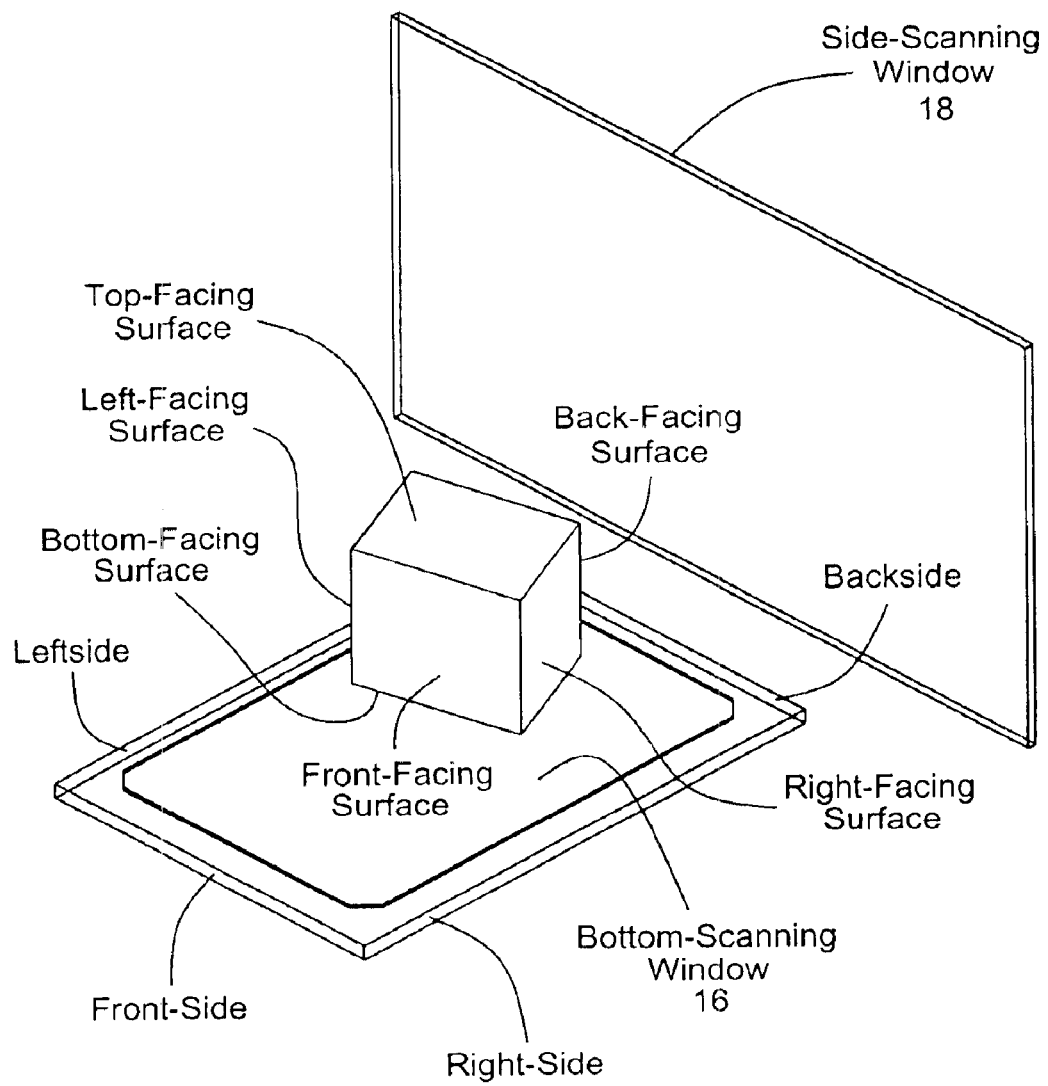
FIG. 1K is a pictorial illustration depicting bottom-facing, top-facing, back-facing, front-facing, left-facing and right-facing surfaces of a rectangular shaped article oriented within the scanning volume of the bioptical laser scanning system of the present invention disposed between the bottom-scanning and side-scanning windows of the system.

Alternatively, as shown in FIG. 1I, the bioptical laser scanner can be installed above a conveyor belt structure as part of a manually-assisted parcel sorting operation being carried out, for example, during inventory control and management operations.

As shown in FIGS. 2A through 2F, the bioptical scanning system 1 of the illustrative embodiment includes two sections: a first section (sometimes referred to as the horizontal section) disposed within the first housing portion 4A and a second section (sometimes referred to as the vertical section) substantially disposed within the second housing portion 4B. It should be noted that in the illustrative embodiment, parts of the vertical section are disposed within the back of the first housing portion 4A as will become evident from the figures and accompanying description that follows.

Figure 2A:
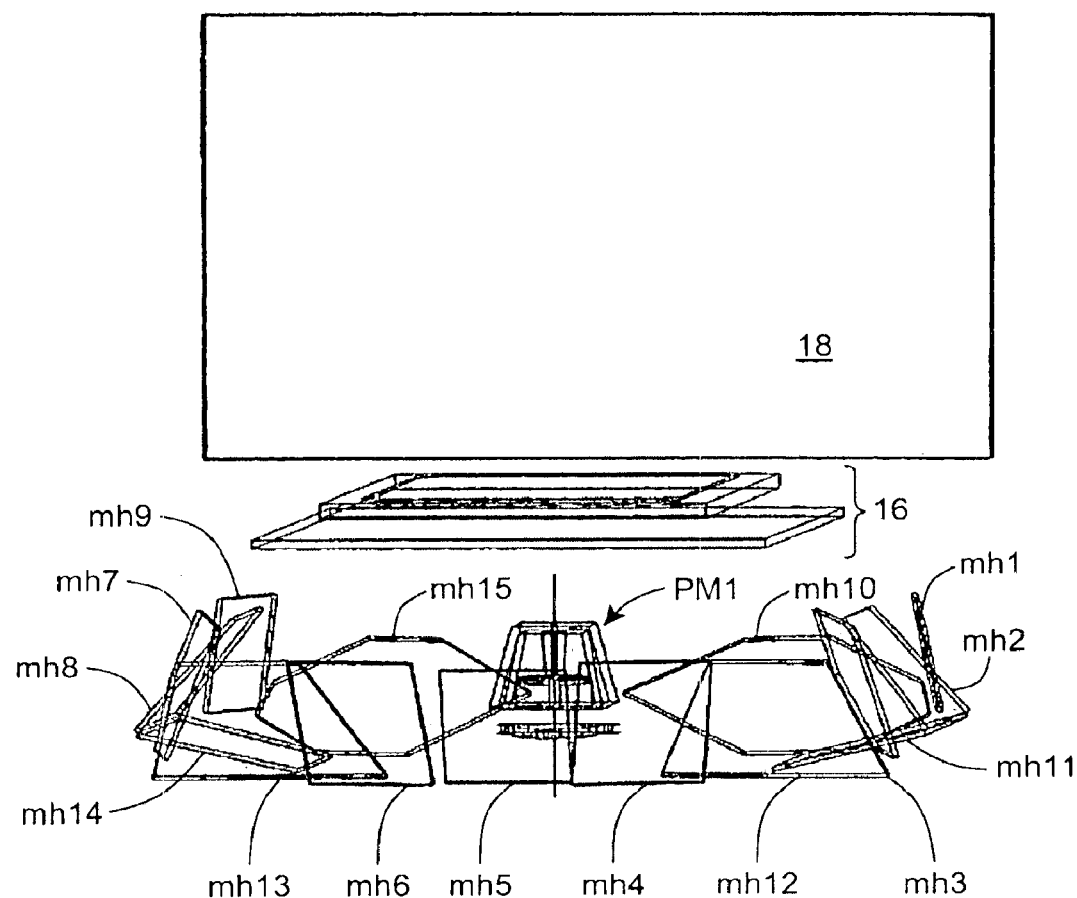
FIG. 2A is a perspective view of a wire frame model of portions of the horizontal section of the bioptical laser scanning system of the illustrative embodiment of the present invention, including the bottom-scanning window (e.g., horizontal window), first rotating polygonal mirror PM1, and the first and second scanning stations HST1 and HST2 disposed thereabout, wherein each laser scanning station includes a set of laser beam folding mirrors disposed about the first rotating polygon PM1.
Figure 2B:
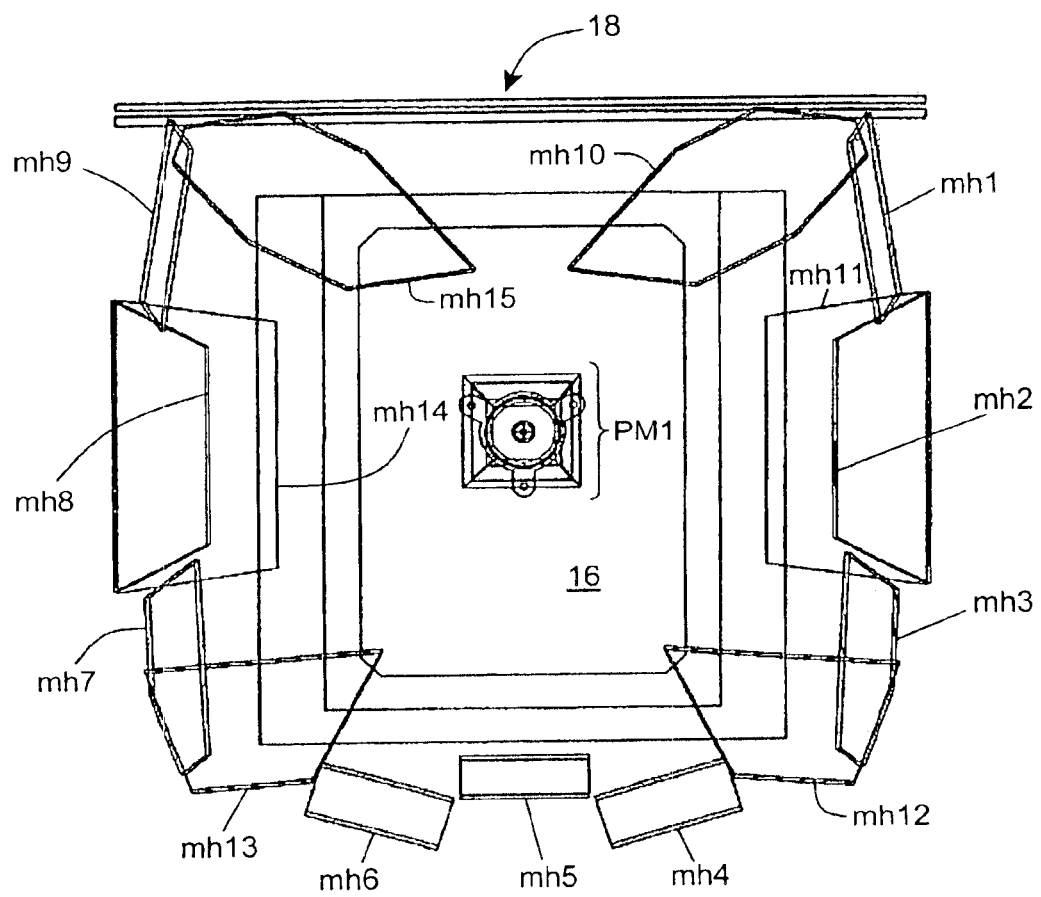
FIG. 2B is a top view of the wire frame model of FIG. 2A.

As shown in FIGS. 2A through 2C2 (and in tables I and II below), the first section includes a first rotating polygonal mirror, and first and second scanning stations (indicated by HST1 and HST2, respectively) disposed thereabout. The first and second laser scanning stations HST1 and HST2 each include a laser beam production module (not shown), a set of laser beam folding mirrors, a light collecting/focusing mirror; and a photodetector. The first and second laser scanning stations HST1 and HST2 are disposed opposite one another about the first rotating polygonal mirror PM1. Each laser scanning station generates a laser scanning beam (shown as SB1 and SB2 in FIGS. 2C1 and 2C2) that is directed to a different point of incidence on the first rotating polygonal mirror PM1. The incident laser beams (produced by the first and second laser scanning stations HST1 and HST2) are reflected by each facet (of the first polygonal mirror PM1) at varying angles as the first polygonal mirror PM1 rotates to produce two scanning beams (SB1 and SB2) whose direction varies over the rotation cycle of the first polygonal mirror PM1. The first and second laser scanning stations HST1 and HST2 include groups of laser beam folder mirrors arranged about the first polygonal mirror PM1 so as to redirect the two scanning beams SB1 and SB2 to thereby generate and project different groups of laser scanning planes through the bottom-scanning window 16.

TABLE I

Mirror Positions—Horizontal Section (mm):

| | Vertex | X | Y | Z |
|---|---|---|---|---|
| mh1 | 1 | 115.25 | 18.87 | 3.06 |
| | 2 | 109.09 | 9.19 | 42.85 |
| | 3 | 99.81 | 69.42 | 40.73 |
| | 4 | 105.97 | 79.10 | 0.94 |
| | 5 | | | |
| | 6 | | | |
| | 7 | | | |
| | 8 | | | |
| mh2 | 1 | 123.91 | −78.90 | 2.61 |
| | 2 | 95.43 | −62.89 | 39.73 |
| | 3 | 95.43 | 3.57 | 39.73 |
| | 4 | 123.91 | 19.57 | 2.61 |
| | 5 | | | |
| | 6 | | | |
| | 7 | | | |
| | 8 | | | |
| mh3 | 1 | 103.74 | −140.29 | 25.40 |
| | 2 | 96.02 | −133.84 | 47.43 |
| | 3 | 99.04 | −68.09 | 37.13 |
| | 4 | 114.48 | −80.98 | −6.92 |
| | 5 | 112.97 | −113.85 | −1.78 |
| | 6 | | | |
| | 7 | | | |
| | 8 | | | |
| mh4 | 1 | 62.08 | −136.87 | −11.25 |
| | 2 | 66.99 | −152.92 | 31.34 |
| | 3 | 26.71 | −165.23 | 31.34 |
| | 4 | 21.80 | −149.19 | −11.25 |
| | 5 | | | |
| | 6 | | | |
| | 7 | | | |
| | 8 | | | |
| mh5 | 1 | −20.00 | −135.31 | −11.19 |
| | 2 | −20.00 | −148.24 | 27.91 |
| | 3 | 20.00 | −148.24 | 27.91 |
| | 4 | 20.00 | −135.31 | −11.19 |
| | 5 | | | |
| | 6 | | | |
| | 7 | | | |
| | 8 | | | |
| mh6 | 1 | −62.08 | −136.87 | −11.25 |
| | 2 | −66.99 | −152.92 | 31.34 |
| | 3 | −26.71 | −165.23 | 31.34 |
| | 4 | −21.80 | −149.19 | −11.25 |
| | 5 | | | |
| | 6 | | | |
| | 7 | | | |
| | 8 | | | |
| mh7 | 1 | −96.02 | −133.84 | 47.43 |
| | 2 | −99.04 | −68.09 | 37.13 |
| | 3 | −114.48 | −80.98 | −6.92 |
| | 4 | −112.97 | −113.85 | −1.78 |
| | 5 | −103.74 | −140.29 | 25.40 |
| | 6 | | | |
| | 7 | | | |
| | 8 | | | |
| mh8 | 1 | −123.91 | −78.90 | 2.61 |
| | 2 | −95.43 | −62.89 | 39.73 |
| | 3 | −95.43 | 3.57 | 39.73 |
| | 4 | −123.91 | 19.57 | 2.61 |
| | 5 | | | |
| | 6 | | | |
| | 7 | | | |
| | 8 | | | |
| mh9 | 1 | −115.25 | 18.87 | 3.06 |
| | 2 | −109.09 | 9.19 | 42.85 |
| | 3 | −99.81 | 69.42 | 40.73 |
| | 4 | −105.97 | 79.10 | 0.94 |
| | 5 | | | |
| | 6 | | | |
| | 7 | | | |
| | 8 | | | |
| mh10 | 1 | 53.69 | 23.10 | −11.94 |
| | 2 | 14.23 | 28.69 | 8.47 |
| | 3 | 47.54 | 67.87 | 24.47 |

TABLE I-continued

Mirror Positions—Horizontal Section (mm):

| | Vertex | X | Y | Z |
|---|---|---|---|---|
| | 4 | 72.59 | 81.43 | 24.47 |
| | 5 | 102.20 | 77.24 | 9.16 |
| | 6 | 106.06 | 65.68 | −1.17 |
| | 7 | 83.67 | 39.33 | −11.94 |
| | 8 | | | |
| mh11 | 1 | 123.91 | −79.28 | 2.61 |
| | 2 | 75.02 | −71.42 | −10.49 |
| | 3 | 75.02 | 11.97 | −10.49 |
| | 4 | 123.91 | 19.83 | 2.61 |
| | 5 | | | |
| | 6 | | | |
| | 7 | | | |
| | 8 | | | |
| mh12 | 1 | 116.06 | −105.01 | −10.87 |
| | 2 | 43.62 | −99.13 | −10.90 |
| | 3 | 65.09 | −142.38 | 30.61 |
| | 4 | 101.96 | −145.37 | 30.63 |
| | 5 | | | |
| | 6 | | | |
| | 7 | | | |
| | 8 | | | |
| mh13 | 1 | −101.96 | −145.37 | 30.63 |
| | 2 | −65.09 | −142.38 | 30.61 |
| | 3 | −43.62 | −99.13 | −10.90 |
| | 4 | −116.06 | −105.01 | −10.87 |
| | 5 | | | |
| | 6 | | | |
| | 7 | | | |
| | 8 | | | |
| mh14 | 1 | −75.02 | 11.97 | −10.49 |
| | 2 | −75.02 | −71.42 | −10.49 |
| | 3 | −123.91 | −79.28 | 2.61 |
| | 4 | −123.91 | 19.83 | 2.61 |
| | 5 | | | |
| | 6 | | | |
| | 7 | | | |
| | 8 | | | |
| mh15 | 1 | −54.15 | 22.24 | −10.80 |
| | 2 | −84.14 | 38.47 | −10.80 |
| | 3 | −106.53 | 64.81 | −0.04 |
| | 4 | −102.66 | 76.38 | 10.30 |
| | 5 | −73.05 | 80.57 | 25.61 |
| | 6 | −48.00 | 67.01 | 25.61 |
| | 7 | −14.70 | 27.83 | 9.60 |
| | 8 | | | |

TABLE II

Scan Line Groups—Horizontal Section

| Group Identifier | Mirrors in Group | Scanning Station/ Scan Lines | Type |
|---|---|---|---|
| gh1 | mh1, mh10 | HST1/4 | vertical |
| gh2 | mh2, mh11 | HST1/4 | horizontal |
| gh3 | mh3, mh12 | HST1/4 | vertical |
| gh4 | mh4 | HST1/4 | horizontal |
| | mh5 | HST1, HST2/8 | |
| | mh6 | H5T2/4 | |
| gh5 | mh7, mh13 | HST2/4 | vertical |
| gh6 | mh8, mh14 | HST2/4 | horizontal |
| gh7 | mh9, mh15 | H5T2/4 | vertical |

In addition, as shown in FIGS. 2C1 and 2C2, the first and second laser scanning stations HST1 and HST2 each include a light collecting/focusing optical element, e.g. parabolic light collecting mirror or parabolic surface emulating volume reflection hologram (labeled $LC_{HST1}$ and $LC_{HST2}$) that collects light from a scan region that encompasses the outgoing scanning planes (produced by the first and second laser scanning stations HST1 and HST2) and focuses such collected light onto a photodetector (labeled $PD_{HST1}$ and $PD_{HST2}$), which produces an electrical signal whose amplitude is proportional to the intensity of light focused thereon. The electrical signal produced by the photodetector is supplied to analog/digital signal processing circuitry, associated with the first and second laser scanning station HST1 and HST2, that process analog and digital scan data signals derived therefrom to perform bar code symbol reading operations. Preferably, the first and second laser scanning stations HST1 and HST2 each include a laser beam production module (not shown) that generates a laser scanning beam (labeled SB1 and SB2) that is directed (preferably through an aperture in the corresponding light collecting/focusing element as shown in FIGS. 2C1 and 2C2) to a point of incidence on the first rotating polygonal mirror PM1.

Figure 2D:
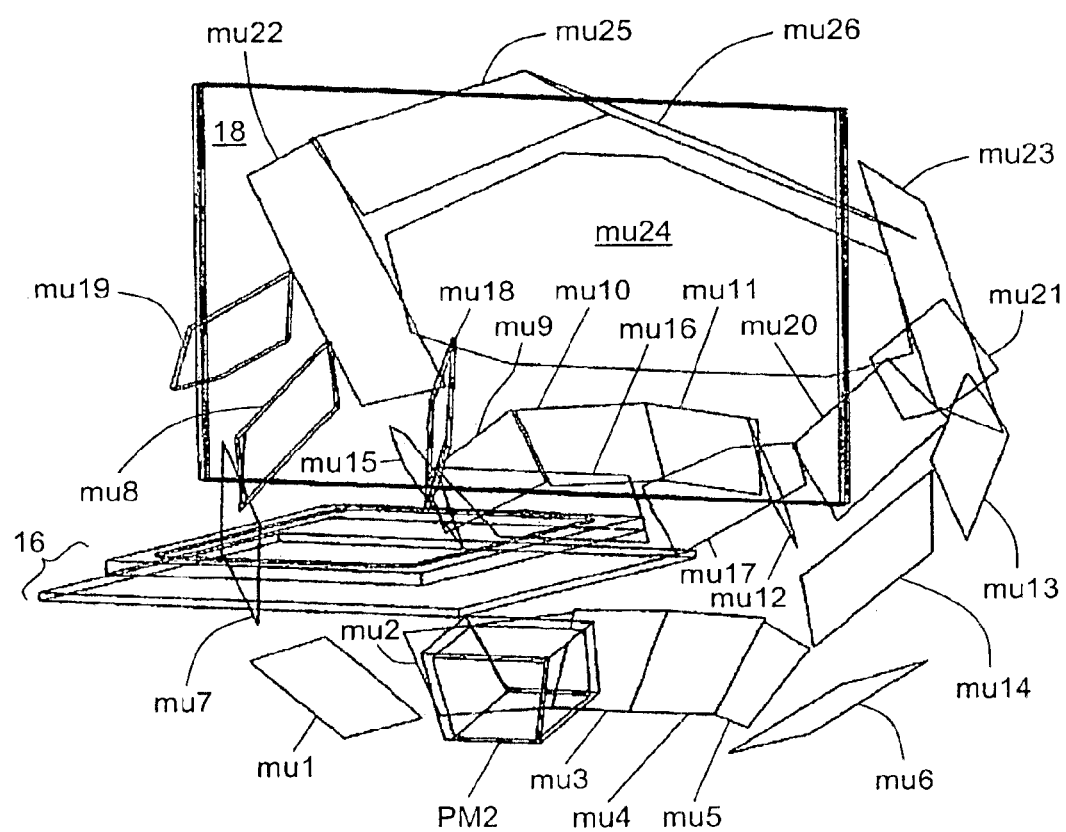
FIG. 2D is a perspective view of a wire frame model of portions of the vertical section of the bioptical laser scanning system of the illustrative embodiment of the present invention, including the side-scanning window (e.g., vertical window), second rotating polygonal mirror PM2, and the third scanning station VST1 disposed thereabout; the third laser scanning station includes a set of laser beam folding mirrors disposed about the second rotating polygon PM2.
Figure 2E:
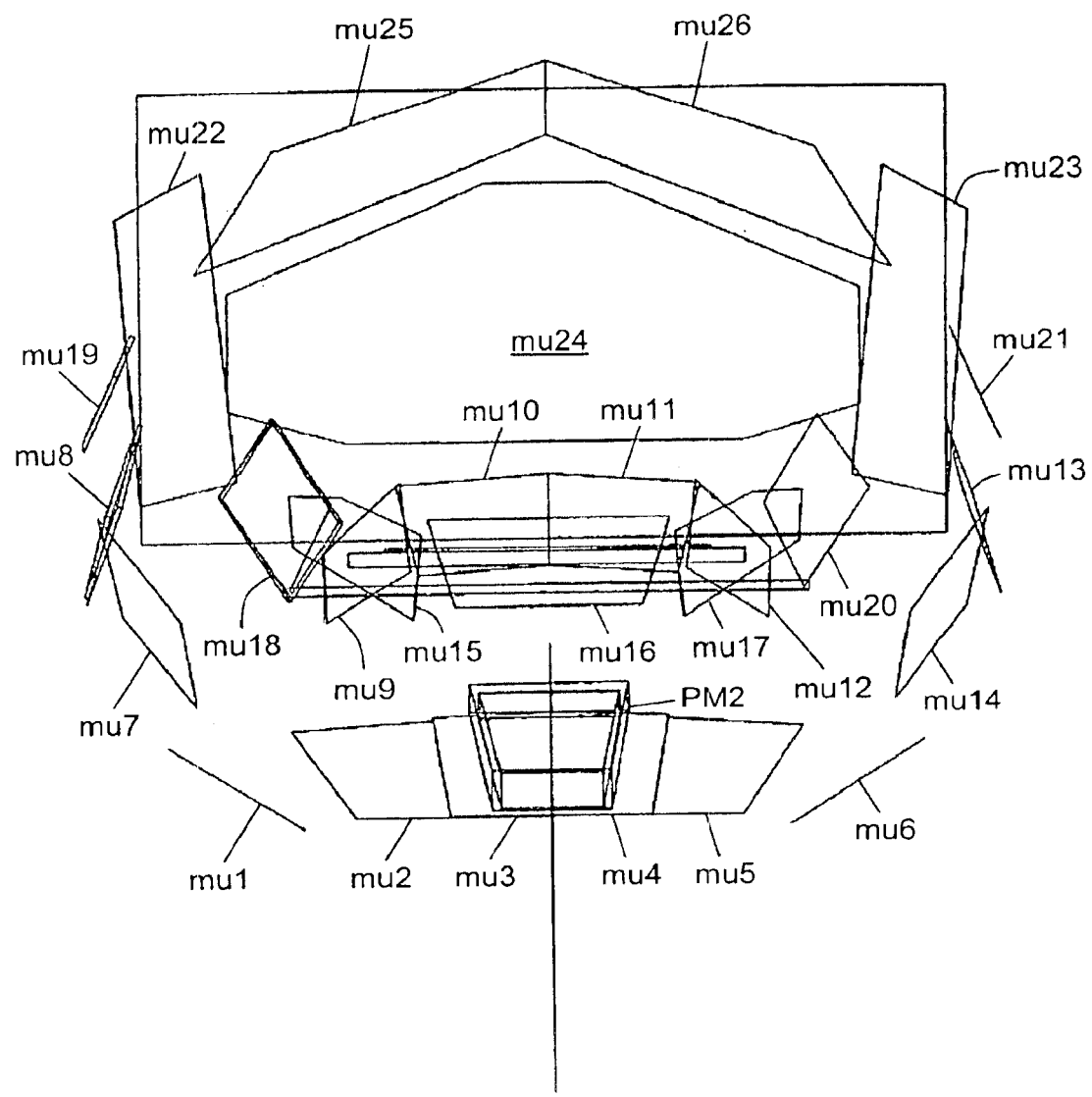
FIG. 2E is a top view of the wire frame model of FIG. 2D.
Figure 2F:
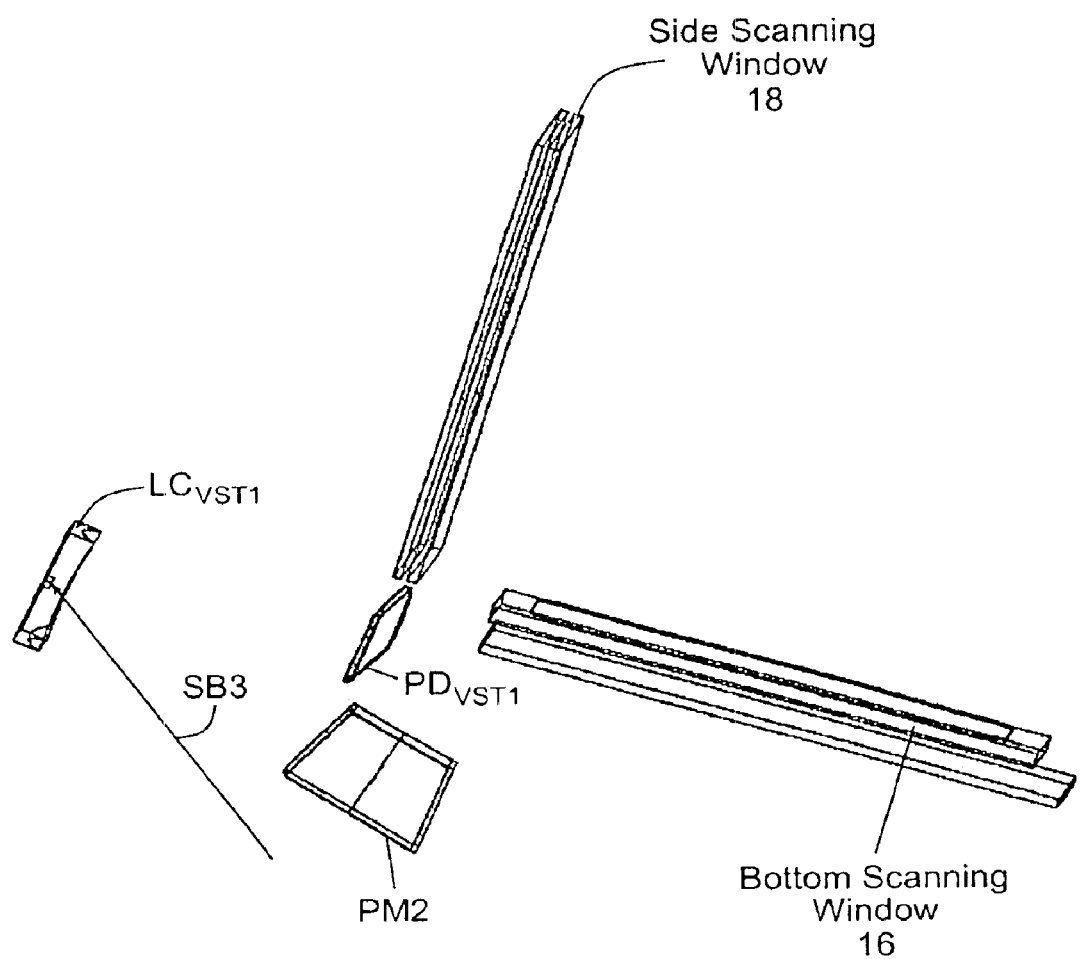
FIG. 2F is a perspective view of a wire frame model of portions of the vertical section of the bioptical laser scanning system of the illustrative embodiment of the present invention, including the side-scanning window (e.g., vertical window), second rotating polygonal mirror PM2, and the third scanning stations VST1 disposed thereabout, wherein the third laser scanning station VST1 includes a light collecting/focusing optical element (labeled $LC_{VST1}$) that collects light from a scan region that encompasses the outgoing scanning planes and focuses such collected light onto a photodetector (labeled $PD_{VST1}$), which produces an electrical signal whose amplitude is proportional to the intensity of light focused thereon. The electrical signal produced by the photodetector is supplied to analog/digital signal processing circuitry, associated with the first and second laser scanning station HST1 and HST2, that process analog and digital scan data signals derived therefrom to perform bar code symbol reading operations. Preferably, the third laser scanning station VST1 includes a laser beam production module (not shown) that generates a laser scanning beam SB3 that is directed to a small light directing mirror disposed in the interior of the light collecting/focusing element $LC_{VST1}$ as shown, which redirects the laser scanning beam SB3 to a point of incidence on the second rotating polygonal mirror PM2.
Figure 2H:
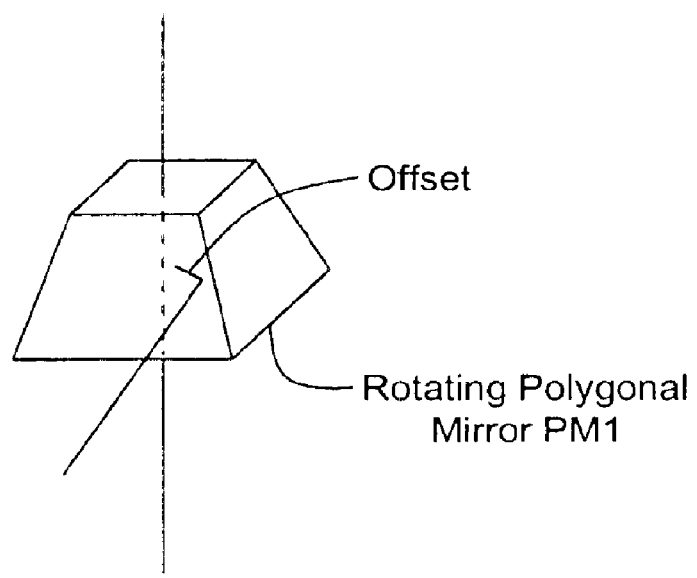
FIG. 2H depicts the offset between the pre-specified angle of incidence of the laser beams produced by the laser beam production modules of the laser scanning stations HST1 and HST2 and the rotational axis of the polygonal mirror PM1 along a direction perpendicular to the rotational axis; Such offset provides for spatial overlap in the scanning pattern of light beams produced from the polygonal mirror PM1 by these laser beam production modules; such spatial overlap can be exploited such that the overlapping rays are incident on at least one common mirror (mh5 in the illustrative embodiment) to provide a dense scanning pattern projecting therefrom; in the illustrative embodiment, a dense pattern of horizontal planes (groups GH4) is projected from the front side of the bottom window as is graphically depicted in FIGS. 3F1, 3F2 and 4B1 and 4B2.

As shown in FIGS. 2D through 2F and in tables III and IV below, the second section includes a second rotating polygonal mirror PM2 and a third scanning station (denoted VST1) that includes a laser beam production module (not shown), a set of laser beam folding mirrors, a light collecting/focusing mirror, and a photodetector. The third laser scanning station VST1 generates a laser scanning beam (labeled as SB3 in FIG. 2F) that is directed to a point of incidence on the second rotating polygonal mirror PM2. The incident laser beam is reflected by each facet (of the second polygonal mirror PM2) at varying angles as the second polygonal mirror PM2 rotates to produce a scanning beam whose direction varies over the rotation cycle of the second polygonal mirror PM2. The third laser scanning station VST1 includes a set of laser beam folder mirrors arranged about the second rotating polygonal mirror PM2 so as to redirect the scanning beam to thereby generate and project different groups of laser scanning planes through the side-scanning window 18.

TABLE III

Mirror Positions—Vertical Section (mm):

| | Vertex | X | Y | Z |
|---|---|---|---|---|
| mv1 | 1 | −74.79 | 88.94 | −10.38 |
| | 2 | −114.09 | 88.94 | 16.17 |
| | 3 | −114.09 | 154.82 | 16.17 |
| | 4 | −74.79 | 154.82 | −10.38 |
| | 5 | | | |
| | 6 | | | |
| | 7 | | | |
| | 8 | | | |
| mv2 | 1 | −61.12 | 131.03 | −6.76 |
| | 2 | −77.92 | 146.42 | 25.78 |
| | 3 | −43.75 | 183.72 | 25.78 |
| | 4 | −33.41 | 174.24 | 5.74 |
| | 5 | −31.44 | 163.43 | −6.76 |
| | 6 | | | |
| | 7 | | | |
| | 8 | | | |
| mv3 | 1 | −29.78 | 160.24 | −1.35 |
| | 2 | −34.38 | 185.43 | 27.65 |
| | 3 | −0.04 | 184.24 | 27.65 |
| | 4 | −0.04 | 159.21 | −1.35 |
| | 5 | | | |
| | 6 | | | |
| | 7 | | | |
| | 8 | | | |
| mv4 | 1 | 0.04 | 159.21 | −1.35 |
| | 2 | 0.04 | 184.24 | 27.65 |
| | 3 | 34.38 | 185.43 | 27.65 |
| | 4 | 29.78 | 160.24 | −1.35 |
| | 5 | | | |
| | 6 | | | |
| | 7 | | | |
| | 8 | | | |

TABLE III-continued

Mirror Positions—Vertical Section (mm):

| | Vertex | X | Y | Z |
|---|---|---|---|---|
| mv5 | 1 | 61.12 | 131.03 | −6.76 |
| | 2 | 31.44 | 163.43 | −6.76 |
| | 3 | 33.41 | 174.24 | 5.74 |
| | 4 | 43.75 | 183.72 | 25.78 |
| | 5 | 77.92 | 146.42 | 25.78 |
| | 6 | | | |
| | 7 | | | |
| | 8 | | | |
| mv6 | 1 | 74.79 | 88.94 | −10.38 |
| | 2 | 74.79 | 154.82 | −10.38 |
| | 3 | 114.09 | 154.82 | 16.17 |
| | 4 | 114.09 | 88.94 | 16.17 |
| | 5 | | | |
| | 6 | | | |
| | 7 | | | |
| | 8 | | | |
| mv7 | 1 | −107.52 | 89.35 | 30.99 |
| | 2 | −110.94 | 68.34 | 59.03 |
| | 3 | −136.32 | 120.65 | 95.14 |
| | 4 | −132.90 | 141.66 | 67.10 |
| | 5 | | | |
| | 6 | | | |
| | 7 | | | |
| | 8 | | | |
| mv8 | 1 | −129.50 | 196.36 | 99.91 |
| | 2 | −139.66 | 144.56 | 68.88 |
| | 3 | −133.18 | 126.69 | 96.58 |
| | 4 | −123.02 | 178.48 | 127.62 |
| | 5 | | | |
| | 6 | | | |
| | 7 | | | |
| | 8 | | | |
| mv9 | 1 | −42.26 | 185.73 | 73.40 |
| | 2 | −65.99 | 163.92 | 49.03 |
| | 3 | −69.45 | 141.18 | 82.25 |
| | 4 | −45.72 | 162.99 | 106.62 |
| | 5 | | | |
| | 6 | | | |
| | 7 | | | |
| | 8 | | | |
| mv10 | 1 | 0.00 | 190.18 | 78.00 |
| | 2 | −40.33 | 183.35 | 74.96 |
| | 3 | −46.98 | 168.27 | 105.79 |
| | 4 | 0.00 | 176.23 | 109.33 |
| | 5 | | | |
| | 6 | | | |
| | 7 | | | |
| | 8 | | | |
| mv11 | 1 | 0.00 | 176.23 | 109.33 |
| | 2 | 46.98 | 168.27 | 105.79 |
| | 3 | 40.33 | 183.35 | 74.96 |
| | 4 | 0.00 | 190.18 | 78.00 |
| | 5 | | | |
| | 6 | | | |
| | 7 | | | |
| | 8 | | | |
| mv12 | 1 | 42.26 | 185.73 | 73.40 |
| | 2 | 45.72 | 162.99 | 106.62 |
| | 3 | 69.45 | 141.18 | 82.25 |
| | 4 | 65.99 | 163.92 | 49.03 |
| | 5 | | | |
| | 6 | | | |
| | 7 | | | |
| | 8 | | | |
| mv13 | 1 | 139.66 | 144.56 | 68.88 |
| | 2 | 129.50 | 196.36 | 99.91 |
| | 3 | 123.02 | 178.48 | 127.62 |
| | 4 | 133.18 | 126.69 | 96.58 |
| | 5 | | | |
| | 6 | | | |
| | 7 | | | |
| | 8 | | | |
| mv14 | 1 | 132.90 | 141.66 | 67.10 |
| | 2 | 136.32 | 120.65 | 95.14 |
| | 3 | 110.94 | 68.34 | 59.03 |
| | 4 | 107.52 | 89.35 | 30.99 |
| | 5 | | | |
| | 6 | | | |
| | 7 | | | |
| | 8 | | | |
| mv15 | 1 | −59.72 | 111.27 | 102.01 |
| | 2 | −38.96 | 95.77 | 87.32 |
| | 3 | −42.25 | 116.98 | 60.28 |
| | 4 | −79.46 | 144.76 | 86.61 |
| | 5 | −77.49 | 132.11 | 102.74 |
| | 6 | | | |
| | 7 | | | |
| | 8 | | | |
| mv16 | 1 | 37.73 | 88.59 | 93.83 |
| | 2 | 29.22 | 119.90 | 64.12 |
| | 3 | −29.22 | 119.90 | 64.12 |
| | 4 | −37.73 | 88.59 | 93.83 |
| | 5 | | | |
| | 6 | | | |
| | 7 | | | |
| | 8 | | | |
| mv17 | 1 | 42.25 | 116.98 | 60.28 |
| | 2 | 38.96 | 95.77 | 87.32 |
| | 3 | 59.72 | 111.27 | 102.01 |
| | 4 | 79.46 | 144.76 | 86.61 |
| | 5 | 42.25 | 116.98 | 60.28 |
| | 6 | | | |
| | 7 | | | |
| | 8 | | | |
| mv18 | 1 | −63.87 | 149.13 | 93.46 |
| | 2 | −79.68 | 162.64 | 67.06 |
| | 3 | −100.06 | 208.14 | 102.55 |
| | 4 | −84.26 | 194.63 | 128.95 |
| | 5 | | | |
| | 6 | | | |
| | 7 | | | |
| | 8 | | | |
| mv19 | 1 | −140.43 | 92.77 | 119.03 |
| | 2 | −140.43 | 126.87 | 119.12 |
| | 3 | −136.72 | 174.44 | 128.44 |
| | 4 | −125.11 | 154.96 | 157.07 |
| | 5 | −130.41 | 87.14 | 143.79 |
| | 6 | | | |
| | 7 | | | |
| | 8 | | | |
| mv20 | 1 | 63.87 | 149.13 | 93.46 |
| | 2 | 79.68 | 162.64 | 67.06 |
| | 3 | 100.06 | 208.14 | 102.55 |
| | 4 | 84.26 | 194.63 | 128.95 |
| | 5 | | | |
| | 6 | | | |
| | 7 | | | |
| | 8 | | | |
| mv21 | 1 | 130.41 | 87.14 | 143.79 |
| | 2 | 125.11 | 154.96 | 157.07 |
| | 3 | 136.72 | 174.44 | 128.44 |
| | 4 | 140.43 | 126.87 | 119.12 |
| | 5 | 140.43 | 92.77 | 119.03 |
| | 6 | | | |
| | 7 | | | |
| | 8 | | | |
| mv22 | 1 | −134.07 | 126.69 | 200.27 |
| | 2 | −103.99 | 134.04 | 208.61 |
| | 3 | −94.62 | 209.63 | 108.20 |
| | 4 | −124.70 | 202.28 | 99.86 |
| | 5 | | | |
| | 6 | | | |
| | 7 | | | |
| | 8 | | | |
| mv23 | 1 | 94.62 | 209.63 | 108.20 |
| | 2 | 103.99 | 134.04 | 208.61 |
| | 3 | 134.07 | 126.69 | 200.27 |
| | 4 | 124.70 | 202.28 | 99.86 |
| | 5 | | | |
| | 6 | | | |

TABLE III-continued

Mirror Positions—Vertical Section (mm):

| | Vertex | X | Y | Z |
|---|---|---|---|---|
| | 7 | | | |
| | 8 | | | |
| mv24 | 1 | −61.13 | 193.21 | 119.96 |
| | 2 | −97.12 | 187.87 | 131.32 |
| | 3 | −97.12 | 169.38 | 170.59 |
| | 4 | −19.20 | 152.51 | 206.45 |
| | 5 | 19.20 | 152.51 | 206.45 |
| | 6 | 97.12 | 169.38 | 170.59 |
| | 7 | 97.12 | 187.87 | 131.32 |
| | 8 | 61.13 | 193.21 | 119.96 |
| mv25 | 1 | −106.74 | 171.66 | 177.19 |
| | 2 | −83.23 | 85.77 | 217.46 |
| | 3 | 0.00 | 85.77 | 246.33 |
| | 4 | 0.00 | 150.54 | 222.12 |
| | 5 | | | |
| | 6 | | | |
| | 7 | | | |
| | 8 | | | |
| mv26 | 1 | 0.00 | 150.54 | 222.12 |
| | 2 | 0.00 | 150.54 | 222.12 |
| | 3 | 83.23 | 85.77 | 217.46 |
| | 4 | 106.74 | 171.66 | 177.19 |
| | 5 | | | |
| | 6 | | | |
| | 7 | | | |
| | 8 | | | |

TABLE IV

Scan Line Groups—Vertical Section

| Group Identifier | Mirrors in Group | Scanning Station/ Scan Lines | Type |
|---|---|---|---|
| gv1 | mv1, mv22 | VST1/4 | vertical left |
| gv2 | mv2, mv26 | VST1/4 | top-down vertical |
| gv3 | mv3, mv25 | VST1/4 | top-down horizontal |
| gv4 | mv4, mv26 | VST1/4 | top-down horizontal |
| gv5 | mv5, mv25 | VST1/4 | top-down vertical |
| gv6 | mv6, mv23 | VST1/4 | vertical right |
| gv7 | mv7, mv24 | VST1/4 | high horizontal left |
| gv8 | mv8, mv18, mv19 | VST1/4 | side horizontal left |
| gv9 | mv9, mv17, mv24 | VST1/4 | low horizontal left |
| gv10 | mv10, mv16, mv26 | VST1/4 | top-down horizontal |
| gv11 | mv11, mv16, mv25 | VST1/4 | top-down horizontal |
| gv12 | mv12, mv15, mv24 | VST1/4 | low horizontal right |
| gv13 | mv13, mv20, mv21 | VST1/4 | side horizontal right |
| gv14 | mv14, mv24 | VST1/4 | high horizontal right |

In addition, as shown in FIG. 2F, the third laser scanning station VST1 includes a light collecting/focusing optical element, e.g. parabolic light collecting mirror or parabolic surface emulating volume reflection hologram (labeled $LC_{VST1}$) that collects light from a scan region that encompasses the outgoing scanning planes (produced by the third laser scanning station VST1) and focuses such collected light onto a photodetector (labeled $PD_{VST1}$), which produces an electrical signal whose amplitude is proportional to the intensity of light focused thereon. The electrical signal produced by the photodetector is supplied to analog/digital signal processing circuitry, associated with the third laser scanning station VST1, that process analog and digital scan data signals derived therefrom to perform bar code symbol reading operations. Preferably, the third laser scanning station VST1 includes a laser beam production module (not shown) that generates a laser scanning beam SB3 that is directed to a small light directing mirror disposed in the interior of the light collecting/focusing element $LC_{VST1}$, which redirects the laser scanning beam SB3 to a point of incidence on the second rotating polygonal mirror PM2.

In the illustrative embodiment, the first polygonal mirror PM1 includes 4 facets that are used in conjunction with the two independent laser beam sources provided by the first and second laser scanning stations HST1 and HST2 so as project from the bottom-scanning window an omni-directional laser scanning pattern consisting of 40 laser scanning planes that are cyclically generated as the first polygonal mirror PM1 rotates. Moreover, the second polygonal mirror PM2 includes 4 facets that are used in conjunction with the independent laser beam source provided by the third laser scanning station VST1 so as to project from the side-scanning window an omni-directional laser scanning pattern consisting of 28 laser scanning planes cyclically generated as the second polygonal mirror PM2 rotates. Thus, the bioptical laser scanning system of the illustrative embodiment project from the bottom and side-scanning windows an omni-directional laser scanning pattern consisting of 68 laser scanning planes cyclically generated as the first and second polygonal mirrors PM1 and PM2 rotate. It is understood, however, these number may vary from embodiment to embodiment of the present invention and thus shall not form a limitation thereof.

FIG. 2G1 depicts the angle of each facet of the rotating polygonal mirrors PM1 and PM2 with respect to the rotational axis of the respective rotating polygonal mirrors in this illustrative embodiment. The scanning ray pattern produced by the four facets of the first polygonal mirror PM1 in conjunction with the laser beam source provided by the first laser scanning station HST1 in the illustrative embodiment is shown in FIG. 2G2. A similar scanning ray pattern is produced by the four facets of the first polygonal mirror PM1 in conjunction with the laser beam source provided by the second laser scanning station HST2. In the illustrative embodiment of the present invention, the second rotating polygonal mirror PM2 has two different types of facets based on beam elevation angle characteristics of the facet. The scanning ray pattern produced by the four facets of the second polygonal mirror PM2 in conjunction with the laser beam source provided by the third laser scanning station VST1 in the illustrative embodiment is shown in FIG. 2G3. The facets of the second polygonal mirror PM2 can be partitioned into two classes: a first class of facets (corresponding to angles $\beta_1$ and $\beta_2$) have High Elevation (HE) angle characteristics, and a second class of facets (corresponding to angles $\beta_3$ and $\beta_4$) have Low Elevation (LE) angle characteristics. As shown in FIG. 2G2, high and low elevation angle characteristics are referenced by the plane P1 that contains the incoming laser beam and is normal to the rotational axis of the second polygonal mirror PM2. Each facet in the first class of facets (having high beam elevation angle characteristics) produces an outgoing laser beam that is directed above the plane P1 as the facet sweeps across the point of incidence of the third laser scanning station VST1. Whereas each facet in the second class of facets (having low beam elevation angle characteristics) produces an outgoing laser beam that is directed below the plane P1 as the facet sweeps across the point of incidence of the third laser scanning station VST1. As will become apparent hereinafter, the use of scanning facets having such diverse elevation angle characteristics enables an efficient design and construction of the second section of the bioptical laser scanning—the plurality of beam folding mirrors used therein can be compactly arranged within a minimized region of volumetric space. Such efficient space saving designs are advantageous in space-constricted POS-type scanning applications.

In the illustrative embodiment of the present invention, the first laser scanning station (HST1) includes four groups of laser beam folding mirrors (GH1, GH2, GH3, and GH4 as depicted in Table II above) which are arranged about the first rotating polygonal mirror PM1, and cooperate with the four scanning facets of the first rotating polygonal mirror PM1 so as to generate and project four different groups of laser scanning planes (with 20 total scanning planes in the four groups) through the bottom-scanning window 16, as graphically illustrated in FIGS. 3A–3G. Note that the first laser scanning station HST1 utilizes mirrors MH4 and MH5 (and not MH6) of group GH4 to produce 8 different scan planes therefrom. The second laser scanning station (HST2) includes four groups of laser beam folding mirrors (GH4, GH5, GH6 and GH7 as depicted in Table II) which are arranged about the first rotating polygonal mirror PM1, and cooperate with the four scanning facets of the first rotating polygonal mirror so as to generate and project four different groups of laser scanning planes (with 20 total scanning planes in the four groups) through the bottom-scanning window 16, as graphically illustrated in FIGS. 4A–4F. Note that the second laser scanning station HST2 utilizes mirrors MH5 and MH6 (and not MH4) of group GH4 to produce 8 different scan planes therefrom. Finally, the third laser scanning station (VST1) includes fourteen groups of laser beam folding mirrors (GV1, GV2 . . . GV14 as depicted in Table IV above) which are arranged about the second rotating polygonal mirror PM2, and cooperate with the four scanning facets of the second rotating polygonal mirror PM2 so as to generate and project fourteen different groups of laser scanning planes (with 28 total scanning planes in the fourteen groups) through the side-scanning window 18, as graphically illustrated in FIGS. 5A–5Q.

For purposes of illustration and conciseness of description, each laser beam folding mirror in each mirror group as depicted in the second column of Tables II and IV, respectively, is referred to in the sequential order that the outgoing laser beam reflects off the mirrors during the laser scanning plane generation process (e.g., the first mirror in the column causes an outgoing laser beam to undergo its first reflection after exiting a facet of the rotating polygonal mirror, the second mirror in the column causes the outgoing laser beam to undergo its second reflection, etc.).

First Laser Scanning Station HST1

Figure 3A:
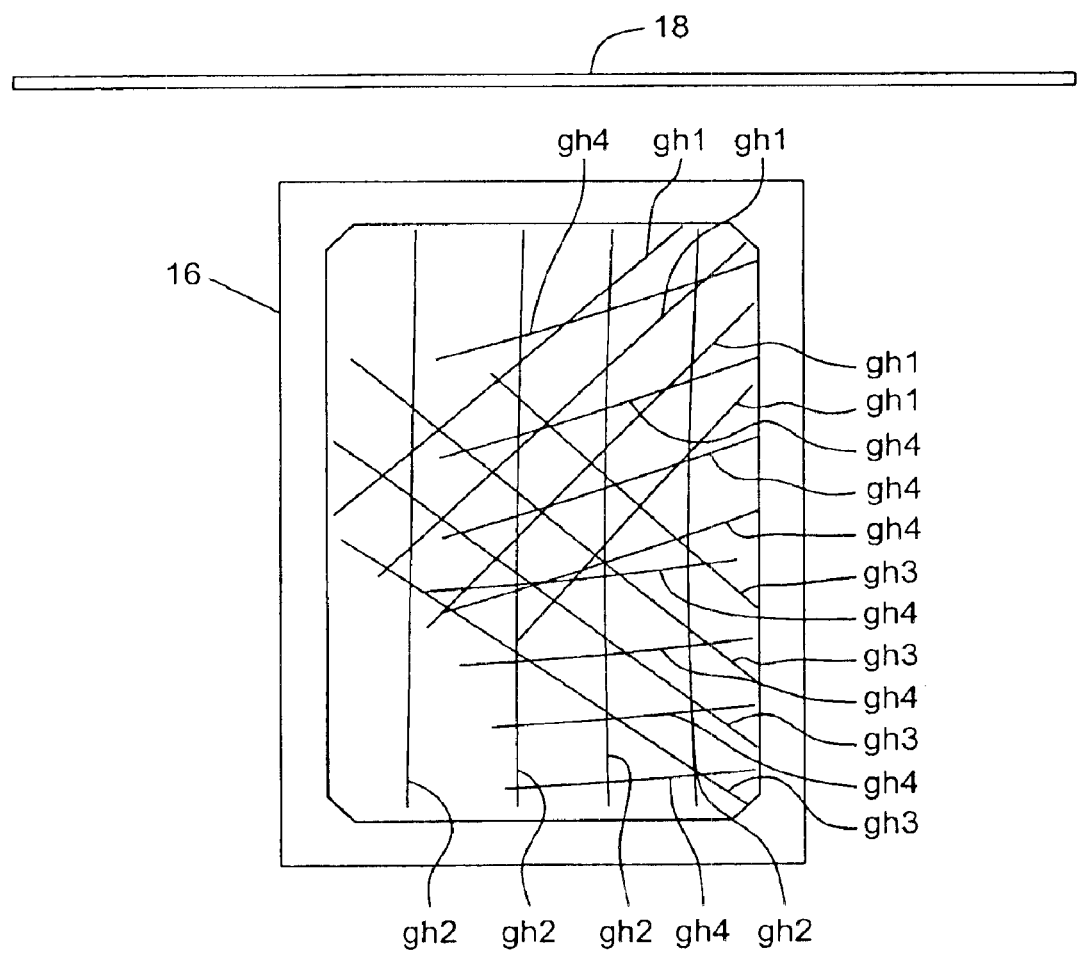
FIG. 3A illustrates the intersection of the four groups of laser scanning planes (with 20 total scanning planes in the four groups) produced by the first laser scanning station HST1 on the bottom-scanning window 16 in the illustrative embodiment of the present invention.

As shown in FIGS. 2A, 2B and 3A–3F2, the first laser scanning station (HST1) includes four groups of laser beam folding mirrors (GH1, GH2, GH3 and GH4) which are arranged about the first rotating polygonal mirror PM1, and cooperate with the four scanning facets of the first rotating polygonal mirror PM1 so as to generate and project four different groups of laser scanning planes (with 20 total scanning planes in the four groups) through the bottom-scanning window 16. The intersection of the four groups of laser scanning planes (with 20 total scanning planes in the four groups) on the bottom-scanning window 16 is shown in FIG. 3A. The twenty laser scanning planes (of these four groups projected through the bottom-scanning window 16) can be classified as either vertical scanning planes or horizontal scanning planes, which can be defined as follows.

As shown in FIGS. 3B1 and 3B2, a scanning plane has a characteristic direction of propagation $D_p$ and a normal direction $SP_N$, which define a direction O that is orthogonal thereto (e.g., $O=D_p \times SP_N$). For the sake of description, the characteristic direction of propagation $D_p$ of a scanning plane can be defined as the mean propagation direction for a plurality of rays that make up the scanning plane. A horizontal scanning plane is a scanning plane wherein the angle $\phi$ between the direction O and the plane defined by the bottom-scanning window 16 is in the range between 0 and 45 degrees (and preferably in the range between 0 and 20 degrees, and more preferably in the range between 0 and 10 degrees). An exemplary horizontal scanning plane is shown in FIG. 3B1. A vertical scanning plane is a scanning plane wherein the angle $\phi$ between the direction O and the plane defined by the bottom-scanning window 16 is in the range between 45 and 90 degrees (and preferably in the range between 70 and 90 degrees, and more preferably in the range between 80 and 90 degrees). An exemplary vertical scanning plane is shown in FIG. 3B2.

FIGS. 3C1 and 3C2 illustrate the first group GH1 of laser beam folding mirrors of the first laser scanning station (HST1), which cooperate with the four scanning facets of the first rotating polygonal mirror PM1 so as to generate four different vertical laser scanning planes that project from the right back corner of the bottom-scanning window 16 diagonally outward and upward above the front left side (and front left corner) of the bottom-scanning window 16 as shown. These scanning planes are useful for reading ladder type bar code symbols disposed on bottom-, back-, and right-facing surfaces.

FIGS. 3D1 and 3D2 illustrate the second group GH2 of laser beam folding mirrors of the first laser scanning station (HST1), which cooperate with the four scanning facets of the first rotating polygonal mirror PM1 so as to generate four different horizontal laser scanning planes that project from the right side of the bottom-scanning window 16 diagonally outward and upward above the left side of the bottom-scanning window 16 as shown. These scanning planes are useful for reading picket-fence type bar code symbols disposed on bottom- and right-facing surfaces.

FIGS. 3E1 and 3E2 illustrate the third group GH3 of laser beam folding mirrors of the first laser scanning station (HST1), which cooperate with the four scanning facets of the first rotating polygonal mirror PM1 so as to generate four different vertical laser scanning planes that project from the right front corner of the bottom-scanning window 16 diagonally outward and upward above the back left side and back left corner of the bottom-scanning window 16 as shown. These scanning planes are useful for reading ladder type bar code symbols disposed on bottom-, front-, and right-facing surfaces.

FIGS. 3F1 and 3F2 illustrate the fourth group GH4 of laser beam folding mirrors of the first laser scanning station (HST1), which cooperate with the four scanning facets of the first rotating polygonal mirror PM1 so as to generate eight different horizontal laser scanning planes that project from the front side of the bottom-scanning window 16 diagonally outward and upward above the back side of the bottom-scanning window 16 as shown. Note that the first laser scanning station HST1 utilizes mirrors MH4 and MH5 (and not MH6) of group GH4 to produce eight different scan planes therefrom. These scanning planes are useful for reading picket-fence type bar code symbols disposed on bottom- and front-facing surfaces.

The position and orientation of each beam folding mirror employed at scanning station HST1 relative to a global coordinate reference system is specified by a set of position vectors pointing from the from the origin of this global coordinate reference system to the vertices of each such beam folding mirror element (i.e. light reflective surface patch). The x,y,z coordinates of these vertex-specifying vectors as set forth above in Table I specify the perimetrical boundaries of these beam folding mirrors employed in the scanning system of the illustrative embodiment.

Second Laser Scanning Station HST2

Figure 4A:
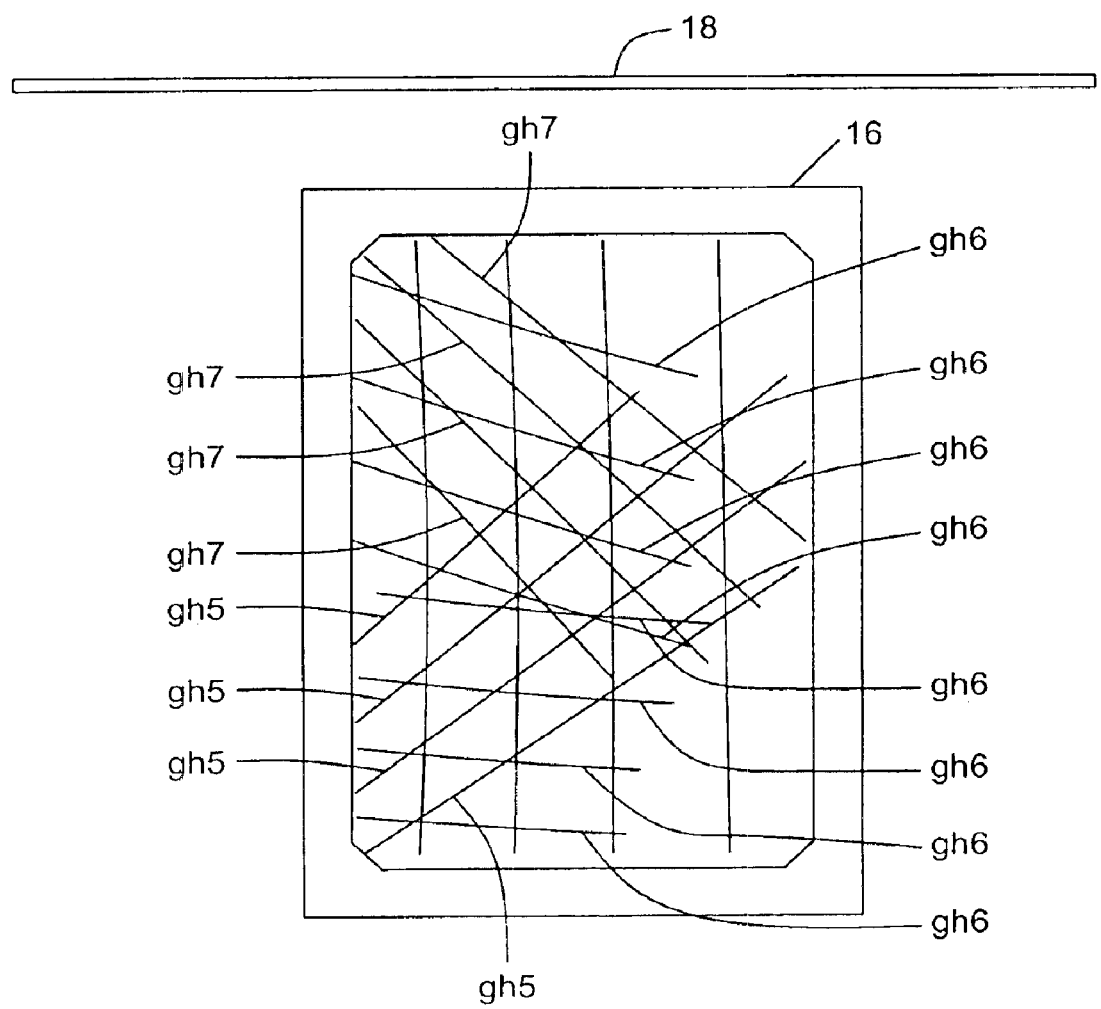
FIG. 4A illustrates the intersection of the four groups of laser scanning planes (with 20 total scanning planes in the four groups) produced by the second laser scanning station HST2 on the bottom-scanning window 16 in the illustrative embodiment of the present invention.

As shown in FIGS. 2A, 2B and 4A–4E2, the second laser scanning station (HST2) includes four groups of laser beam folding mirrors (GH4, GH5, GH6, and GH7) which are arranged about the first rotating polygonal mirror PM1, and cooperate with the four scanning facets of the first rotating polygonal mirror PM1 so as to generate and project four different groups of laser scanning planes (with 20 total scanning planes in the four groups) through the bottom-scanning window 16. The intersection of the four groups of laser scanning planes (with 20 total scanning planes in the four groups) on the bottom-scanning window 16 is shown in FIG. 4A. The twenty laser scanning planes (of these four groups projected through the bottom-scanning window 16) can be classified as either vertical scanning planes or horizontal scanning planes as defined above.

FIGS. 4B1 and 4B2 illustrate the first group (GH4) of laser beam folding mirrors of the second laser scanning station (HST2), which cooperate with the four scanning facets of the first rotating polygonal mirror PM1 so as to generate eight different horizontal laser scanning planes that project from the front side of the bottom-scanning window 16 diagonally outward and upward above the back side of the bottom-scanning window 16 as shown. Note that the second laser scanning station HST2 utilizes mirrors MH5 and MH6 (and not MH4) of group GH4 to produce eight different scan planes therefrom. These scanning planes are useful for reading picket-fence type bar code symbols disposed on bottom- and front-facing surfaces.

FIGS. 4C1 and 4C2 illustrate the second group (GH5) of laser beam folding mirrors of the second laser scanning station (HST2), which cooperate with the four scanning facets of the first rotating polygonal mirror PM1 so as to generate four different vertical laser scanning planes that project from the left front corner of the bottom-scanning window 16 diagonally outward and upward above the back right side and back right corner of the bottom-scanning window 16 as shown. These scanning planes are useful for reading ladder type bar code symbols disposed on bottom-, front-, and left-facing surfaces.

FIGS. 4D1 and 4D2 illustrate the third group (GH6) of laser beam folding mirrors of the second laser scanning station (HST2), which cooperate with the four scanning facets of the first rotating polygonal mirror PM1 so as to generate four different horizontal laser scanning planes that project from the left side of the bottom-scanning window 16 diagonally outward and upward above the right side of the bottom-scanning window 16 as shown. These scanning planes are useful for reading picket-fence type bar code symbols disposed on bottom- and left-facing surfaces.

FIGS. 4E1 and 4E2 illustrate the fourth group (GH7) of laser beam folding mirrors of the second laser scanning station (HST2), which cooperate with the four scanning facets of the first rotating polygonal mirror PM1 so as to generate four different vertical laser scanning planes that project from the left back corner of the bottom-scanning window 16 diagonally outward and upward above the front right side and front right corner of the bottom-scanning window 16 as shown. These scanning planes are useful for reading ladder type bar code symbols disposed on bottom-, back-, and left-facing surfaces.

The position and orientation of each beam folding mirror employed at scanning station HST2 relative to a global coordinate reference system is specified by a set of position vectors pointing from the from the origin of this global coordinate reference system to the vertices of each such beam folding mirror element (i.e. light reflective surface patch). The x,y,z coordinates of these vertex-specifying vectors as set forth above in Table I specify the perimetrical boundaries of these beam folding mirrors employed in the scanning system of the illustrative embodiment.

Figure 4F:
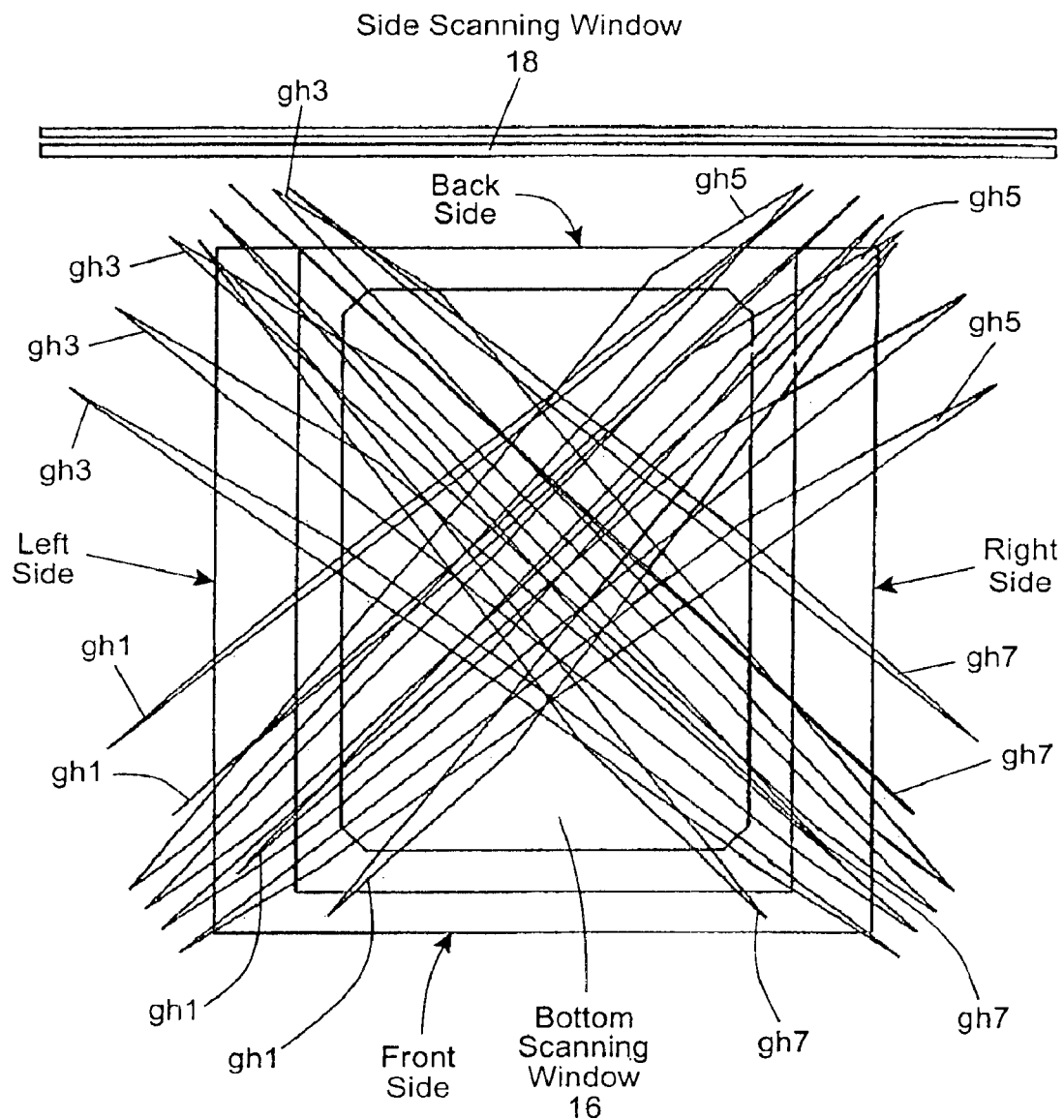
FIG. 4F illustrates the vertical scanning planes that project from the bottom-scanning window 16; including 4 groups (namely, GH1, GH3, GH5 and GH7); groups GH1 and GH5 project from opposing portions (e.g., the back-right and front-left corners of the window 16) of the bottom-scanning window 16, and groups GH3 and GH7 project from opposing portions (e.g., front-right and back-left corners of the window 16) of the bottom-scanning window; note that groups GH1 and GH5 are substantially co-planar (i.e., quasi co-planar) and groups GH3 and GH7 are substantially co-planar (i.e., quasi co-planar), while groups GH1 and GH5 are substantially orthogonal (i.e., quasi-orthogonal) to groups GH3 and GH7, respectively, as shown.

As shown in FIG. 4F, the vertical scanning planes that project from the bottom-scanning window 16 include 4 groups (namely, GH1, GH3, GH5 and GH7). Groups GH1 and GH5 project from opposing portions (e.g., the back-right and front-left corners of the window 16) of the bottom-scanning window 16, and groups GH3 and GH7 project from opposing portions (e.g., front-right and back-left corners of the window 16) of the bottom-scanning window. Note that groups GH1 and GH5 are substantially co-planar (i.e., quasi co-planar) and groups GH3 and GH7 are substantially co-planar (i.e., quasi co-planar), while groups GH1 and GH5 are substantially orthogonal (i.e., quasi-orthogonal) to groups GH3 and GH7, respectively, as shown.

Third Laser Scanning Station VST1

Figure 5A:
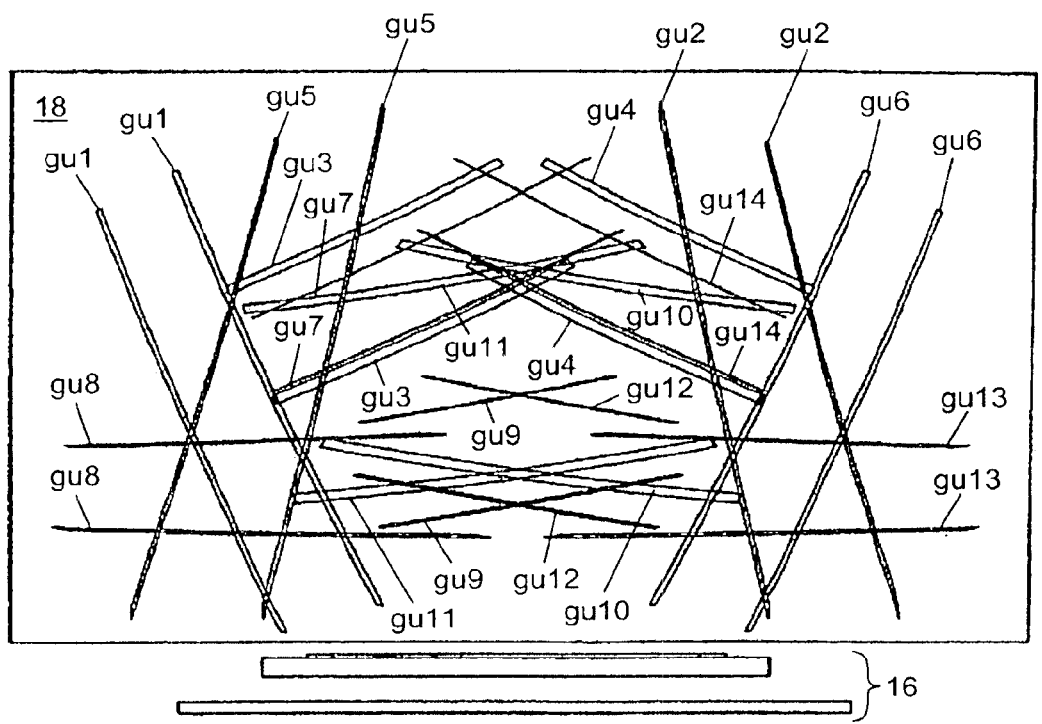
FIG. 5A illustrates the intersection of the fourteen groups of laser scanning planes (with 28 total scanning planes in the fourteen groups) produced by the third laser scanning station VST1 on the side-scanning window 18 in the illustrative embodiment of the present invention.
Figure 512:
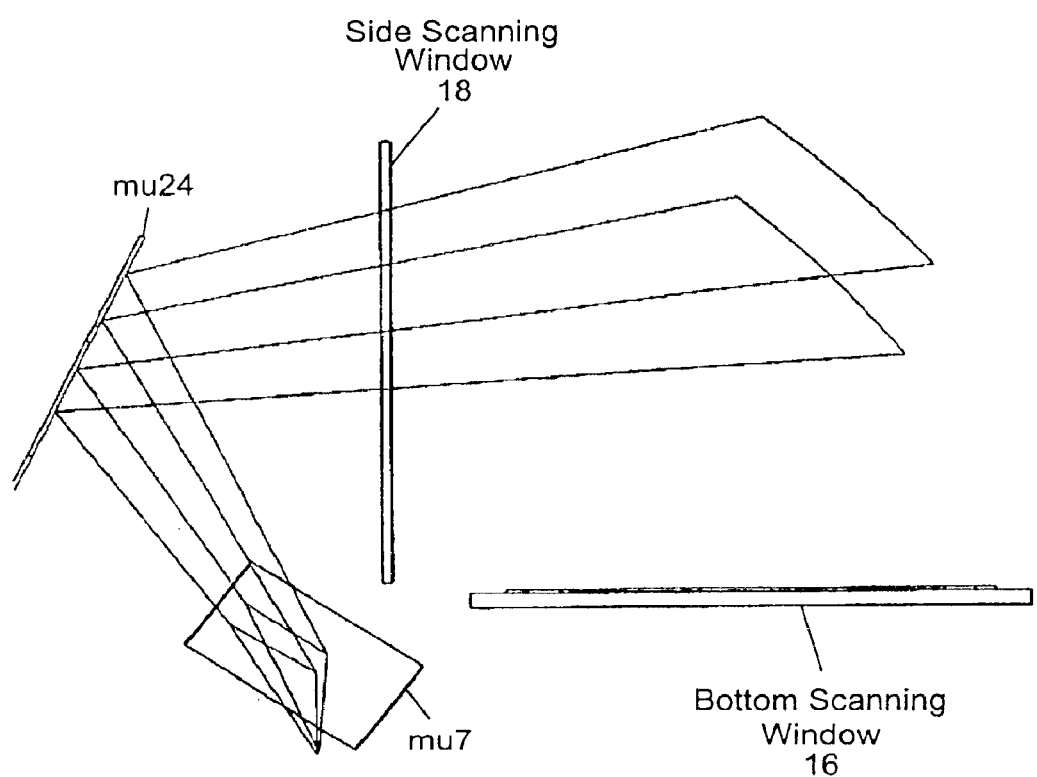
Figure 502:
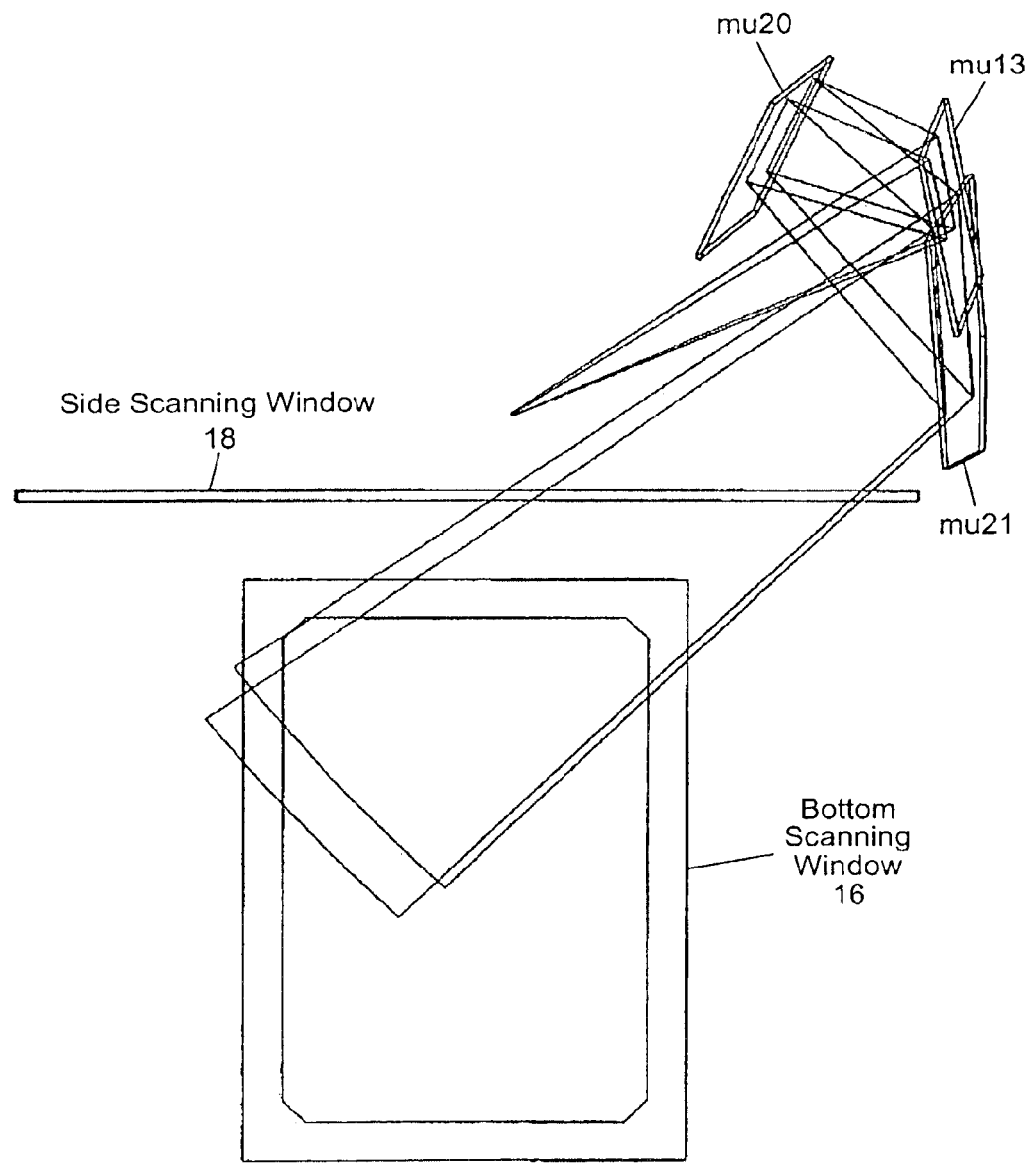

As shown in FIGS. 2D, 2E and 5A–5P2, the third laser scanning station (VST1) includes fourteen groups of laser beam folding mirrors (GV1, GV2, GV3 . . . GV14) which are arranged about the second rotating polygonal mirror PM2, and cooperate with the four scanning facets of the second rotating polygonal mirror PM2 so as to generate and project fourteen different groups of laser scanning planes (with 28 total scanning planes in the fourteen groups) through the side-scanning window 18. The intersection of the fourteen groups of laser scanning planes (with 28 total scanning planes in the fourteen groups) on the side-scanning window 18 is shown in FIG. 5A. The twenty-eight laser scanning planes (of these fourteen groups projected through the side-scanning window 18) can be classified as either vertical scanning planes or horizontal scanning planes, which can be defined as follows.

As shown in FIGS. 5B1 and 5B2, a scanning plane has a characteristic direction of propagation $D_p$ and a normal direction $SP_N$, which define a direction O that is orthogonal thereto (e.g., $O=D_p \times SP_N$). A horizontal scanning plane is a scanning plane wherein the angle $\phi$ between the direction O and the plane defined by the bottom-scanning window 16 is in the range between 0 and 45 degrees (and preferably in the range between 0 and 20 degrees, and more preferably in the range between 0 and 10 degrees). An exemplary horizontal scanning plane projected from the side-scanning window 18 is shown in FIG. 5B1. A vertical scanning plane is a scanning plane wherein the angle $\phi$ between the direction O and the plane defined by the bottom-scanning window 16 is in the range between 45 and 90 degrees (and preferably in the range between 70 and 90 degrees, and more preferably in the range between 80 and 90 degrees). An exemplary vertical scanning plane projected from the side-scanning window 18 is shown in FIG. 5B2.

FIGS. 5C1 and 5C2 illustrate the first group (GV1) of laser beam folding mirrors of the third laser scanning station (VST1), which cooperate with the two low-elevation (LE) scanning facets of the second rotating polygonal mirror PM2 (corresponding to angles $\beta_3$ and $\beta_4$ of the second polygonal mirror PM2 in FIG. 2G1) so as to generate two different vertical laser scanning planes that project from the left side of the side-scanning window 18 diagonally down and out across the bottom-scanning window 16 above the front right corner of the bottom-scanning window 16 as shown. These scanning planes are useful for reading ladder type bar code symbols disposed on left- and back-facing surfaces.

FIGS. 5D1 and 5D2 illustrate the second group (GV2) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2G1) so as to generate two different vertical laser scanning planes that project from the top left corner of the side-scanning window 18 downward toward the bottom-scanning window 16 substantially along the left side of the bottom-scanning window 16 as shown. These scanning planes are useful for reading ladder type bar code symbols disposed on top- and back-facing surfaces.

FIGS. 5E1 and 5E2 illustrate the third group (GV3) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2G1) so as to generate two different horizontal laser scanning planes that project from the top left quadrant of the side-scanning window 18 diagonally down across the bottom-scanning window 16 as shown. These scanning planes are useful for reading picket-fence type bar code symbols disposed on back- and top-facing surfaces.

FIGS. 5F1 and 5F2 illustrate the fourth group (GV4) of laser beam folding mirrors of the third laser scanning station (VST1), which cooperate with the two low elevation scanning facets of the second rotating polygonal mirror PM2 (corresponding to angles $\beta_3$ and $\beta_4$ of the second polygonal mirror PM2 in FIG. 2G1) so as to generate two different horizontal laser scanning planes that project from the top right quadrant of the side-scanning window 18 diagonally down across the bottom-scanning window 16 as shown. These scanning planes are useful for reading picket-fence type bar code symbols disposed on back- and top-facing surfaces.

FIGS. 5G1 and 5G2 illustrate the fifth group (GV5) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2G1) so as to generate two different vertical laser scanning planes that project from the top right corner of the side-scanning window 18 downward toward the bottom-scanning window 16 substantially along the right side of the bottom-scanning window 16 as shown. These scanning planes are useful for reading ladder type bar code symbols disposed on top- and back-facing surfaces.

FIGS. 5H1 and 5H2 illustrate the sixth group (GV6) of laser beam folding mirrors of the third laser scanning station (VST1), which cooperate with the two low elevation scanning facets of the second rotating polygonal mirror PM2 (corresponding to angles $\beta_3$ and $\beta_4$ of the second polygonal mirror PM2 in FIG. 2G1) so as to generate two different vertical laser scanning planes that project from the right side of the side-scanning window 18 diagonally out across the bottom-scanning window 16 above the front left corner of the bottom-scanning window 16 as shown. These scanning planes are useful for reading ladder type bar code symbols disposed on right- and back-facing surfaces.

FIGS. 5I1 and 5I2 illustrate the seventh group (GV7) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the top left quadrant of the side-scanning window 18 outwardly across the bottom-scanning window 16 (substantially parallel to the bottom-scanning window 16) as shown. These scanning planes are useful for reading picket-fence type bar code symbols disposed on back- and left-facing surfaces.

FIGS. 5J1 and 5J2 illustrate the eight group (GV8) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the left side of the side-scanning window 18 outwardly across the bottom-scanning window 16 (substantially parallel to the bottom-scanning window 16) as shown. In the illustrative embodiment, the characteristic direction of propagation of such scanning planes has a non-vertical component (i.e., components in the plane parallel to the bottom-scanning window 16) whose orientation relative to the normal of the side-scanning window 18 is greater than 35 degrees. These scanning planes are useful for reading picket-fence type bar code symbols disposed on back- and left-facing surfaces (including those surfaces whose normals are substantially offset from the normal of the side-scanning window).

FIGS. 5K1 and 5K2 illustrate the ninth group (GV9) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the central portion of the side-scanning window 18 outwardly and downward across the bottom-scanning window 16 as shown. These scanning planes are useful for reading picket-fence type bar code symbols disposed on back-facing surfaces.

FIGS. 5L1 and 5L2 illustrate the tenth group (GV10) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the central portion of the side-scanning window 18 outwardly and sharply downward across the bottom-scanning window 16 as shown. These scanning planes are useful for reading picket-fence type bar code symbols disposed on top- and back-facing surfaces.

FIGS. 5M1 and 5M2 illustrate the eleventh group (GV11) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the central portion of the side-scanning window 18 outwardly and sharply downward across the bottom-scanning window 16 as shown. These scanning planes are useful for reading picket-fence type bar code symbols disposed on top- and back-facing surfaces.

FIGS. 5N1 and 5N2 illustrate the twelfth group (GV12) of laser beam folding mirrors of the third laser scanning station (VST1), which cooperate with the two high elevation scanning, facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the central portion of the side-scanning window 18 outwardly across the bottom-scanning window 16 (substantially parallel to the bottom-scanning window 16) as shown. These scanning planes are useful for reading picket-fence type bar code symbols disposed on back-facing surfaces.

FIGS. 5O1 and 5O2 illustrate the thirteenth group (GV13) of laser beam folding mirrors of the third laser scanning station (VST1), which cooperate with the two high elevation scanning facets of the second rotating polygonal mirror (corresponding to angles $\beta_1$ and $\beta_2$ of the second polygonal mirror PM2 in FIG. 2G1) so as to generate two different horizontal laser scanning planes that project from the right side of the side-scanning window 18 outwardly across the bottom-scanning window 16 (substantially parallel to the bottom-scanning window 16) as shown. In the illustrative embodiment, the characteristic direction of propagation of such scanning planes has a non-vertical component (i.e., components in the plane parallel to the bottom-scanning window 16) whose orientation relative to the normal of the side-scanning window 18 is greater than 35 degrees. These scanning planes are useful for reading picket-fence type bar code symbols disposed on back- and right-facing surfaces (including those surfaces whose normals are substantially offset from the normal of the side-scanning window).

FIGS. 5P1 and 5P2 illustrate the fourteenth group (GV14) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2G1) so as to generate two different horizontal laser scanning planes that project from the top right quadrant of the side-scanning window 18 outwardly across the bottom-scanning window 16 (substantially parallel to the bottom-scanning window 16) as shown. These scanning planes are useful for reading picket-fence type bar code symbols disposed on back- and right-facing surfaces.

The position and orientation of each beam folding mirror employed at scanning station VST1 relative to a global coordinate reference system is specified by a set of position vectors pointing from the from the origin of this global coordinate reference system to the vertices of each such beam folding mirror element (i.e. light reflective surface patch). The x,y,z coordinates of these vertex-specifying vectors as set forth above in Table III specifies the perimetrical boundaries of these beam folding mirrors employed in the scanning system of the illustrative embodiment.

In the illustrative embodiment of the present invention, the laser beam folding mirrors associated with scanning stations HST1, HST2 and VST1 are physically supported utilizing one or more mirror support platforms, formed with the scanner housing. Preferably, these mirror mounting support structures, as well as the components of the scanning housing are made from a high-impact plastic using injection molding techniques well known in the art.

Figure 6:
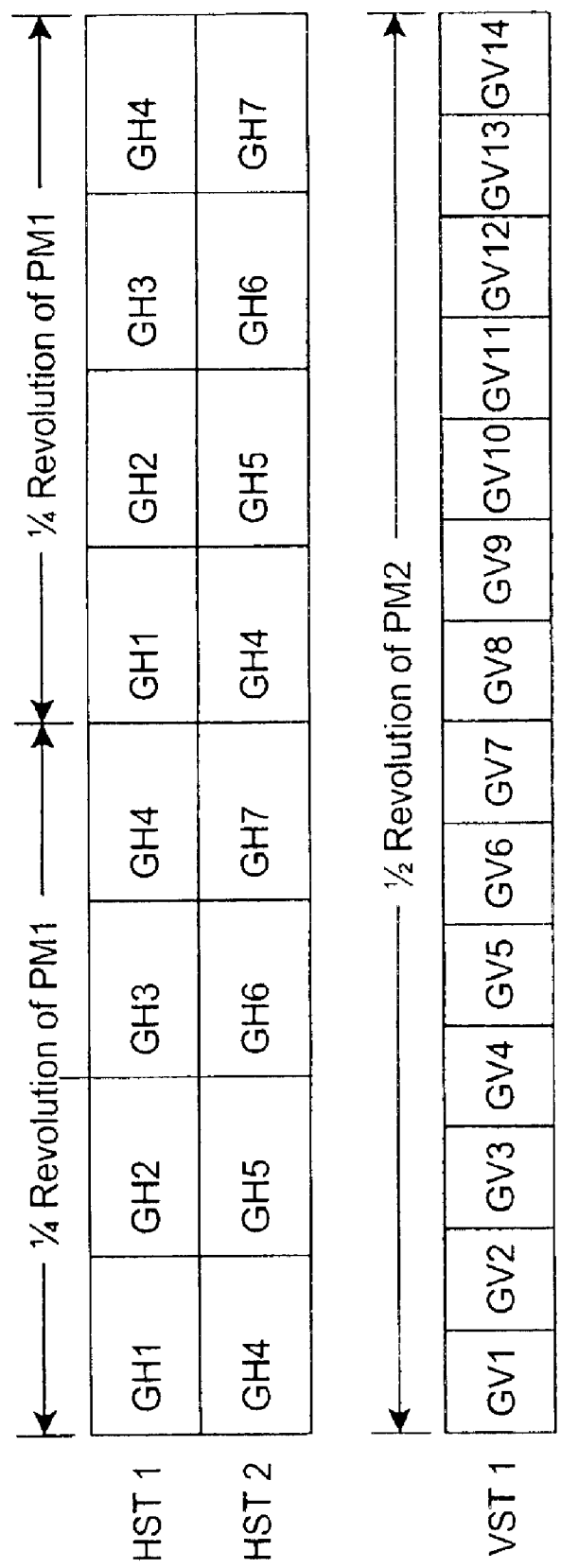
FIG. 6 is an exemplary timing scheme for controlling the bioptical laser scanner of the illustrative embodiment to cyclically generate a complex omni-directional 3-D laser scanning pattern from both the bottom and side-scanning windows 16 and 18 thereof during the revolutions of the scanning polygonal mirrors PM1 and PM2; in this exemplary timing scheme, four sets of scan plane groups (4*[GH1 . . . GH7]) are produced by stations HST1 and HST2 during each revolution of the polygonal mirror PM1 concurrently with two sets of scan plane groups (2*[GV1 . . . GV14]) produced by station VST1 during a single revolution of the polygonal mirror PM2; this complex omni-directional scanning pattern is graphically illustrated in FIGS. 3A through 5P2; the 3-D laser scanning pattern of the illustrative embodiment consists of 68 different laser scanning planes, which cooperate in order to generate a plurality of quasi-orthogonal laser scanning patterns within the 3-D scanning volume of the system, thereby enabling true omnidirectional scanning of bar code symbols.

In the scanning system of the present invention, the principal function of each facet on the first and second rotating polygonal mirrors PM1 and PM2 is to deflect an incident laser beam along a particular path in 3-D space in order to generate a corresponding scanning plane within the 3-D laser scanning volume produced by the laser scanning system hereof. Collectively, the complex of laser scanning planes produced by the plurality of facets in cooperation with the three laser beam production modules of HST1, HST2 and VST1 creates an omni-directional scanning pattern within the highly-defined 3-D scanning volume of the scanning system between the space occupied by the bottom and side-scanning windows of the system. As shown in the exemplary timing scheme of FIG. 6, the bioptical laser scanner of the illustrative embodiment cyclically generates a complex omni-directional 3-D laser scanning pattern from both the bottom and side-scanning windows 16 and 18 thereof during the revolutions of the scanning polygonal mirrors PM1 and PM2. In this exemplary timing scheme, four sets of scan plane groups (4*[GH1 . . . GH7]) are produced by stations HST1 and HST2 during each revolution of the polygonal mirror PM1 concurrently with a two sets of scan plane groups (2*[GV1 . . . GV14]) produced by station VST1 during a single revolution of the polygonal mirror PM2. This complex omni-directional scanning pattern is graphically illustrated in FIGS. 3A through 5P2. The 3-D laser scanning pattern of the illustrative embodiment consists of 68 different laser scanning planes, which cooperate in order to generate a plurality of quasi-orthogonal laser scanning patterns within the 3-D scanning volume of the system, thereby enabling true omnidirectional scanning of bar code symbols.

In each laser scanning station (HST1, HST2, and VST1) of the illustrative embodiment, a laser beam production module produces a laser beam that is directed at the point of incidence on the facets of the first or second rotating polygonal mirrors at the pre-specified angle of incidence. Preferably, such laser beam production modules comprises a visible laser diode (VLD) and possibly an aspheric collimating lens supported within the bore of a housing mounted upon the optical bench of the module housing.

In the illustrative embodiment described above, the pre-specified angle of incidence of the laser beams produced by the laser beam production modules of the laser scanning stations HST1 and HST2 are offset from the rotational axis of the polygonal mirror PM1 along a direction perpendicular to the rotational axis as shown in FIG. 2H. Such offset provides for spatial overlap in the scanning pattern of light beams produced from the polygonal mirror PM1 by these laser beam production modules. In the illustrative embodiment, the offset between the rotational axis of the rotating polygonal mirror PM1 and the incident directions of the scanning beams SB1 and SB2, respectively, is approximately 5 mm. Such spatial overlap can be exploited such that the overlapping rays are incident on at least one common mirror (mh5 in the illustrative embodiment) to provide a dense scanning pattern projecting therefrom. In the illustrative embodiment, a dense pattern of horizontal planes (groups GH4) is projected from the front side of the bottom window as is graphically depicted in FIGS. 3F1, 3F2 and 4B1 and 4B2.

Light Collection for the 3 Scanning Stations

When a bar code symbol is scanned by any one of the laser scanning planes projected from the bottom-scanning window 16 (by either the first or second laser scanning stations HST1, HST2), or by any one of the laser scanning planes projected from the side-scanning window 18 by the third laser scanning station VST1, the incident laser light scanned across the object is intensity modulated by the absorptive properties of the scanned object and scattered according to Lambert's Law (for diffuse reflective surfaces). A portion of this laser light is reflected back along the outgoing ray (optical) path, off the same group of beam folding mirrors employed during the corresponding laser beam generation process, and thereafter is incident on the same scanning facet (of the first or second rotating polygonal mirror) that generated the corresponding scanning plane only a short time before. The scanning facet directs the returning reflected laser light towards a light collecting optical element (e.g., parabolic mirror structure) of the respective laser scanning station, which collects the returning light and focuses these collected light rays onto a photodetector, which may be disposed on a planar surface beneath the respective scanning polygon (as shown in FIGS. 2C1 and 2C2), or which may be disposed on a planar surface above the respective scanning polygon (as shown in FIG. 2F). FIGS. 2C1 and 2C2 depict the light collection optical elements $LC_{HST1}$ and $LC_{HST2}$, e.g., parabolic mirrors, and photodetectors $PD_{HST1}$ and $PD_{HST2}$ for the two laser scanning stations HST1 and HST2, respectively. FIG. 2F depicts the light collection optical elements $LC_{VST1}$, e.g., parabolic mirror, and photodetector $PD_{VST1}$ for the third laser scanning station VST1. The electrical signal produced by the photodetector for the respective laser scanning stations is supplied to analog/digital signal processing circuitry, associated with the respective laser scanning stations, that process analog and digital scan data signals derived therefrom to perform bar code symbol reading operations.

As shown in FIG. 1A, the bottom and side-scanning windows 16 and 18 have light transmission apertures of substantially planar extent. In order to seal off the optical components of the scanning system from dust, moisture and the like, the scanning windows 16 and 18, are preferably fabricated from a high impact plastic material and installed over their corresponding light transmission apertures using a rubber gasket and conventional mounting techniques. In the illustrative embodiment, each scanning window 16 and 18 preferably has spectrally-selective light transmission characteristics which, in conjunction with a spectrally-selective filters installed before each photodetector within the housing, forms a narrow-band spectral filtering subsystem that performs two different functions. The first function of the narrow-band spectral filtering subsystem is to transmit only the optical wavelengths in the red region of the visible spectrum in order to impart a reddish color or semi-transparent character to the scanning window. This makes the internal optical components less visible and thus remarkably improves the external appearance of the bioptical laser scanning system. This feature also makes the bioptical laser scanner less intimidating to customers at point-of-sale (POS) stations where it may be used. The second function of the narrow-band spectral filtering subsystem is to transmit to the photodetector for detection, only the narrow band of spectral components comprising the outgoing laser beam produced by the associated laser beam production module. Details regarding this optical filtering subsystem are disclosed in copending application Ser. No. 08/439,224, entitled "Laser Bar Code Symbol Scanner Employing Optical Filtering With Narrow Band-Pass Characteristics and Spatially Separated Optical Filter Elements" filed on May 11, 1995, which is incorporated herein by reference in its entirety.

Electrical Subsystem

Figure 7:
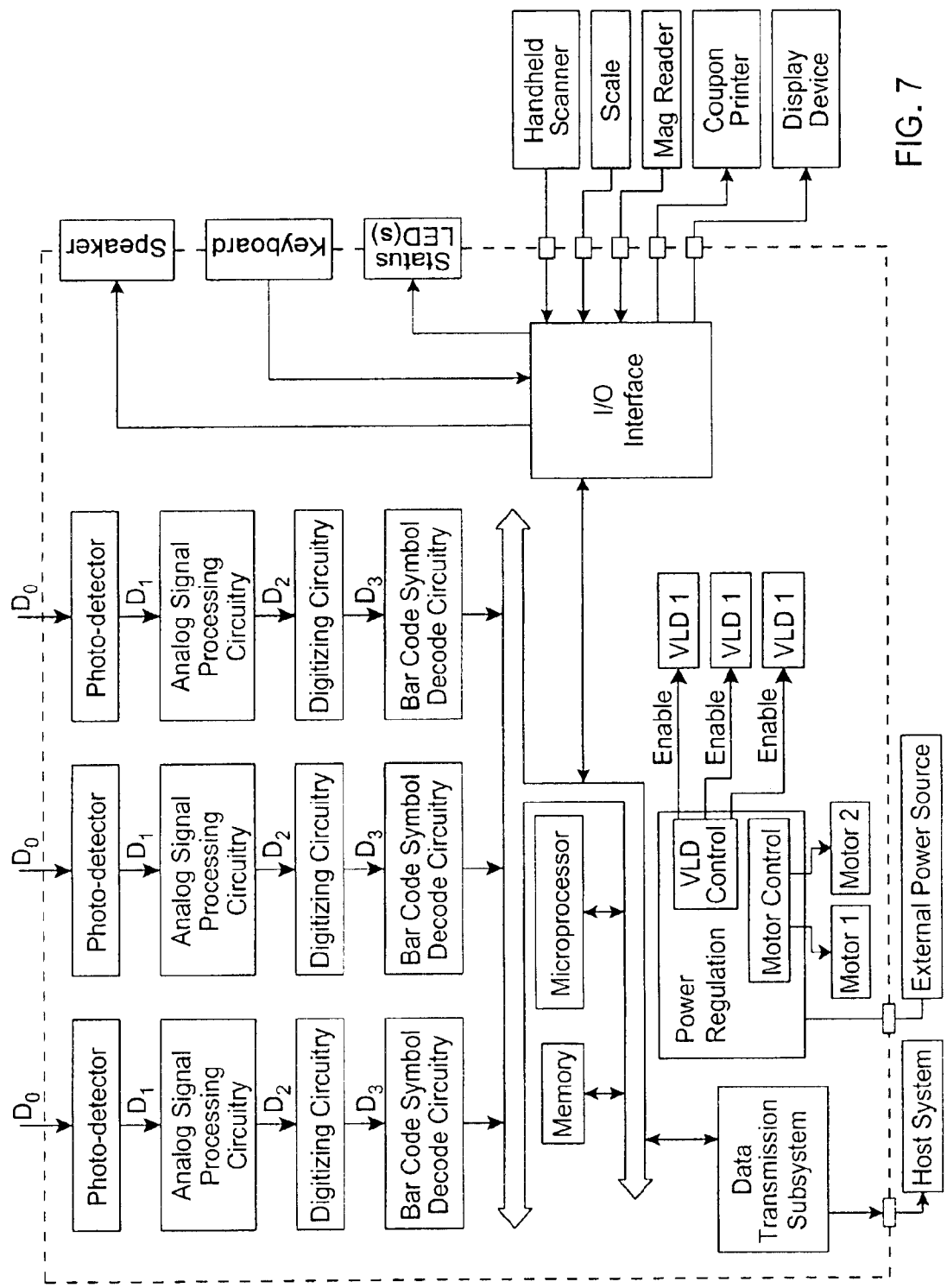
FIG. 7 is a functional block diagram of an illustrative embodiment of the electrical subsystem of the bioptical laser scanning system according to the present invention, including: photodetectors (e.g. a silicon photocell) for detection of optical scan data signals generated by the respective laser scanning stations; analog signal processing circuitry for processing (e.g., preamplification, bandpass filtering, and A/D conversion) analog scan data signals, digitizing circuitry for converting the digital scan data signal $D_2$, associated with each scanned bar code symbol, into a corresponding sequence of digital words (i.e. a sequence of digital count values) $D_3$, and bar code symbol decoding circuitry that receives the digital word sequences $D_3$ produced from the digitizing circuit, and subject it to one or more bar code symbol decoding algorithms in order to determine which bar code symbol is indicated (i.e. represented) by the digital word sequence $D_3$; a programmed microprocessor 61 with a system bus and associated program and data storage memory, for controlling the system operation of the bioptical laser scanner and performing other auxiliary functions and for receiving bar code symbol character data (provided by the bar code symbol decoding circuitry); a data transmission subsystem for interfacing with and transmitting symbol character data and other information to host computer system (e.g. central computer, cash register, etc.) over a communication link therebetween; and an input/output interface for providing drive signals to an audio-transducer and/or LED-based visual indicators used to signal successful symbol reading operations to users and the like, for providing user input via interaction with a keypad, and for interfacing with a plurality of accessory devices (such as an external handheld scanner, a display device, a weigh scale, a magnetic card reader and/or a coupon printer as shown).

In the illustrative embodiment of the present invention, the bioptical laser scanning system 1 comprises a number of system components as shown in the system diagram of FIG. 7, including: photodetectors (e.g. a silicon photocell) for detection of optical scan data signals generated by the respective laser scanning stations; analog signal processing circuitry for processing (e.g., preamplification, bandpass filtering, and A/D conversion) analog scan data signals, digitizing circuitry for converting the digital scan data signal $D_2$, associated with each scanned bar code symbol, into a corresponding sequence of digital words (i.e. a sequence of digital count values) $D_3$, and bar code symbol decoding circuitry that receives the digital word sequences $D_3$ produced from the digitizing circuit, and subject it to one or more bar code symbol decoding algorithms in order to determine which bar code symbol is indicated (i.e. represented) by the digital word sequence $D_3$.

As described above, during laser scanning operations, the optical scan data signal $D_0$ focused onto the photodetectors 45A 45B, and 45C is produced by light rays associated with a diffracted laser beam being scanned across a light reflective surface (e.g. the bars and spaces of a bar code symbol) and scattering thereof, whereupon the polarization state distribution of the scattered light rays is typically altered when the scanned surface exhibits diffuse reflective characteristics. Thereafter, a portion of the scattered light rays are reflected along the same outgoing light ray paths toward the facet which produced the scanned laser beam. These reflected light rays are collected by the scanning facet and ultimately focused onto the photodetector by its parabolic light reflecting mirror. The function of each photodetector is to detect variations in the amplitude (i.e. intensity) of optical scan data signal $D_0$, and produce in response thereto an electrical analog scan data signal $D_1$ which corresponds to such intensity variations. When a photodetector with suitable light sensitivity characteristics is used, the amplitude variations of electrical analog scan data signal $D_1$ will linearly correspond to light reflection characteristics of the scanned surface (e.g. the scanned bar code symbol). The function of the analog signal processing circuitry is to amplify and band-pass filter the electrical analog scan data signal $D_1$, in order to improve the SNR of the analog signal, and convert the analog signal into digital form (e.g., a pulse train with transitions between high and low logic levels). In practice, this analog to digital conversion is a thresholding function which converts the electrical analog scan data signal $D_1$ into a corresponding digital scan data signal $D_2$ having first and second (i.e. binary) signal levels which correspond to the bars and spaces of the bar code symbol being scanned. Thus, the digital scan data signal $D_2$ appears as a pulse-width modulated type signal as the first and second signal levels vary in proportion to the width of bars and spaces in the scanned bar code symbol.

The digitizing circuitry converts the digital scan data signal $D_2$, associated with each scanned bar code symbol, into a corresponding sequence of digital words (i.e. a sequence of digital count values) $D_3$. Notably, in the digital word sequence $D_3$, each digital word represents the time length associated with each first or second signal level in the corresponding digital scan data signal $D_2$. Preferably, these digital count values are in a suitable digital format for use in carrying out various symbol decoding operations which, like the scanning pattern and volume of the present invention, will be determined primarily by the particular scanning application at hand. Reference is made to U.S. Pat. No. 5,343,027 to Knowles, incorporated herein by reference, as it provides technical details regarding the design and construction of microelectronic digitizing circuits suitable for use in the laser scanner of the present invention.

The bar code symbol decoding circuitry receive each digital word sequence $D_3$ produced from the digitizing circuit, and subject it to one or more bar code symbol decoding algorithms in order to determine which bar code symbol is indicated (i.e. represented) by the digital word sequence $D_3$, originally derived from corresponding scan data signal $D_1$ detected by the photodetector associated therewith. In more general scanning applications, the function of the programmed decode computer is to receive each digital word sequence $D_3$ produced from the digitizing circuit, and subject it to one or more pattern recognition algorithms (e.g. character recognition algorithms) in order to determine which pattern is indicated by the digital word sequence $D_3$. In bar code symbol reading applications, in which scanned code symbols can be any one of a number of symbologies, a bar code symbol decoding algorithm with auto-discrimination capabilities can be used in a manner known in the art.

As shown in FIG. 7, the system includes a programmed microprocessor 61 with a system bus and associated program and data storage memory, for controlling the system operation of the bioptical laser scanner and performing other auxiliary functions and for receiving bar code symbol character data (provided by the bar code symbol decoding circuitry); a data transmission subsystem for interfacing with and transmitting symbol character data and other information to host computer system (e.g. central computer, cash register, etc.) over a communication link therebetween; and an input/output interface for providing drive signals to an audio-transducer and/or LED-based visual indicators used to signal successful symbol reading operations to users and the like, for providing user input via interaction with a keypad, and for interfacing with a plurality of accessory devices (such as an external handheld scanner that transmits bar code symbol character data to the bioptical laser scanning system, a display device, a weight scale, a magnetic card reader and/or a coupon printer as shown). In addition, the input-output interface may provide a port that enables an external handheld scanner to transmit sequences of digital words $D_3$ (i.e. a sequence of digital count values) generated therein to the bioptical laser scanning system for bar code symbol decoding operations. Details of such an interface port are described in U.S. Pat. No. 5,686,717 to Knowles et al., commonly assigned to the assignee of the present invention, herein incorporated by reference in its entirety.

The communication link between the data transmission subsystem and the host system may be a wireless data link (such as an infra-red link, Bluetooth RF link or IEEE 802.11a or 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, and RS-485 link), a wired parallel data bus, or other common wired interface links (such as an OCIA link, IBM 46XX link, Light Pen Emulation link, LTPN link). Similarly, the input/output interface between the external handheld scanner and the bioptical laser scanning system may support a wireless data link (such as an infra-red link, Bluetooth RF link or IEEE 802.11a or 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, and RS-485 link), a wired parallel data bus, or other common wired interface links (such as an OCIA link, IBM 46XX link, Light Pen Emulation link, LTPN link).

The microprocessor also produces motor control signals, and laser control signals during system operation. These control signals as well as a 120 Volt, 60 Hz line voltage signal from an external power source (such as a standard power distribution circuit) are received as input by a power regulation circuit, which produces as output, (1) laser source enable signals to drive VLDs 153A, 153B, 153C, and 153D, respectively, and (2) motor enable signals in order to drive the two motors (motor 1 and motor 2) that cause rotation of the first and second rotating polygonal mirrors, respectively.

In some scanning applications, where omni-directional scanning cannot be ensured at all regions within a pre-specified scanning volume, it may be useful to use scan data produced either (i) from the same laser scanning plane reproduced many times over a very short time duration while the code symbol is being scanned therethrough, or (ii) from several different scanning planes spatially contiguous within a pre-specified portion of the scanning volume. In the first instance, if the bar code symbol is moved through a partial region of the scanning volume, a number of partial scan data signal fragments associated with the moved bar code symbol can be acquired by a particular scanning plane being cyclically generated over an ultra-short period of time (e.g. 1–3 milliseconds), thereby providing sufficient scan data to read the bar code symbol. In the second instance, if the bar code symbol is within the scanning volume, a number of partial scan data signal fragments associated with the bar code symbol can be acquired by several different scanning planes being simultaneously generated by the three laser scanning stations of the system hereof, thereby providing sufficient scan data to read the bar code symbol, that is, provided such scan data can be identified and collectively gathered at a particular decode processor for symbol decoding operations.

In order to allow the bioptical scanning system of the present invention to use symbol decoding algorithms that operate upon partial scan data signal fragments, as described above, a synchronizing signal can be used to identify a set of digital word sequences $D_3$, (i.e. $\{D_S\}$), associated with a set of time-sequentially generated laser scanning beams produced by a particular facet on the first and second rotating polygonal mirrors. In such applications, each set of digital word sequences can be used to decode a partially scanned code symbol and produce symbol character data representative of the scanned code symbol. In code symbol reading applications where complete scan data signals are used to decode scanned code symbols, the synchronizing signal described above need not be used, as the digital word sequence $D_3$ corresponding to the completely scanned bar code symbol is sufficient to carry out symbol decoding operations using conventional symbol decoding algorithms known in the art.

The synchronizing signal can be derived from a position sensor (such as a hall sensor), integrated into the rotating shaft (or other portion) of the rotating polygonal mirror, that generates an electrical signal when the rotating polygonal mirror reaches a predetermined point (such as a start-of-scan position) in its rotation. Alternatively, such synchronization may be derived from a position indicating optical element (e.g., mirror or lens), which is preferably mounted adjacent (or near) the perimeter of one of the light folding mirrors, such that the position indicating optical element is illuminated by the scanning beam when the rotating polygonal mirror reaches a predetermined point (such as a start-of-scan position) in its rotation. The position indicating optical element may be a mirror that directs the illumination of the scanning beam incident thereon to a position indicating optical detector (which generates an electrical signal whose amplitude corresponds to the intensity of light incident thereon). Alternatively, the position indicating optical element may be a light collecting lens that is operably coupled to a light guide (such as a fiber optic bundle) that directs the illumination of the scanning beam incident thereon to a position indicating optical detector (which generates an electrical signal whose amplitude corresponds to the intensity of light incident thereon).

As each synchronizing pulse in the synchronizing signal is synchronous with a "reference" point on the respective rotating mirror, the symbol decoding circuitry provided with this periodic signal can readily "link up" or relate, on a real-time basis, such partial scan data signal fragments with the particular facet on the respective rotating polygonal mirror that generated the partial scan data fragment. By producing both a scan data signal and a synchronizing signal as described above, the bioptical laser scanning system of the present invention can readily carry out a diverse repertoire of symbol decoding processes which use partial scan data signal fragments during the symbol reading process.

Modifications

The bioptical laser scanning system of the present invention can be modified in various ways. For example, more (or less) groups of beam folding mirrors can be used in each laser scanning station within the system and/or more or less facets can be used for the rotating polygonal mirrors. Such modifications will add (or remove) scanning planes from the system.

Also more or less laser scanning stations might be employed within the system. Such modifications might be practiced in order to provide an omnidirectional laser scanning pattern having scanning performance characteristics optimized for a specialized scanning application.

While the second rotating polygonal mirror of the illustrative embodiment employs facets having low and high elevation angle characteristics, it is understood that it might be desirable in particular applications to use scanning facets with different characteristics (such as varying angular reflection characteristics) so as to enable a compact scanner design in a particular application.

Also, it is contemplated that each laser scanning station may not have its own laser source (e.g., VLD). More specifically, as is well known in the scanning art, the laser light produced by a laser source (VLD) may be split into multiple beams (with a beam splitter) and directed to multiple laser scanning stations with mirrors, a light pipe or other light directing optical element.

While the various embodiments of the bioptical laser scanner hereof have been described in connection with linear (1-D) bar code symbol scanning applications, it should be clear, however, that the scanning apparatus and methods of the present invention are equally suited for scanning 2-D bar code symbols, as well as alphanumeric characters (e.g. textual information) in optical character recognition (OCR) applications, as well as scanning graphical images in graphical scanning arts.

Improved Scan Signal Processing

In any laser scanning system (including the various embodiments of the bioptical laser scanner described above), the primary function of the laser scanning mechanism is to produce a laser scanning field (or volume) in which bar code symbols can be scanned in a reliable manner. In such systems, the speed of the laser beam spot (or cross-section) along the extent of the scanned laser beam will vary over the depth of the scanning range of the system. The further the laser beam spot is away from the laser scanning mechanism, the greater the laser beam spot speed with be, based on well known principles of physics. A useful measure of such beam spot speed variation is given by the ratio of (i) the maximum laser beam spot speed within the scanning field of the system, to (ii) the minimum laser beam spot speed in the scanning system. Hereinafter, this spot speed variation measure shall be referred to as the "Max/Min Beam Spot Speed Ratio" of a laser scanning system.

The substrate, usually paper, on which a bar code is printed reflects a signal of varying power when scanned with a focused laser beam within a given focal zone in the system. The laser light energy reflected (i.e. scattered) off the scanned code symbol is directed onto a photodetector by way of light collection and focusing optics. The photodetector converts these optical signals into corresponding electrical signals. The signal components produced by scanning the bar code substrate are unwanted and therefore are described as noise. Since the substrate is usually paper, consisting of fibers having a random spatial structure, such unwanted noise signals are commonly referred to as paper or substrate noise. A signal derived from the output of the photodetector (in analog or digital form) is referred to as a scan data signal $S_{analog}$ comprising the desired bar code signal component as well as the paper noise components.

Figure 8A:
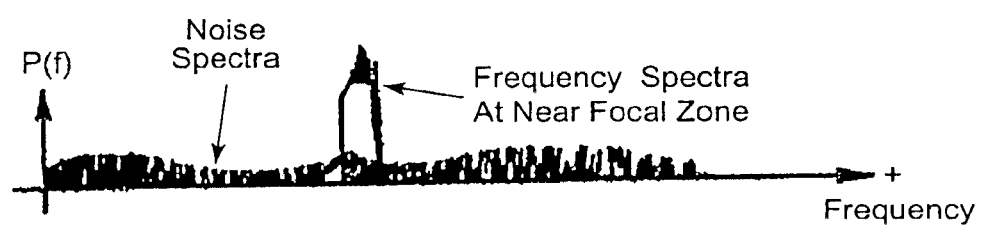
FIGS. 8A and 8B are graphical representations of the power spectrum of an exemplary analog scan data signal produced when laser scanning a bar code symbol within near and far focal zones of a laser scanning system, shown plotted along with the power density spectrum of the paper/substrate noise signal produced while laser scanning the bar code symbol on its substrate within such near and far focal zones.
Figure 8B:
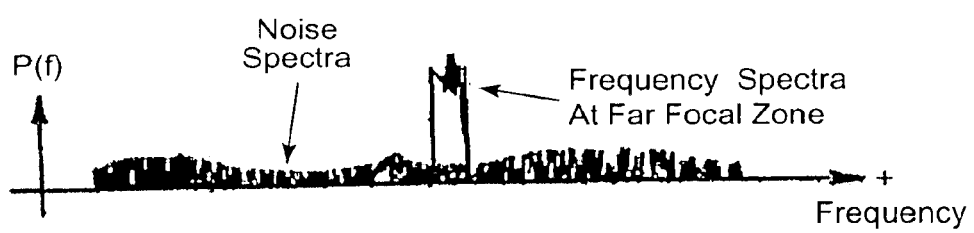

As a bar code is scanned within a focal zone disposed further away from the scanner, the scan data signal is increasingly compressed on the time-domain by virtue of the fact that the laser beam speed increases as a function of distance away from the laser scanning mechanism. In accordance with Fourier Analysis principles, compression of the scan data signal (including its noise components) represented on the time-domain results in an increase in or shift of power to the higher spectral components of the scan data signal represented on the frequency-domain. Thus, the frequency spectra of the scan data signal (including its noise components) undergoes a positive frequency shift as the corresponding bar code symbol is scanned further away from the laser scanning system. This phenomenon is graphically illustrated in the analog scan data signal of FIGS. 8A and 8B.

When scanning bar code symbols in a multi-focal zone laser scanning system, filters and signal thresholding devices are useful for rejecting noise components in the scan data signal. However, such devices also limit the scan resolution of the system, potentially rendering the system incapable of reading low contrast and high resolution bar code symbols on surfaces placed in the scanning field. Thus, it is imperative that the bandwidth of the system be sufficient to support the spectral components of scan data signals at different focal zones of the system and to support the scanning of the desired resolution of bar code symbols on surfaces placed in the scanning field.

In accordance with teachings of the present invention, a laser scanning system (such as the bioptical laser scanning system of the present invention as described above) includes a multi-path scan data signal processor having multiple signal processing paths. Each signal processing path processes the same data signal (which is derived from the output of a photodetector) to detect bar code symbols therein and generate data representing the bar code symbols. And each signal processing path has different operational characteristics (such as low-pass filter cutoff frequencies, amplifier gain characteristics, and/or positive and negative signal thresholds). The varying operational characteristics of the paths are optimized to provide different signal processing functions (e.g., minimize paper noise, or maximize the scan resolution of the system). The data signal derived from laser scanning is supplied to each path of the multi-path scan data processor, where it is processed (preferably in parallel) to identify signal level transitions therein. A digital scan data signal that encodes such signal level transitions is provided to digitizing circuitry, which converts the digital scan data signal into a corresponding sequence of digital words (i.e. a sequence of digital count values) suitable for bar code symbol decoding as described above.

By virtue of the present invention, it is now possible to identify signal level transitions in the scan data signal over a diverse range of operating conditions (e.g., operating conditions where paper noise is present in addition to operating conditions requiring high resolution scanning, such as the reading of low contrast or high resolution bar code symbols), which enables more reliable bar code reading over such diverse operating conditions. These and other advantages of the present invention will become apparent hereinafter.

Figure 9:
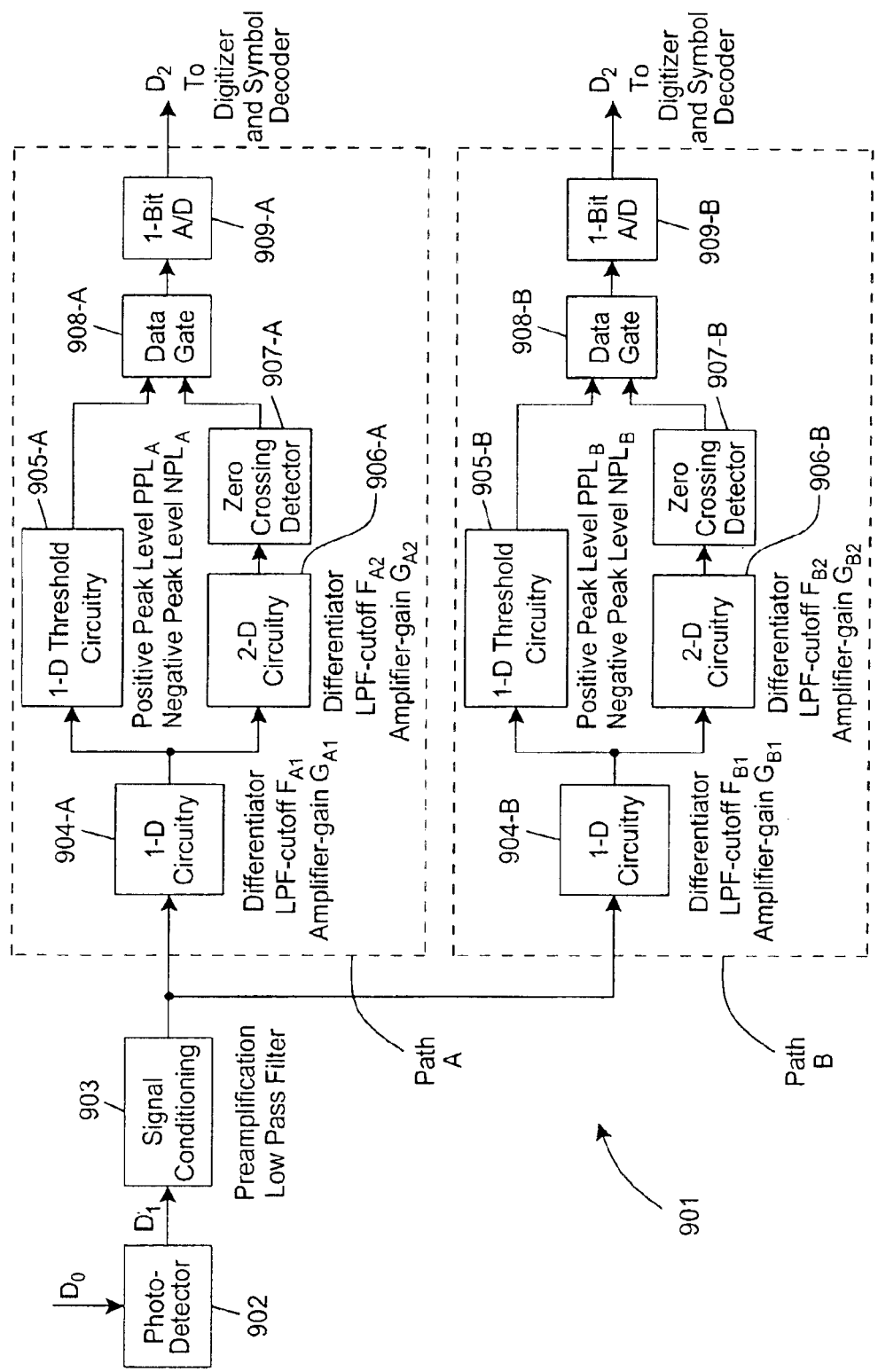
FIG. 9 is a functional block diagram of an illustrative embodiment of the multi-path scan data signal processor according to the present invention, including: signal conditioning circuitry 903 operably coupled between a photodetector 902 and a plurality of signal processing paths (two shown as path A and path B) that process the output of the signal conditioning circuitry in parallel; each signal processing path includes: a first derivative signal generation circuit 904 having a differentiator, low pass filter and amplifier therein; a second derivative signal generation circuit 906 having a differentiator therein; a first derivative signal threshold-level generation circuit 905; and a zero crossing detector 907, data gate 908, and binary-type A/D signal conversion circuitry 909; each signal processing path has different operational characteristics (such as different cutoff frequencies in the filtering stages of the first and second derivative signal generation circuits of the respective paths, different gain characteristics in amplifier stages of the first and second derivative signal generation circuits of the respective paths, and/or different positive and negative signal thresholds in the first derivative threshold circuitry of the respective paths); the varying operational characteristics of the paths provide different signal processing functions.

Analog Scan Data Signal Processor of the Illustrative Embodiment of the Present Invention As shown in FIG. 9, a multi-path scan data signal processor 901 according to the present invention comprises a number of subcomponents, namely: signal conditioning circuitry 903 operably coupled between a photodetector 902 and a plurality of signal processing paths (two shown as path A and path B) that process the output of the signal conditioning circuitry in parallel. Each signal processing path includes: a first derivative signal generation circuit 904 having a differentiator, low pass filter and amplifier therein; a second derivative signal generation circuit 906 having a differentiator therein; a first derivative signal threshold-level generation circuit 905; and a zero crossing detector 907, data gate 908, and binary-type A/D signal conversion circuitry 909.

The signal conditioning circuitry 903 operates to smooth out or otherwise filter the scan data signal produced by the photodetector 902 to remove unwanted noise components therein, and possibly amplify such signal. An illustrative implementation of such signal conditioning circuitry is described below with respect to FIGS. 11A and 11B. The output of the signal conditioning circuitry 903 is provided to the plurality of signal processing paths (two shown as path A and path B) that process the output of the signal conditioning circuitry 903 in parallel.

The first derivative signal generation circuitry 904 in each respective path (labeled 904-A and 904-B in as shown) includes a differentiator, low pass filter and amplifier that generate a signal approximating the first derivative of the analog scan data signal (with unwanted noise components removed). The low pass filter may be implemented with passive elements (such as resistors, capacitors and inductors) or may be implemented with active elements (such as an operational amplifier). Preferably, the low-pass filter implements one of a Butterworth-type, Chebsychev-type, MFTD-type, or elliptical-type low pass filtering transfer function, which are well known in the filtering art. Details of the design of such filters is set forth in the book entitled "Electrical Filter Design Handbook," Third Edition, by A. Williams et al., McGraw-Hill, 1996, herein incorporated by reference in its entirety. An illustrative implementation of the first derivative signal generation circuitry 904 for two different paths is described below with respect to FIG. 12.

The "first derivative signal" is supplied to second derivative signal generation circuit 906 and to first derivative threshold circuitry 905 in the respective path. The second derivative signal generation circuitry in each respective path (labeled 906-A and 906-B as shown) includes a differentiator that generates a signal approximating the second derivative of the scan data signal (with unwanted noise components removed). An example of the second derivative signal generation circuitry is described below with respect to FIG. 13.

The "second derivative signal" is supplied to a zero crossing detector 907 that produces output signal(s) ("zero crossing signal") identifying zero crossings in the second derivative signal. An illustrative implementation of the zero crossing detector in each respective path (labeled 907-A and 907-B) is described below with respect to FIG. 15.

The first derivative threshold circuitry in each respective path (labeled 905-A and 905-B) operates as a positive and negative peak detector to provide output signals that indicate the approximate time periods when the positive and negative peaks of the first derivative signal provided thereto exceed predetermined thresholds (i.e., a positive peak level PPL and a negative peak level NPL). An illustrative implementation of such first derivative threshold circuitry 905 for the two different paths is described below with respect to FIGS. 14A through 14C.

In the absence of noise, the occurrence of each second derivative zero-crossing indicates that the "first derivative signal" is undergoing a (positive or negative) peak which corresponds to the point in the scan data signal where a signal level transition (e.g., indicative of a transition between a space and a bar in a bar code symbol) has occurred. However, in the real-world, noise is notorious for producing false zero-crossing detections within the second derivative zero-crossing detection circuit. To reduce the number of "falsely detected" zero-crossings produced by noise, data gating circuit 908 is provided, which functions to gate to the binary-type A/D signal conversion circuitry 909, only detected second derivative zero-crossings which occur substantially concurrent to a positive or negative peak detected in the "first derivative signal" (as identified by the outputs signals of the first derivative threshold circuitry 905). An example of the data gate circuitry and binary-type A/D signal conversion circuitry is described below with respect to FIG. 16.

The output of the binary-type A/D conversion circuitry 909 is a digital scan data signal $D_2$ having first and second (i.e. binary) signal levels which correspond to the bars and spaces of the bar code symbol being scanned. Thus, the digital scan data signal $D_2$ appears as a pulse-width modulated type signal as the first and second signal levels vary in proportion to the width of bars and spaces in the scanned bar code symbol.

The digital scan data signal $D_2$ is supplied to digitizing circuitry, which converts the digital scan data signal $D_2$, associated with each scanned bar code symbol, into a corresponding sequence of digital words (i.e. a sequence of digital count values) $D_3$. Notably, in the digital word sequence $D_3$, each digital word represents the time length associated with each first or second signal level in the corresponding digital scan data signal $D_2$. Preferably, these digital count values are in a suitable digital format for use in carrying out various symbol decoding operations which, like the scanning pattern and volume of the present invention, will be determined primarily by the particular scanning application at hand. Reference is made to U.S. Pat. No. 5,343,027 to Knowles, incorporated herein by reference, as it provides technical details regarding the design and construction of microelectronic digitizing circuits suitable for use in the laser scanner of the present invention.

Bar code symbol decoding circuitry (which is typically implemented with a programmed microprocessor/microcontroller) receive each digital word sequence $D_3$ produced from the digitizing circuit, and subject it to one or more bar code symbol decoding algorithms in order to determine which bar code symbol is indicated (i.e. represented) by the digital word sequence $D_3$, originally derived from corresponding scan data signal $D_1$ detected by the photodetector associated therewith.

The operation of the multi-path scan data signal processor 901 is illustrated by the signal diagrams of FIGS. 10A through 10I. FIGS. 10A and 10B depict the signal produced at the output of the photodetector 902 as the laser scanning beam scans across a bar code symbol. FIG. 10C depicts the output signal produced by the signal conditioning circuitry 903. And FIGS. 10D through 10I depict the processing performed in one of the respective paths of the multi-path scan data signal processor 901. Similar processing operations with different operations characteristics are performed in other paths of the multi-path scan data signal processor 901.

More specifically, each signal processing path has different operational characteristics (such as different cutoff frequencies in the filtering stages of the first and second derivative signal generation circuits of the respective paths, different gain characteristics in amplifier stages of the first and second derivative signal generation circuits of the respective paths, and/or different positive and negative signal thresholds in the first derivative threshold circuitry of the respective paths). The varying operational characteristics of the paths are optimized to provide different signal processing functions.

For example, the cut-off frequencies in the filtering stages of the first and second derivative signal generation circuits of the respective paths can vary such that different paths minimize the paper noise originating from different focal zones of the system. Alternatively, such cut-off frequencies can vary such that one or more paths maximize the scan resolution of the system (i.e., a path with higher cutoff frequencies may be able to detect high resolution bar code symbols) while other paths minimize paper noise (i.e., a path with lower cutoff frequencies will reject paper noise from a larger frequency band above the selected cutoff frequencies).

In another example, the gain characteristics in the amplifier stages of the first and second derivative signal generation circuits of the paths and/or the positive and negative signal thresholds in the first derivative threshold circuitry of the paths can vary such that one or more paths maximize the scan resolution of the system (i.e., a path with higher gain and/or smaller positive and negative signal thresholds may be able to detect low bar code symbols) while other paths minimize paper noise (i.e., a path with lower gain and/or larger positive and negative signal thresholds will reject paper noise that falls below such thresholds).

The different signal processing functions of each path of the multi-path scan data processor as described above are preferably performed in parallel. Alternatively, the processing along each path may be performed sequentially. In this case, a programmable microcomputer may be programmed to dynamically activate the processing of a given path based upon the operation of the scanner (for example, based upon the focal distance of the scanning plane from which the scan data signal is derived, which is described in detail in U.S. application Ser. No. (108-045USA000), or based upon results of previous scan processing of the system).

By virtue of this improved architecture, the multi-path scan data signal processor is able to identify signal level transitions (corresponding to transitions between a space and a bar in a bar code symbol) in the scan data signal over a diverse range of operating conditions (e.g., operating conditions where paper noise is present in addition to operating conditions requiring high resolution scanning, such as the reading of low contrast or high resolution bar code symbols), which enables more reliable bar code reading over such diverse operating conditions.

Signal Conditioning Circuitry

Figure 11A:
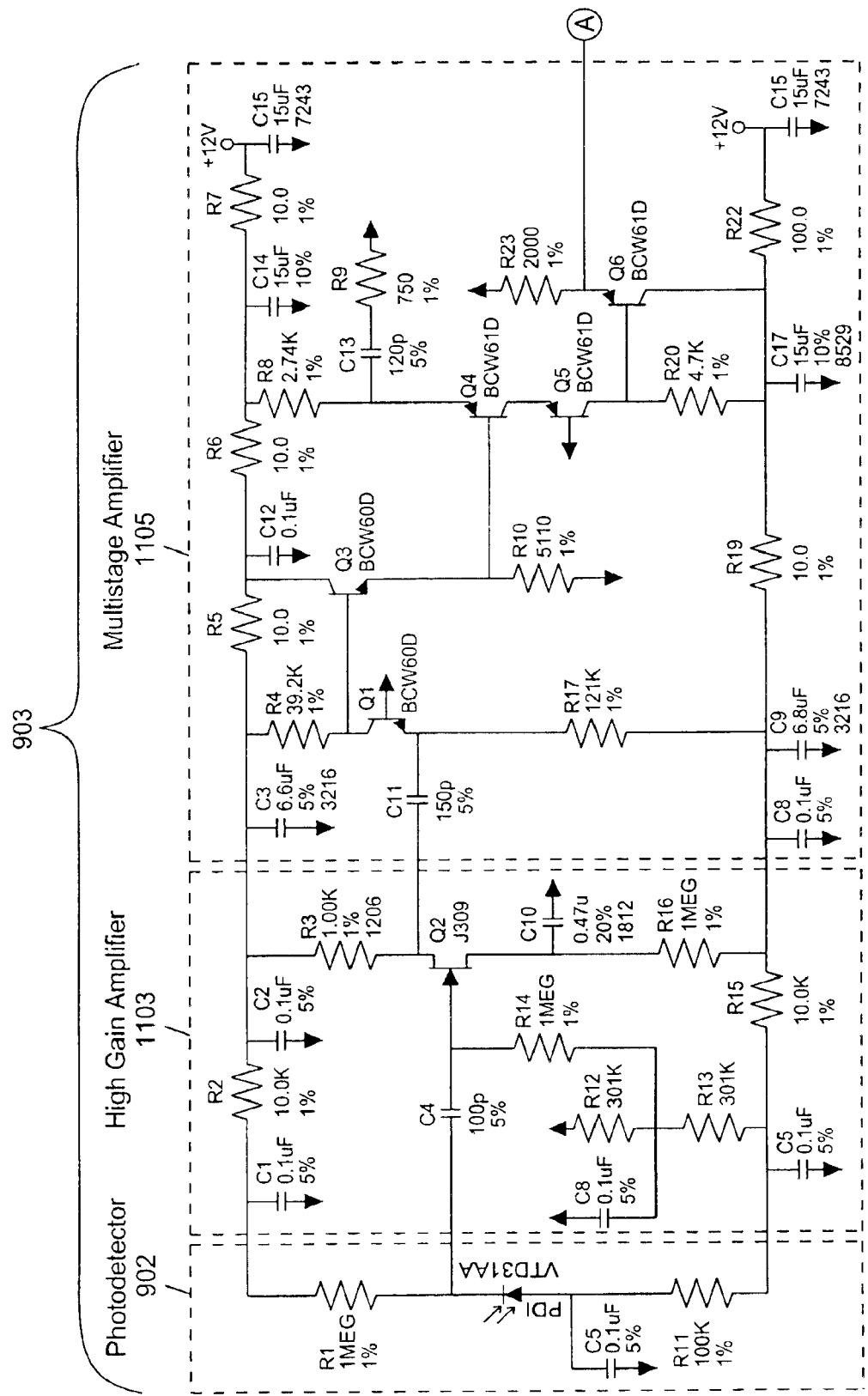
FIGS. 11A and 11B, taken together, set forth a schematic diagram illustrating an exemplary embodiment of the signal conditioning circuitry 903 of FIG. 9, which operates to amplify and smooth out or otherwise filter the scan data signal produced by the photodetector 902 to remove unwanted noise components therein, including a number of subcomponents arranged in a serial manner, namely: a high gain amplifier stage 1103, a multistage amplifier stage 1105, a differential amplifier stage 1107 and a low pass filter (LPF) stage 1109.
Figure 11B:
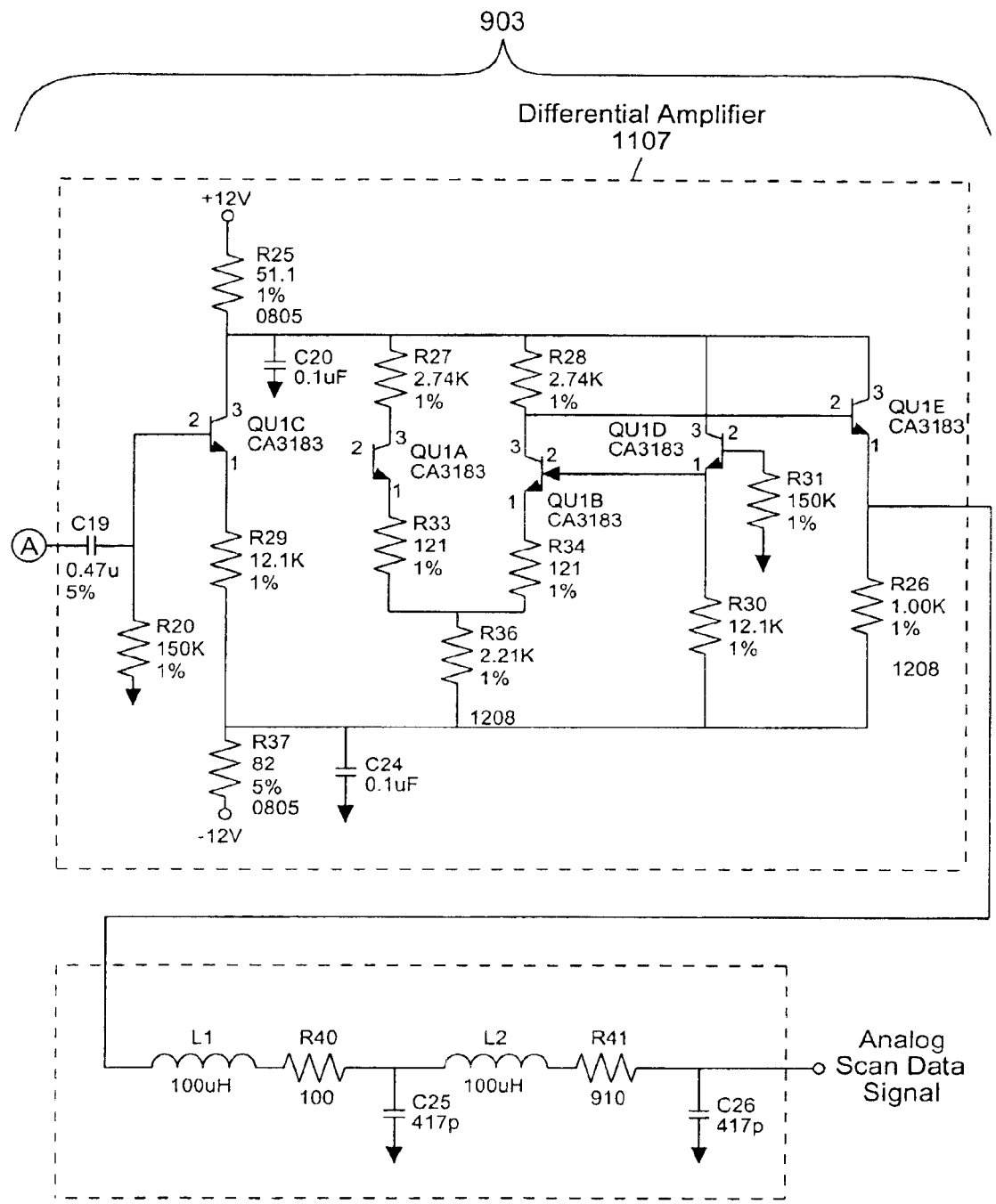

FIGS. 11A and 11B, taken together, illustrates an exemplary embodiment of the signal conditioning circuitry 903 of FIG. 9, which operates to amplify and smooth out or otherwise filter the scan data signal produced by the photodetector 902 to remove unwanted noise components therein. The circuitry 903 comprises, a number of subcomponents in a serial manner, namely: a high gain amplifier stage 1103, a multistage amplifier stage 1105, a differential amplifier stage 1107 and a low pass filter (LPF) stage 1109. The amplifier stages 1103, 1105 and 1109 amplify the voltage of the analog scan data signal produced by the photodetector 902 with gains of 90, 3.0 and 7.1, respectively, to provide a total gain of about 1900. The low pass filter 1109 stage operates to filter out unwanted noise in the amplified signal produced by the amplifier stages 1103, 1105 and 1109. The 3 dB cutoff frequency of the low pass filter shown (which is a maximally flat Butterworth type filter) is approximately 780 kHz, which is designed to filter out unwanted high frequency noise (e.g., noise which lies above the expected maximum signal frequency of 540 kHz).

The First Derivative Signal Generation Circuitry

Figure 12:
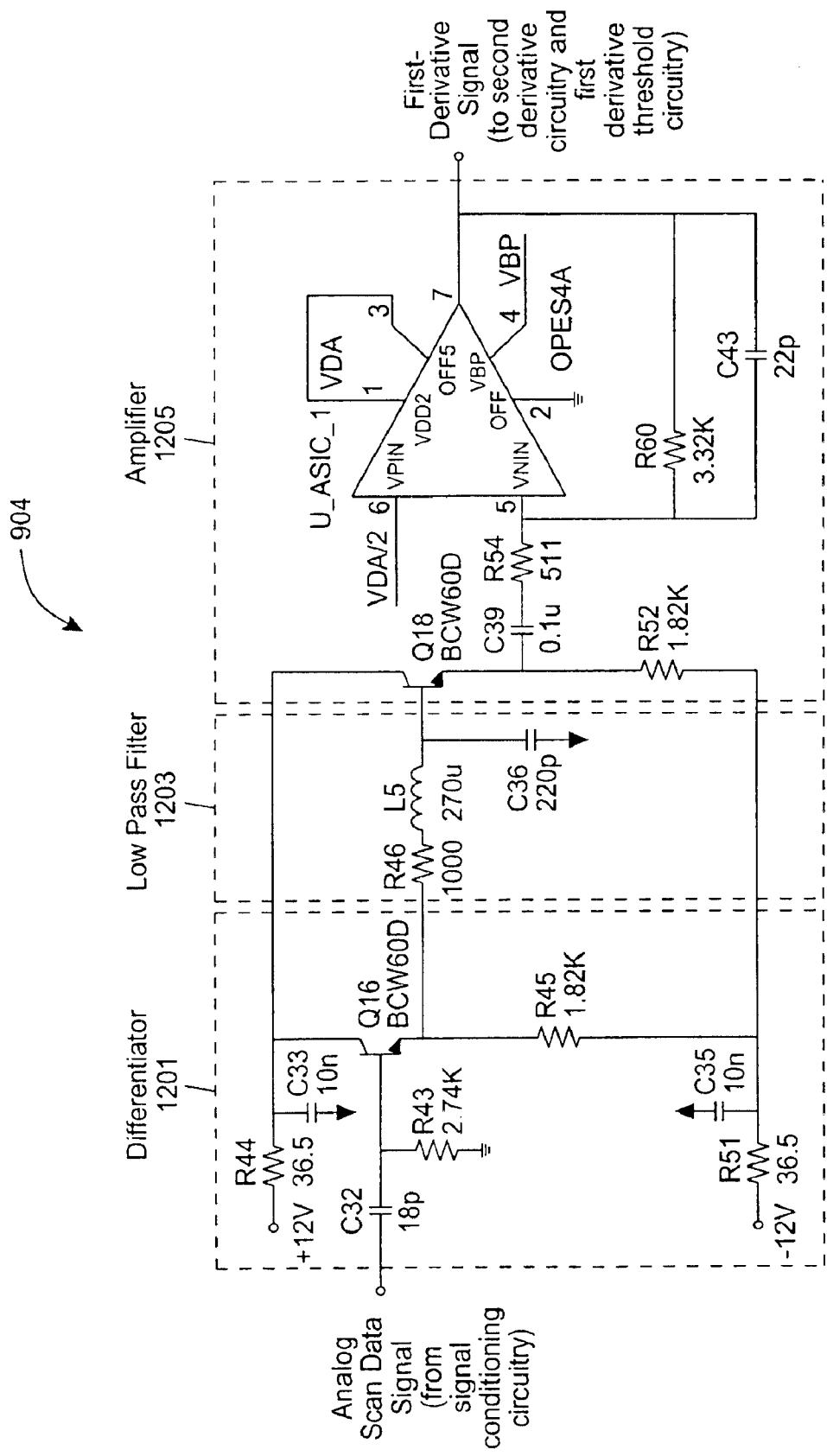
FIG. 12 is a schematic diagram illustrating an exemplary implementation of the first derivative signal generation circuitry 904, which is suitable for use in the two different paths of the scan data signal processor of FIG. 9, including a number of subcomponents arranged in a serial manner that process the analog scan data signal produced by the signal conditioning circuitry 903, namely: a differentiator stage 1201, a low-pass filter (LPF) stage 1203, and an amplifier stage 1205.

FIG. 12 illustrates an exemplary implementation of the first derivative signal generation circuitry 904, which is suitable for use in the two different paths of the scan data signal processor of FIG. 9. As shown in FIG. 12, the first derivative signal generation circuitry 904 includes a number of subcomponents arranged in a serial manner that process the analog scan data signal produced by the signal conditioning circuitry 903, namely: a differentiator stage 1201, a low-pass filter (LPF) stage 1203, and an amplifier stage 1205.

The differentiator stage 1201 generates an signal whose voltage level is proportional to the first derivative of the analog scan data signal for those frequencies less than the cutoff frequency of the differentiator stage 1201, which is set by the values of R43 and C32, respectively, and can be approximated by the expression:

$$f_c = \frac{1}{2*\pi*R43*C32},$$

which is approximately 3.226 MHz for the circuit elements shown.

The low pass filter stage 1203 operates to filter out unwanted noise in the output signal produced by the differentiator stage 1201. The 3 dB cutoff frequency of the low pass filter shown (which is a maximally flat Butterworth type filter) is set by the values of L5 and C36, respectively, and can be approximated by the expression:

$$f_c = \frac{1}{2*\pi*\sqrt{L5*C36}},$$

which is approximately 650 kHz for the circuit elements shown.

The amplifier stage 1205 operates to amplify the voltage levels of the output signal produced by the LPF stage for frequencies in a predetermined frequency band. More specifically, for frequencies between $f_1$ and $f_2$, the amplifier produces a gain that is approximately proportional to R60/R54 (which is approximately 6.5 for the circuit elements shown) where:

$$f_1 = \frac{1}{2*\pi*R54*C39},$$

which is approximately 3 kHz for the circuit elements shown.

$$f_2 = \frac{1}{2*\pi*R60*C43},$$

which is approximately 2 MHz for the circuit elements shown.

Outside the predetermined frequency band between $f_1$ and $f_2$, the amplifier stage 1205 attenuates such frequency components.

It should be noted that although the first derivative signal generation circuitry of the two paths (labeled 904-A and 904-B in FIG. 9) share a common function—to generate a signal approximating the first derivative of the analog scan data signal—they may have different operational characteristics that are optimized for bar code scanning and reading in diverse operating conditions.

For example, the cut-off frequencies in the differentiator stage 1201, the LPF stage 1203 and the amplifier stage 1205 of the first derivative signal generation circuits of the respective paths (labeled 904-A and 904-B) can vary (by selecting different values for the appropriate circuit elements as set forth above) such that different paths minimize the paper noise originating from different focal zones of the system. Techniques for selecting the appropriate cutoff frequencies that correspond to the different focal zones of the laser scanning system are described in detail in U.S. patent application Ser. No. (108-045USA000), commonly assigned to the assignee of the present application, incorporated by reference above in its entirety. Alternatively, such cut-off frequencies can vary such that one or more paths maximize the scan resolution of the system (i.e., a path with higher cutoff frequencies may be able to detect high resolution bar code symbols) while other paths minimize paper noise (i.e., a path with lower cutoff frequencies will reject paper noise from a larger frequency band above the selected cutoff frequencies).

In another example, the gain characteristics in the amplifier stage 1205 of the first derivative signal generation circuits of the respective paths (labeled 904-A and 904B) can vary such that one path maximizes the scan resolution of the system (i.e., a path with higher gain may be able to detect low bar code symbols) while the other path minimize paper noise (i.e., a path with lower gain will reject paper noise that might trigger scan errors when amplified by the high gain path).

The Second Derivative Signal Generation Circuitry

Figure 13:
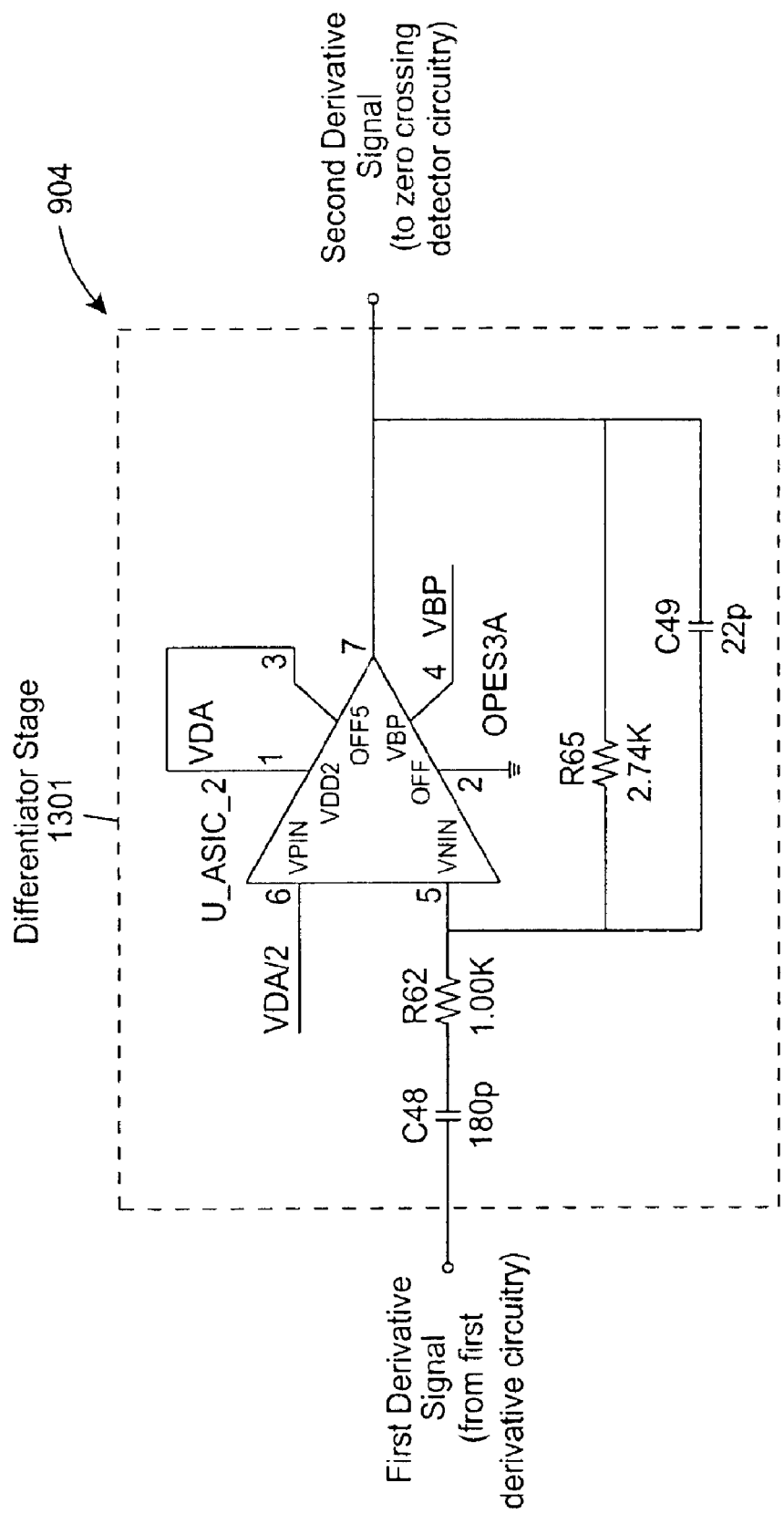
FIG. 13 is a schematic diagram illustrating an exemplary implementation of the second derivative signal generation circuitry 906, which is suitable for use in the two different paths of the scan data signal processor of FIG. 9, including: a differentiator stage 1301 that generates a signal whose voltage level is proportional to the derivative of the first derivative signal produced by the first derivative generation circuitry 904 (thus proportional to the second derivative of the analog scan data signal produced by the signal conditioning circuitry 903) for frequencies in a predetermined frequency band.

FIG. 13 illustrate an exemplary implementation of the second derivative signal generation circuitry 906, which is suitable for use in the two different paths of the scan data signal processor of FIG. 9. As shown in FIG. 13, the second derivative signal generation circuitry 906 includes a differentiator stage 1301 that generates a signal whose voltage level is proportional to the derivative of the first derivative signal produced by the first derivative generation circuitry 904 (thus proportional to the second derivative of the analog scan data signal produced by the signal conditioning circuitry 903) for frequencies in a predetermined frequency band. More specifically, the differentiator stage 1301 operates substantially as a differentiator (producing a signal whose voltage level is proportional to the derivative of the first derivative signal produced by the first derivative generation circuitry 904) for frequencies less than $f_1$ where:

$$f_1 = \frac{1}{2*\pi*R62*C48},$$

which is approximately 884 kHz for the circuit elements shown.

Moreover, the feedback elements of the differentiator stage 1301 operate substantially as a low pass filter with a 3 dB cutoff frequency which is set by the values of R65 and C49, respectively, and can be approximated by the expression:

$$f_c = \frac{1}{2*\pi*R65*C49},$$

which is approximately 2.15 Mhz for the circuit elements shown.

For frequencies above this predetermined 3 dB cutoff frequency $f_c$, the differentiator stage 1301 attenuates such frequency components.

It should be noted that although the second derivative signal generation circuitry of the two paths (labeled 906-A and 906-B in FIG. 9) share a common function—to generate a signal approximating the second derivative of the analog scan data signal—they may have different operational characteristics that are optimized for bar code scanning and reading in diverse operating conditions.

For example, the cut-off frequencies in the differentiator stage 1301 of the second derivative signal generation circuits of the respective paths (labeled 906-A and 906-B) can vary (by selecting different values for the appropriate circuit elements as set forth above) such that different paths minimize the paper noise originating from different focal zones of the system. Techniques for selecting the appropriate cutoff frequencies that correspond to the different focal zones of the laser scanning system are described in detail in U.S. patent application Ser. No. (108-045USA000), commonly assigned to the assignee of the present application, incorporated by reference above in its entirety. Alternatively, such cut-off frequencies can vary such that one or more paths maximize the scan resolution of the system (i.e., a path with higher cutoff frequencies may be able to detect high resolution bar code symbols) while other paths minimize paper noise (i.e., a path with lower cutoff frequencies will reject paper noise from a larger frequency band above the selected cutoff frequencies).

Zero Crossing Detector

Figure 15:
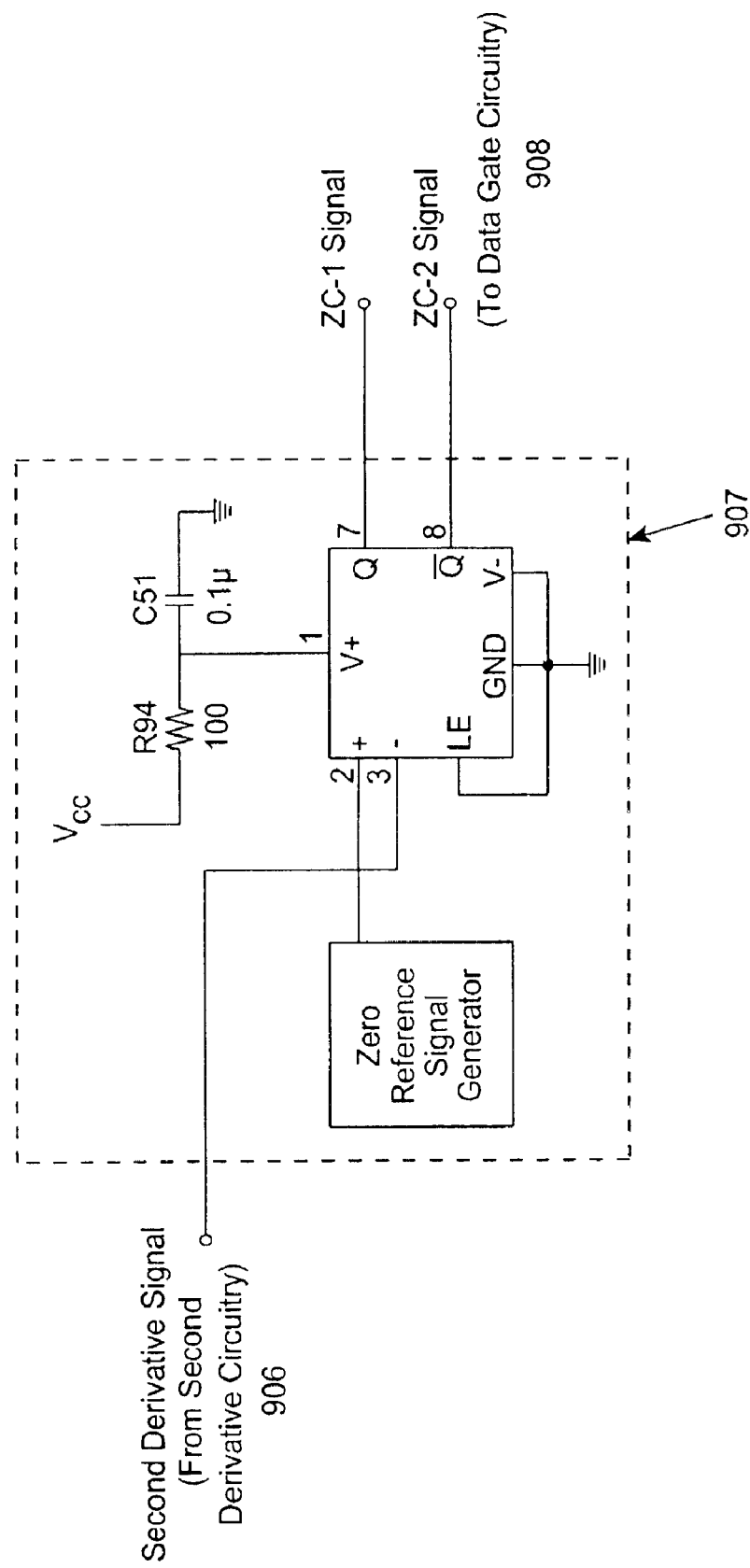
FIG. 15 illustrates an exemplary implementation of a zero crossing detector 907, which is suitable for use in the two different paths of the scan data signal processor of FIG. 9, including a comparator circuit that compares the second derivative signal produced from the second derivative generation circuit in its respective path with a zero voltage reference (i.e. the AC ground level) provided by the zero reference signal generator, in order to detect the occurrence of each zero-crossing in the second derivative signal, and provide output signals (ZC_1 and ZC_2 signals) identifying zero crossings in the second derivative signal.

FIG. 15 illustrates an exemplary implementation of a zero crossing detector 907, which is suitable for use in the two different paths of the scan data signal processor of FIG. 9. As shown in FIG. 15, the zero-crossing detector 907 includes a comparator circuit that compares the second derivative signal produced from the second derivative generation circuit in its respective path with a zero voltage reference (i.e. the AC ground level) provided by the zero reference signal generator, in order to detect the occurrence of each zero-crossing in the second derivative signal, and provide output signals (ZC_1 and ZC_2 signals) identifying zero crossings in the second derivative signal.

First Derivative Signal Threshold Level Generation Circuit

Figure 14A:
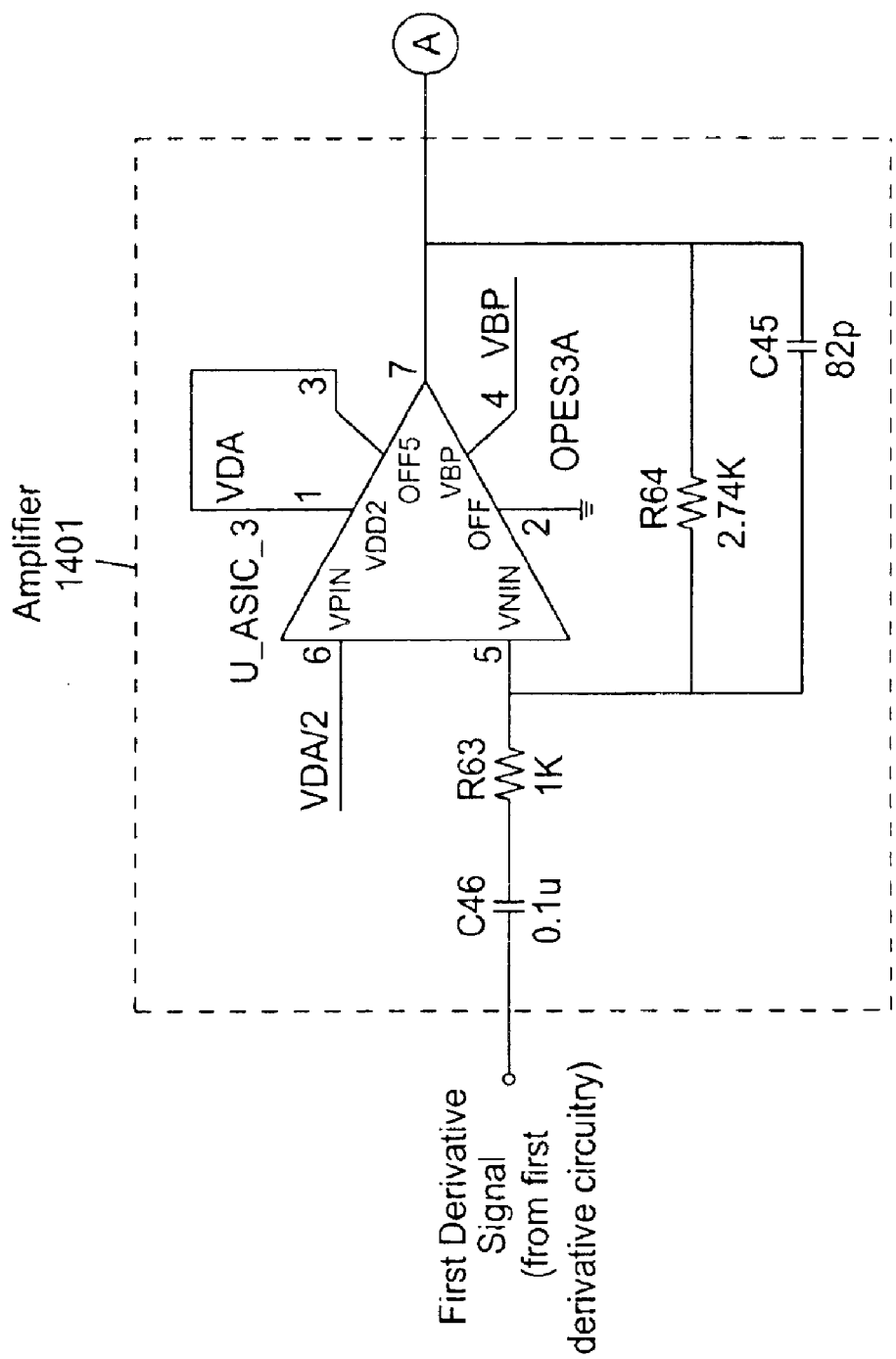
FIGS. 14A through 14C set forth a schematic diagram illustrating an exemplary implementation of the first derivative signal threshold circuitry 905, which is suitable for use in the two different paths of the scan data signal processor of FIG. 9, including: an amplifier stage 1401 that amplifies the voltage levels of the first derivative signal produced by the first derivative signal generation circuitry 904, positive and negative peak detectors 1403 and 1405, and a comparator stage 1407 that generates output signals (e.g., the Upper_Threshold Signal and Lower_Threshold Signal) that indicate the time period when the positive and negative peaks of the amplified first derivative signal produced by the amplifier stage exceed predetermined thresholds (i.e., a positive peak level PPL and a negative peak level NPL).
Figure 14B:
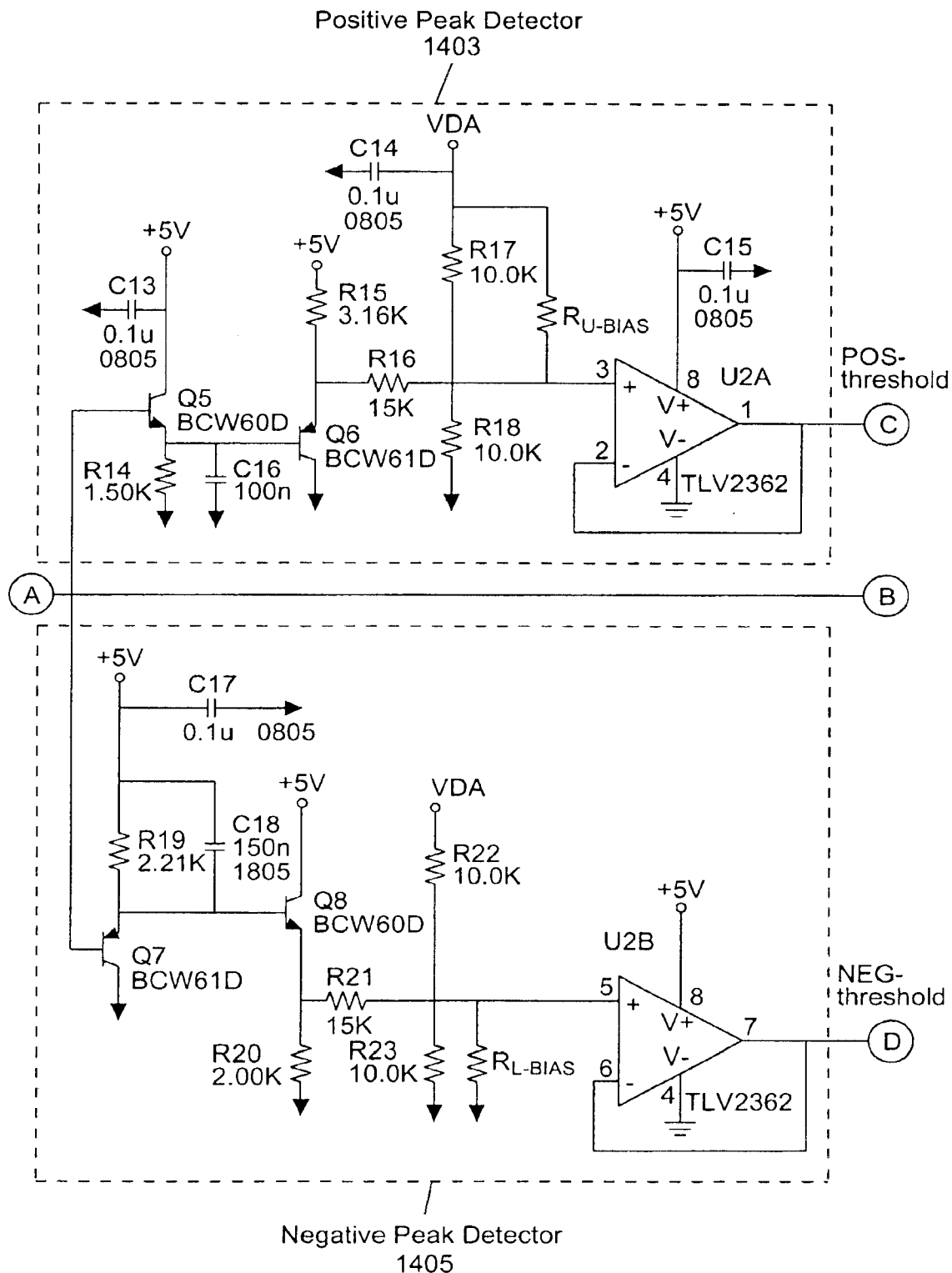
Figure 14C:
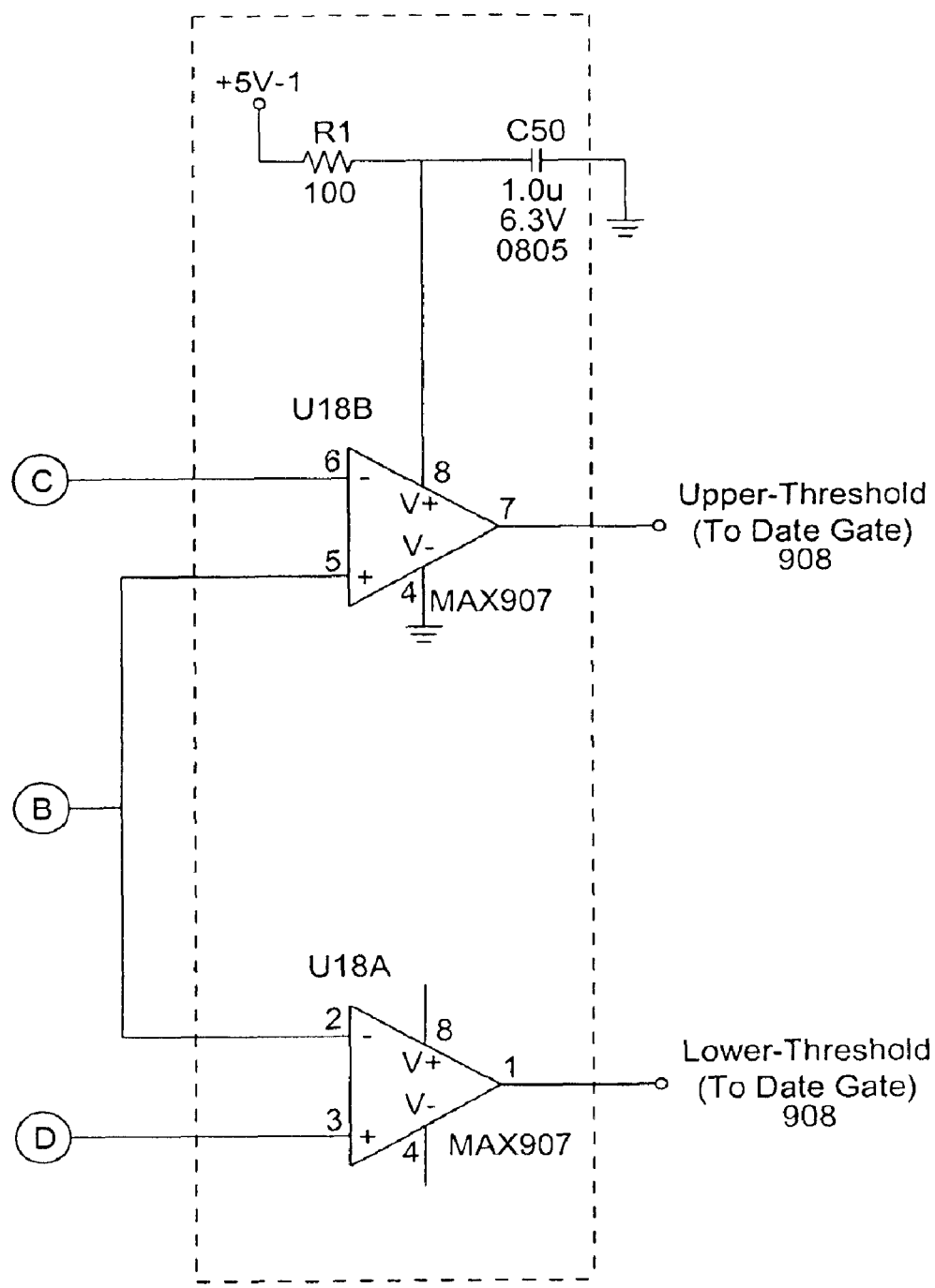

FIGS. 14A through 14C illustrate exemplary implementation of the first derivative signal threshold circuitry 905, which is suitable for use in the two different paths of the scan data signal processor of FIG. 9. As shown in FIGS. 14A through 14C, the first derivative signal threshold circuitry 905 includes an amplifier stage 1401 that amplifies the voltage levels of the first derivative signal produced by the first derivative signal generation circuitry 904, positive and negative peak detectors 1403 and 1405, and a comparator stage 1407 that generates output signals (e.g., the Upper_Threshold Signal and Lower_Threshold Signal) that indicate the time period when the positive and negative peaks of the amplified first derivative signal produced by the amplifier stage exceed predetermined thresholds (i.e., a positive peak level PPL and a negative peak level NPL). Preferably, the positive peak level PPL and negative peak level NPL are dynamic thresholds (e.g., these levels change as the amplified analog signal changes over time) based upon a DC bias level and a percentage (portion) of the amplified first derivative signal produced by the amplifier stage 1401. In the illustrative embodiment shown in FIGS. 14A through 14C, capacitors C16 and C18 are configured as peak detectors (with a decay time constant proportional to the values of R14/C16 and R19/C18, respectively); and the positive peak level PPL is set by the resistance values of the resistor network R16,R17,R18 and $R_{U\_BIAS}$, while the negative peak level NPL is set by the values of the resistor network R21,R22,R23 and $R_{L\_BIAS}$.

It should be noted that although the first derivative signal threshold circuitry of the two paths (labeled 905-A and 905-B in FIG. 9) share a common function—to generate output signals that indicate the time period when the positive and negative peaks of the amplified first derivative signal exceed predetermined thresholds—they may have different operational characteristics that are optimized for bar code scanning and reading in diverse operating conditions.

For example, the positive and negative peak levels in the positive and negative peak detectors 1403 and 1405, respectively, (which are set by the resistance values of the resistor networks therein) can vary such that one path maximizes the scan resolution of the system (i.e., a path with lower positive peak and negative peak level may be able to detect low bar code symbols) while the other path minimize paper noise (i.e., a path with a higher positive peak and negative peak level will reject paper noise that that falls below such thresholds.

For example, the positive and negative peak detectors 1403 and 1405 in the first derivative signal threshold circuitry 905-A of the first path A may utilize a 91 kilo-ohm resistor for $R_{U\_BIAS}$ and $R_{L\_BIAS}$ of FIG. 14. Such resistor values produce a dynamic PPL threshold which approximates 2.079 mV DC bias level plus 24% of the amplified first derivative signal, and produce a dynamic NPL threshold which approximates a 1.921 mV DC bias level less 24% of the amplified first derivative signal. In another example, the positive and negative peak detectors 1403 and 1405 in the first derivative signal threshold circuitry 905-B of the second path B may utilize a 20 kilo-ohm resistor for $R_{U\_BIAS}$ and $R_{L\_BIAS}$ of FIG. 14. Such resistor values produce a dynamic PPL threshold which approximates a 2.316 mV DC bias level plus 21% of the amplified first derivative signal, and produce a dynamic NPL threshold which approximates 1.684 mV DC bias level less 21% of the amplified first derivative signal. Note that path A has "lower" positive peak and negative peak levels—it may be able to detect high resolution bar code symbols than path B. While path B has "higher" positive peak and negative peak levels—it will reject paper noise that might trigger scan errors in the path A).

Data Gating Circuitry and 1-Bit A/D Conversion Circuitry

Figure 16:
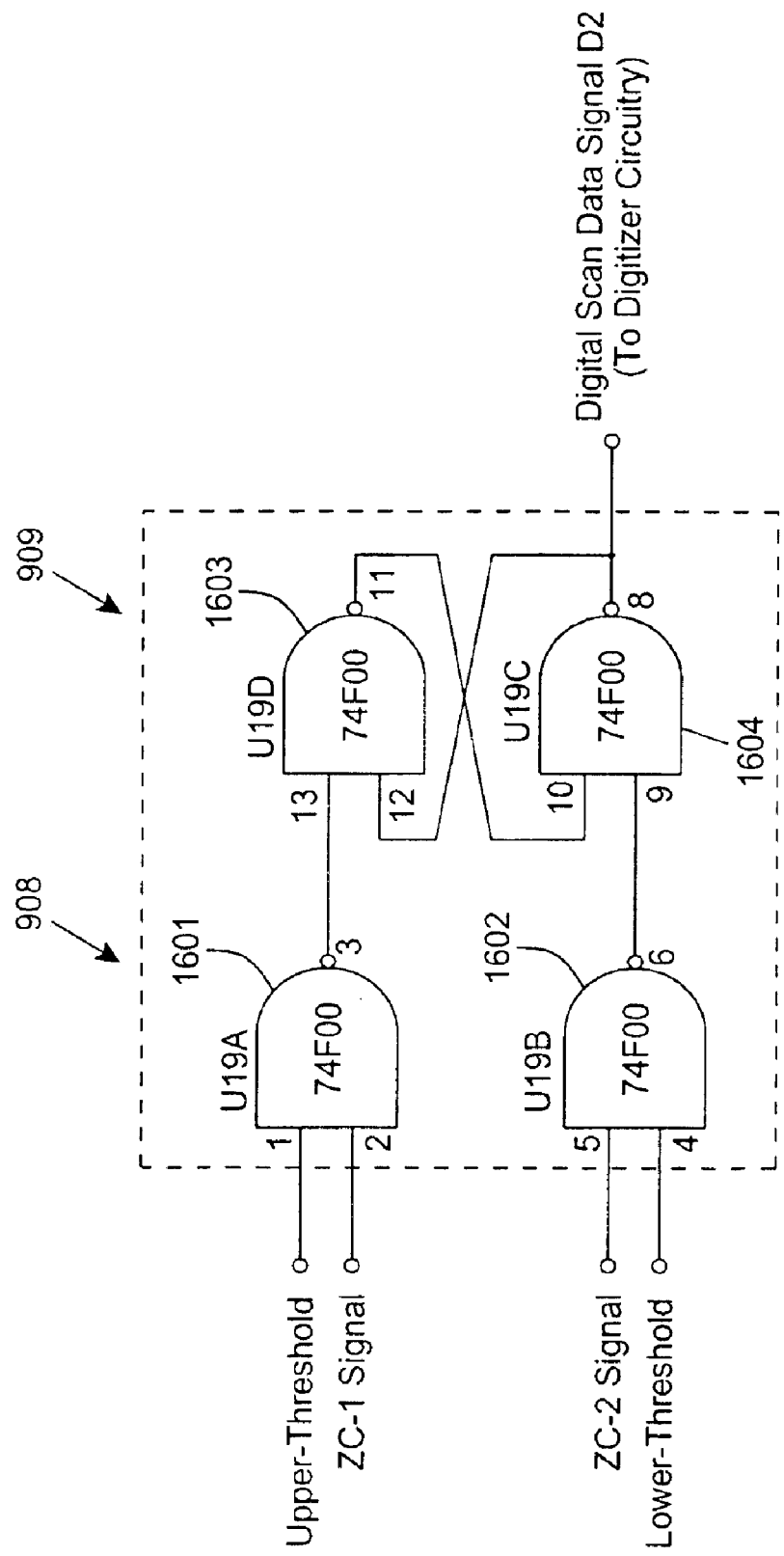
FIG. 16 is a schematic diagram illustrating an exemplary implementation of the data gating circuitry 908 and 1-Bit A/D conversion circuitry 909, which is suitable for use in the two different paths of the scan data signal processor of FIG. 9.

FIG. 16 illustrates an exemplary implementation of the data gating circuitry 908 and 1-Bit A/D conversion circuitry 909, which is suitable for use in the two different paths of the scan data signal processor of FIG. 9. In each respective path, the data gating circuit 908 functions to gate to the binary-type A/D signal conversion circuitry 909, only detected second derivative zero-crossings (identified by the outputs signals ZC_1 and ZC_2 of the zero crossing detector 907 in the respective path) which occur substantially concurrent to a positive or negative peaks detected in the "first derivative signal" (as identified by the output signals—Upper_Threshold and Lower_Threshold—of the first derivative threshold circuitry 905). As shown in FIG. 16, the data gate circuit 908 and the 1 bit D/A conversion circuitry 909 in each path is realized by four NAND gates (labeled 601 through 1604) configured as a set/reset latch circuit. The operation of the data gating circuitry and 1 bit D/A conversion circuitry of FIG. 16 is illustrated in the signal plot of FIG. 10I.

Having described illustrative embodiments of the present invention, it is understood that there are a number of alternative ways to practice the present invention. Several different modes for carrying out the present invention will be described below.

For example, rather than using "analog-type" circuit technology for realizing the signal processing subcomponents of the multi-path scan data signal processor (e.g., the differentiators, low-pass filter, amplifiers, peak detectors, data gate, etc.), it is understood that the scan data signal processing method and apparatus of the present invention can be implemented using digital signal processing techniques carried out either within a programmed microcomputer or using one or more custom or commercially available digital signal processing (DSP) chips known in the digital signal processing art.

Figure 17A:
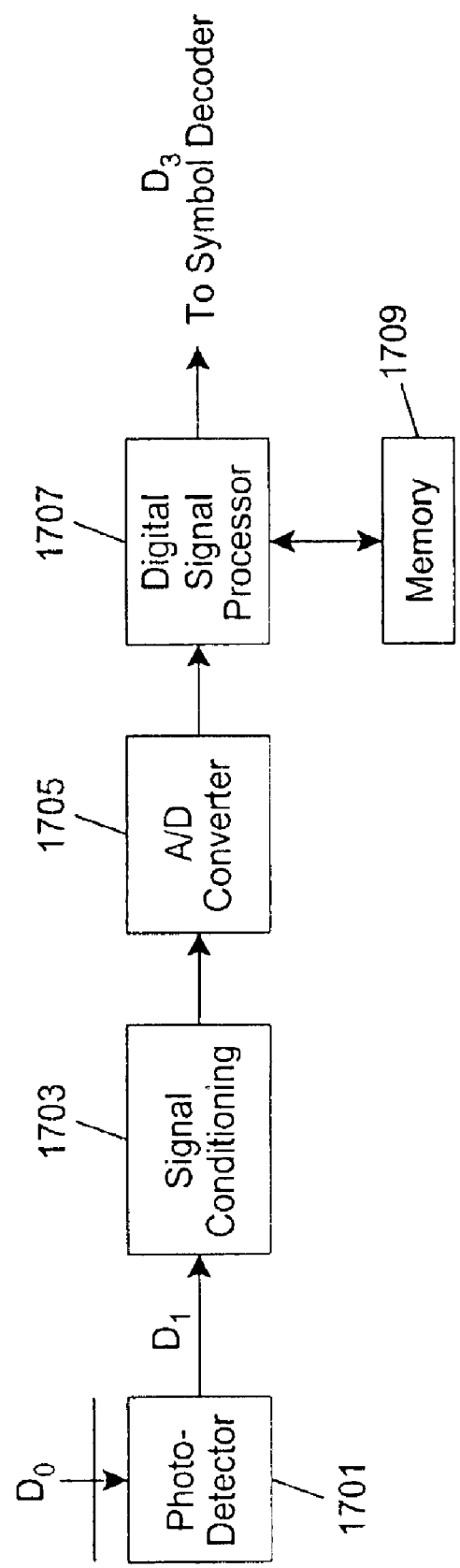
FIG. 17A is a functional block diagram of a system architecture suitable for a digital implementation of the scan data signal processor of the present invention, including: signal conditioning circuitry 1703 (which amplifies and filters the analog signal to remove unwanted noise components as described above), analog-to-digital conversion circuitry 1705 which samples the conditioned analog scan data signals at a sampling frequency at least two times the highest frequency component expected in the analog scan data signal, in accordance with the well known Nyquist criteria, and quantizes each time-sampled scan data signal value into a discrete signal level using a suitable length number representation (e.g. 8 bits) to produce a discrete scan data signal; and programmed processor (e.g., a digital signal processor 1707 and associated memory 1709 as shown) that processes the discrete signal levels to generate a sequence of digital words (i.e. a sequence of digital count values) $D_3$, each representing the time length associated with the signal level transitions in the corresponding digital scan data signal as described above.

As illustrated in FIG. 17A, when carrying out a digital implementation of the scan data signal processor of the present invention, the analog scan data signal $D_1$ is provided to signal conditioning circuitry 1703 (which amplifies and filters the signal to remove unwanted noise components as described above), whose output is provided to analog-to-digital conversion circuitry 1705. The analog-to-digital conversion circuitry 1705 samples the conditioned analog scan data signals at a sampling frequency at least two times the highest frequency component expected in the analog scan data signal, in accordance with the well known Nyquist criteria, and quantizes each time-sampled scan data signal value into a discrete signal level using a suitable length number representation (e.g. 8 bits) to produce a discrete scan data signal. A suitable quantization level can be selected in view of expected noise levels in the signal. Thereafter, the discrete scan data signal is processed by the programmed processor (e.g., a digital signal processor 1707 and associated memory 1709 as shown) to generate a sequence of digital words (i.e. a sequence of digital count values) $D_3$, each representing the time length associated with the signal level transitions in the corresponding digital scan data signal as described above. Preferably, these digital count values are in a suitable digital format for use in carrying out various symbol decoding operations which, like the scanning pattern and volume of the present invention, will be determined primarily by the particular scanning application at hand.

Figure 17B:
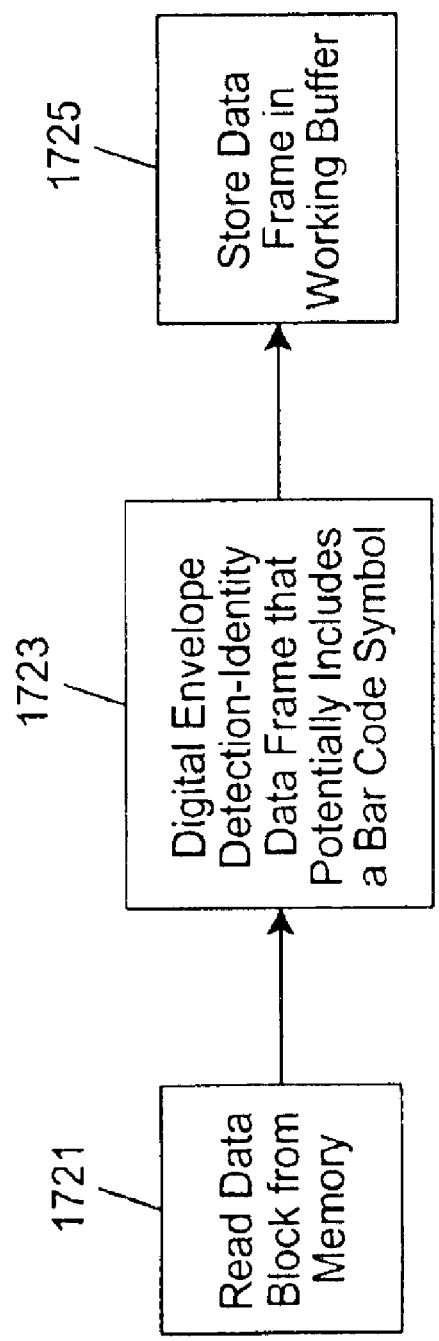
FIGS. 17B through 17D are functional block diagrams that illustrate exemplary digital implementations of the multi-path scan data processing according to the present invention, wherein digital signal processing operations are preferably carried out on the discrete scan data signal levels generated by the A/D converter 1705 and stored in the memory 1709 of FIG. 17A.
Figure 17C:
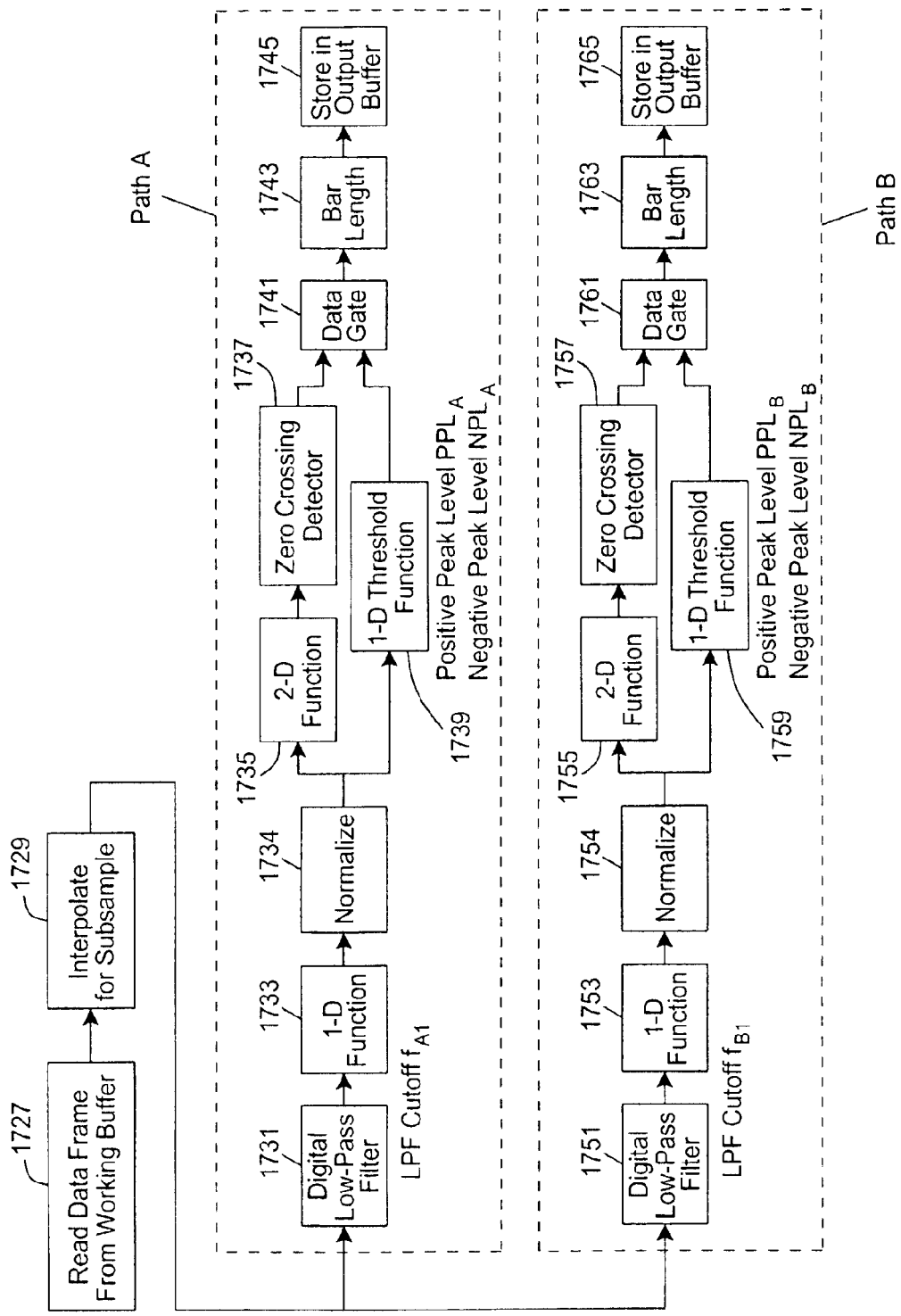
Figure 17D:
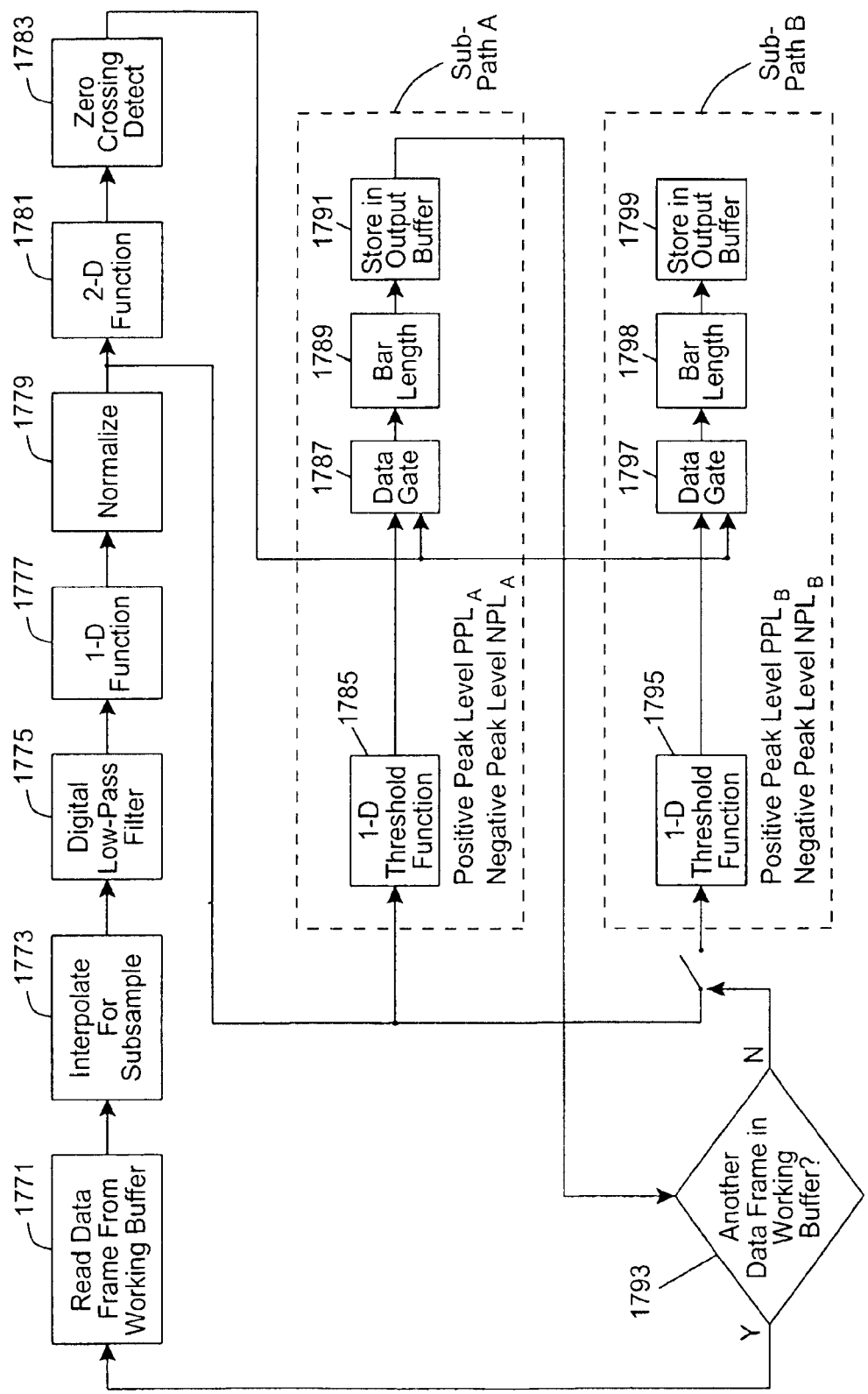

FIGS. 17B through 17D illustrate exemplary digital implementations of the multi-path scan data processing according to the present invention. The digital signal processing operations therein are preferably carried out on the discrete scan data signal levels generated by the A/D converter 1705 and stored in the memory 1709 of FIG. 17A.

FIG. 17B illustrates exemplary digital signal processing operations that identify a data frame (e.g., a portion of the discrete scan data signal levels stored in memory 1709) that potentially represents a bar code symbol (block 1723) and stores the data frame in a working buffer (block 1725). Signal processing techniques that identify a data frame (within the discrete signal levels stored in the memory 1709) that potentially represents a bar code symbol (block 1723) are well know in the art.

FIG. 17C illustrates exemplary digital signal processing operations that carry out multi-path scan data signal processing according to the present invention. More specifically, in block 1727, a data frame is read from the working buffer. Preferably, the data frame read from the working buffer in block 1727 was stored therein in block 1725 of FIG. 17B. Alternatively, the data frame may be a block of the discrete scan data signals levels generated by the A/D converter 1705 and stored in memory 1709 of FIG. 17A (or discrete scan data signals derived therefrom). The data values of the data frame are then processed by a sequence of signal processing blocks (blocks 1729, 1731–1745 and 1751–1765).

In block 1729, such data values are optionally interpolated (or sub-sampled). Interpolation increases the effective sampling rate of the system by adding data values that are derived from existing data values. Interpolation is a technique well known in the digital signal processing arts, and is discussed in great detail in Russ, "Image Processing Handbook," Third Edition, IEEE Press, 1999, pg. 219–220, herein incorporated by reference in its entirety. Sub-sampling (or decimation) decreases the effective sampling rate of the system. Sub-sampling is typically accomplished by averaging data values. Sub-sampling is a technique well known in the digital signal processing arts, and is discussed in great detail in Russ, "Image Processing Handbook," Third Edition, IEEE Press, 1999, pg. 166–174, herein incorporated by reference in its entirety. The resulting block of data values are provided to at least two processing paths (for example, two paths A and B as shown). The different digital signal processing functions of each path are preferably performed in parallel (for example, by separated threads in a multi-threaded processing system or by separate processors in a multi-processor system). Alternatively, the processing along each path may be performed sequentially.

In each respective processing path, the block of data values are subject to a digital low pass filter (blocks 1731 and blocks 1753) that filter out unwanted noise. Such digital low-pass filters preferably implement one of a Butterworth-type, Chebsychev-type, MFTD-type, or elliptical-type low pass filtering transfer function, which are well known in the filtering art. Details of the design of such digital filters is set forth in the book entitled "Electrical Filter Design Handbook," Third Edition, by A. Williams et al. McGraw-Hill, 1996, incorporated by reference above in its entirety. The output of the digital low pass filter (blocks 1731, 1751) is supplied to a first derivative processing function (blocks 1733, and 1753) which differentiate the filtered digital scan data signals supplied thereto. The output of the first derivative processing function (blocks 1733, 1753) is normalized (blocks 1734, 1754) and supplied to a first derivative thresholding function (blocks 1739 and 1759) and a second derivative processing function (blocks 1735 and 1755).

The second derivative processing function (blocks 1735, 1755) differentiates the data supplied thereto to generate data representing the second derivative of the data values read from the working buffer. Such data is supplied to a zero crossing detector function (blocks 1737, 1757), which produces output data ("zero crossing data") identifying zero crossings in the second derivative data generated by the second derivative function (blocks 1735, 1755).

The first derivative thresholding function (blocks 1739, 1759) operates as a positive and negative peak detector to provide output data that identifies time periods when the positive and negative peaks of the data supplied thereto exceed predetermined thresholds (i.e., a positive peak level PPL and a negative peak level NPL). Preferably, the positive peak level PPL and negative peak level NPL are dynamic thresholds (e.g., these levels change as the digital scan data values read from the working buffer change over time) based upon a predetermined digital value and a percentage (portion) of the corresponding normalized first derivative signal supplied thereto.

The data output of the zero crossing detector function (blocks 1737, 1757) and the first derivative thresholding function (blocks 1739, 1759) are supplied to a data gate function (blocks 1741, 1761), which functions to output only zero crossing data which corresponds to detected zero-crossings which occur substantially concurrent with the positive or negative peaks detected in the normalized first derivative data (as identified by the output data of the first derivative threshold function). Thereafter, the data output by the data gate function (which represents a discrete binary-level scan data signal) is supplied to a bar length function (blocks 1743, 1763), which produce a digital "time" count value for each of the first and second signal levels in the discrete binary scan data signal. Such digital count values form a sequence of digital word $D_3$, each representing the time length associated with the signal level transitions in the corresponding digital scan data signal as described above. These digital words are stored in an output buffer (blocks 1745, 1765), for supply to a programmed decoder for decoding the scan data signal and producing symbol character data string representative of the corresponding laser-scanned bar code symbol. Alternatively, the generated discrete binary-level scan data signal can be converted back into a continuous-type binary-level scan data signal so that it may be "digitized" using a digital signal processor of the type taught in U.S. Pat. No. 5,828,049, incorporated herein by reference.

Each digital signal processing path has different operational characteristics (such as different cutoff frequencies in the low pass filters (blocks 1731 and 1751) and/or different positive and negative signal thresholds in the first derivative threshold function (blocks 1739, 1759) of the respective paths). The varying operational characteristics of the paths are optimized to provide different digital signal processing functions.

For example, the cut-off frequencies in the low pass filters (blocks 1731 and 1751) of the respective paths can vary such that different paths minimize the paper noise originating from different focal zones of the system. Alternatively, such cut-off frequencies can such that vary such that one or more paths maximize the scan resolution of the system (i.e., a path with higher cutoff frequencies may be able to detect high resolution bar code symbols) while other paths minimize paper noise (i.e., a path with lower cutoff frequencies will reject paper noise from a larger frequency band above the selected cutoff frequencies).

In another example, the positive and negative signal thresholds in the first derivative threshold functions (blocks 1739, 1759) of the respective paths can vary such that one or more paths maximize the scan resolution of the system (i.e., a path with "smaller" positive and negative signal thresholds may be able to detect low contrast bar code symbols) while other paths minimize paper noise (i.e., a path with a "larger" positive and negative signal thresholds will reject paper noise that falls below such thresholds.

The different digital signal processing functions of each path as described above are preferably performed in parallel (for example, by separated threads in a multi-threaded processing system or by separate processors in a multi-processor system). Alternatively, the processing along each path may be performed sequentially. In this case, the programmable microcomputer (e.g., digital signal processing system) may be programmed to dynamically activate the processing of a given path based upon the operation of the scanner (for example, based upon the focal distance of the scanning plane from which the scan data signal is derived, which is described in detail in U.S. application Ser. No. (108-045USA000), or based upon results of previous scan processing of the system.

FIG. 17D illustrates alternative digital signal processing operations that carry out multi-path scan data signal processing according to the present invention. More specifically, in block 1771, a data frame is read from the working buffer. Preferably, the data frame read from the working buffer in block 1727 was stored therein in block 1725 of FIG. 17B. Alternatively, the data frame may be a block of the discrete scan data signals levels generated by the A/D converter 1705 and stored in memory 1709 of FIG. 17A (or discrete scan data signals derived therefrom). In block 1773, such data values are optionally interpolated (or sub-sampled). Interpolation increases the effective sampling rate of the system by adding data values that are derived from existing data values.

In block 1775, the resulting block of data values are subject to a digital low pass filter that filters out unwanted noise. Such digital low-pass filter preferably implements one of a Butterworth-type, Chebsychev-type, MFTD-type, or elliptical-type low pass filtering transfer function, which are well known in the filtering art. Details of the design of such digital filters is set forth in the book entitled "Electrical Filter Design Handbook," Third Edition, by A. Williams et al. McGraw-Hill, 1996, incorporated by reference above in its entirety. The output of the digital low pass filter (block 1775) is supplied to a first derivative processing function (block 1777) which differentiates the filtered digital scan data signals supplied thereto. The output of the first derivative processing function (block 1777) is normalized (block 1779) and supplied to a second derivative processing function (block 1781).

The second derivative processing function (block 1781) differentiates the data supplied thereto to generate data representing the second derivative of the data values read from the working buffer. Such data is supplied to a zero crossing detector function (block 1783), which produces output data ("zero crossing data") identifying zero crossings in the second derivative data generated by the second derivative function.

The normalized output of the first derivative processing function (block 1779) is also supplied to at least one processing sub-path (for example, sub-path A as shown). In the illustrative embodiment shown in FIG. 17D, the execution of the signal processing of the second sub-path B is contingent upon a status condition of the working buffer (e.g., whether it has (or has not) received another full data frame. Alternatively, the different digital signal processing functions of each sub-path may be performed in parallel (for example, by separated threads in a multi-threaded processing system or by separate processors in a multi-processor system).

Each processing sub-path includes a first derivative thresholding function (blocks 1785, 1795), which operates as a positive and negative peak detector to provide output data that identifies time periods when the positive and negative peaks of the data supplied thereto exceed predetermined thresholds (i.e., a positive peak level PPL and a negative peak level NPL). Preferably, the positive peak level PPL and negative peak level NPL are dynamic thresholds (e.g., these levels change as the digital scan data values read from the working buffer change over time) based upon a predetermined digital value and a percentage (portion) of the corresponding normalized first derivative signal supplied thereto.

The data output of the zero crossing detector function (block 1783) and the first derivative thresholding function of the respective path (block 1785, 1795) are supplied to a data gate function (blocks 1787, 1797), which functions to output only zero crossing data which corresponds to detected zero-crossings which occur substantially concurrent with the positive or negative peaks detected in the normalized first derivative data (as identified by the output data of the first derivative threshold function). Thereafter, the data output by the data gate function (which represents a discrete binary-level scan data signal) is supplied to a bar length function (blocks 1789, 1798), which produce a digital "time" count value for each of the first and second signal levels in the discrete binary scan data signal. Such digital count values form a sequence of digital word $D_3$, each representing the time length associated with the signal level transitions in the corresponding digital scan data signal as described above. These digital words are stored in an output buffer (blocks 1791, 1799), for supply to a programmed decoder for decoding the scan data signal and producing symbol character data string representative of the corresponding laser-scanned bar code symbol. Alternatively, the generated discrete binary-level scan data signal can be converted back into a continuous-type binary-level scan data signal so that it may be "digitized" using a digital signal processor of the type taught in U.S. Pat. No. 5,828,049, incorporated herein by reference.

Each digital signal processing sub-path of FIG. 17D has different operational characteristics (such as different positive and negative signal thresholds in the first derivative threshold function (blocks 1785, 1795) of the respective sub-paths). The varying operational characteristics of the sub-paths are optimized to provide different digital signal processing functions.

For example, the positive and negative signal thresholds in the first derivative threshold functions (blocks 1785, 1795) of the respective sub-paths can vary such that one or more sub-paths maximize the scan resolution of the system (i.e., a sub-path with "smaller" positive and negative signal thresholds may be able to detect low bar code symbols) while other sub-paths minimize paper noise (i.e., a sub-path with a "larger" positive and negative signal thresholds will reject paper noise that falls below such thresholds.

Note that the illustrative embodiments set forth above provide a multi-path scan data signal processor with two signal processing paths (or sub-paths) with different operational characteristics. It is contemplated that the multi-path scan data signal processor of the present invention includes more than two signal processing paths (or sub-paths) with different operational characteristics as described above.

Advantageously, the scan data signal processor of the present invention has an improved signal-to-noise ratio (SNR) and dynamic range, which effectively increases the length of each focal zone in the system. This allows the system designer to provide more overlap between adjacent focal zones or produce a laser scanning system with a larger overall depth of field. In addition, it produces a laser scanning system capable of scanning/resolving bar code symbols having narrower element widths and/or printed on substrates whose normal vector is disposed at large angles from the projection axis of scanning system.

Several modifications to the illustrative embodiments have been described above. It is understood, however, that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A bioptical laser scanning system providing 360° of omnidirectional bar code symbol scanning coverage at a point of sale (POS) station, said bioptical laser scanning system comprising:

a horizontal section integrally connected to a vertical section;

a horizontal-scanning window formed in said horizontal section;

a vertical-scanning window formed in said vertical section, and being substantially orthogonal to said bottom-scanning window;

a first plurality of laser beam folding mirrors disposed within said horizontal section;

a second plurality of laser beam folding mirrors disposed within said vertical section;

a first laser beam production module for producing a first laser beam, and a second laser beam production module for producing a second laser beam;

a first polygonal scanning element disposed within said horizontal section and having multiple reflective surfaces rotating about a first axis of rotation, for automatically scanning said first laser beam and producing a first laser scanning beam that reflects off said first plurality of laser beam folding mirrors to generate and project a first plurality of laser scanning planes through said horizontal-scanning window; and a second polygonal scanning element disposed within said vertical section and having multiple reflective surfaces rotating about a second axis of rotation, for automatically scanning said second laser beam and producing a second laser scanning beam that reflects off said second plurality of laser beam folding mirrors to generate and project a second plurality of laser scanning planes through said vertical-scanning window, whereby said first and second pluralities of laser scanning planes (i) intersect within predetermined scan regions contained within a 3-D scanning volume defined between said horizontal-scanning and vertical-scanning windows, and (ii) generate a plurality of groups of quasi-orthogonal laser scanning planes within said 3-D scanning volume, and wherein each group of quasi-orthogonal laser scanning planes comprises a plurality of substantially-vertical laser scanning planes for reading bar code symbols having bar code elements (i.e., ladder type bar code symbols) that are oriented substantially horizontal with respect to the horizontal-scanning window, and a plurality of substantially-horizontal laser scanning planes for reading bar code symbols having bar code elements (i.e., picket-fence type bar code symbols) that are oriented substantially vertical with respect to the horizontal-scanning window; and wherein said plurality of groups of quasi-orthogonal laser scanning planes form a complex omni-directional 3-D laser scanning pattern within said 3-D scanning volume capable of scanning a bar code symbol located on the surface of an object presented within said 3-D scanning volume at any orientation and from any direction at said POS station so as to provide 360° of omnidirectional bar code symbol scanning coverage at said POS station.

2. The bioptical laser scanning system of claim 1, wherein the height dimension of the said horizontal section is less than about 4.5 inches for installation of said horizontal section within a countertop surface at said POS.

3. The bioptical laser scanning system of claim 1, wherein said plurality of groups of intersecting laser scanning planes comprises over 60 different laser scanning planes cooperating within said 3-D scanning volume to generate said complex omni-directional 3-D laser scanning pattern.

4. The bioptical laser scanning system of claim 1, wherein said first laser beam production module comprises a first visible laser diode (VLD), and said second laser beam production module comprises a second visible laser diode (VLD).

5. The bioptical laser scanning system of claim 1, wherein said first plurality of laser beam folding mirrors and said first laser production module cooperate with first and second light collecting/focusing optical elements and first and second photodetectors disposed within said horizontal housing section to form first and second scanning stations disposed about said first polygonal scanning element, and wherein the light collecting/focusing optical element within each said laser scanning station collects light from predetermined scan regions within said 3-D scanning volume and focuses such collected light onto the respective photodetector to produce an electrical signal having an amplitude proportional to the intensity of light focused thereon, and said electrical signal being supplied to analog/digital signal processing circuitry for processing analog and digital scan data signals derived therefrom to perform bar code symbol reading operations.

6. The bioptical laser scanning system of claim 5, wherein said second plurality of laser beam folding mirrors and said second laser production module cooperate with a third light collecting/focusing optical element and a third photodetector disposed within said vertical housing section to form third scanning station disposed about said second polygonal scanning element, and wherein the light collecting/focusing optical element within said third laser scanning station collects light from predetermined scan regions within said 3-D scanning volume and focuses such collected light onto the third photodetector to produce an electrical signal having an amplitude proportional to the intensity of light focused thereon, and said electrical signal being supplied to analog/digital signal processing circuitry for processing analog and digital scan data signals derived therefrom to perform bar code symbol reading operations.

7. The bioptical laser scanning system of claim 1, wherein said first polygonal scanning element comprises a first polygonal scanning mirror having a first plurality of rotating mirror facets, and wherein said second polygonal scanning element comprises a second polygonal scanning mirror having a second plurality of rotating mirror facets.

8. The bioptical laser scanning system of claim 7, wherein said second plurality of rotating mirror facets on said second polygonal scanning mirror are classifiable into a first class of facets having High Elevation (HE) angle characteristics, and a second class of facets having Low Elevation (LE) angle characteristics.

9. The bioptical laser scanning system of claim 1, wherein said complex omni-directional 3-D laser scanning pattern is generated from said horizontal-scanning window and said vertical-scanning window during the revolution of said first and second polygonal scanning mirrors.

* * * * *